US006909419B2

(12) United States Patent
Zavracky et al.

(10) Patent No.: US 6,909,419 B2
(45) Date of Patent: *Jun. 21, 2005

(54) PORTABLE MICRODISPLAY SYSTEM

(75) Inventors: Matthew Zavracky, Plympton, MA (US); Jeffrey Jacobsen, Hollister, CA (US); Frederick P. Herrmann, Sharon, MA (US); Wen-Foo Chern, Wayland, MA (US); Hiap L. Ong, Taipai (TW); John C. C. Fan, Chestnut Hill, MA (US); Bor-Yeu Tsaur, Lexington, MA (US); Alan Richard, Wrentham, MA (US); Ron Gale, Sharon, MA (US); Jason Lo, Westboro, MA (US); Stephen A. Pombo, Campbell, CA (US); Rodney Bumgardner, Los Gatos, CA (US)

(73) Assignee: Kopin Corporation, Taunton, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/153,744

(22) Filed: Sep. 15, 1998

(65) Prior Publication Data

US 2002/0154082 A1 Oct. 24, 2002

Related U.S. Application Data

(63) Continuation-in-part of application No. 09/066,061, filed on Apr. 24, 1998, which is a continuation-in-part of application No. 09/004,706, filed on Jan. 8, 1998, now Pat. No. 6,476,784, which is a continuation-in-part of application No. 08/961,744, filed on Oct. 31, 1997, now Pat. No. 6,552,704.

(51) Int. Cl.[7] .............................................. G09G 3/36

(52) U.S. Cl. ......................... 345/102; 345/88; 345/183
(58) Field of Search .............................. 345/88, 89, 90, 345/92, 104, 182, 183, 536; 348/207, 222, 333.01–333.12, 335, 358, 370, 371

(56) References Cited

U.S. PATENT DOCUMENTS

| 4,010,322 A | 3/1977 | Nathanson ................... 358/233 |
| 4,159,417 A | 6/1979 | Rubincam .................... 235/375 |

(Continued)

FOREIGN PATENT DOCUMENTS

| CA | 2123461 | 11/1994 |

(Continued)

OTHER PUBLICATIONS

"Hand–held Videophone," *Popular Science* (Feb. 1992).

(Continued)

Primary Examiner—Henry N. Tran
Assistant Examiner—Jean Lesperance
(74) Attorney, Agent, or Firm—Hamilton, Brook, Smith & Reynolds, P.C.

(57) ABSTRACT

An active matrix color crystal display has an active matrix circuit, a counterelectrode panel and an interposed layer of liquid crystal. The active matrix display is located in a portable microdisplay system that has a display computer that generates images to be displayed on the liquid crystal display and connected to the active matrix liquid crystal display. A data link transmits data at a rate of speed of greater than 200 Mbytes per second in series for at least a portion between the display computer and the active matrix liquid crystal display. In a preferred embodiment, the display system has a randomizing device that alternates the amplifier through which an analog video signal passes.

38 Claims, 92 Drawing Sheets

U.S. PATENT DOCUMENTS

| | | |
|---|---|---|
| 4,258,387 A | 3/1981 | Lemelson et al. ............. 358/85 |
| 4,336,524 A | 6/1982 | Levine .................... 340/311.1 |
| 4,532,506 A | 7/1985 | Kitazima et al. ............ 340/784 |
| 4,573,766 A | 3/1986 | Bournay, Jr. et al. ........ 350/345 |
| 4,630,895 A | 12/1986 | Abdala, Jr. et al. ......... 350/345 |
| 4,636,866 A | 1/1987 | Hattori ....................... 358/236 |
| 4,695,129 A | 9/1987 | Faessen et al. ........... 350/96.25 |
| 4,704,740 A | 11/1987 | McKee et al. ............... 455/348 |
| 4,714,980 A | 12/1987 | Hara .......................... 361/395 |
| 4,814,876 A | 3/1989 | Horio et al. ................. 358/160 |
| 4,837,817 A | 6/1989 | Maemori ..................... 358/224 |
| 4,856,045 A | 8/1989 | Hoshina ....................... 379/53 |
| 4,856,088 A | 8/1989 | Oliwa et al. ................. 455/349 |
| 4,873,576 A | 10/1989 | Hattori et al. ............... 358/224 |
| 4,916,441 A | 4/1990 | Gombrich .................... 340/712 |
| 4,917,469 A | 4/1990 | Ross .......................... 350/332 |
| 4,928,300 A | 5/1990 | Ogawa et al. ................. 379/53 |
| 4,934,773 A | 6/1990 | Becker ......................... 350/6.6 |
| 4,959,642 A | 9/1990 | Sharples ..................... 340/716 |
| 4,977,456 A | 12/1990 | Furuya ................... 358/213.13 |
| 4,985,697 A | 1/1991 | Bolton ........................ 340/750 |
| 5,003,300 A | 3/1991 | Wells ......................... 340/705 |
| 5,008,658 A | 4/1991 | Russay et al. ............... 340/784 |
| 5,008,788 A | 4/1991 | Palinkas ..................... 362/231 |
| 5,023,931 A | 6/1991 | Streck et al. .................. 455/21 |
| 5,042,918 A | 8/1991 | Suzuki ......................... 359/59 |
| 5,048,077 A | 9/1991 | Wells et al. ................... 379/96 |
| 5,077,784 A | 12/1991 | Fujita et al. ................... 379/53 |
| 5,079,627 A | 1/1992 | Filo ............................. 358/85 |
| 5,087,113 A | 2/1992 | Sakono et al. ................. 359/59 |
| 5,106,179 A | 4/1992 | Kamaya et al. ............. 351/158 |
| 5,111,498 A | 5/1992 | Guichard et al. .............. 379/53 |
| 5,122,880 A | 6/1992 | Nagano ....................... 358/209 |
| 5,132,825 A | 7/1992 | Miyadera ..................... 359/85 |
| 5,138,312 A | 8/1992 | Tsukamoto et al. ..... 340/825.44 |
| 5,162,828 A | 11/1992 | Furness et al. .............. 353/122 |
| 5,164,833 A | 11/1992 | Aoki ........................... 358/224 |
| 5,164,980 A | 11/1992 | Bush et al. .................... 379/53 |
| 5,177,405 A * | 1/1993 | Kusuda et al. ............ 315/169.1 |
| 5,185,712 A | 2/1993 | Sato et al. ................... 358/224 |
| 5,189,632 A | 2/1993 | Paajanen et al. ........ 364/705.05 |
| 5,206,749 A | 4/1993 | Zavracky et al. .............. 359/59 |
| 5,220,366 A | 6/1993 | King ............................ 354/76 |
| 5,224,198 A | 6/1993 | Jachimowicz et al. ....... 385/133 |
| 5,256,562 A | 10/1993 | Vu et al. ....................... 437/86 |
| 5,258,325 A | 11/1993 | Spitzer et al. ................. 437/86 |
| 5,260,625 A | 11/1993 | Holden et al. ............... 313/486 |
| 5,281,957 A | 1/1994 | Schoolman ..................... 345/8 |
| 5,300,788 A | 4/1994 | Fan et al. ...................... 257/13 |
| 5,300,976 A | 4/1994 | Lim et al. .................... 354/219 |
| 5,305,244 A | 4/1994 | Newman et al. .......... 364/708.1 |
| 5,311,206 A | 5/1994 | Nelson ......................... 345/89 |
| 5,317,236 A | 5/1994 | Zavracky et al. ......... 315/169.3 |
| 5,321,416 A | 6/1994 | Bassett et al. .................. 345/8 |
| 5,322,989 A | 6/1994 | Long et al. .................. 235/375 |
| 5,325,429 A | 6/1994 | Kurgan ....................... 379/429 |
| 5,335,276 A | 8/1994 | Thompson et al. ........... 380/21 |
| 5,337,068 A | 8/1994 | Stewart et al. ................ 345/88 |
| 5,347,378 A | 9/1994 | Handschy et al. ............ 359/53 |
| 5,347,400 A | 9/1994 | Hunter ....................... 359/815 |
| 5,362,671 A | 11/1994 | Zavracky et al. .............. 437/81 |
| 5,371,493 A | 12/1994 | Sharpe et al. .......... 340/825.34 |
| 5,373,181 A | 12/1994 | Scheiter et al. .............. 257/415 |
| 5,376,979 A | 12/1994 | Zavracky et al. ............ 353/122 |
| 5,381,179 A | 1/1995 | Kashimura .................. 348/376 |
| 5,404,580 A | 4/1995 | Simpson et al. .............. 455/89 |
| 5,412,396 A | 5/1995 | Nelson ......................... 345/89 |
| 5,416,496 A | 5/1995 | Wood ......................... 345/102 |
| 5,422,656 A | 6/1995 | Allard et al. ................ 345/173 |
| 5,432,358 A | 7/1995 | Nelson et al. ................ 257/81 |
| 5,444,557 A | 8/1995 | Spitzer et al. ................. 359/59 |
| 5,455,572 A | 10/1995 | Cannon et al. ......... 340/825.44 |
| 5,469,278 A | 11/1995 | Takahara et al. .............. 359/51 |
| 5,471,045 A | 11/1995 | Geronimi .................... 235/492 |
| 5,483,285 A | 1/1996 | Lim et al. .................... 348/341 |
| 5,485,318 A | 1/1996 | Lebby et al. ................ 359/811 |
| 5,485,504 A | 1/1996 | Ohnsorge ..................... 379/58 |
| 5,486,708 A | 1/1996 | Takahashi et al. ............. 257/59 |
| 5,486,946 A | 1/1996 | Jachimowicz et al. ...... 359/263 |
| 5,493,437 A | 2/1996 | Lebby et al. ................ 359/152 |
| 5,500,517 A | 3/1996 | Cagliostro .................. 235/486 |
| 5,506,705 A | 4/1996 | Yamamoto et al. ........... 359/40 |
| 5,515,424 A | 5/1996 | Kenney ....................... 379/96 |
| 5,528,285 A | 6/1996 | Morikawa et al. ............ 348/14 |
| 5,528,397 A | 6/1996 | Zavracky et al. ............. 359/59 |
| 5,537,129 A | 7/1996 | Okada et al. .................. 345/90 |
| 5,539,554 A | 7/1996 | Lebby et al. .................. 359/83 |
| 5,541,640 A | 7/1996 | Larson ......................... 348/19 |
| 5,544,111 A | 8/1996 | Berthozat et al. ......... 365/225.7 |
| 5,548,271 A | 8/1996 | Tsuchiyama et al. .... 340/311.1 |
| 5,549,747 A | 8/1996 | Bozler et al. ................. 117/43 |
| 5,561,538 A | 10/1996 | Kato et al. .................... 359/40 |
| 5,572,045 A | 11/1996 | Takahashi et al. ............. 257/59 |
| 5,579,165 A | 11/1996 | Michel et al. ............... 359/630 |
| 5,584,070 A | 12/1996 | Harris et al. ................. 455/346 |
| 5,585,948 A | 12/1996 | Petera ......................... 349/143 |
| 5,596,451 A | 1/1997 | Handschy et al. ........... 359/633 |
| 5,606,392 A * | 2/1997 | Tintera et al. ............... 396/161 |
| 5,608,553 A | 3/1997 | Kim ............................ 349/61 |
| 5,627,560 A | 5/1997 | Verhulst |
| 5,634,080 A | 5/1997 | Kikinis et al. ............... 395/893 |
| 5,642,129 A | 6/1997 | Zavracky et al. ............ 345/100 |
| 5,646,432 A | 7/1997 | Iwaki et al. ................. 257/347 |
| 5,666,133 A | 9/1997 | Matsuo et al. ............... 345/100 |
| 5,673,059 A | 9/1997 | Zavracky et al. |
| 5,705,424 A | 1/1998 | Zavracky et al. ............. 437/86 |
| 5,748,160 A | 5/1998 | Shieh et al. ................... 345/82 |
| 5,748,237 A | 5/1998 | Ueda et al. .................. 348/333 |
| 5,767,828 A | 6/1998 | McKnight ..................... 345/89 |
| 5,815,126 A * | 9/1998 | Fan et al. ........................ 345/8 |
| 5,818,634 A | 10/1998 | Richard et al. .............. 359/565 |
| 5,821,911 A | 10/1998 | Jachimowicz ................. 345/7 |
| 5,867,795 A | 2/1999 | Novis et al. ................. 455/566 |
| 5,912,651 A * | 6/1999 | Bitzakidis et al. ........... 345/102 |
| 5,920,298 A | 7/1999 | McKnight ..................... 345/87 |
| 5,926,218 A * | 7/1999 | Smith ......................... 348/358 |
| 6,005,649 A * | 12/1999 | Krusius et al. ................ 349/73 |
| 6,073,034 A * | 6/2000 | Jacobsen et al. ............. 455/566 |
| 6,145,025 A * | 11/2000 | Lim ............................. 710/22 |
| 6,151,004 A | 11/2000 | Kaneko ....................... 345/88 |
| 6,205,199 B1 * | 3/2001 | Polichar et al. ............ 378/98.2 |

FOREIGN PATENT DOCUMENTS

| | | |
|---|---|---|
| DE | 27 15 446 | 10/1978 |
| DE | 28 20 096 A1 | 11/1979 |
| DE | 38 28 485 A1 | 3/1990 |
| DE | G 92 00 683.3 | 6/1992 |
| EP | 0 172 473 A2 | 2/1986 |
| EP | 0 344 881 A2 | 12/1989 |
| EP | 0 352 914 A2 | 1/1990 |
| EP | 0 424 880 A2 | 5/1991 |
| EP | 0 438 362 A1 | 7/1991 |
| EP | 0 464 011 A1 | 1/1992 |
| EP | 0 472 361 A2 | 2/1992 |
| EP | 0 491 639 A1 | 6/1992 |
| EP | 0 526 802 A2 | 2/1993 |
| EP | 0 535 401 A1 | 4/1993 |
| EP | 0 539 699 A2 | 5/1993 |
| EP | 0 539 907 A3 | 5/1993 |
| EP | 0 547 493 A1 | 6/1993 |
| EP | 0 551 781 A1 | 7/1993 |

| | | |
|---|---|---|
| EP | 0 626 773 A1 | 11/1994 |
| EP | 0 689 350 A2 | 12/1995 |
| EP | 0 626 773 B1 | 2/1996 |
| EP | 0 702 338 A2 | 7/1996 |
| EP | 0 732 606 A2 | 9/1996 |
| EP | 0 772 068 A1 | 6/1997 |
| EP | 0 791 891 A1 | 8/1997 |
| EP | 0 864 917 A1 | 9/1998 |
| FR | 2612351 | 9/1988 |
| GB | 2 242 335 A | 9/1991 |
| GB | 2 289 555 | 11/1995 |
| GB | 2 308 486 | 6/1997 |
| JP | 61-139177 | 6/1986 |
| JP | 62-91045 | 4/1987 |
| JP | 63-151283 | 6/1988 |
| JP | 1-160286 | 6/1989 |
| JP | 2-113656 | 4/1990 |
| JP | 2-196570 | 8/1990 |
| JP | 2-218251 | 8/1990 |
| JP | 3-53785 | 3/1991 |
| JP | 3-105383 | 5/1991 |
| JP | 3-136487 | 6/1991 |
| JP | 5-14550 | 1/1993 |
| JP | 5-252523 | 9/1993 |
| JP | 6-123852 | 5/1994 |
| JP | 6-141308 | 5/1994 |
| JP | 7-177398 | 7/1995 |
| JP | 7-235892 | 9/1995 |
| JP | 8-76078 | 3/1996 |
| JP | 8-95027 | 4/1996 |
| JP | 8-102877 | 4/1996 |
| JP | 8-114783 | 5/1996 |
| JP | 8-129157 | 5/1996 |
| JP | 8-149346 | 6/1996 |
| JP | 8-149485 | 6/1996 |
| JP | 8-154190 | 6/1996 |
| JP | 8-248499 | 9/1996 |
| JP | 8-340546 | 12/1996 |
| JP | 9-26617 | 1/1997 |
| JP | 9-55872 | 2/1997 |
| WO | WO 90/13096 | 11/1990 |
| WO | 92/12453 | 7/1992 |
| WO | 93/01583 | 1/1993 |
| WO | 93/16550 | 8/1993 |
| WO | 93/18428 | 9/1993 |
| WO | 93/23783 | 11/1993 |
| WO | 94/01958 | 1/1994 |
| WO | 94/09398 | 4/1994 |
| WO | 94/11775 | 5/1994 |
| WO | 94/14152 | 6/1994 |
| WO | 95/11473 | 4/1995 |
| WO | 95/25983 | 9/1995 |
| WO | 95/26110 | 9/1995 |
| WO | 96/19794 | 6/1996 |
| WO | 96/21173 | 7/1996 |
| WO | 96/21205 | 7/1996 |
| WO | 96/35288 | 11/1996 |
| WO | 97/01240 | 1/1997 |
| WO | WO 98/27538 | 6/1998 |
| WO | WO 98/27540 | 6/1998 |

OTHER PUBLICATIONS

"VideoPhone price cut to $1,000," *USA TODAY* (Jan. 2, 1993).

"SA620 Integrated Front–End," *Philips Electronics North America Corp.* (1993).

Kummerow, T., Meurer, W., "Bildtelefon—ein Kommunikationsdienst im ISDN ab 1991," *Telenorma Nachrichten, Telenorma Bosch Gruppe* 1989 Heft 93, pp. 52, 53, index and cover page.

Linder, Ben, "A whole lot smarter," *Telephony*, pp. 22, 23, 26, 28 and cover (May 19, 1997).

* cited by examiner

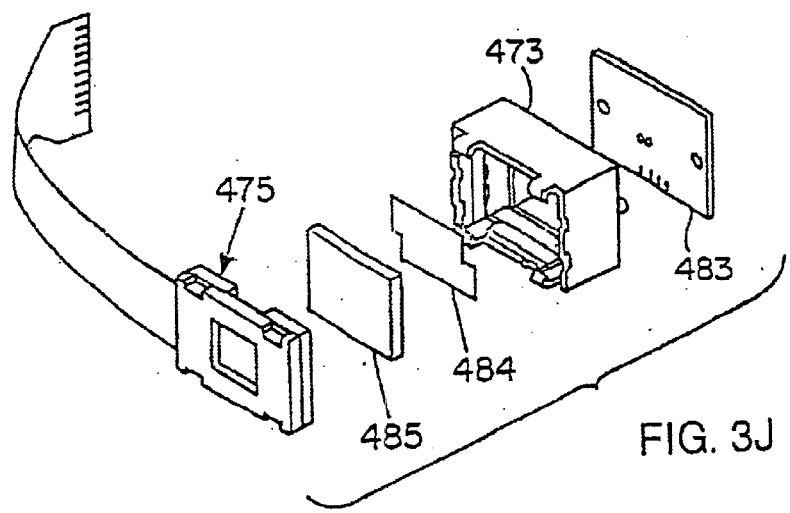
FIG. 3J
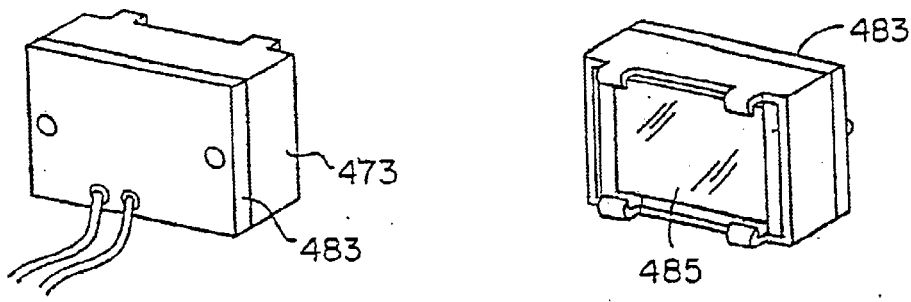
FIG. 3K
FIG. 3L
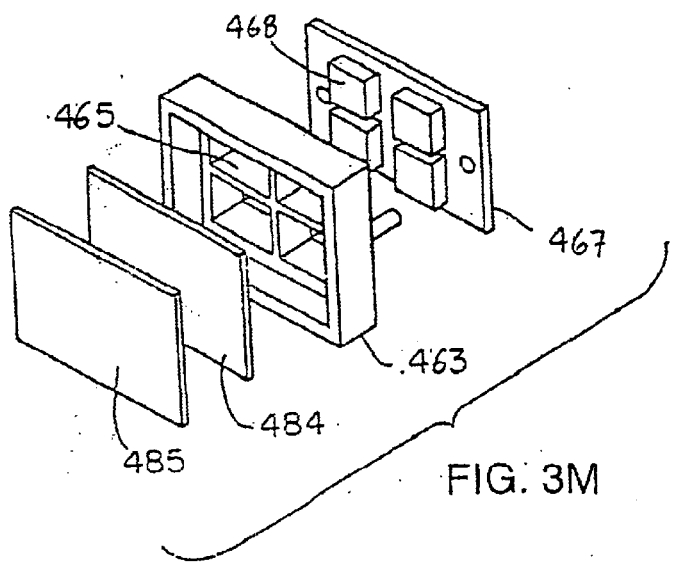
FIG. 3M

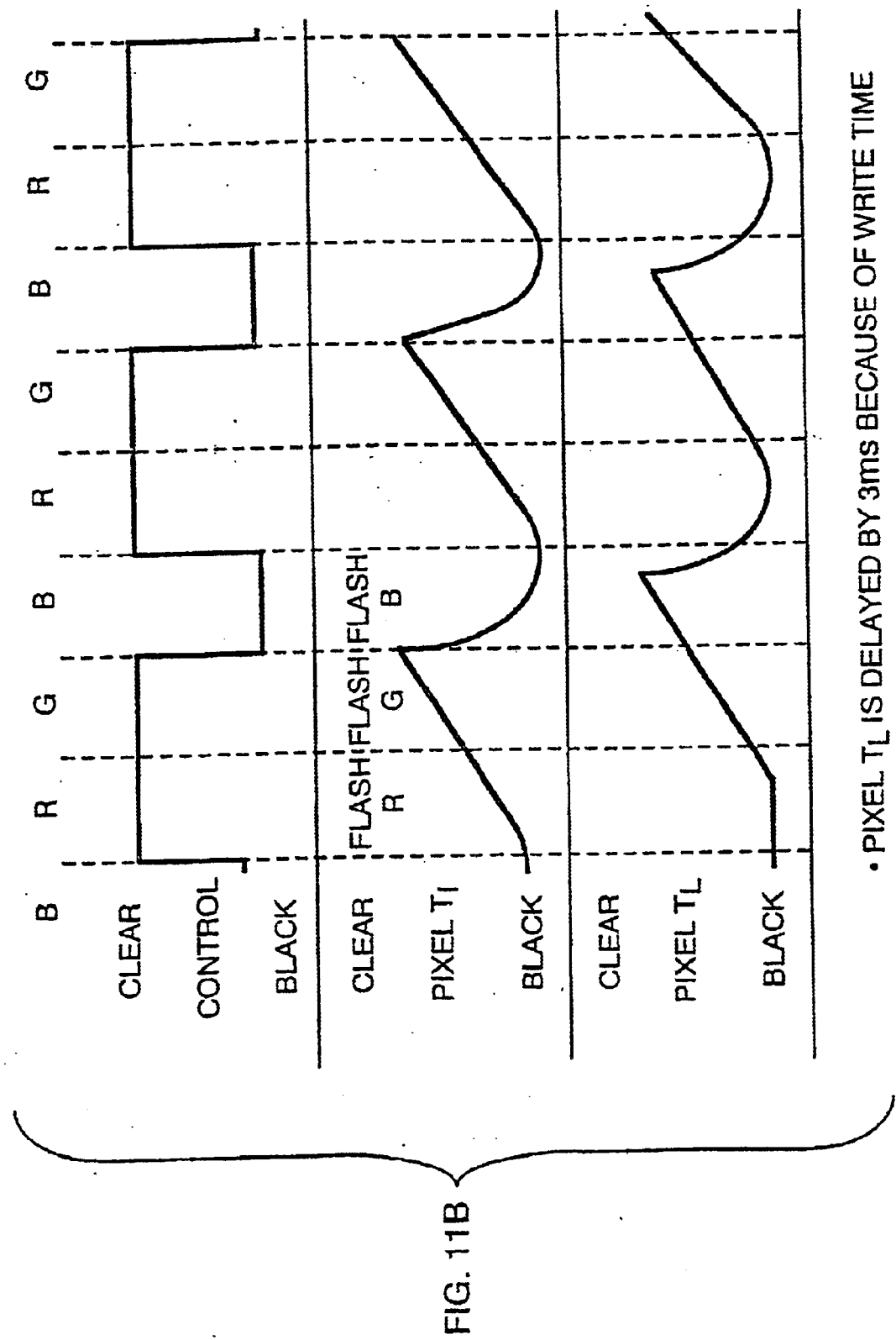

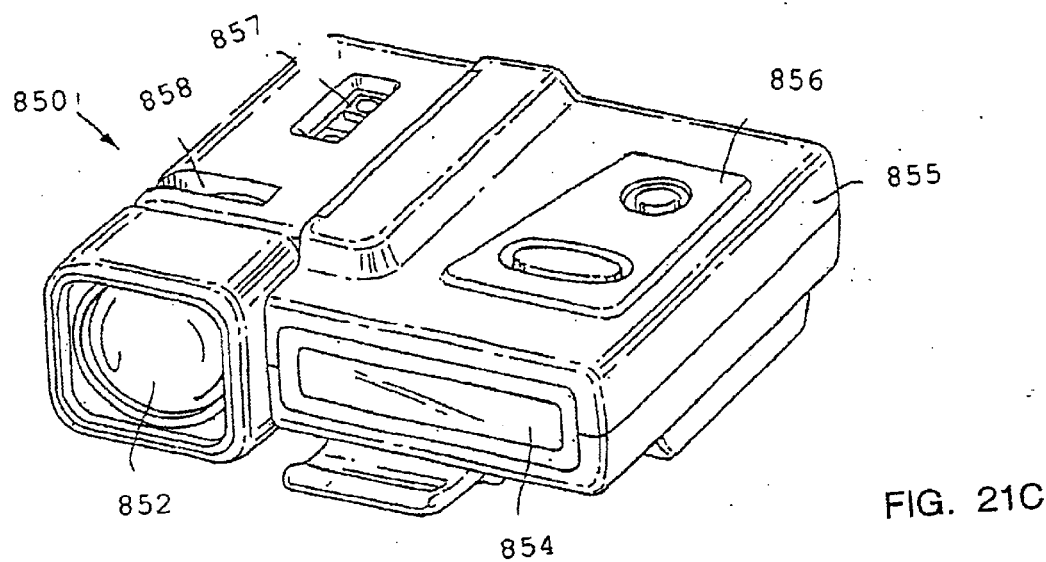
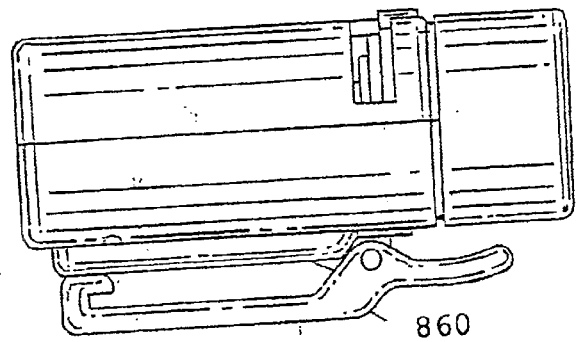
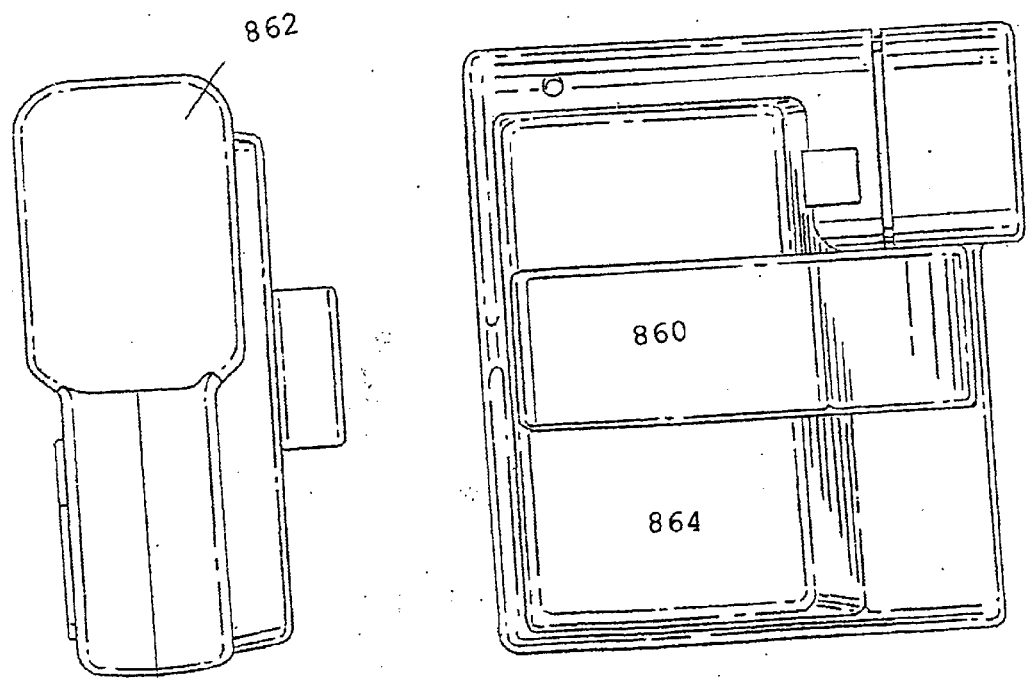
FIG. 21A
FIG. 21C
FIG. 21B
FIG. 21D

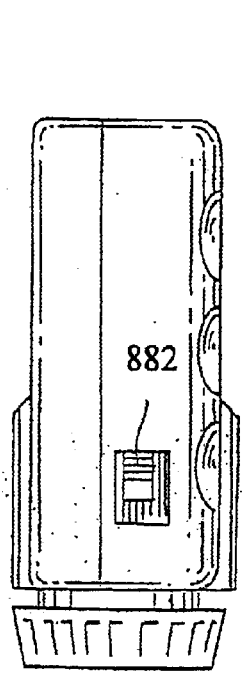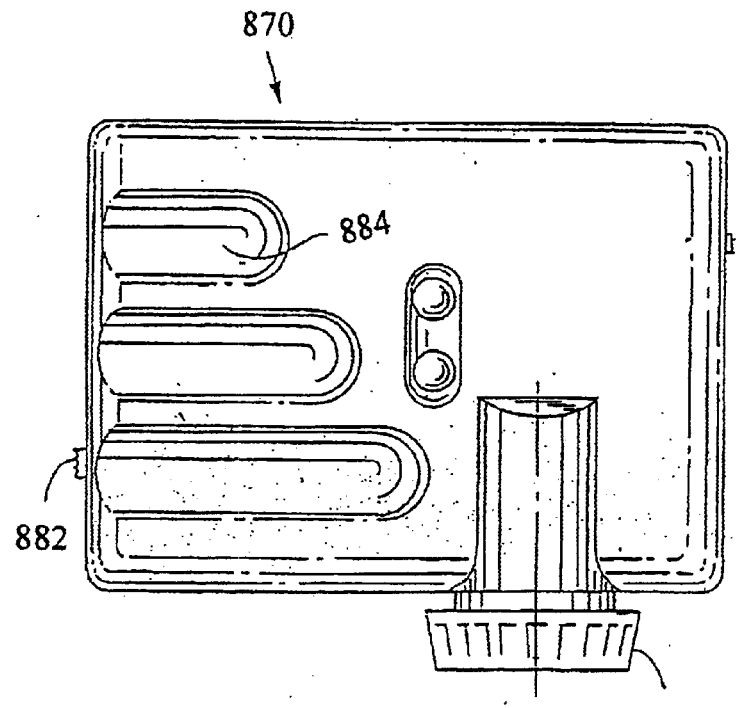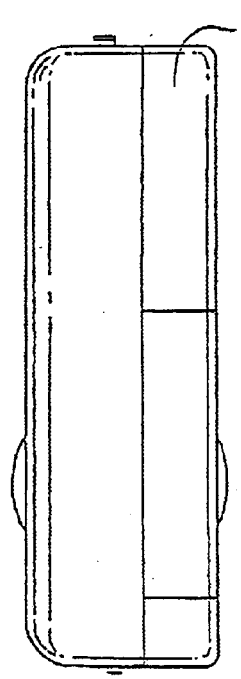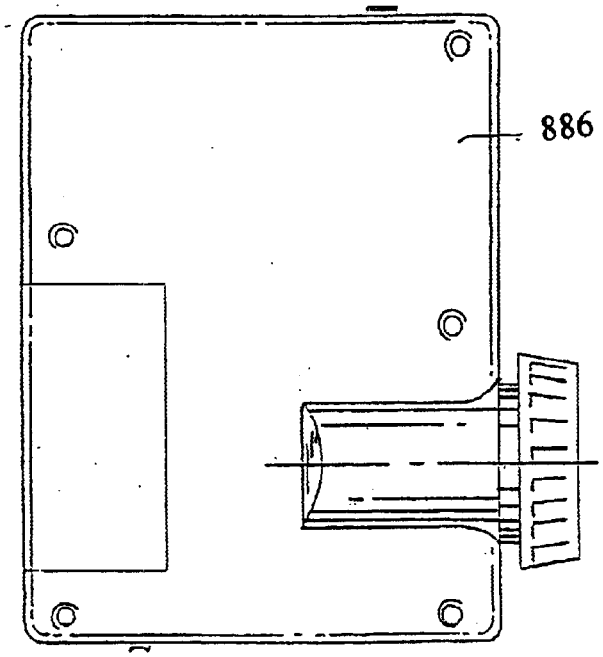
FIG. 21G
FIG. 21F
FIG. 21H
FIG. 21I

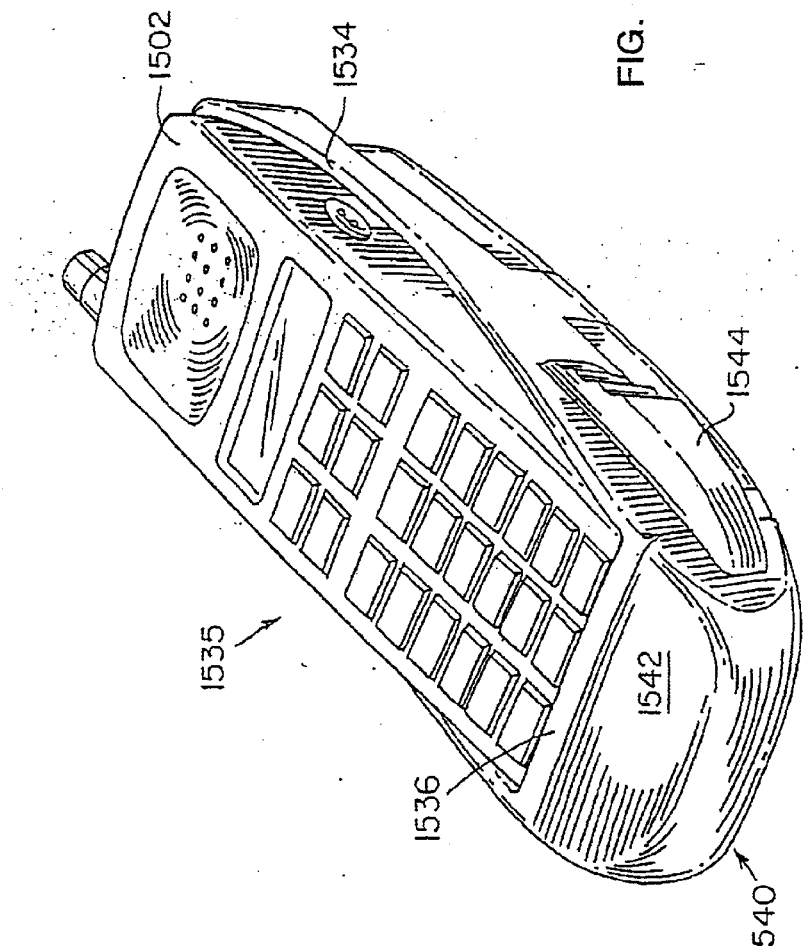
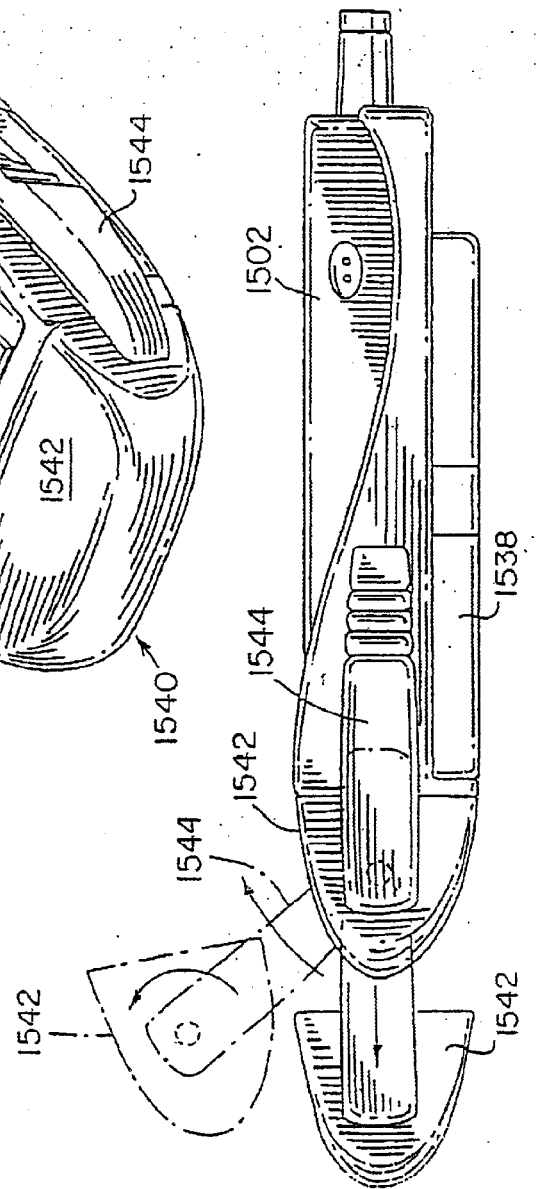

PORTABLE MICRODISPLAY SYSTEM

RELATED APPLICATION(S)

This application is a Continuation-in-Part of U.S. application Ser. No. 09/066,061 filed on Apr. 24, 1998 which is a Continuation-in-Part of U.S. application Ser. No. 09/004,706 filed on Jan. 8, 1998 now U.S. Pat. No. 6,476,784 which is a Continuation-in-Part of U.S. application Ser. No. 08/961,744 filed Oct. 31, 1997, now U.S. Pat. No. 6,552,704 the entire contents of which are incorporated herein by reference.

BACKGROUND OF THE INVENTION

Flat-panel displays are being developed which utilize liquid crystals or electroluminescent materials to produce high quality images. These displays are expected to supplant cathode ray tube (CRT) technology and provide a more highly defined television picture or computer monitor image. The most promising route to large scale high quality liquid crystal displays (LCDs), for example, is the active-matrix approach in which thin-film transistors (TFTs) are co-located with LCD pixels. The primary advantage of the active matrix approach using TFTs is the elimination of cross-talk between pixels, and the excellent gray scale that can be attained with TFT-compatible LCDs.

Color liquid crystal flat panel displays can be made in several different ways including with color filters or sequentially flashing lights. Both style displays are found in transmissive or reflective models.

Transmissive color filter liquid crystal flat panel displays generally include five different layers: a white light source, a first polarizing filter that is mounted on one side of a circuit panel on which the TFTs are arrayed to form pixels, a filter plate containing at least three primary colors arranged into pixels, and finally a second polarizing filter. A volume between the circuit panel and the filter plate is filled with a liquid crystal material. This material will allow transmission of light in the material when an electric field is applied across the material between the circuit panel and a ground affixed to the filter plate. Thus, when a particular pixel of the display is turned on by the TFTs, the liquid crystal material rotates polarized light being transmitted through the material so that the light will pass through the second polarizing filter.

In sequential color displays, the display panel is triple scanned, once for each primary color. For example, to produce color frames at 20 Hz, the active matrix must be driven at a frequency of 60 Hz. In order to reduce flicker, it is desirable to drive the active matrix at 180 Hz to produce a 60 Hz color image. At over 60 Hz, visible flicker is reduced.

Owing to the limitations of amorphous silicon, other alternative materials include polycrystalline silicon, or laser recrystallized silicon. These materials are limited as they use silicon that is already on glass, which generally restricts further circuit processing to low temperatures.

Integrated circuits for displays, such as the above referred color sequential display, are becoming more and more complex. For example, the color sequential display is designed for displaying High Definition Television (HDTV) formats requiring a 1280-by-1024 pixel array with a pixel pitch, or the distance between lines connecting adjacent columns or rows of pixel electrodes, being in the range of 15–55 microns, and fabricated on a single five-inch wafer.

SUMMARY OF THE INVENTION

In accordance with the invention, the cost and complexity of high resolution displays are significantly reduced by fabricating multiple integrated displays of reduced size on a single wafer and then dicing the wafer to produce a plurality of display devices.

The displays are then assembled with appropriate magnifying optics to form a portable display system of low cost and reduced size. Included in the optics is a magnification system which compensates for the small image size by magnifying and projecting the image at an appropriate distance for viewing.

In preferred embodiments, an active matrix color sequential liquid crystal display has an active matrix circuit, a counterelectrode panel, and an interposed layer of liquid crystal. The active matrix circuit has an array of transistor circuits formed in a first plane. Each transistor circuit is connected to a pixel electrode in an array of pixel electrodes having an area of 200 mm$^2$ or less and preferably under 100 mm$^2$. The counterelectrode panel extends in a second plane that is parallel to the first plane, such that the counterelectrode panel receives an applied voltage. The liquid crystal layer is interposed in a cavity between the two planes. The cavity has a depth along an axis perpendicular to the first and second planes of less than 3 microns.

In a preferred embodiment, an oxide layer extends between the pixel electrode array and a layer of liquid crystal material. The oxide has a first thickness in a peripheral region around the array of pixel electrodes and a thinner second thickness in a pixel electrode region extending over the array of pixel electrodes. The thick peripheral region (about 0.5 microns in a preferred embodiment) serves to better isolate the driver electrodes integrated into the display circuit. The thinner oxide region (about 0.3 microns) serves to reduce the voltage drop across the oxide during display operations. This serves to increase the applied voltage on the liquid crystal without the need to draw more power from the power source such as a battery.

In a preferred embodiment, the liquid crystal is a super-fluorinated material. This material has the desired combination of characteristics that improves color sequential operation. A concern associated with liquid crystal displays is voltage buildup. One preferred method of controlling the liquid crystal is to invert the signal for alternative columns to eliminate voltage buildup. Another preferred method of controlling the liquid crystal in the display includes switching the applied voltage to the counterelectrode panel after every subframe which is referred to as $V_{COM}$ modulation.

In addition to eliminating the buildup of voltage, the technique of alternating the voltage to the counterelectrode panel after every subframe in addition has the additional benefit of improving both the color uniformity and maximum contrast.

In addition to $V_{COM}$ modulation, there are several other techniques that can be used in conjunction with or separately from $V_{COM}$ modulation to improve the quality of image on the display. It has been recognized that the temperature of microdisplay and in particular the liquid crystal effects the response of the liquid crystal and the brightness and the color uniformity of the image on the display.

An alternative method and one which can be used independently or in conjunction with $V_{COM}$ modulation is to initialize the pixels $V_{PIXEL}$ to $V_{COM}$ after flashing the backlight. With the pixel electrodes set to $V_{COM}$, the liquid crystal begins to relax to the clear state, if the liquid crystal associated with the pixel is in some other state. The liquid crystal associated with each pixel is relaxing, rotating to the clear state, until that pixel receives the signal. The first pixels will have the majority of the writing period to get to their desired position and the initializing of the pixel to $V_{COM}$ will have minimum effect. Therefore, the pixels which receive their signal last will be clear or near clear prior to receiving their signal. The liquid crystal in this preferred embodiment is oriented such that it takes less time to drive black than relax white. Therefore, with the end pixels being clear, the response time is quicker driving to black than if the pixels were black and relaxing to clear.

The characteristics of the liquid crystal material are effected by the temperature of the liquid crystal, such as the twist time of twisted-nematic liquid crystal material, being shorter when the liquid crystal material is warm. By knowing the temperature of the liquid crystal, the duration and timing of the flash of the backlight, therein achieving the desired brightness and minimizing power consumption.

The liquid crystal can be heated by several alternative embodiments. In one preferred embodiment, the display is placed in a heat mode where each row is turned on and a voltage drop across a row line, creates heat.

An alternative embodiment for internal heating is to include a second layer of ITO (Indium Tin Oxide) underlying the counterelectrode with an interposed layer of $SiO_2$. The second layer of ITO is patterned such that it covers only the array area. If a current is passed through the second layer, the layer heats and can heat the liquid crystal. The heating occurs between the two layers of glass that bound the matrix in both embodiments discussed.

The measuring of the temperature of the liquid crystal requires additional analog circuitry which adds complexity to the circuit of the display. It is recognized that it is the operational characteristics of the liquid crystal, not the actual temperature, that is ultimately desired. In one preferred embodiment, an electrical measurement of the liquid crystal capacitance is performed instead of the measurement of temperature in order to determine when heating is required. Thus the heater can be actuated in response to a liquid crystal sensor that responds to the optical or electrical properties of the liquid crystal.

In one preferred embodiment, a sensor is incorporated to determine if the liquid crystal is approaching the characteristic clearing temperature of the liquid crystal. The clearing temperature sensor is located just off the active display area. The capacitance of a white pixel and a black pixel converge as the liquid crystal approaches its characteristic clearing temperature.

One of the traits of liquid crystal that is desired is the long time constant which allows the image to be maintained without having to refresh in certain instances. While a long time constant is generally a benefit, it can be a detriment in instances where the display is powered down and powered up a short time later. Upon powering up the system, a portion of the previous image may remain.

In a preferred embodiment, an analog comparator samples the voltage of the main power in real time. When the voltage drops below the level to run the circuit plus some margin, such as the display is powered down, a reset signal (PDR*) is asserted low. On receipt of the PDR* signal, the display circuitry will place VDD on all the column lines, and activates all the row lines. The normal timing continues for two or more cycles, therein sequentially activating all the even and odd rows. This clocks the VDD signal on the column lines into every pixel.

Because the storage capacitor is several times larger than the pixel capacitor, the voltage on the storage capacitor will then discharge the pixel capacitor to zero (0) volts. At this point the display can be de-energized without any residual charge left on either the storage or pixel capacitor.

The increasing capability of microdisplays at the same time as the decrease in size of the microdisplay has allowed for devices that were not possible prior to the invention of microdisplay or allow devices with increased capability. These devices included portable smart card readers, portable memory card readers, display cellular telephones and digital cameras.

In a preferred embodiment a card reader system is capable of reading information off of a smart card. The information is displayed on the microdisplay. The user manipulates control elements on the control panel to select and access data.

In another embodiment, a portable display system has a microdisplay for viewing images received from a memory card which is inserted into a housing of the portable display system. In one preferred embodiment, the display system has a pair of speakers for projecting the sound associated with the image. The portable display system can be used for viewing video clips stored on the memory card. In one preferred embodiment, the display system is additionally a portable pager capable of receiving information through a wireless transceiver located within the display system.

In another embodiment, the microdisplay is used within a digital camera. The microdisplay is used to both display the image to be taken and to display images stored within memory within the digital camera.

BRIEF DESCRIPTION OF THE DRAWINGS

The above and other objects and features of the invention will be better understood and appreciated by those skilled in the art in view of the description of the preferred embodiments given below in conjunction with the accompanying drawings, in which:

FIGS. 3E–3M illustrate additional preferred embodiments of a backlighting system in accordance with the invention.

FIG. 11B is a graphical representation of the voltage and the transitioning of the liquid crystal for the first pixel and the last pixel for an intermediate color such as yellow;

FIGS. 21A–21K are exterior views of hand-held imaging devices;

FIG. 29Ab illustrates the bottom view of the circuit board of FIG. 29Aa;

FIG. 29Bb illustrates the bottom view of the memory card of FIG. 29Ba;

FIGS. 31A–31E illustrate other preferred embodiments of the invention including a display docking system for a cellular telephone;

DETAILED DESCRIPTION OF THE INVENTION

High Resolution Active Matrix Microdisplay

Figure 1:
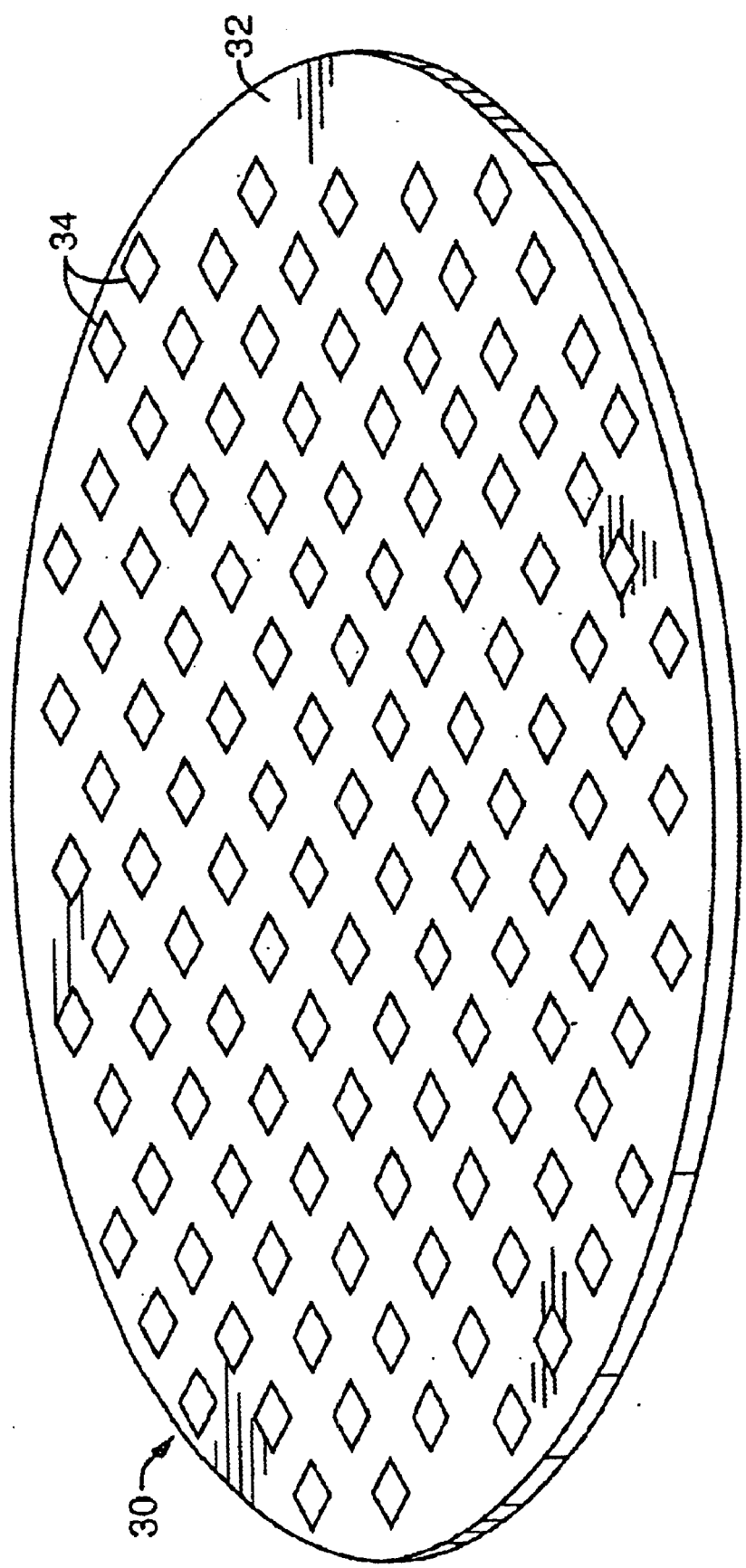
FIG. 1 is a perspective view of a single wafer having a plurality of display devices formed thereon in accordance with the invention.

A preferred embodiment of the invention utilizes a process of making a plurality of flat panel displays 30 in which a large number of active matrix arrays 34 are fabricated on a single wafer 32 as illustrated in connection with FIG. 1.

The number of displays fabricated on a single wafer depends upon the size of the wafer and the size of each display. A preferred embodiment of the invention, for example, uses a high resolution display having an imaging area of the display with a diagonal of 0.24 inches or less. The active display area is 4.8 mm×3.6 mm and has a total display dimension of 11.8 mm×6.8 mm. 120 separate displays can be fabricated on a single five inch wafer.

By fabricating a large number of small high resolution displays on a single wafer, the manufacturing yield can be substantially increased and the cost per display can be substantially reduced.

To obtain monochrome or color sequential resolutions of at least 75,000 pixels (e.g. a 320×240 array) on a 0.25 inch diagonal display, the pixel electrodes are preferably on the order of about 15 microns in width or less. To obtain a resolution of at least 300,000 pixels (e.g. 640×480 array) on a 0.25 inch diagonal display, the pixel electrodes preferably have a width of about 8–10 microns.

Figure 2A:
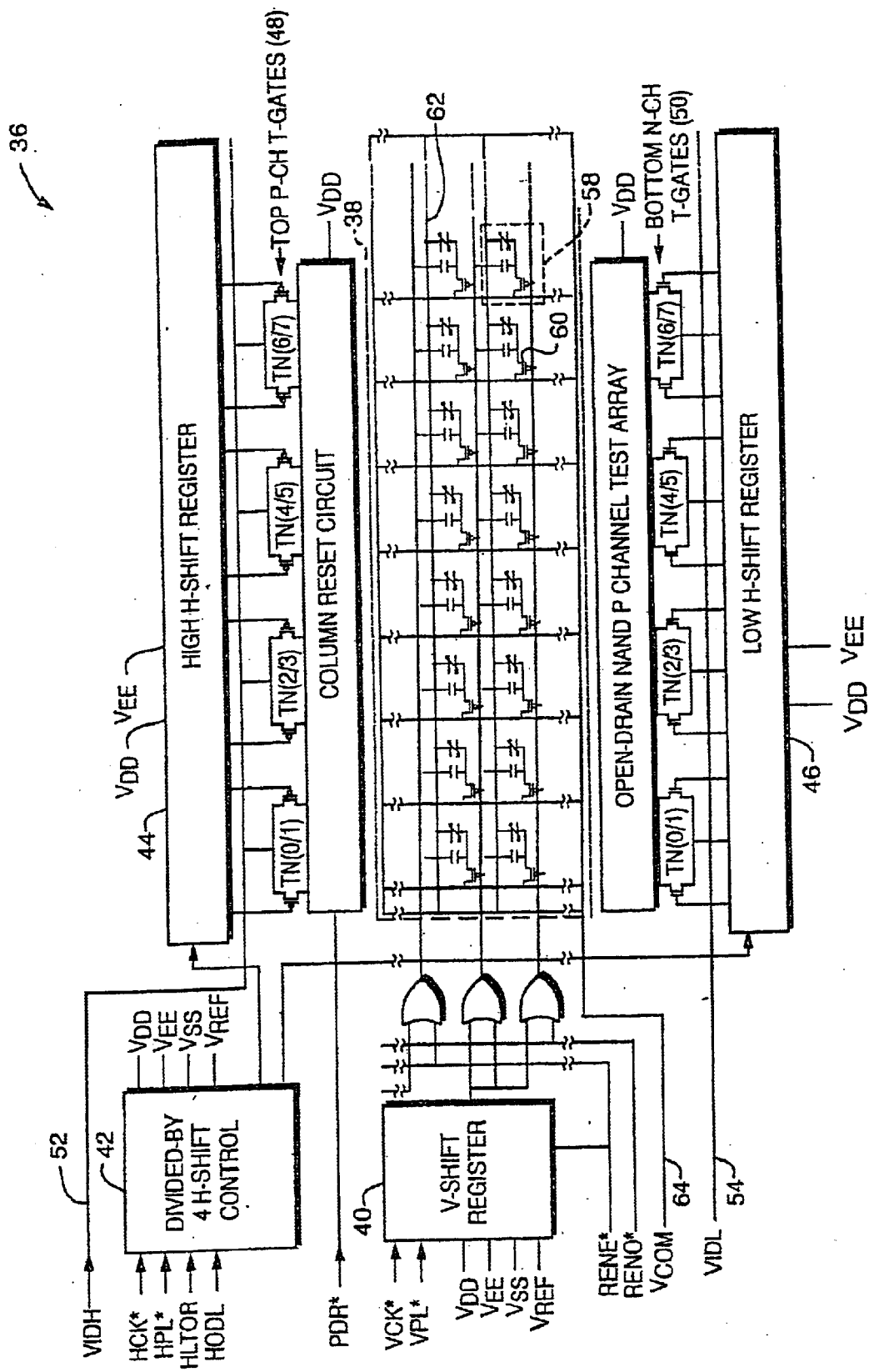
FIG. 2A is a schematic illustration of a die for an integrated active matrix panel display which includes optional control signal circuitry therein.

An integrated circuit active matrix display die 36 is shown schematically in FIG. 2A. The circuit 36 has been diced from a single wafer 32 along with a selected number of replicated circuits. Incorporated into the circuit 36 are a display matrix circuit 38, a vertical shift register 40, a horizontal shift control 42, a pair of horizontal shift registers 44 and 46, and a plurality of transmission gates 48 and 50.

A video signal high line 52 and a video signal low line 54 carry analog video signals from a digital to analog amplifier to the transmission gates 48 and 50. The transmission gates 48 and 50 are located above and below the display matrix circuit 38 as seen in FIG. 2A. The transmission gates above the display matrix circuit are p-channel transmission gates 48 and are connected to the video high (VIDH) line 52. The transmission gates below the display matrix circuit are n-channel transmission gates 50 and are connected to the video low (VIDL) line 54.

The transmission gates 48 and 50 are controlled by horizontal shift registers 44 and 46, with the p-channel transmission gate 48 controlled by a high horizontal shift register 44 and the n-channel 50 by a low horizontal shift register 46. The horizontal shift registers 44 and 46 are controlled by the horizontal shift control 42. The horizontal shift registers 44 and 46 select to which column the video signal is sent.

The display matrix circuit 38 has a plurality of pixel elements 58. (e.g., 76800 pixel elements are in a 320×240 display). Each pixel element has a transistor 60 and a pixel electrode 62. The pixel electrode 62 works in conjunction with a counterelectrode 64 and the liquid crystal forming the pixel capacitor for creating the image.

The vertical shift register 40 selects the row. The row line from the vertical shift register 40 is connected to the base of each of the transistors 60 to turns on the pixels of the row. The column which has been selected by the horizontal shift register receives the signals and drives the liquid crystal or allows the liquid crystal of the pixel element to relax.

It is recognized that in larger arrays, such as 480×320, 640×480, and 1280×1024, it may be desirable to split the display in sectors and drive individual sectors independently. A description of a display with multiple channel driver is described in U.S. patent application Ser. No. 08/942,272 filed on Sep. 30, 1997 and titled "Color Display System for a Camera," the entire contents which is incorporated herein by reference.

Figure 2B:
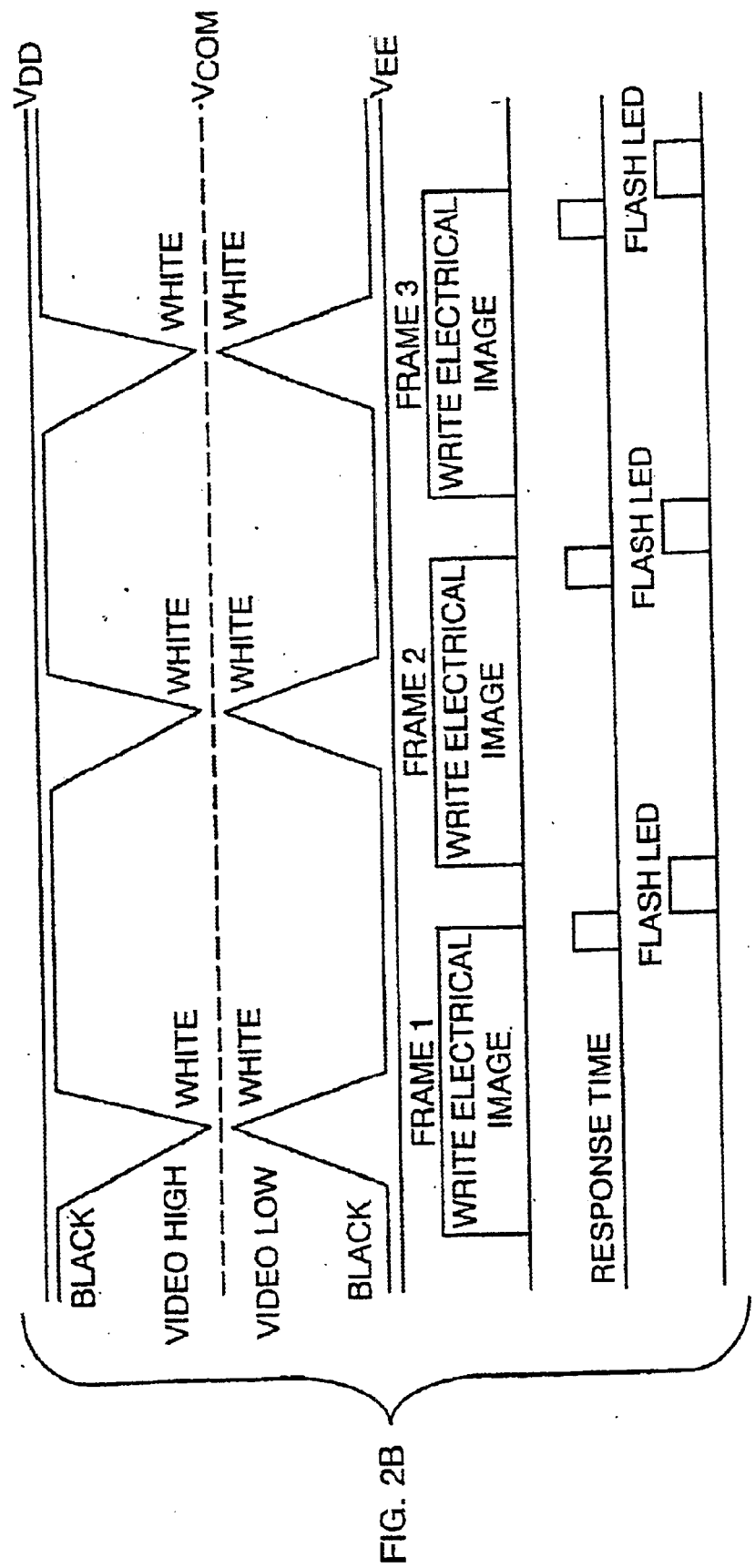
FIG. 2B illustrates a timing diagram for the display control circuit illustrated in FIG. 2B.

FIG. 2B illustrates a timing diagram for a microdisplay. The video signal is sent to the display 36 both as actual video and inverted video. The p-channel transmission gates 48 receive actual video and the pixels supplied by these gates are driven between the common voltage ($V_{COM}$), the voltage applied to the counterelectrode, and the supply voltage source ($V_{DD}$). The n-channel transmission gates 50 receive the inverted video and the pixels supplied by these gates are driven between $V_{COM}$ and the supply voltage sink ($V_{EE}$). After the entire frame is scanned into the display and there is a delay to allow the liquid crystal to twist, the backlight is flashed to present the image. In a preferred embodiment, $V_{DD}$ is 9 volts, $V_{EE}$ is 2 volts and $V_{COM}$ is 5.5 volts. The technique of alternating the video on each column is called column inversion and helps prevent a DC voltage from building up on the liquid crystal material and additionally prevents cross talk.

These small high resolution displays require magnification such that when held in a user's hand within the range of 0.5 inches to 10 inches of the user's eye, a clear image is provided.

Figure 3B:
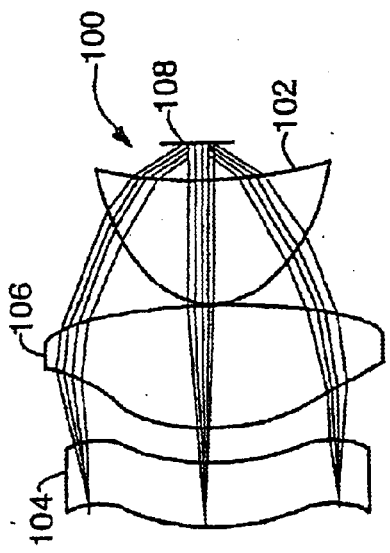
FIG. 3B is a side view of a multi-element lens providing an increased field of view.
Figure 3C:
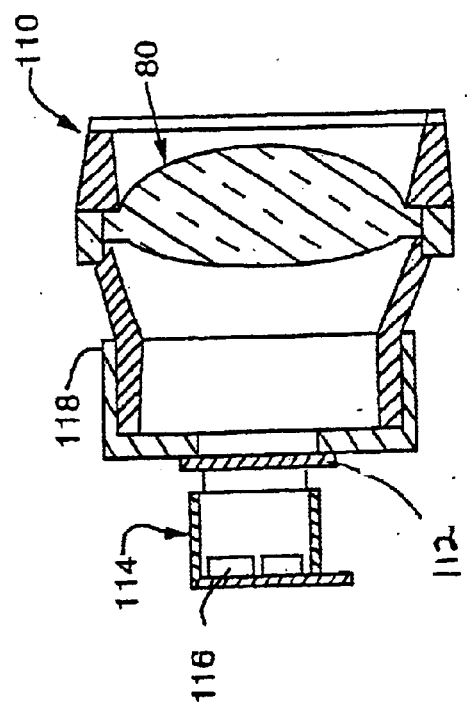
FIG. 3C is a cross-sectional view of a display assembly with a fixed lens.
Figure 3A:
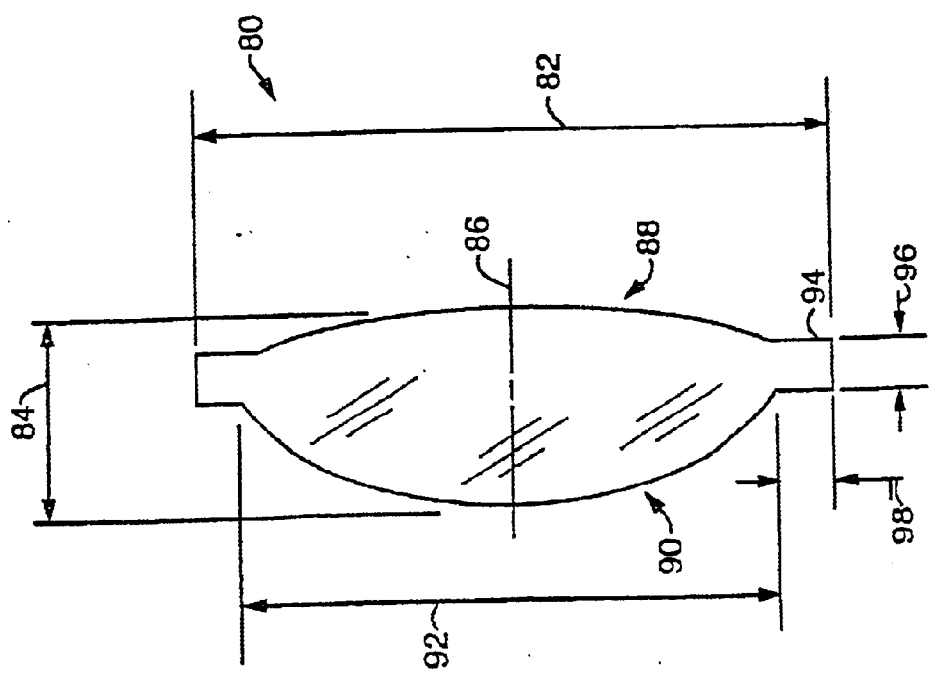
FIG. 3A is a side view of a lens suitable for magnifying a microdisplay in accordance with the invention.

A lens 80 suitable for magnifying the image of a microdisplay for viewing by a user is illustrated in the example of FIG. 3A.

For a 0.25 inch diagonal microdisplay, the outer diameter 82 of the lens can be about 30.4 mm, the thickness 84 of the lens at the optical axis 86 can be about 8 mm, the inner surface 88 that receives light from the display has a curved diameter of about 21.6 mm, and the viewing surface 90 has a diameter 92 of about 22.4. The peripheral edge 94 used to hold the lens 80 in the assembly can have a thickness 96 of about 2 mm and a radius 98 of about 4 mm. The lens 80 can be made of glass or a plastic material such as acrylic. This particular example of such a lens has a 16 degree field of view and an ERD (eye relief distance) of 50 mm. The lens assembly can include an automatic focusing system, or a lens system that collapses in size when not in use.

Another preferred embodiment of a 1.25 inch diameter lens system 100 with a larger field of view is illustrated in FIG. 3B. Three lens elements 102, 104 and 106 enlarge the image on the display 108.

The lens 80 of FIG. 3A can be used in a display assembly 110 of FIG. 3C. In this embodiment, the display 112 is positioned between the backlight housing 114, containing LED 116, and the lens housing 118 that holds the lens 80 in a fixed position relative to the display 112.

A microdisplay system 360 utilizing a folded optical path is illustrated in connection with FIG. 3D. In this embodiment, an LED array 362, or other light source, illuminates the display within housing 364. The display 366 directs an image along a first optical path 372 that is reflected by mirror 368 along a second optical path 374 through the lens 370 as described previously.

Figure 3F:
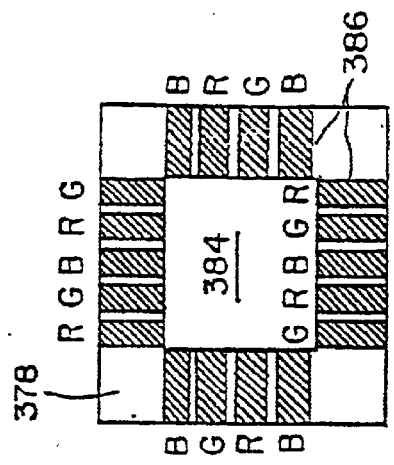
Figure 3G:
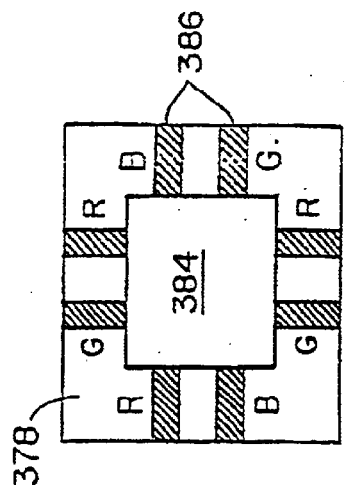
Figure 3E:
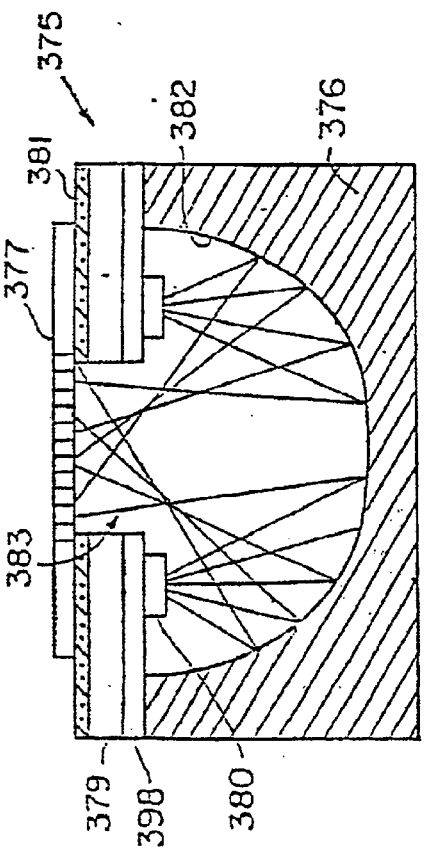
Figure 3D:
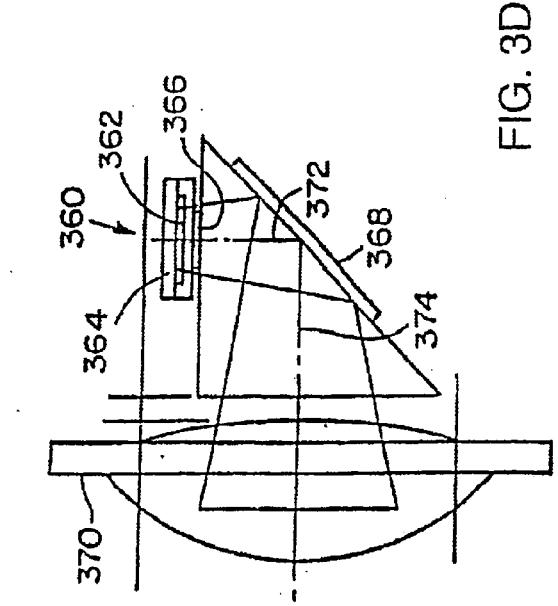
FIG. 3D is a schematic view of an LED backlighting system for a liquid crystal display in accordance with the invention.

Another preferred embodiment of a backlight system 375 is illustrated in FIGS. 3E–3G. The backlight system 375 includes a reflective bowl 376 with an inner concave surface 382 that reflects light emitted by the LEDs 380 onto the active matrix region of display 377. The LEDs 380 are mounted on a circuit board 378 that is electrically connected to the timing circuit described previously. The system 375 can also include a heat sink 379 for applications requiring thermal isolation of the display circuit from the backlight circuit. The heat sink 379 can be a silicon carbide, silicon, or aluminum nickel plate or wafer. The heat sink 379 can be insulated from the display 377 with layer 381 such as an adhesive. The circuit board 378, element 379 and optional layer 381 have openings that are aligned to provide an aperture 383.

A preferred embodiment of printed circuit board 378 on which the LEDs are mounted is shown in FIG. 3F. In this embodiment 16 blue, green and red LEDs 386 are positioned around opening 384. Another preferred embodiment utilizing 8 LEDs 386 is illustrated in FIG. 5G. Fewer LEDs allow the circuit to operate at lower power. Additionally, for color sequential operation, where frame rates are relatively high, the LEDs are driven at higher rates to increase brightness.

Figures 3H, 3I:
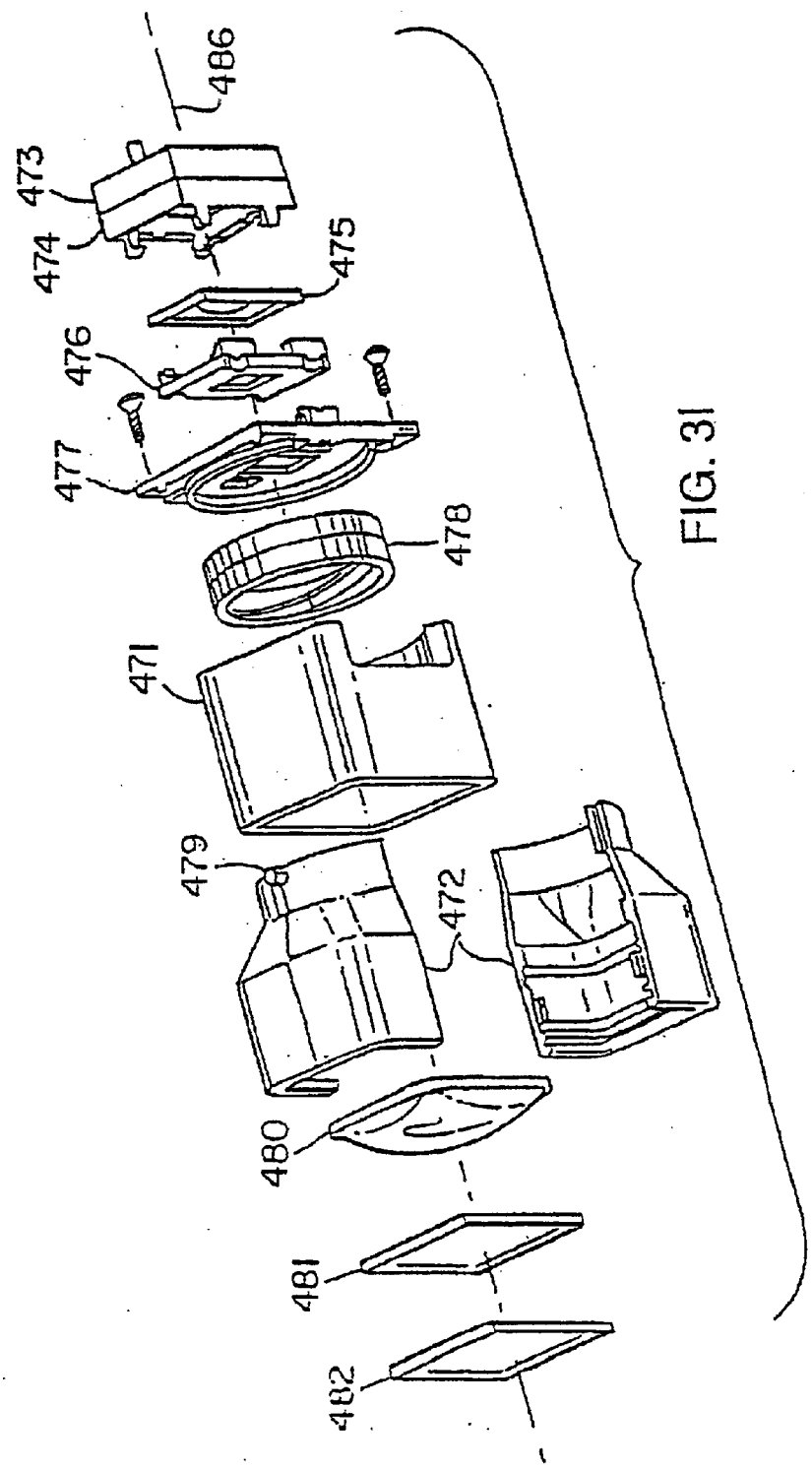

A system having a volume less than 15 cm$^3$ is illustrated in connection with FIGS. 3H–3L. FIG. 3H is a perspective view of an assembled display module 470. The exploded view of FIG. 5I shows the elements of system 470 in detail. The backlight reflector is positioned in back light housing 473 which can be adhered directly onto the display 475 with an epoxy adhesive or with a clip 474. The display is held by a display holder 476 which can also serve to define the visual border for the active area of the display as seen by the user through transparent window 482. The holder 476 is attached to holding panel 477 which retains ring 478 within the proximal end of housing element 471. The ring can be manually or electrically actuated to rotate and thereby translate optics holder 472 along the optical axis 486. A pin 479 can be used to couple the holder 472 to internal helical thread of ring 478. The lens 480, an optional second lens within the distal end of holder 472, a color correction element 481 and window 482 can all be held within holder 472 which moves relative to the display to focus the image thereon.

Figures 30A, 30B:
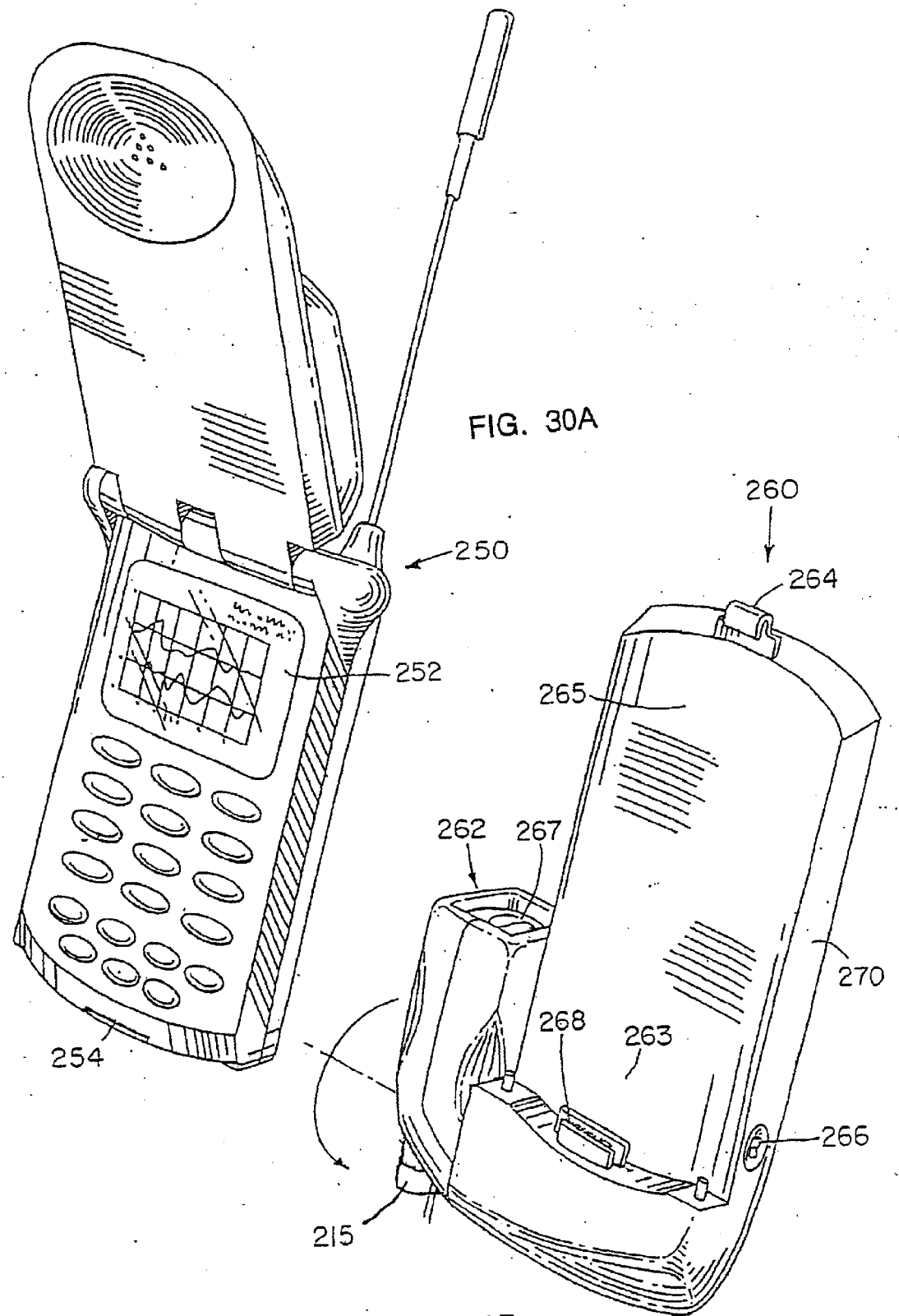
FIGS. 30A–30J are illustrations of further preferred embodiments of a telephone microdisplay system.

Element 470 fits snugly within an external housing 262 such as that shown in FIG. 30B, or within the other device housings as described herein, such as in FIGS. 27A–D.

An exploded view of a preferred embodiment of the backlight relative to the display 475 is shown in FIG. 3J. The display circuit and LED backlight are mounted on circuit board 483. Preferably, three LEDs are used to provide three colors. Between the backlight housing 473 and the display 475, a brightness enhancement film 484, such as the "BEF" film available from 3M Corporation can optionally be used along with a diffuser 485. As seen in FIGS. 3H and 3L, the circuit board 483 mounted on a first side of housing 473 and the backlight active area is defined by the diffuser 485 on a second side of the housing 473.

An exploded view of an alternative embodiment of the backlight is shown in FIG. 3M. A backlight housing 463 has a plurality of compartments 465, four being shown in the figure by way of example. The LED backlights are mounted on a circuit board 467 in groups 468 which compliment the compartments 465 of the housing 463. Preferably, two or three LEDs are used per group to provide two or three colors, respectively. A brightness enhancement film 484, such as the "BEF" film available from 3M Corporation can optionally be used along with a diffuser 485 between the backlight housing 463 and the display.

Figure 3N:
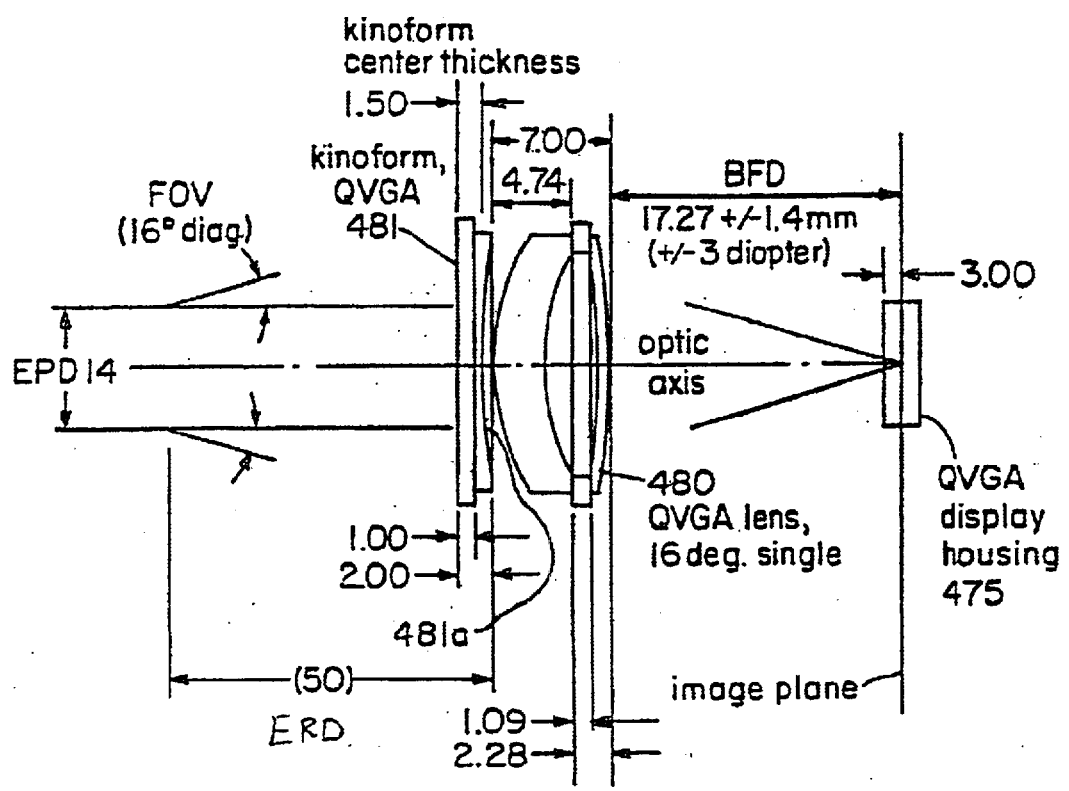
FIG. 3N illustrates a single lens positioned adjacent the kinoform.
Figure 3O:
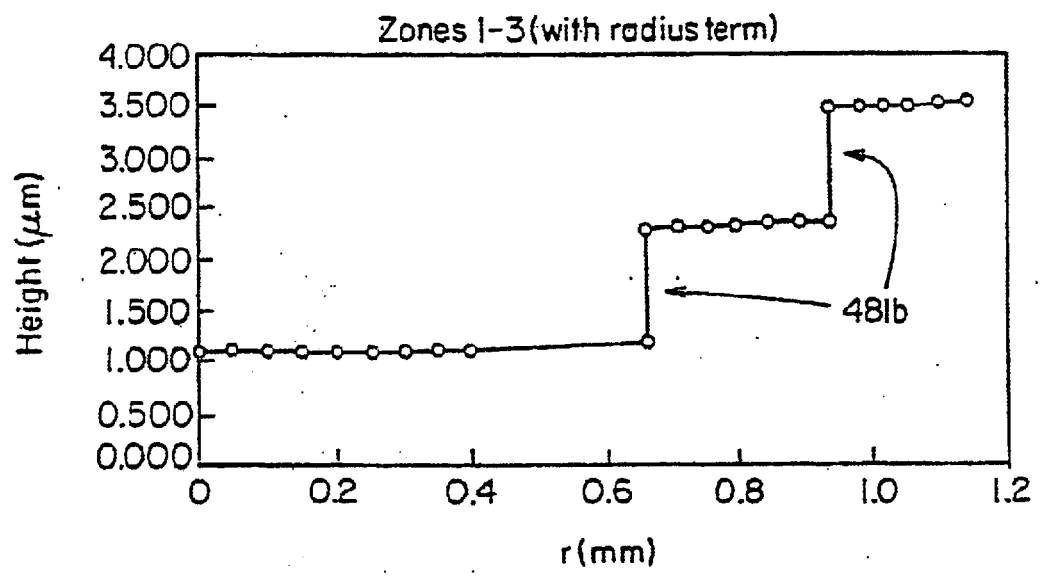
FIG. 3O illustrates the first three zones of a kinoform.

The color correction element 481 can be a transparent molded plastic kinoform having a contoured surface with circular steps that introduce phase corrections into the incident light. The configuration of a preferred embodiment of a single lens 480 positioned adjacent the kinoform, color correction element, 481 for a QVGA display 475 is illustrated in FIG. 3N with dimensions in millimeters. The kinoform can be made of an acrylic material molded to form a concave surface 481a facing the lens. The surface 481a can have an anti-reflective coating thereon to increase the transmission. The concave surface is divided into a number of zones of different radii and width. Each zone is separated by a step in the surface. The QVGA display preferably has between 150 and 300 zones whereas a 640×480 display has between 500 and 1000 zones. For a kinoform having 196 zones, the first three zones with intervening steps 481b being illustrated in FIG. 3O, the zones dimensions, curvature and height are exemplified as follows:

TABLE 1

| Zone | Zone Radius (mm) | Step Width (mm) |
|---|---|---|
| 1 | 0.661 | 0.661 |
| 2 | 0.934 | 0.274 |
| 3 | 1.145 | 0.210 |
| 4 | 1.322 | 0.177 |
| 5 | 1.478 | 0.156 |
| 6 | 1.619 | 0.148 |
| 7 | 1.748 | 0.130 |
| 8 | 1.869 | 0.121 |
| ↓ | | |
| 190 | 9.108 | 0.024 |
| 191 | 9.132 | 0.024 |
| 192 | 9.156 | 0.024 |
| 193 | 9.180 | 0.024 |
| 194 | 9.204 | 0.024 |
| 195 | 9.227 | 0.024 |
| 196 | 9.251 | 0.024 |

TABLE 2

| Zone | R (mm) | Height (mm) |
|---|---|---|
| 1 | 0.0001 | 1.101 |
| 1 | 0.05 | 1.102 |
| 1 | 0.1 | 1.380 |
| 1 | 0.15 | 1.106 |
| 1 | 0.2 | 1.109 |
| 1 | 0.25 | 1.114 |
| 1 | 0.3 | 1.120 |
| 1 | 0.35 | 1.126 |
| 1 | 0.4 | 1.134 |
| 1 | 0.661 | 1.890 |
| 2 | 0.662 | 2.292 |
| 2 | 0.707 | 2.305 |
| 2 | 0.753 | 2.318 |
| 2 | 0.798 | 2.332 |
| 2 | 0.844 | 2.348 |
| 2 | 0.889 | 2.364 |
| 2 | 0.934 | 2.381 |
| 3 | 0.935 | 3.482 |
| 3 | 0.977 | 3.499 |
| 3 | 1.019 | 3.516 |
| 3 | 1.061 | 3.534 |

TABLE 2-continued

| Zone | R (mm) | Height (mm) |
| --- | --- | --- |
| 3 | 1.103 | 3.552 |
| 3 | 1.145 | 3.571 |

Figure 3P:
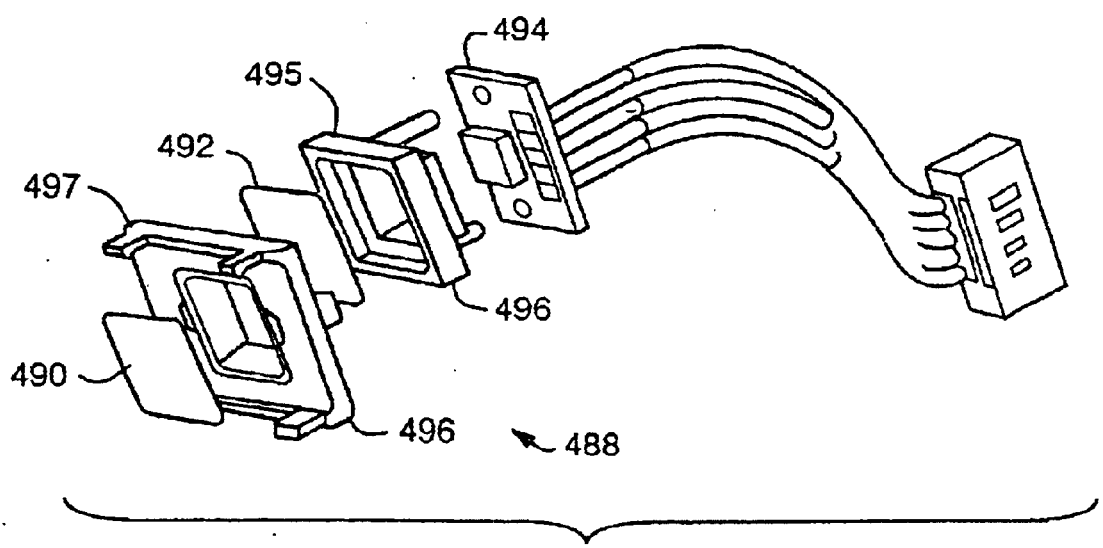
FIG. 3P is an exploded view of an alternative backlight.
Figure 3Q:
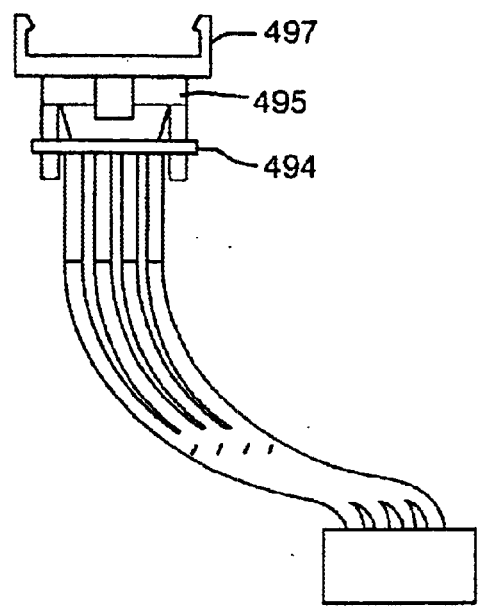
FIG. 3Q is a sideview of the alternative backlight.

FIGS. 3P and 3Q show an alternative backlight assembly 488. The backlight assembly 488 has a diffuser 490, a brightness enhanced film (BEF) 492, and an LED PCB assembly 494. The housing 496 has a backlight top housing 495 and a backlight bottom housing 497. The LED PCB assembly 494 has a series of wires to a connector for controlling the LED backlights.

Other preferred embodiments of optical systems for color displays are described in application U.S. Ser. No. 08/565,058 filed on Nov. 30, 1995, the entire contents of which is incorporated herein by reference. Additional details on optical systems for color displays are described in U.S. Ser. No. 08/966,985 filed on Nov. 10, 1997 of Jacobsen et al. and titled "REFLECTIVE MICRODISPLAY FOR PORTABLE COMMUNICATION SYSTEM", the contents of which is incorporated herein in its entirety by reference.

While in most environments it is desired to have the display as bright as possible, especially in bright sunlight, there are certain situations where it is desirous to lower the intensity of the display such that the person using the display preserves their night vision, such as an aircraft or a ship at night.

The backlight in the display transitions from a normal mode to a night or low light ambient mode. In a normal mode, the LED(s) for normal light are used, such as a single amber, green, or white LED for a monochrome display and red, blue, and green LEDs for a color sequential display.

For daylight operation, the "day" LED(s) would be on to provide the display to be readable in ambient sunlight. If the ambient light level decreases, the LED(s)' intensity could be decreased to provide an image with brightness comfortable to view. At some point with lower light ambient, a call for a decrease in the LED intensity would result in the turning off of the "day" LED and the turning on of the "night" LED; further reductions in display brightness would result in decrease of the "night" LED intensity until at some point it was turned off.

Increasing the display brightness would be the reverse of this, consisting of first increasing the "night" LED brightness until some crossover point where the "night" LED was turned off and the "day" LED turned on. Further increasing of the display brightness would only increase the "day" LED brightness.

Dependent on the environment in which the microdisplay is located, the "night" LED is either a red LED or a blue green LED. While red is typically considered better for maintaining a person's night vision, the red light is more detectable using night detection gear.

It is recognized that the night illumination source can be either chosen from a class of sources that did not emit infrared and near infrared frequencies, or a filter that removes infrared and near infrared frequencies can be interposed between the night light source and the remaining structure.

While the intensity, style or color of a light source may be dependent on the ambient light, the level of ambient light does not generally effect the color sequential process described below.

The configuration of the display for a monochrome or a color sequential display is generally the same with the same pixel pitch or size. This is in contrast to other types of color displays where there is an individual pixel for each of red, green and blue. In a monochrome display a single light source is required, wherein in a color sequential display there are three distinct light sources (e.g., red, green and blue). In that there are three distinct colors, each color must flash in order to produce most images, in contrast to one flash for monochrome.

In sequential color displays, the display panel is triple scanned, once for each primary color. For example, to produce color frames at 20 Hz, the active matrix must be driven at a frequency of 60 Hz. However, in order to reduce flicker it is desirable to drive the active matrix to have a frame rate of 60 frames per second, since at over 60 Hz, visible flicker is reduced. In a color display a preferred frame rate is 60 frames per second which results in 180 sub-frames per second, in that each frame has a red, a blue and a green sub-frame. In contrast in a preferred embodiment for monochrome, the frame rate is 72 frames per second. It is thus recognized that while a display for a color sequential display is substantially similar to one for a monochrome display, the sub-frame rate needs to be substantially faster to achieve the desired results in color sequential.

The following describes a method of manufacturing a display for color sequential. While the display is for color sequential and the fast frame rates, there is nothing that would limit its use for monochrome at a slower frame rate.

Figure 4:
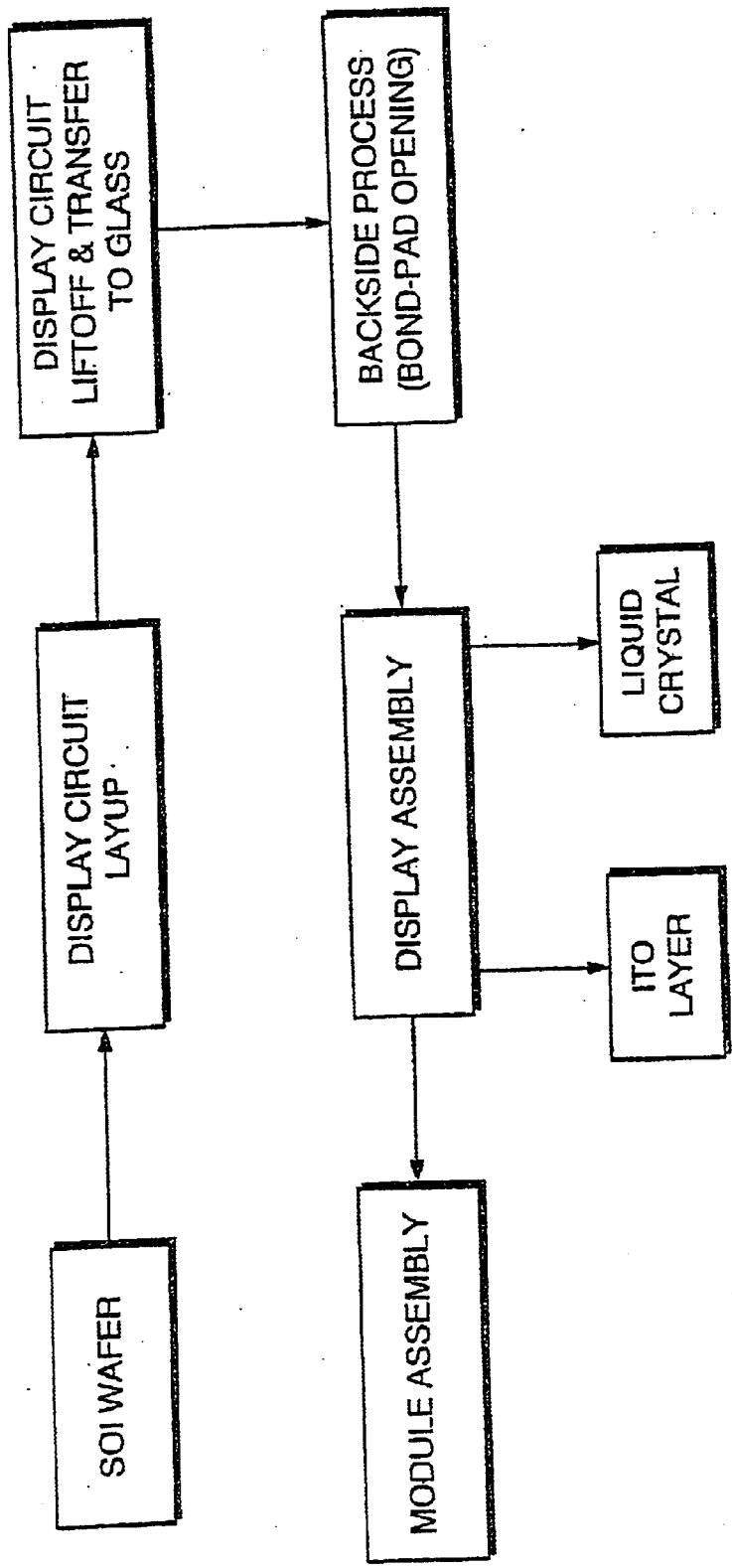
FIG. 4 is a schematic of the process of manufacturing and assembling the microdisplay.

The microdisplay is assembled in several major assemblies wherein in each assembly may have several steps. Referring to FIG. 4, a SOI (Silicon on Insulator) wafer has the integrated circuit laid upon the wafer. The display circuit is lifted off the wafer and transferred to the glass. The backside of the display circuit is processed. In addition to the display circuit, an ITO (Indium Tin Oxide) wafer having the counterelectrode is manufactured. The display circuit, the ITO wafer and the liquid crystal are assembled in a display assembly. The display assembly is assembled into a module assembly.

Figure 5A:
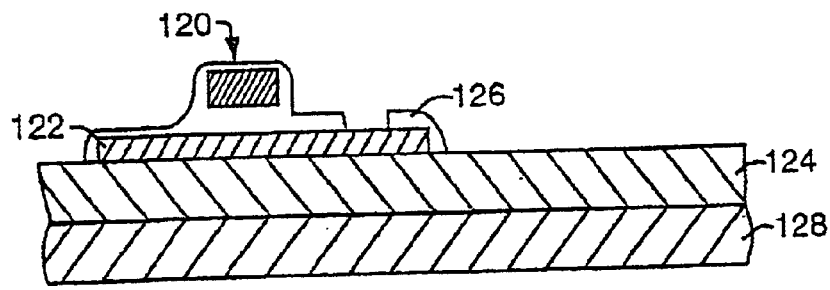
FIGS. 5A–5D are a schematic of the process of making the circuit on the TFT layer.
Figure 5B:
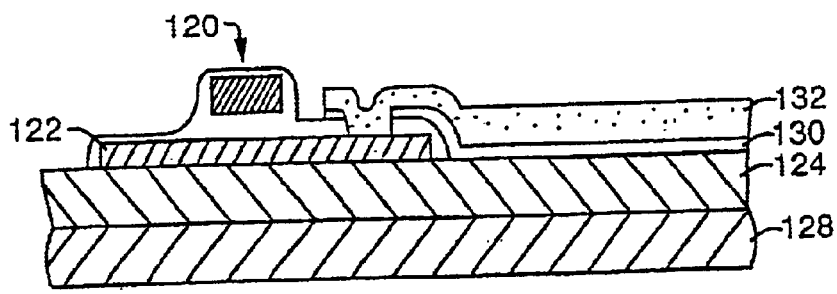

The forming of the circuitry 119 is illustrated in FIGS. 5A–5D. A transistor 120 in an active matrix circuit has been formed with a thin film single crystal silicon layer 122 over an insulating substrate 124 as seen in FIG. 5A. The silicon layer over the insulating substrate can be formed by recrystallization of the silicon layer or by using a bonded wafer process in which a first silicon wafer is bonded to a second silicon wafer with an insulating oxide layer. The second wafer is thinned to form a silicon-on-insulator structure suitable for display circuit fabrication and transfer to an optically transparent substrate as described in the previously incorporated application. A thermal oxide 126 also overlies a portion of the single crystal silicon layer 122. The insulating substrate 124 is carried by a Silicon (Si) wafer 128. A layer of $Si_3N_4$ 130 is formed as an anti-reflection layer over the insulating substrate 124 and the thermal oxide 126 as illustrated in FIG. 5B. A poly-silicon electrode (the pixel electrode) 132 is formed over the $Si_3N_4$ layer 130 and is in contact with the thin film single crystal silicon layer 122.

Figure 5C:
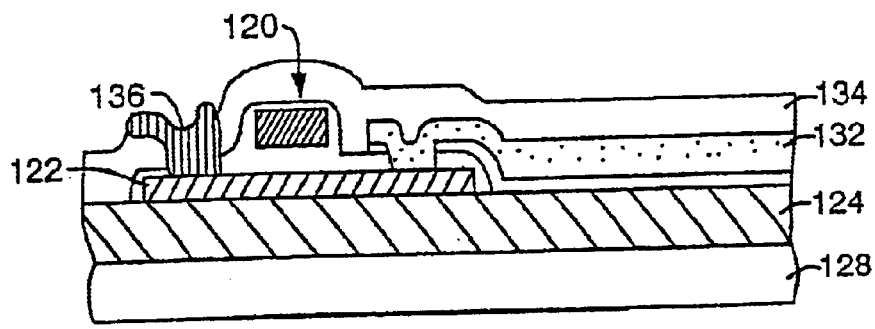
Figure 5D:
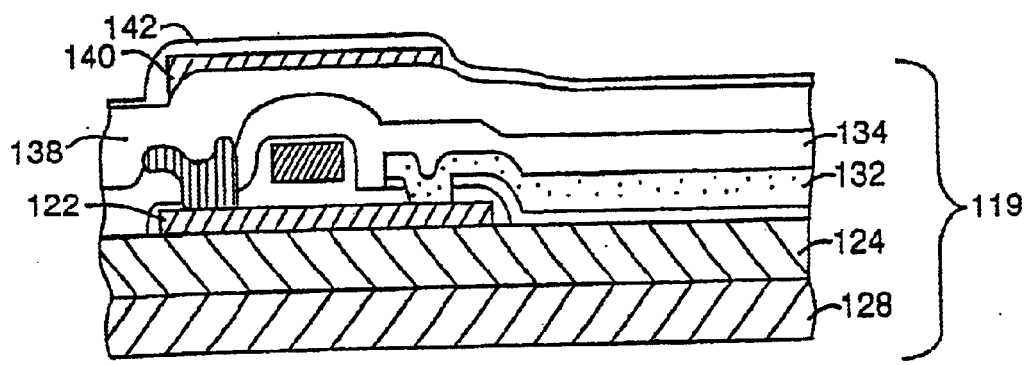

Referring to FIG. 5C, a BPSG 134 of $SiO_2$ is formed over the circuit. A portion is etched away and an aluminum terminal 136 is added. Referring to FIG. 5D, a layer of PSG 138 of $SiO_2$ is formed over the BPSG 134 and the aluminum terminal 136. A titanium (Ti) black matrix 140 is located over the transistor as a light shield. A silica passivation 142 is formed over the entire wafer. The wafer is ready for the next assembly process.

Figure 6:
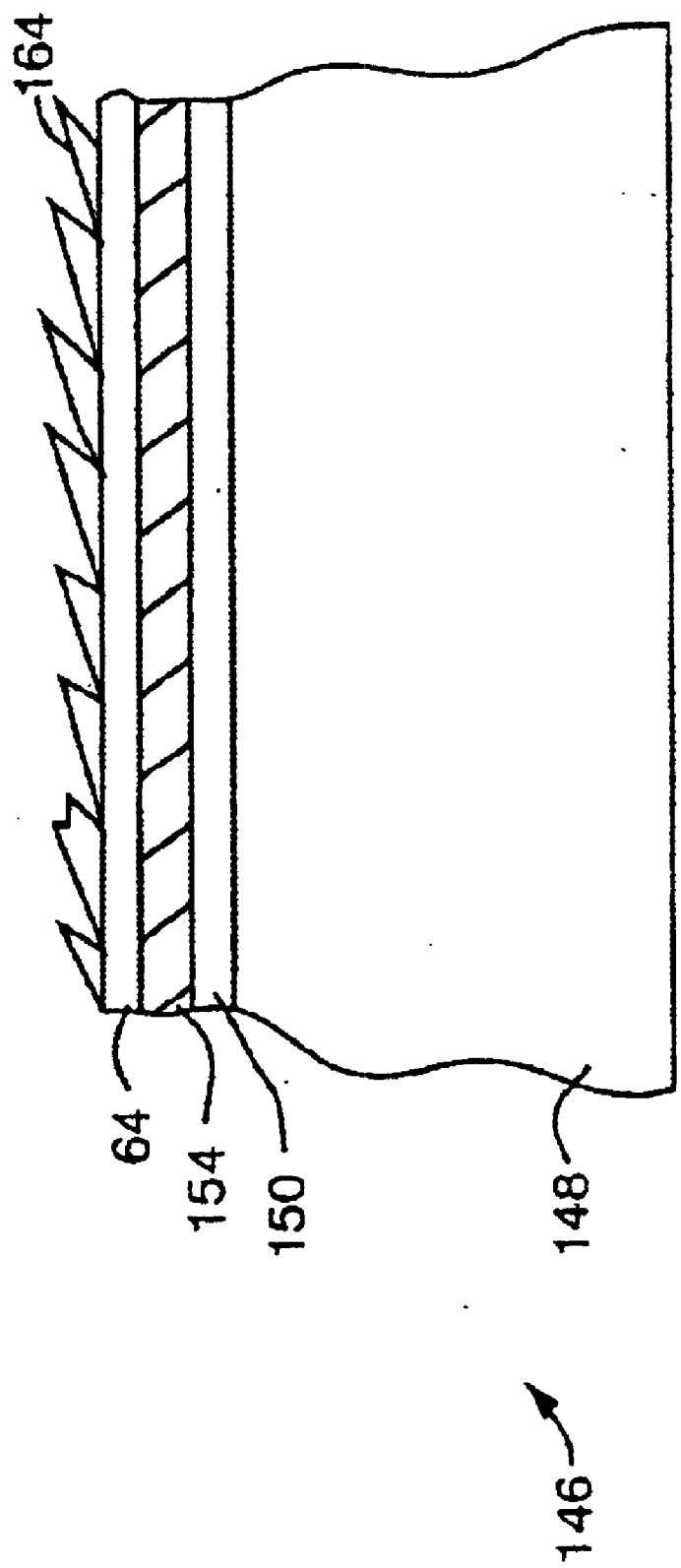
FIG. 6 is a cross-sectional view of an ITO layer.

In a separate process, the ITO wafer 146 having a counterelectrode 64 is formed. FIG. 6 illustrates the ITO wafer having a layer of glass 148, and the counterelectrode 64 (an ITO layer). In a preferred embodiment, interposed between the layer of glass 148 and the counterelectrode 64 is a second ITO layer 150 adjacent to the glass for heating as described below and a $SiO_2$ layer 154 between the two ITO layers 64 and 150.

Figure 7:
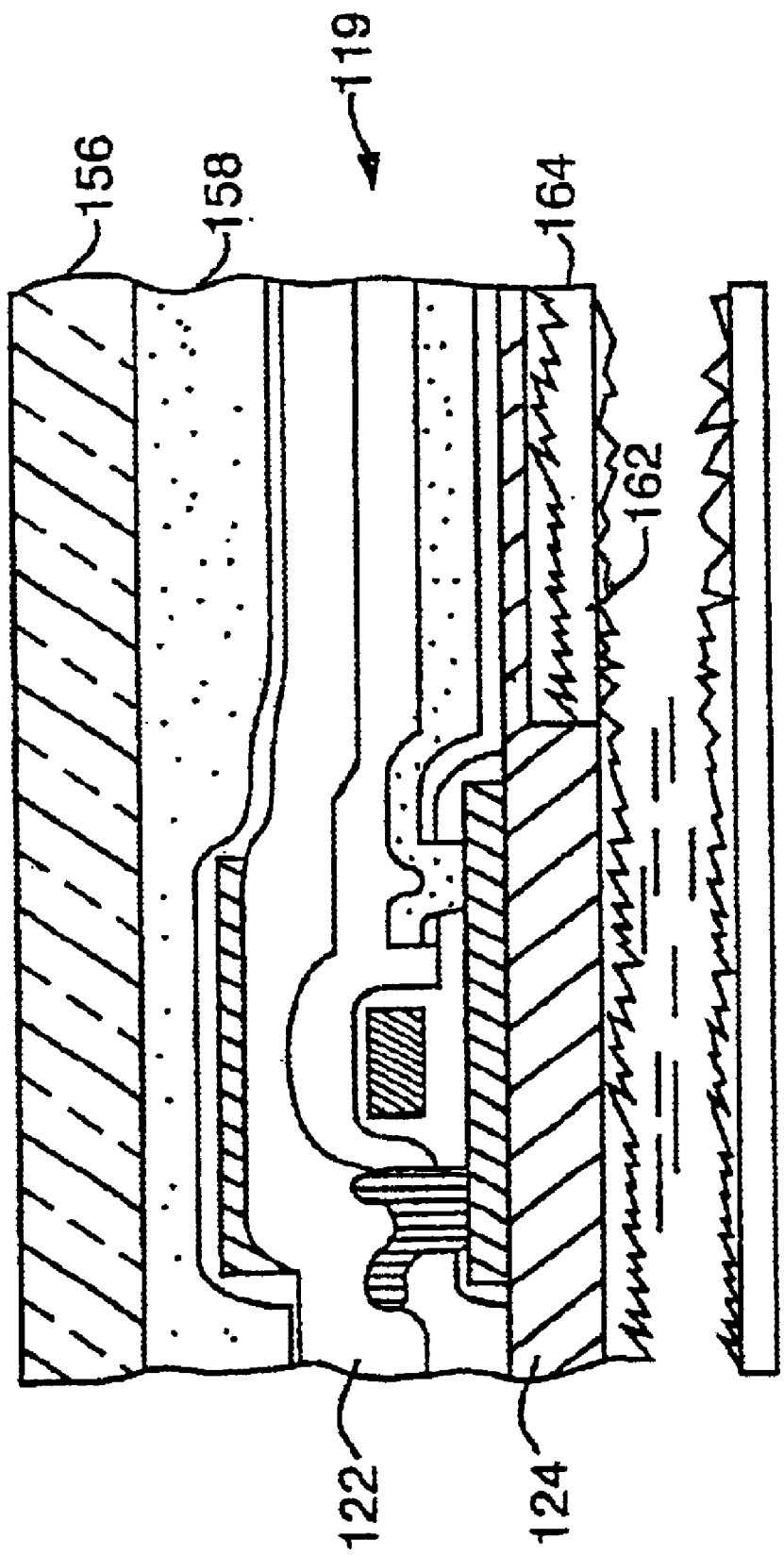
FIG. 7 is a cross-sectional view of a TFT layer with pooled buried oxide layer.

With the circuitry formed and the ITO wafer 146 formed, the two are ready to be joined together. The circuitry device 119 is then transferred to an optically transparent substrate 156 as shown in FIG. 7. A transparent adhesive 158 as described in greater detail in U.S. Pat. No. 5,256,562, the contents of which are incorporated herein by reference, is used to secure the circuit to the substrate 156. The layer, Si Wafer 128 to which the insulating substrate was initially attached, is removed.

The insulating substrate 124, also referred to as a buried oxide layer, is etched over the pixel arrays 132 as illustrated in FIG. 7. The buried oxide layer not located over the pixel arrays is left, therein creating a series of pools 162. In a preferred embodiment, the buried oxide layer is 0.5 μm and thinned by 0.2 μm to 0.34 μm in the pool areas over the pixel arrays. By only thinning the pixel arrays, the applied voltage to the liquid crystal is increased without compromising back-gate effect to the transistors (TFTs).

An alignment layer 164 of $SiO_x$ is deposited on the buried oxide and the counterelectrode illustrated in FIGS. 6 and 7. The alignment layer aligns the liquid crystal as described below.

Figure 8:
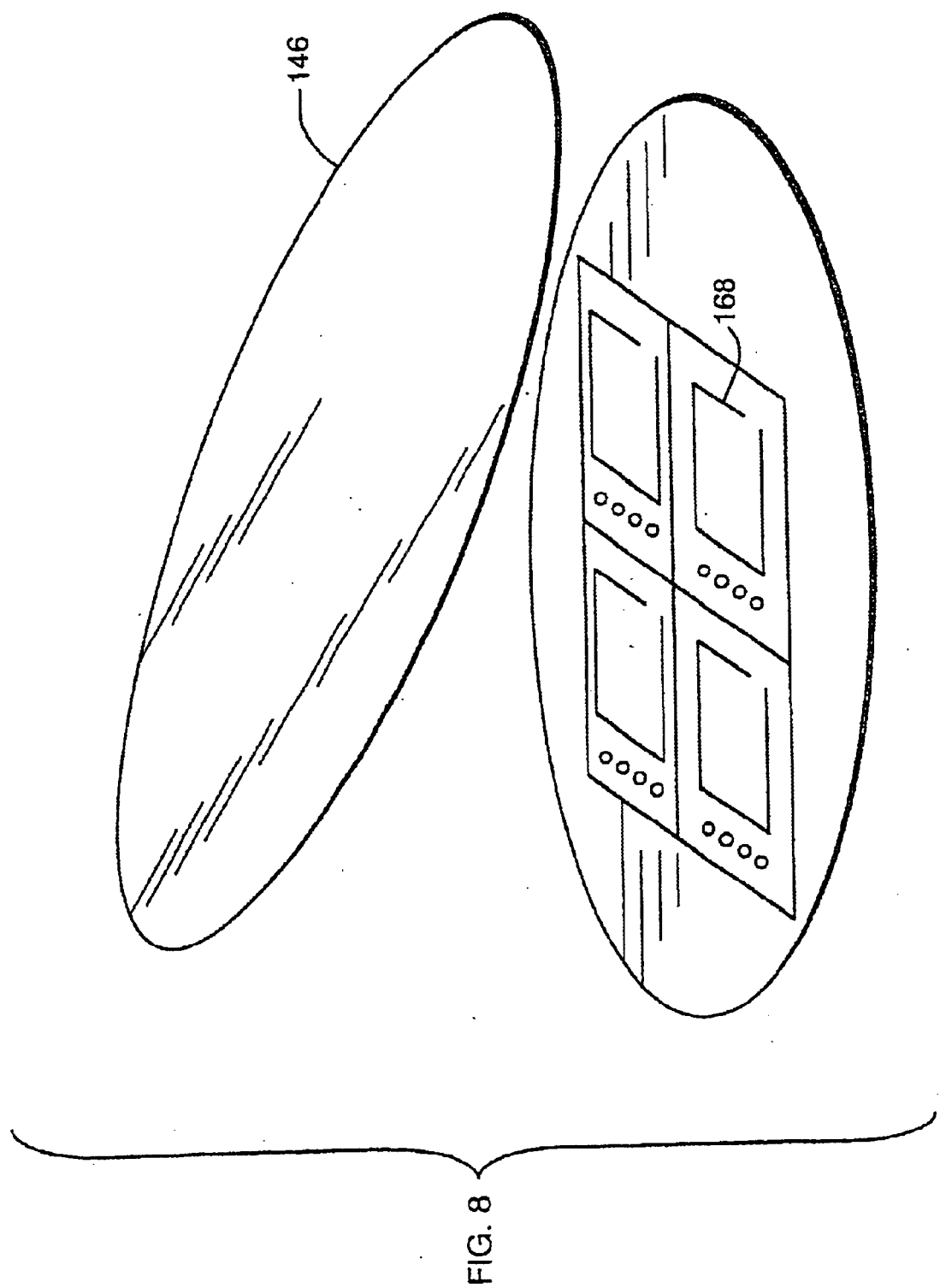
FIG. 8 is an exploded view of the ITO layer and the TFT layer prior to assembly.

A frame adhesive 168 is placed around each display area as illustrated in FIG. 8. In addition, a silver paste is located in one spot on each display, so that the counter electrode is connected to the circuit when joined. A fill hole is left for filling the liquid crystal, as described below. The frame adhesive has a plurality of spacer balls. The spacer balls are 3–4 μm in diameter. The TFT glass and the counterelectrode glass are pressed together. The spacer balls ensure that the layers are spaced 1.8 μm apart when the bonding pressure is asserted. There are no spacers in the active matrix area. The combined wafers are then cured.

Figure 9:
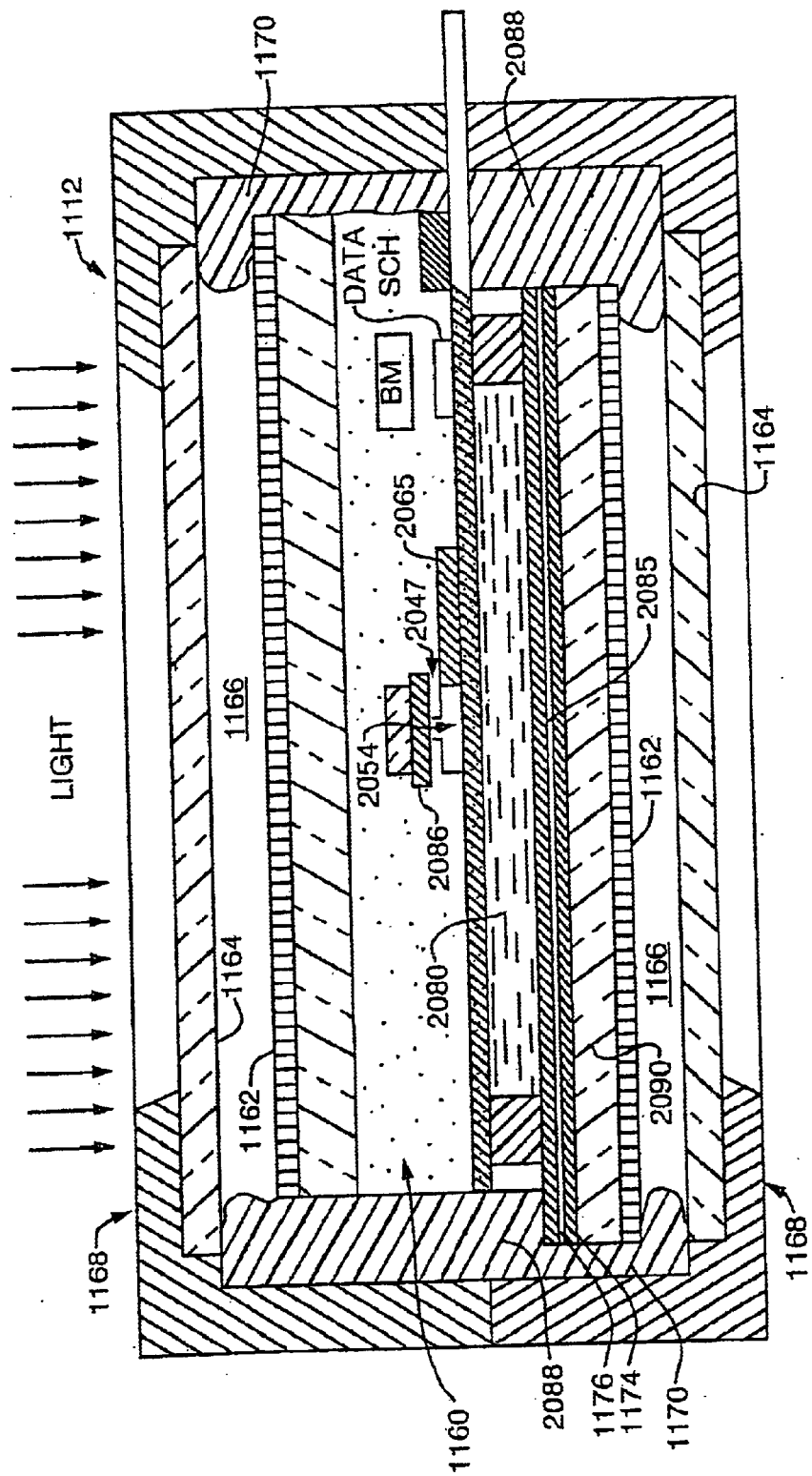
FIG. 9 is an enlarged sectional view of the display in its housing.

After curing, the glass on either side is scribed and broken. The two glass layers are broken at two different locations as illustrated in FIG. 9. The staggering of the break is to facilitate pin connection as described below.

The individual displays are placed in a holding tray and dipped into liquid crystal to fill the space between the buried layer and the counterelectrode as illustrated in FIG. 7. The liquid crystal is located between the alignment layers. The fill hole is then filled. That is the final step of the display assembly.

The module assembly consists of attaching the flex cable, the polarizers and mounting them into a module. Referring back to FIG. 9, a sectional view of a display 1112 is shown. The display 1112 has an active matrix portion 1160 including a pixel element 2047 spaced from a counterelectrode 2085 by an interposed liquid crystal material 2080. Each pixel element 2047 has a transistor 2054 and a pixel electrode 2065. The active matrix portion 1160 can have aluminum light shields 2086 to protect the transistor (TFT) 2054 if the active matrix is used for projection requiring high luminance light. The counterelectrode 2085 is connected to the rest of the circuit by solder bumps 2088. The matrix 1160 is bounded by a pair of glass substrates 2090 in this embodiment and a pair of polarizers 1162. An additional pair of glass plates 1164 are located outboard of the active matrix portion 1160. The glass plates 1164 are spaced from the polarizer 1162. The space defines an insulation layer 1166.

The display 1112 includes a two-piece case 1168 which contains the active matrix portion 1160, the glass plates 1162 and the polarizers 1164. A room temperature vulcanization (RTV) rubber 1170 helps in maintaining the elements in the proper position in the case.

In order to get the liquid crystal to respond more quickly, the distance between the counterelectrode and the oxide layer is 2.0 μm at the pools 162. The narrow distance between the two elements results in less liquid crystal that has to twist to allow light to pass. However, the narrowing of the distance results in additional problems including the viscosity of some liquid crystals making it difficult to fill the display. Therefore, the selection of the proper liquid crystal requires an evaluation of the liquid crystal properties.

There are many characteristics that must be taken into account in selecting the desirable liquid crystal. Some characteristics include the operational temperature range, the birefringence (delta $n=n_e-n_o$), the operational voltage, viscosity and resistivity of the liquid crystal.

With respect to viscosity, flow viscosity and rotational viscosity are two areas that are examined. The preferred ranges are a flow viscosity of less than 40 cp and a rotational viscosity less than 200 cp in the temperature range of 0° C. to 70° C.

Another characteristic that is examined in selecting a liquid crystal is delta n. The value of delta n depends on the cell gap and the liquid crystal pretilt angle at the two surfaces. The pretilt angle at the two surfaces is influenced by the alignment layer of $SiO_x$ deposited on the buried oxide and the counterelectrode. For a 2 μm gap a delta n of greater than 0.18 is preferred and a delta n of 0.285 is desired. For a large gap a different delta n would be required. For a gap of 5 μm a delta n in the range of 0.08 to 0.14 is desired.

In addition to viscosity and delta n (Δn), the liquid crystal's threshold voltage and the voltage holding rate are criteria to be examined when selecting a liquid crystal. In a preferred embodiment, the threshold voltage should be less than 1.8 volts and preferable approximately 1.2 volts. The voltage holding ratio should be greater than 99%.

Other characteristics that are desired are easy alignment and stability to UV and high optical intensity. If required, the delta n can be compromised in order to achieve a lower viscosity and lower operation voltage.

In a preferred embodiment, the liquid crystal chosen was a SFM (superfluoriated material). In preferred embodiments, the liquid crystal selected was one of TL203 and MLC-9100-000 marketed by Merck.

Liquid crystal is formed of a chemical chain which extends from the two surfaces. The alignment layer of $SiO_x$ as seen in FIG. 7, deposited on the buried oxide and the counterelectrode are oriented in a preferred embodiment at 90° to each other. The alignment layers give the liquid crystal a pre-alignment.

The chain of liquid crystal twists and untwists depending on the voltage to the associated pixel electrode. This twisting in relation to the polarization plates results in the liquid crystal going between a white or clear state and a dark state.

While depending on the relation of the liquid crystal and the polarization plates, the liquid crystal can either look clear or dark in the relaxed position and conversely dark or clear in the driven state. In a preferred embodiment, the liquid crystal looks clear in the relaxed position and dark in the driven state.

Referring back to FIG. 2A, the image is scanned into the active matrix display by the vertical shift register selecting the first row, by the row going low, and the horizontal shift register selecting column by column until the entire row has been written to. When the first row is done, the vertical shift register selects the second row. This continues until the last row is selected. The horizontal shift register selects column by column until the last column in the last row has been written to. There is therefore a set time delay between when the first pixel (i.e., the first row, first column) and when the last pixel (i.e., the last row, last column) has been written. In a preferred embodiment, the delay from writing the first pixel to the last pixel is approximately 3 milliseconds.

Figure 10:
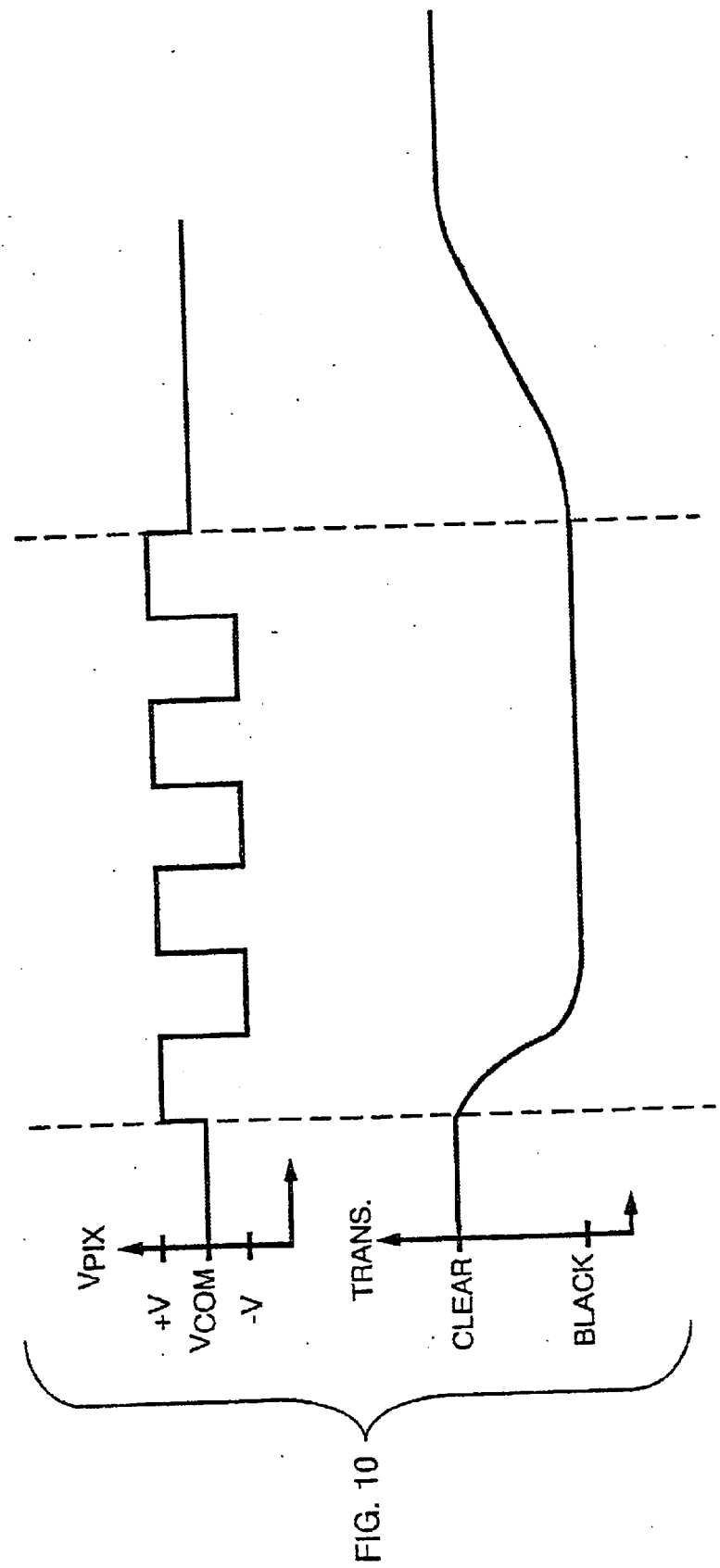
FIG. 10 is a graphical representation of the time to turn the liquid crystal clear to black and black to clear.

As indicated above, the liquid crystal does not respond instantaneously to the change of voltage. The delay for the liquid crystal to respond is illustrated in FIG. 10. With $V_{pixel}$ initially equal to $V_{COM}$, so there is no voltage drop, the liquid crystal, as seen through the polarizers, is clear. When $V_{pixel}$ goes to a voltage, the liquid crystal is driven black. The change is not instantaneous since it takes the liquid crystal a set time to rotate. This time is a function of several factors including the type of liquid crystal and the temperature. If after reaching the steady state black, $V_{pixel}$ is set to $V_{COM}$, the liquid crystal returns to the clear state. Like the translation from clear to black, the change is not instantaneous. The change of state to clear takes longer than when the liquid crystal is being driven to black. FIG. 10 shows it takes over 2½ times as long to go from black to clear as it takes to go from clear to black. In a preferred embodiment using the preferred liquid crystal at room temperature, the time to drive from white to black is 4 milliseconds and the time for the liquid crystal to return to white is 10 milliseconds.

Figure 11A:
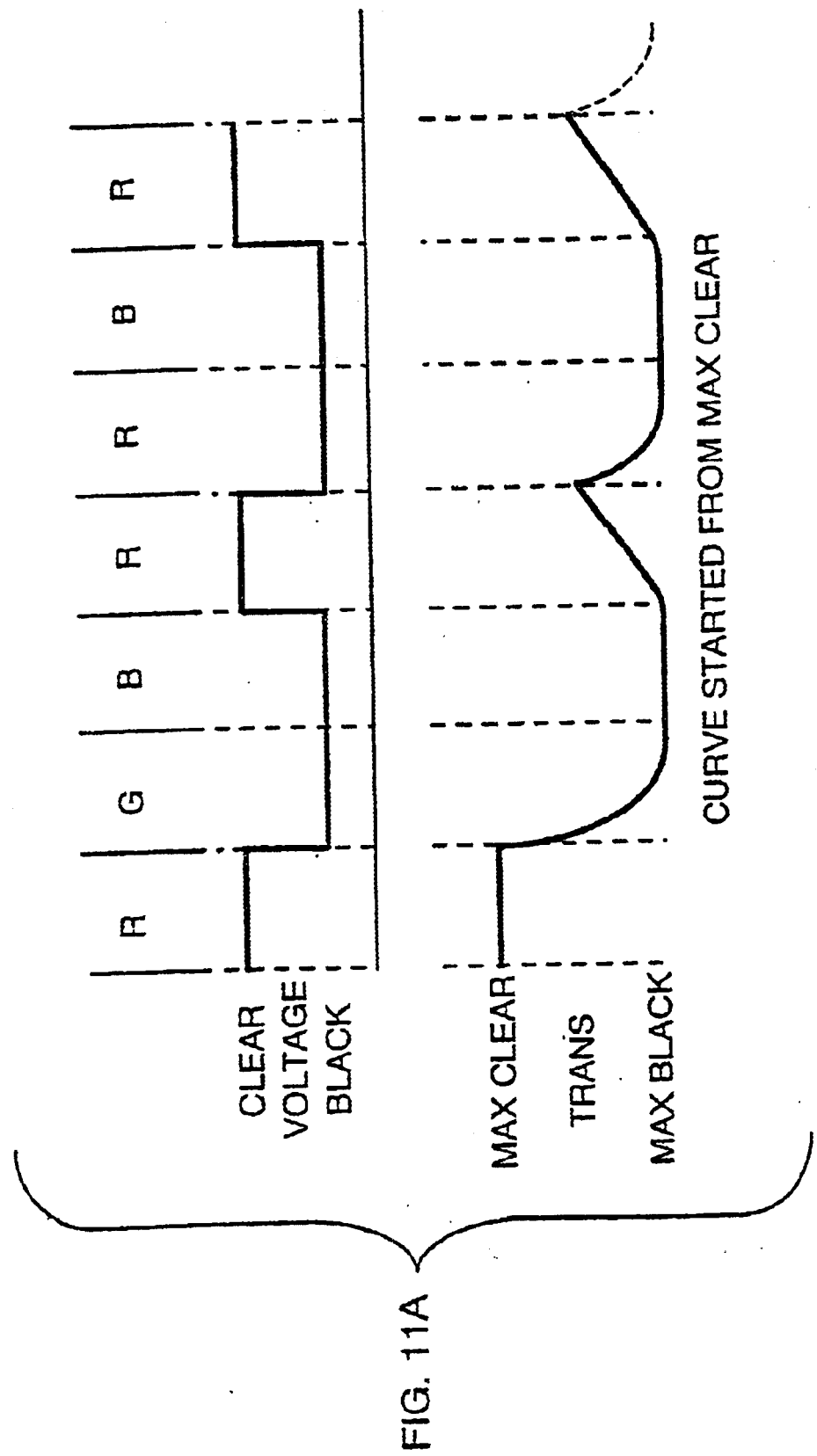
FIG. 11A is a graphical representation of the voltage and the transitioning of the liquid crystal for a pixel that is desired to be red.

As indicated above, in order for the color display to reduce flicker, there needs to be 180 subframes per second or less than 6 milliseconds per subframe. Therefore at 180 subframes per second, the liquid crystal cannot go from black to clear in a subframe. Referring to FIG. 11A, for a red pixel the voltage is $V_{COM}$ for the subframe which is associated with the red flash of light and another voltage for the subframes which are associated with the green and the blue flashes. This is done with the desire that the liquid crystal associated with that pixel is clear for the red flash and black for the green and blue flashes therein producing a red pixel.

If the liquid crystal starts as clear in the first subframe, it is capable of being driven black in the next subframe, the subframe associated with the green flash. The display circuit continues to drive the liquid crystal black for the next subframe associated with the blue flash. When the display circuit for that pixel goes to $V_{COM}$, the liquid crystal is allowed to relax. However, the liquid crystal, as represented in the illustration, does not get to a clear state by the time the subframe is done. In the illustration shown in FIG. 11A, the liquid crystal only gets to about fifty percent (50%) clear. In the next subframe, the green subframe, the liquid crystal is driven black again. Therefore, the liquid crystal for this red pixel never gets to its completely clear state before the flash. A maximum contrast is never achieved.

With a color sequential display, even when the display is of a static image, the display is dynamic since the display is sequencing through the red image, the green image, and the blue image.

Referring back to FIG. 2B, if the liquid crystal had a fast enough response to twist or untwist or if the subframe was a longer time period, even the last pixel written to, as represented by the end of the write box, would be settled in the final position before the flashing of the LED. However, the liquid crystal does not respond quickly enough to allow settling at the frame or subframe speeds required to prevent flicker as illustrated in FIG. 11A. In that the pixels are written to sequentially, the first pixel is written to (i.e., driven to twist or allowed to relax) a set time before the last pixel. In a preferred embodiment, the time between writing to the first pixel and the last pixel is approximately 3 milliseconds.

Therefore, the liquid crystal associated with the last pixel and the liquid crystal associated with the first pixel do not have the same amount of time to respond prior to the flashing of the backlight.

With the twist of the liquid crystal different at the two pixels, there is a different amount of light passing through the liquid crystal and therefore the contrast, the luminance, the color blend can vary from one corner to another of the display. For example, if a display had an intermediate color such as yellow at the first pixel and the last pixel, the color would not be identical.

Referring to FIG. 11B, a yellow pixel is created by allowing the red flash and the green flash to be seen and not the blue flash. The video for the pixel is set to drive the pixel black for the blue subframe and allow it to relax for the red and the green subframes, as represented by the square wave. In the first subframe in FIG. 11B, the blue subframe, the liquid crystal for both the first pixel and the last pixel are shown at a steady state black. The first pixel receives its signal at the beginning of the red subframe and the liquid crystal begins to relax. The last pixel receives its signal at some time later, 3 milliseconds in a preferred embodiment, and the liquid crystal begins to relax at that time. The liquid crystal related to the first pixel and the last pixel are at different points in the transition to clear when the red LED flashes, therein producing different levels of red. In the embodiment shown in FIG. 11B, the next color to flash is green and therefore the first and last pixels are not changed. Therefore the liquid crystal associated with both the first and the last pixel continues to transition to clear. When the LED for green flashes, the liquid crystal for the two pixels are in different points of transition to clear, therefore there is a different level of green. In addition, because the green flash occurred after the red flash and the liquid crystal had more time to transition, the amount of green that is visible is greater than the amount of red, therein resulting in a greenish yellow.

Still referring to FIG. 11B, the next subframe is the blue subframe. The pixels are driven black. The first pixel once again receives its signal near the beginning of the subframe and in that in a preferred embodiment it takes 3 milliseconds for the liquid crystal to turn black, the liquid crystal is black before the flash of the blue LED. The last pixel receives its signal near the end of the subframe and is still transitioning to black when the blue LED flashes. Therefore, the last pixel in this subframe has some blue in its yellow.

In the next frame, the next red subframe, the liquid crystal is relaxing, therein turning to clear. The last pixel had been previously driven black, therefore as it transitions to clear, the last pixel will once again lag behind the first pixel.

Figure 12A:
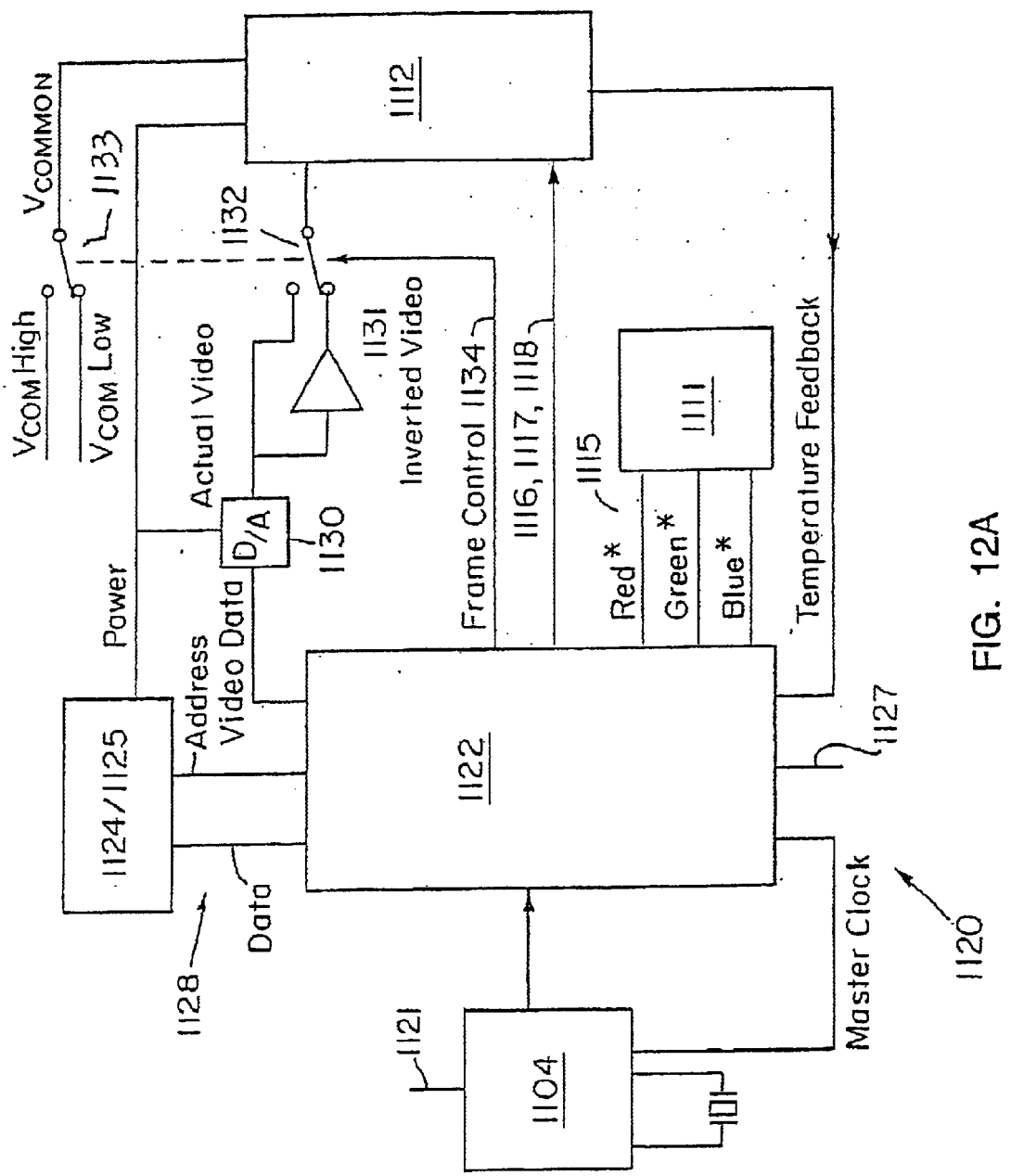
FIG. 12A illustrates an alternative preferred embodiment of the display control circuit in accordance with the invention.

FIG. 12A illustrates an embodiment of a display control circuit. In this embodiment, a digital circuit 1120 is used to control color sequential display operation. The processor 1104 receives image data at an input 1121 and sends display data to memory 1124 and flash memory 1125 via the timing control circuit 1122. The image data can be in a variety of forms including serial or parallel digital data, analog RGB data, composite data, or s-video. The processor 1104 is configured for the type of image data received, as is well known in the art. The timing control circuit 1122 receives clock and digital control signals from the processor 1104 and transmits control signals to the backlight 1111 along lines 1115. The timing control circuit 1122 transmits control signals, such as vertical start pulse, vertical clock, horizontal start pulse, and horizontal clock, to the display 1112 along lines 1116, 1117, and 1118. Lines 1128 direct ready, reset, write enable, output enable, color enable, address and data signals to memory to control delivery of image frames to the display 1112.

Still referring to FIG. 12A, the image data travels from the timing control circuit 1122 to the display 1112 through a digital to analog converter 1130 and through an inverter 1131 on an alternate frame dependent on a switch 1132 as described below. In addition and in contrast to the previous embodiment, the common voltage ($V_{COM}$) enters the display 1112 at alternating values controlled by a switch 1133. The switches 1133 and 1132 for alternating the $V_{COM}$ and the video to the display are controlled by a frame control line 1134 from the timing control circuit 1122.

Figure 12B:
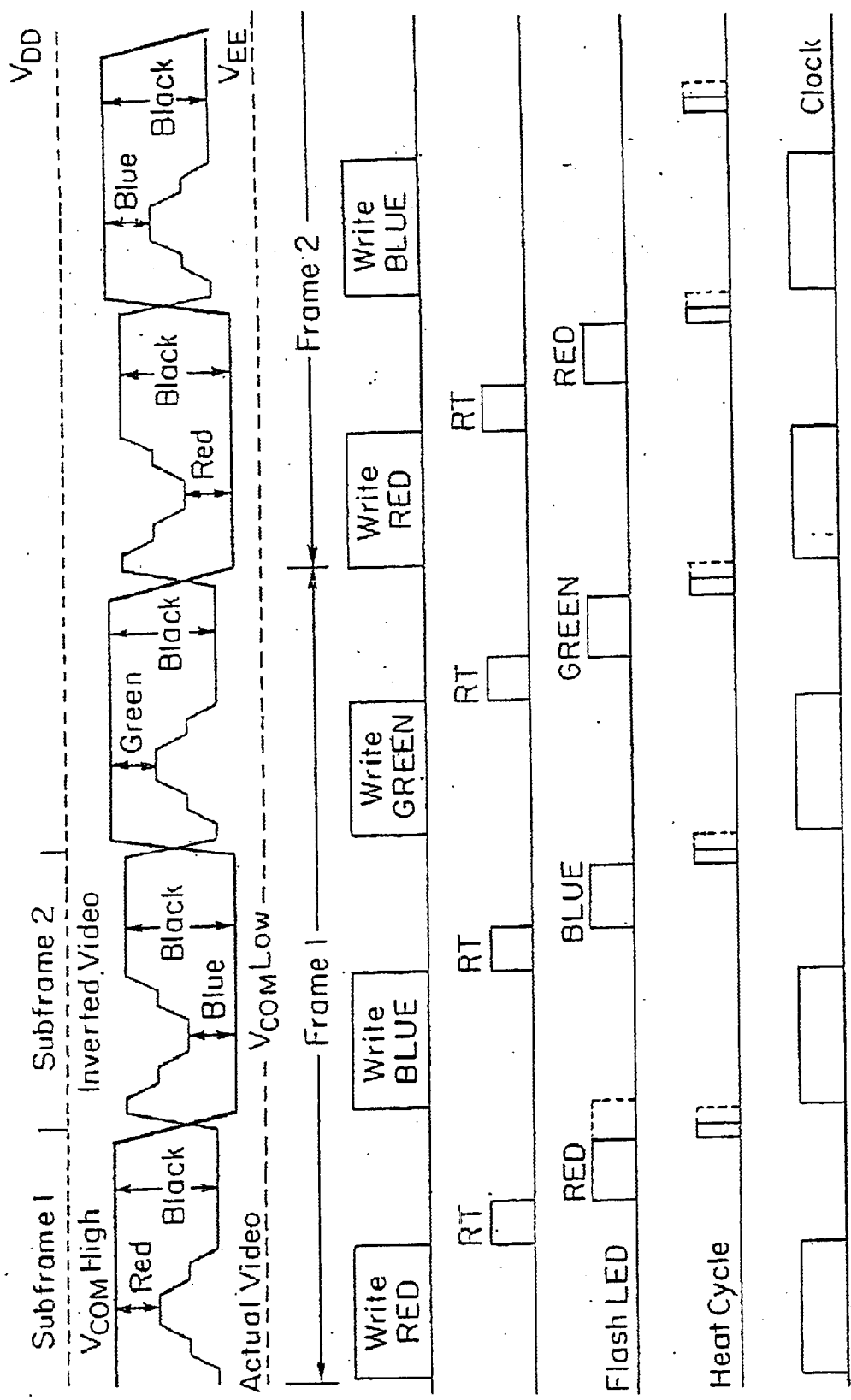
FIG. 12B illustrates a timing diagram for the display control circuit illustrated in FIG. 12A.
Figure 12C:
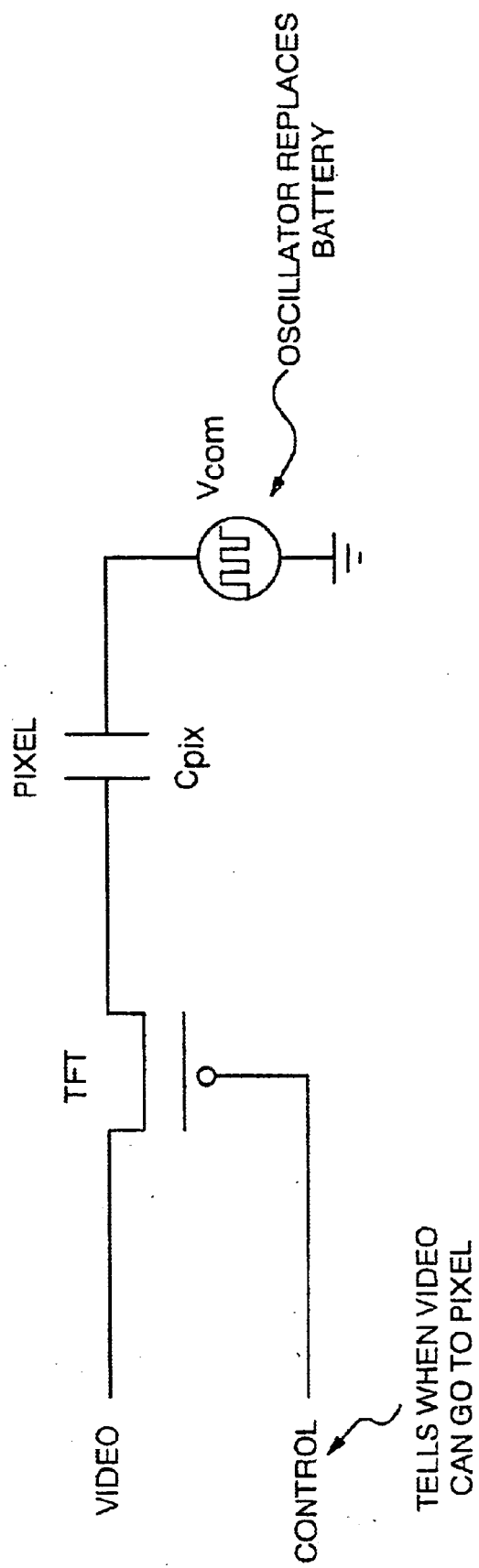
FIG. 12C illustrates a pixel element of the display control circuit shown in FIG. 12A.

Referring to FIGS. 12B and 12A, with the common voltage ($V_{COM}$) high, approximately 8 volts in a preferred embodiment, the actual video signal is scanned into the matrix circuit. After a delay to allow for the liquid crystal to twist to maximum position, the LED backlight 1111 is flashed to present the image. Prior to the next frame, subframe 2 in FIG. 12B, $V_{COM}$ goes low, approximately four (4) volts in a preferred embodiment. Driving $V_{COM}$ low erases the image that has just been scanned. However, since there is no backlight on, the loss of the image is not seen. With $V_{COM}$ low, the inverted video signal is scanned into the matrix circuit. Similarly, after a delay to allow the liquid crystal to twist, the LED backlight 1111 is flashed to present the refreshed or new image. Prior to the next frame, subframe 3 in the figure, $V_{COM}$ goes high. Driving $V_{COM}$ high results in the image that has just been scanned to be erased. With $V_{COM}$ high, an actual video signal is scanned into the matrix circuit. A delay occurs and then the LED backlight 1111 is flashed. The common voltage ($V_{COM}$) and the video keep on alternating, as represented in FIG. 12C. If the display is a color display, the LED backlight 1111 sequentially flashes the distinct colors. In addition, three screen scans, one for each color LED, comprise a frame and the $V_{COM}$ alternates each screen.

In a preferred embodiment, $V_{COM}$ fluctuates every 5–6 milliseconds. It takes approximately 3 milliseconds to write/scan the image. The LED flashes for a time period of about 0.5 milliseconds. There is a waiting period between writing to the last pixel and the flash of about 1.5 milliseconds. It is recognized that it may be desirable to vary the delay time before flashing the LED or vary the length of the LED flash dependent on the color LED to be flashed. For example, it may be desirable to have a longer delay time, response time, before flashing the LED when the LED to be flashed has a longer wavelength, such as red, which has a wavelength of between 630 and 700 nm.

With the video amplitude, the difference between $V_{DD}$ and $V_{EE}$, on the pixel's TFT reduced, a smaller storage capacitor is required. Less time is needed to write with a smaller storage capacitor and therefore a smaller pixel TFT can be used. If the liquid crystal has a fast enough response, the storage capacitor can be eliminated and the capacitance of the liquid crystal becomes the storage capacitor. In addition, with no storage capacitor a larger aperture is possible. With a larger aperture and increased aperture ratio, the image will be brighter for the same cycling of the backlight or the total power used can be reduced with the same image brightness.

Figure 12D:
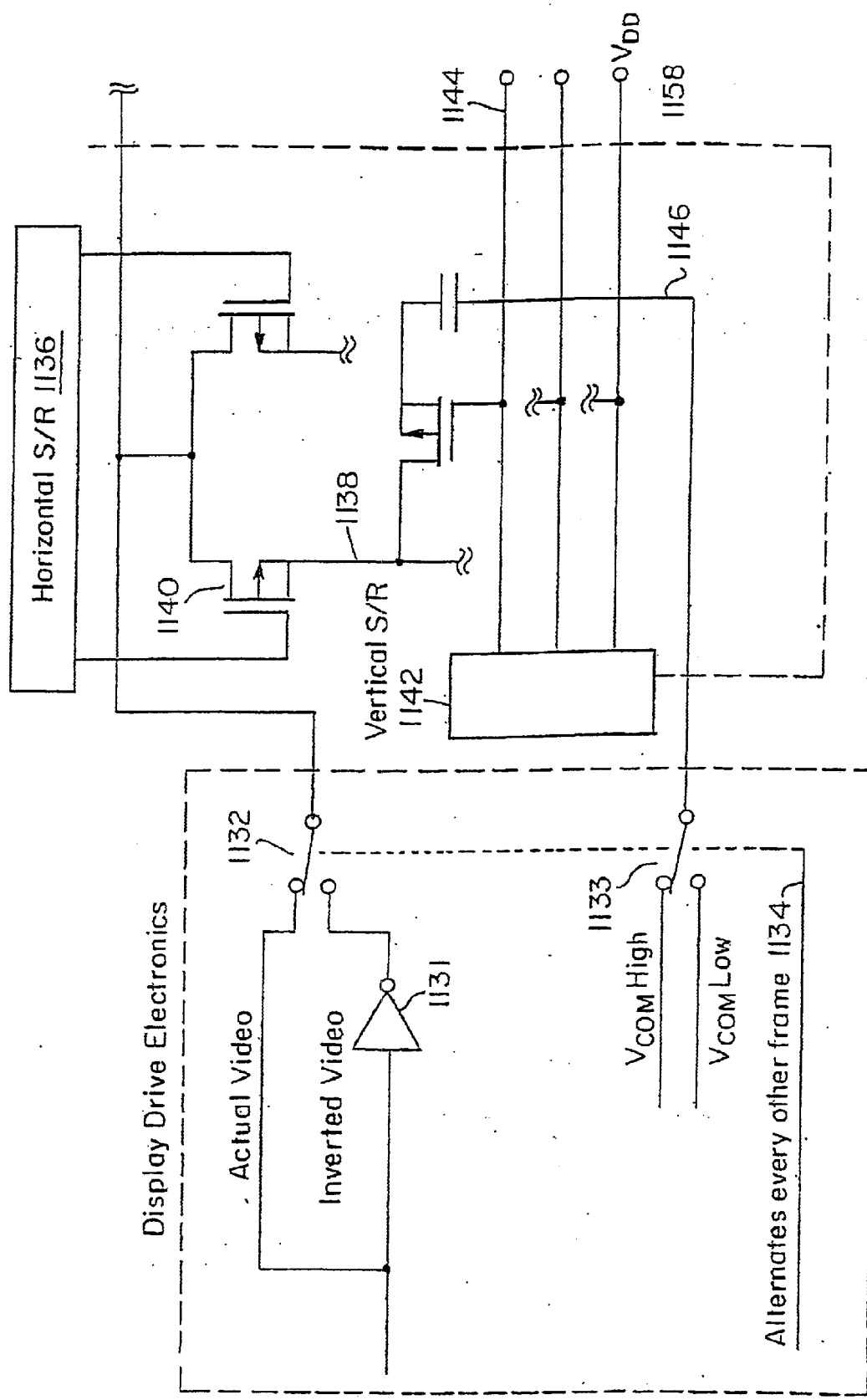
FIG. 12D illustrates a portion of the display control circuit shown in FIG. 12A.

Referring to FIG. 12D, an enlarged schematic view of one pixel, the pixel is charged by a horizontal shift register 1136 selecting a column 1138 by turning a transmission gate 1140 and the vertical shift register 1142 selecting a row 1144. The video is written to the pixel and the liquid crystal begins to twist and become optically transmissive. After the entire display has been written and there has been a delay before the LED flashes, the $V_{COM}$ 1146, i.e., the voltage to the counterelectrode, is switched from high to low or vice versa by the frame control line. At the same time, the video signal is switched from actual video to inverted video or vice versa, so that the video will be switched for the next frame.

The liquid crystal can be twisted to become either optically transmissive or optically opaque. The orientation of the polarizers affect whether the liquid crystal is driven to white, transmissive, or to dark, opaque.

Figure 13:
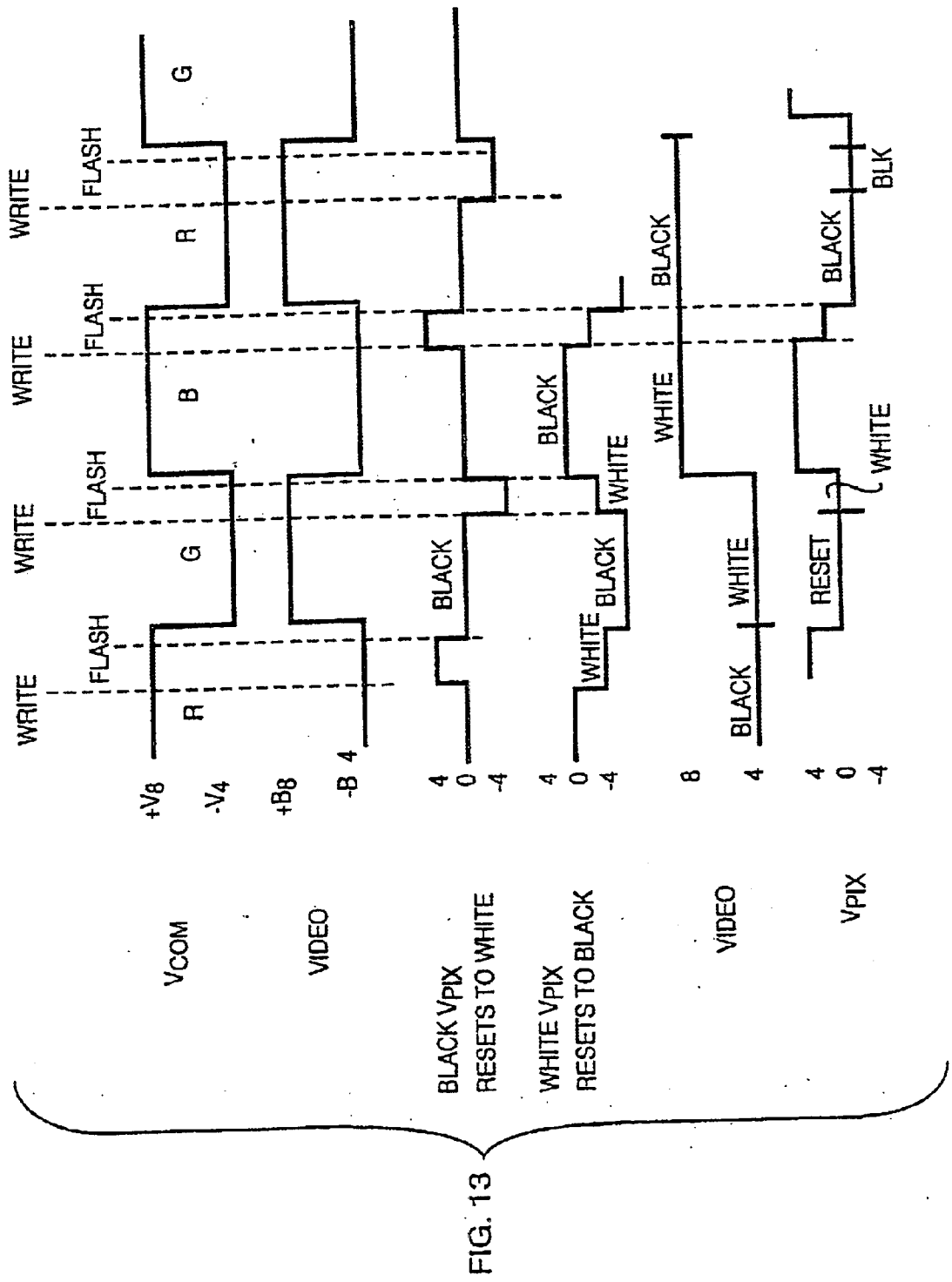
FIG. 13 is a graphical representation of a black pixel being reset to white and white pixel being reset to black by the modulation of $V_{COM}$.

By switching $V_{COM}$ and the video signal after each frame or subframe as illustrated in FIG. 13, a black pixel is reset to white and a white pixel is reset to black. The resetting of the $V_{COM}$ changes the base or common ground voltage for the pixel. Therefore if $V_{COM}$ is 8 volts and the pixel is driven to 4 volts, a 4 volt differential results and the liquid crystal is black. If $V_{COM}$ is then set to 4 volts, there is no differential and the pixel is reset to white. Likewise if $V_{COM}$ is 8 volts and the pixel is allowed to go to $V_{COM}$, a zero (0) volt differential results and the liquid crystal twists to white, and then $V_{COM}$ is set to 4 volts, there is now a 4 volt differential and the pixel is reset to black.

Figure 14A:
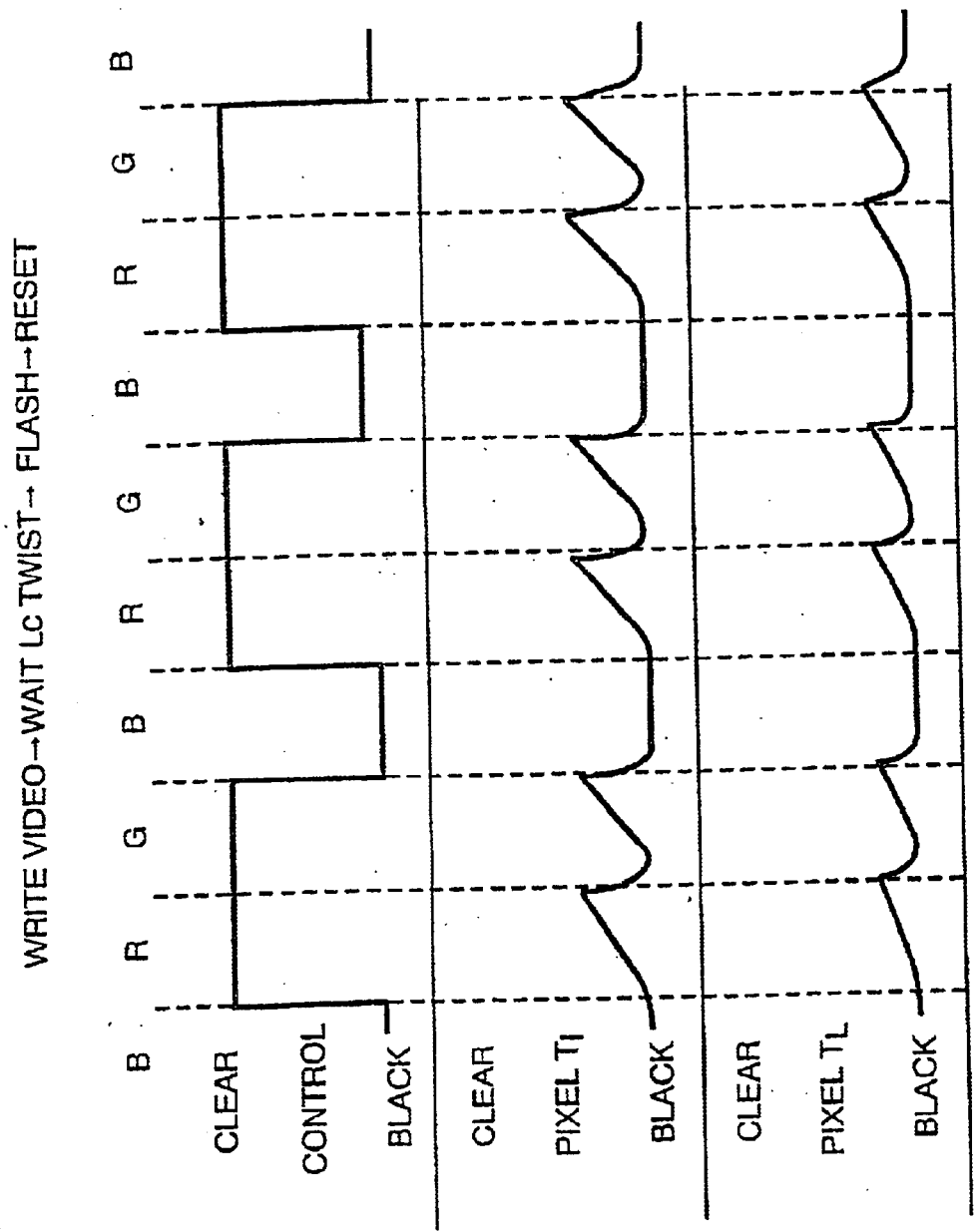
FIG. 14A is a graphical representation of the voltage and the transitioning of the liquid crystal for the first pixel and the last pixel for an intermediate color such as yellow for the display control circuit illustrated in FIGS. 12A–12C.

FIG. 14A illustrates the creation of a yellow pixel for the first pixel and the last pixel, similar to what is shown in FIG. 11B, but resetting or modulating $V_{COM}$ after each subframe. The video for the pixel is set to drive the pixel black for the blue subframe and allow it to relax for the red and the green subframes, as represented by the square wave. In the first subframe in FIG. 14A, the blue subframe, the liquid crystal for both the first pixel and the last pixel are shown at a steady state black. The first pixel receives its signal at the beginning of the red subframe and the liquid crystal begins to relax. The last pixel receives its signal at some time later, 3 milliseconds in a preferred embodiment, and the liquid crystal begins to relax at that time. The liquid crystal related to the first pixel and the last pixel are at different points in the transition to clear when the red LED flashes, therein producing different level of red as in FIG. 11B. However, in contrast to the previous embodiment, the $V_{COM}$ modulates so that the clear (white) pixels reset to black. This is represented by the downward slope between the red subframe and the green subframe.

The next color to flash is green. The first pixel receives its signal at the beginning of the green subframe and the liquid crystal begins to relax. The last pixel receives its signal at some time later, 3 milliseconds in a preferred embodiment, and the liquid crystal begins to relax at that time. When the LED for green flashes, the liquid crystal for the two pixels are in different points of transition to clear, therefore there is a different level of green. However, in contrast to the previous embodiment, the liquid crystal has not had more time to transition prior to the flash of the green LED compared to the red LED. The color is thus more uniform in that both the first pixel and the last pixel have the same ratio of red to green.

Still referring to FIG. 14A, the next subframe is the blue subframe. The pixels are driven black by $V_{COM}$ modulation, as represented by the slope between the green subframe and the blue subframe. In contrast to the previous embodiment, both the first pixel and the last pixel are driven black at the same time. The last pixel is therefore not still transitioning when the blue LED is flashed. With the $V_{COM}$ modulation, while there are still variations of luminosity from the top to the bottom, there is now uniform color.

An alternative method is to reset, initialize, the pixels $V_{PIXEL}$ to $V_{COM}$ after flashing the backlight. In one preferred embodiment, the odd rows are first set to $V_{COM}$ with the even rows subsequently set to $V_{COM}$. With the pixel electrodes set to $V_{COM}$, the liquid crystal begins to relax to the clear state, if the liquid crystal associated with the pixel is in some other state. Once the pixel electrodes have been reset to $V_{COM}$, the first pixel receives it signal and begins to transition. Each pixel receives its signal until the last pixel receives its signal. The liquid crystal associated with each pixel is relaxing, rotating to the clear state, until that pixel receives the signal. The first pixels will have the majority of the writing period to get to their desire position and the initializing of the pixel to $V_{COM}$ will have minimum effect. However, the pixels which receive their signal last will be clear or near clear prior to receiving their signal. As indicated above it takes less time to drive black than relax white. Therefore, with the end pixels being clear, the response time is quicker driving to black than if the pixels were black and relaxing to clear.

Each frame is presented as three subframes, sequentially illuminated with red, green, and blue light. Each frame field is divided into several phases, as shown in the timing diagram of FIG. 2B. The pixel voltages are updated in the first (Write) phase. The second phase (Settle) is a delay to allow the liquid crystal to respond to the applied voltage. Finally, the panel is illuminated in the last (Flash) phase. As the diagram shows, it is sometimes possible to overlap the flash phase of one field with the write phase of the next field.

To achieve good color purity, the liquid crystal must complete its transition to the proper state during the settling phase. Otherwise, the liquid crystal state is effected by the position, state, of liquid crystal in the previous subframe (e.g. the green flash will depend on its state during the red field). This "color shift" effect appears at the bottom of the display first, since those pixels are the last to be updated during the Write phase.

Figure 14B:
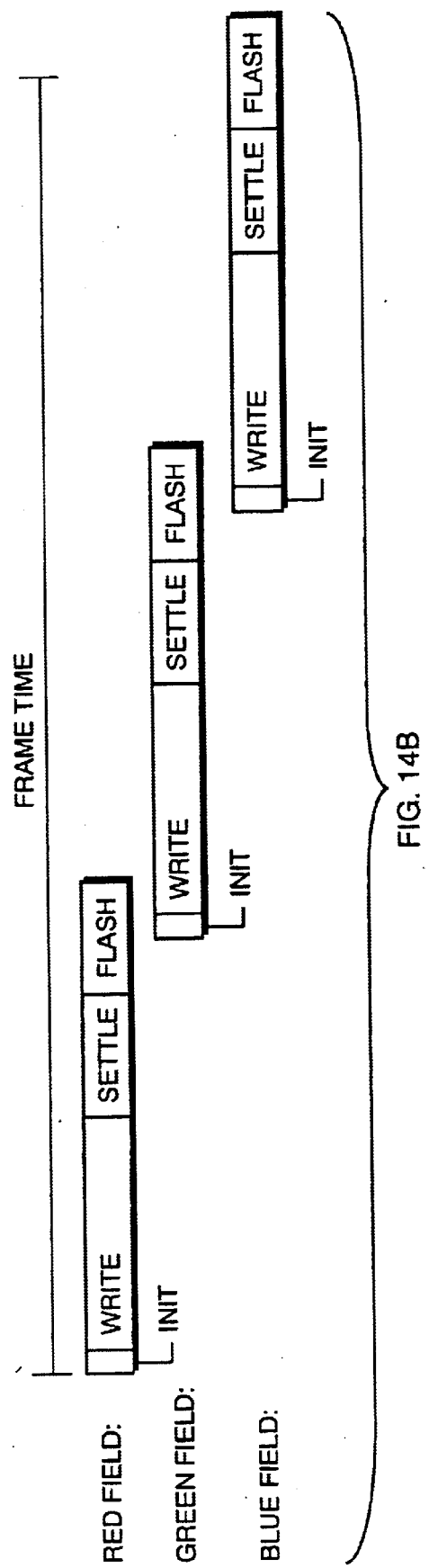
FIG. 14B illustrates a timing diagram for a color sequential display with initialization.

An initialization phase (Init) is added before the write, as shown in FIG. 14B. The initialization phase takes advantage of the fact that the black-to-white and white-to-black liquid crystal transition times are different in the preferred embodiment. In a preferred embodiment, the black-to-white transition is slower, all pixels are initialized to the white state at the beginning of the field. This gives the white pixels a head start, so that the Settle phase need be only as long as the faster white-to-black transition. (It is recognized that the optimal initialization state will depend on such particulars as liquid crystal chemistry, alignment, and cell assembly, and that initialization to black, white, or gray levels might be preferred for a given display).

Figure 14C:
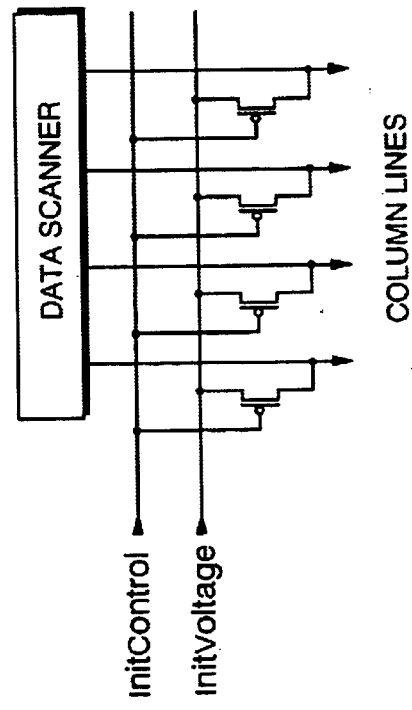
FIG. 14C illustrates a circuit to initialize all columns to the same voltage.

The drive electronics update quickly all pixels in the array. First, the data scanners drive all column lines to the appropriate initialization voltage. A simple implementation adds an initialization switch to every column. FIG. 14C shows switches implemented with p-channel MOS transistors; it is recognized that n-channel transistors, complementary MOS pairs, or other configurations could be used. Second, the select scanners must be able to select multiple rows simultaneously as described in relation to the power down reset circuitry. The control logic is modified to support the initialization operation.

As indicated above, the temperature of the display and in particular the temperature of the liquid crystal effects the response and the characteristics of the display.

Referring back to FIG. 12A, the display circuit has an additional line, a temperature sensor line 1148, which runs from the display 1112 to the timing control circuit 1122. The active matrix comprises a plurality of pixels arranged in columns and rows. Heat is preferably absorbed substantially uniformly throughout the liquid crystal material. However, there may be local temperature variations due to the nature of the image being displayed as well as display and heater geometry and environmental conditions. Temperature sensors can be distributed throughout the active matrix region including around the perimeter of the active matrix including the corners and also disposed near the center of the active matrix. The use of a temperature sensor is described in U.S. patent application Ser. No. 08/364,070 filed Dec. 27, 1994 and is incorporated herein by reference.

The characteristics of the liquid crystal material are effected by the temperature of the liquid crystal. One such example is the twist time of twisted-nematic liquid crystal material, which is shorter when the liquid crystal material is warm. By knowing the temperature of the liquid crystal, the timing control circuit 1122 can set the duration and timing of the flash of the backlight 1111, therein achieving the desired brightness and minimizing power consumption.

Another preferred embodiment of the display 1112 has an internal heater. Referring back to FIG. 12D, during normal operations, the vertical shift register 1142 has only one row on, so that as the horizontal shift register 1136 moves from column to column only one pixel is affected. After the last pixel on a row is addressed, the vertical shift register 1142 switches the active row. The display 1112 can be placed in a heat mode where each row 1144 is turned on and has a voltage drop across the row to create heat. In the embodiment shown in FIG. 12D, an end 1158 of each row line is connected to $V_{VDD}$ and the end near the shift register is driven low thereby creating a voltage differential across each line. Heat is generated at a rate $P=V^2/R$, where R is the resistance of the parallel combination of row lines and V the voltage differential across the row lines. In normal operation, only the selected line which contains pixels to be driven low generates heat, not the entire display.

Referring back to FIG. 12B, with the common voltage ($V_{COM}$)high, the actual video signal is scanned into the matrix circuit. After a delay to allow for the liquid crystal to twist into position, the LED backlight 1111 is flashed to present the image. Prior to the next screen or subframe, a heat cycle occurs where all the row lines are driven such that there is a voltage differential across the row. The heating can occur while $V_{COM}$ and the video are being alternated and inverted, respectively, by the frame control line 1131. FIG. 12B shows a heating cycle after each subframe, but the number and time period of heat cycles can be dependent on the temperature of the liquid crystal as determined by the temperature sensor 1132. In cold environments, the digital circuit 1120 can have a warm-up cycle where the heater is turned on prior to the first painting of the screen.

The delay time before beginning the flash and the flash time are shown as identical in FIG. 12B. However, both the delay time (the delay for response time of the liquid crystal) and the flash time can be dependent on the specific color to be flashed. The delay time is dependent on when the liquid crystal associated with the last pixel to be written has sufficient time to twist to allow that specific color to be seen. The duration of the flash, or the point that the flash must be terminated, is dependent on when the liquid crystal associated with the first pixel to be written of the next frame has twisted sufficiently that light from the backlight is visible to the viewer.

The timing control circuit 1122, as seen in FIG. 12A, can vary the flash duration and the delay or response time depending on the color that is to be flashed. In addition, the current to the backlights 1111 can be varied to adjust the intensity of the color. If desired, a color control line 1127 can be added to the timing control circuit 1122 to allow the user to vary the color.

Figure 15A:
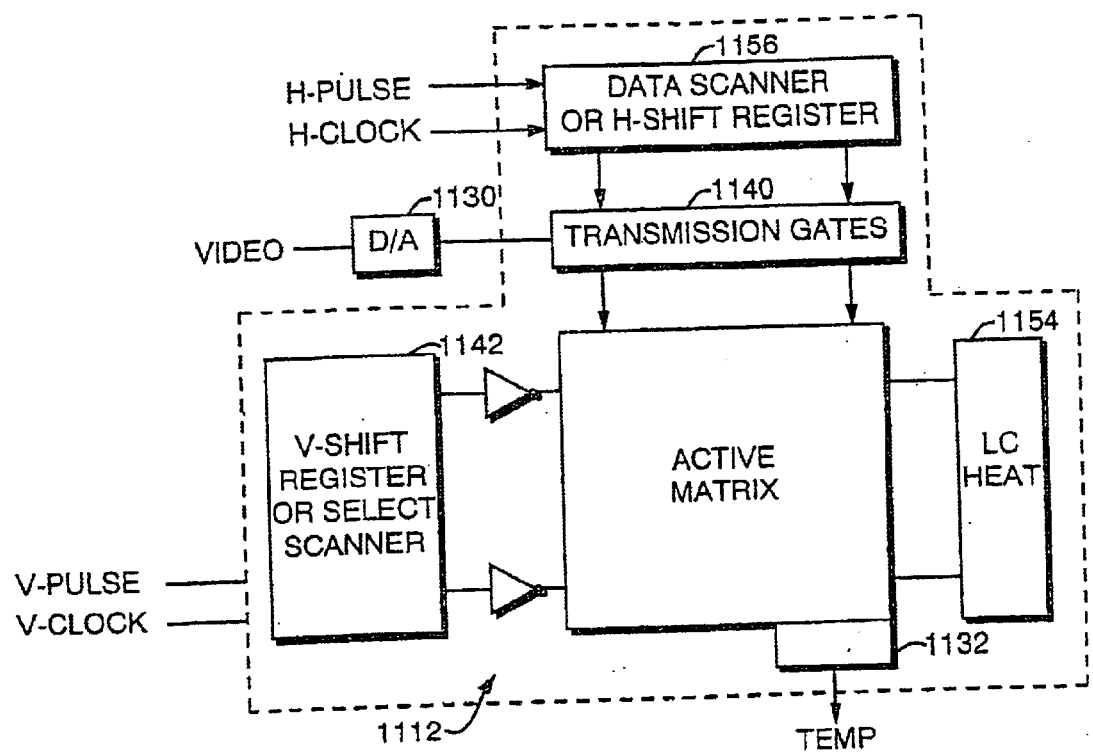
FIG. 15A illustrates an alternative preferred embodiment of the display with a heat gate.

Referring to FIG. 15A, a schematic of the display 1112 and the digital to analog converter 1130 are shown. The display has a horizontal shift register 1136, a vertical shift register 1142, and switches 1140 similar to what is illustrated in FIG. 12D. In addition, and in contrast to FIG. 12D, FIG. 15A illustrates a heating gate 1154.

Figure 15B:
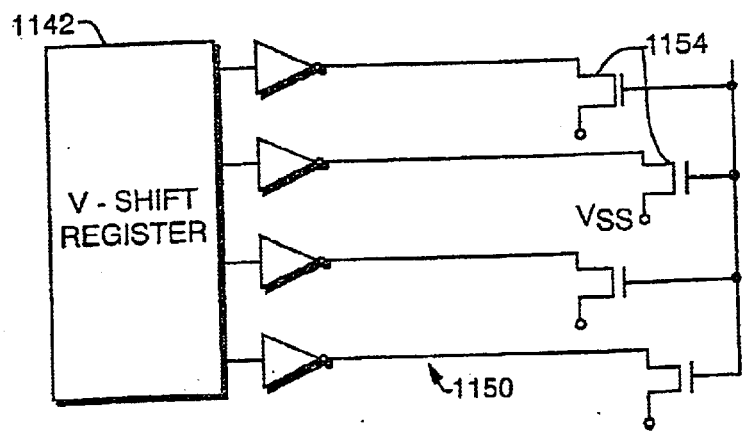
FIG. 15B illustrates a portion of the display shown in FIG. 15A.

Referring to FIG. 15B, for pixels which have p-channel TFTS, the heating gate 1154 has a series of n-channel TFTs. Typically when writing to the display only the row being written to is on (V=0). When not writing to the display, all the rows are $V_{DD}$. When the n-channel TFTs turned on, by applying $V_{DD}$ to a row line 1150 results in current flowing from the inverter associated with the vertical shift register 1142 through the row to the n-channel TFT and heat is dissipated along the entire row. The source is connected to $V_{SS}$, which is zero. It is also recognize that the display 1112 can have several extra rows outside the typical array to assist in uniform heating.

Figure 15C:
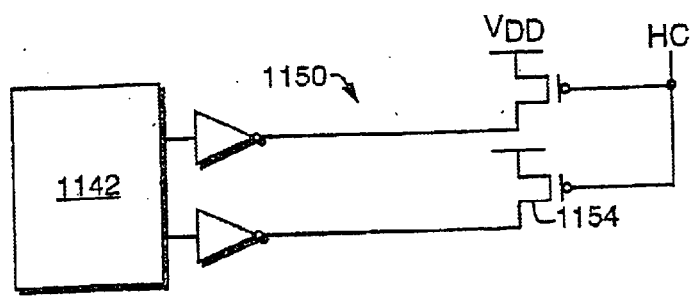
FIG. 15C illustrates an alternative embodiment of a portion of the display shown in FIG. 15A.

Likewise for pixels which have n-channel TFTS, referring to FIG. 15C the heating gate 1154 has a series of p-channel TFTS. Typically when writing to the display only the row being written to is on (V=$V_{DD}$). When not writing to the display, all the rows are approximately zero (0) volts. When the p-channel TFTs are turned on by setting the gate to zero (0), there is a voltage drop across the row of $V_{DD}$.

It is recognized that $V_{COM}$ addressing and the heating of the display can be used independently. Heating can be incorporated into the embodiments described with respect to FIG. 2A. While an internal heater is preferred, it is recognized that a separate heater can be used with the temperature sensor.

In the embodiments shown in FIGS. 15B and 15C, a DC voltage drop ΔV develops across the display as current flows through the row lines 1150 to create the heat. Depending on the length and frequency of the heating cycles, a DC field can be created that affects the performance of the Liquid Crystal. An alternative embodiment shown in FIG. 15D alternates the direction of current flow in the row lines 1150 to reduce or eliminate a DC field.

Figure 15D:
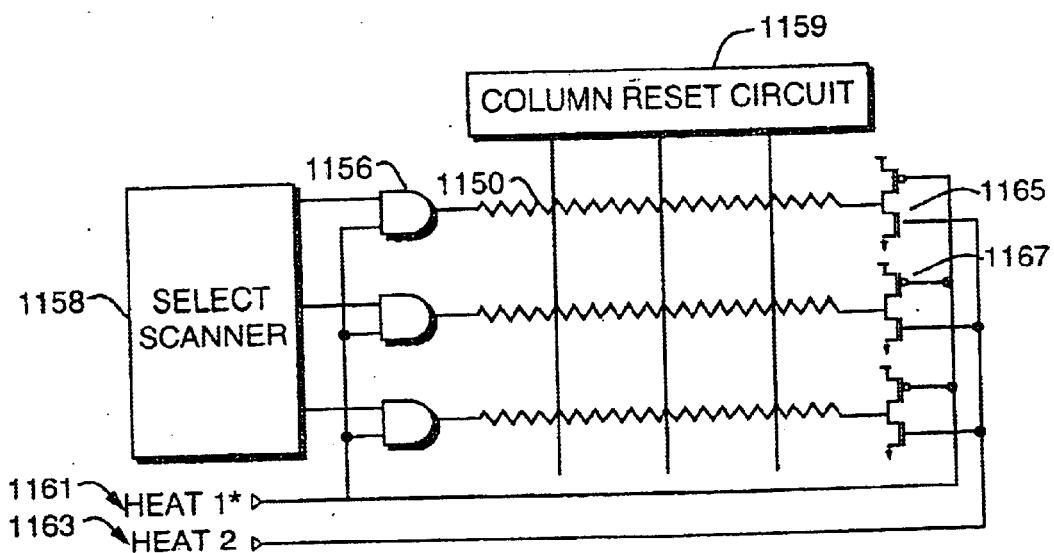
FIG. 15D illustrates an alternative heat driving embodiment.

Still referring to FIG. 15D, the display has two-input AND gates 1156 between the select scanner 1158 and the row lines 1150, with one of the inputs of the AND the input from the select scanner 1158. The other input is a heat signal, HEAT1*, 1161. The other side of each row line 1150 is connected to the drains of two transistors, a n-channel TFT 1165 and a p-channel TFT 1167. The gate of each of the p-channel TFTs is connected to the HEAT1* 1161. The gate of each of the n-channel TFTs is connected to a second heat signal, HEAT2, 1163.

The two heat signals HEAT1* and HEAT2* are held HIGH and LOW, respectively during normal display operation. When HEAT1* is asserted (LOW), the select scanner side of each row line 1150 is driven low while the right side is pulled high. The current flow from right-to-left, as seen in this figure, in this situation. Alternatively, HEAT2 is asserted (HIGH)and the right side is pulled down and the current flows left-to-right. The alternating of HEAT1* and HEAT2 heating cycles helps equalize the DC component of any electric fields to which the liquid crystal may be exposed.

For the above embodiments, the other lines that extend across the active area, the column lines, are not driven to a set voltage. In an alternative embodiment, a column reset circuit 1159 drives all columns to a known voltage during the heat cycle to improve image uniformity. It is recognized that the column lines or additional added lines can also be used for heat.

Figure 15E:
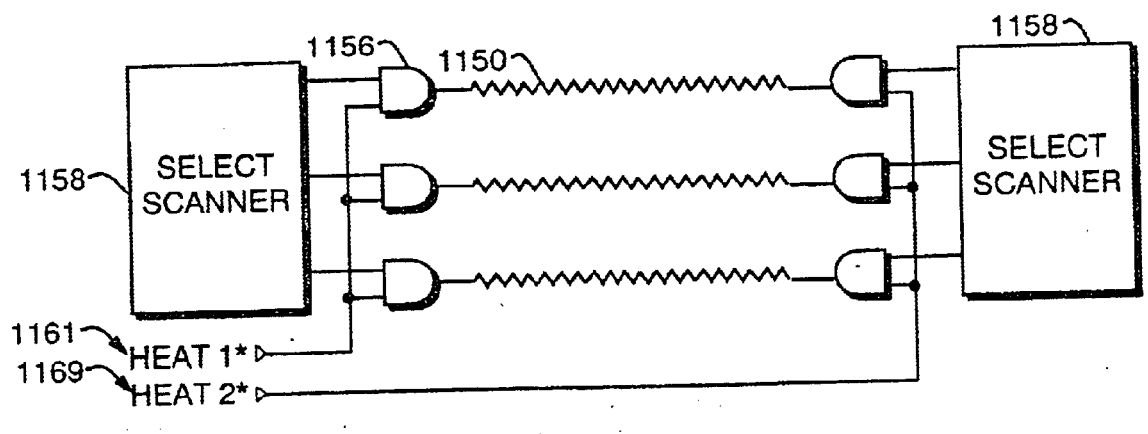
FIG. 15E illustrates an alternative heating embodiment for a display with two select scanners.

Referring to FIG. 15E, most larger displays use two select scanners 1158, on opposite sides of the array to drive the video signal to the pixel elements. A more detail explanation of two select scanners is described in U.S. patent application Ser. No. 08/942,272, which was filed on Sep. 30, 1997, the entire contents of the which is incorporated herein by reference.

The display with two select scanners 1158 has a two input AND gate 1156 at each end of each row line 1150. The HEAT1* 1161 is connected to an input of the AND gate on side of the display and the HEAT2* 1169 is connected to an input of the AND gate on the other side of the display.

An alternative embodiment to having the AND gates is to incorporate equivalent logic within the select scanner.

Referring back to FIG. 9, an alternative embodiment for internal heating is shown. A second layer of ITO (Indium Tin Oxide) 1174 underlies the counterelectrode 2085 with an interposed layer of $SiO_2$ 1176. The second layer of ITO 1174 is patterned such that it covers only the array area. If a current is passed through the second layer 1174, it heats and can heat the liquid crystal 2080. Similar to previous embodiments, the heating occurs between the two layers of glass 2090 that bound the matrix 1160.

The measuring of the temperature of the liquid crystal requires additional analog circuitry which adds complexity to the circuit of the display. It is recognized that it is the operational characteristics of the liquid crystal, not the actual temperature, that is ultimately desired. Therefore, the capacitance of the liquid crystal, an electrical measurement of the liquid crystal capacitance is performed instead of the measurement of temperature in order to determine when heating is required. Thus the heater can be actuated in response to a liquid crystal sensor that responds to the optical or electrical properties of the liquid crystal.

Figure 15F:
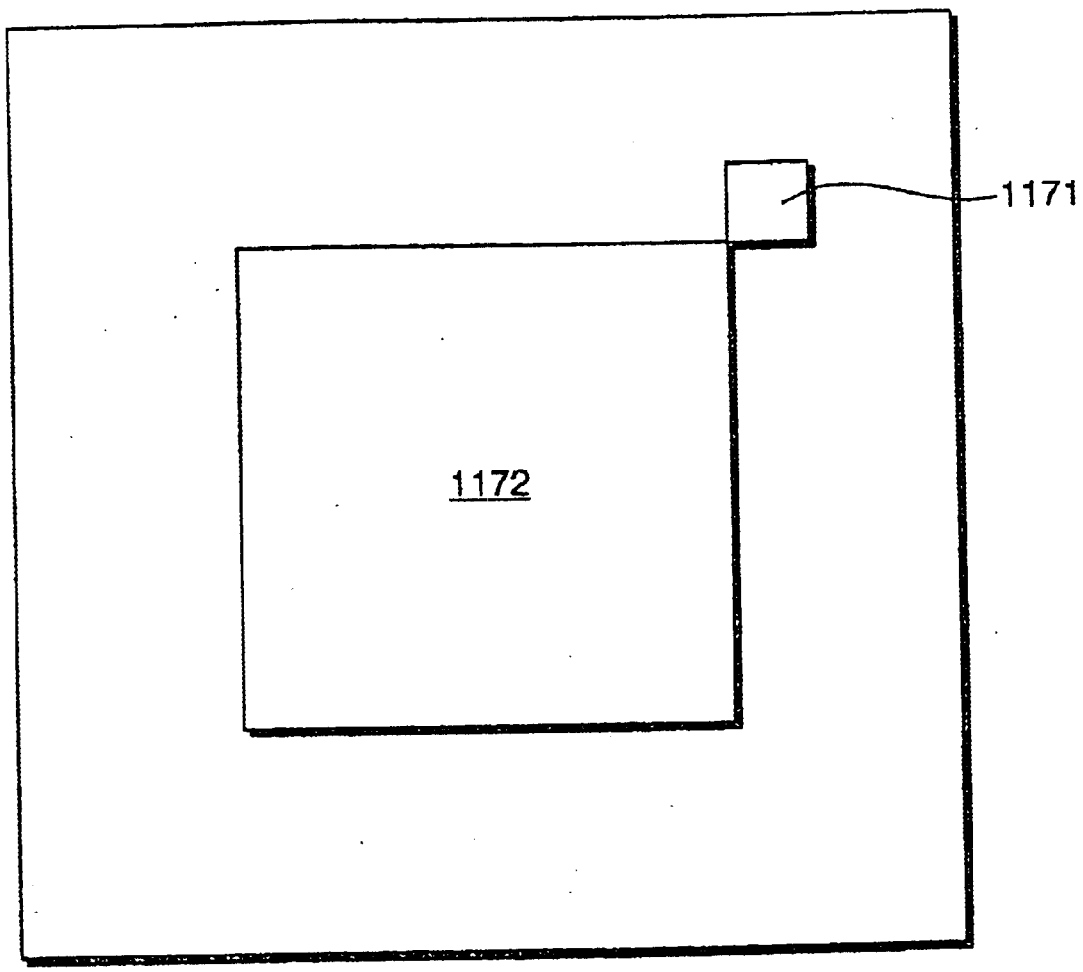
FIG. 15F illustrates a liquid crystal response time sensor array located just out side the active display.
Figure 15G:
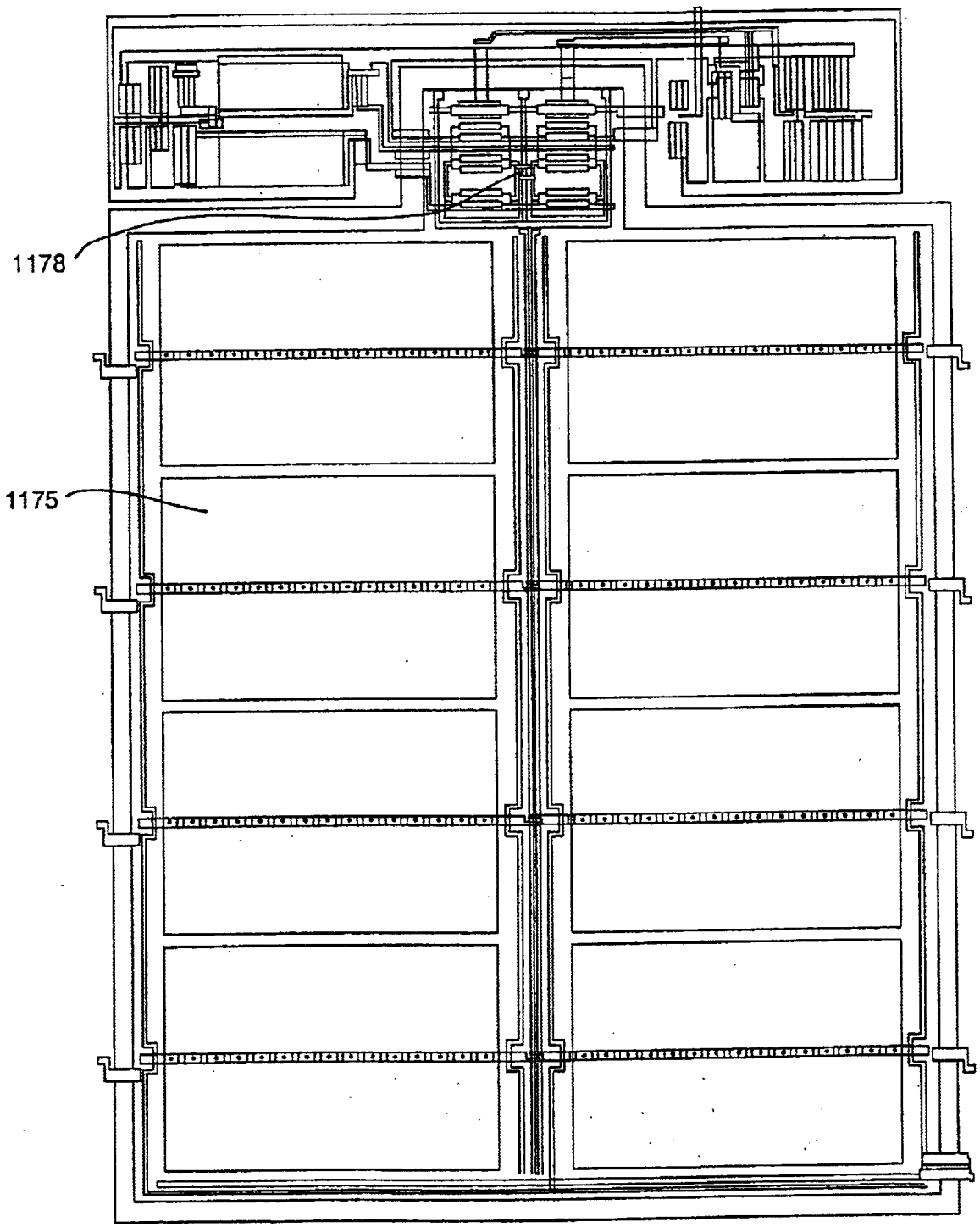
FIG. 15G is an enlarge view of the liquid crystal response time sensor array.

FIG. 15F illustrates a liquid crystal response time sensor 1171 located just of the active matrix display 1172 that is seen by the user. The liquid crystal response time sensor has a plurality of dummy pixels 1175, eight pixels in a preferred embodiment seen in FIG. 15G, and a sense amplifier 1178. The dummy pixels need not be the same size as those in the active area. In a preferred embodiment, the dummy pixels are created large enough to dominate parasitic capacitance effects, within area constraints of the microdisplay.

The eight pixels are divided into two sets of four dummy pixels. The voltages of the pixels are driven to $V_{HB}$ (high black), $V_W$ (white) and $V_{LB}$ (low black). In a preferred embodiment, in one set, two pixels are driven to $V_{HB}$ and one pixel to $V_{LB}$ and the other pixel is set to $V_W$. In the other set, two pixels are driven to $V_{LB}$, and one pixel to $V_{HB}$ and the other pixel is set to $V_W$. The liquid crystal is given a time period much longer than the anticipated response time, to allow the capacitance of the liquid crystal to settle. In a preferred embodiment, the time period can be in excess of 5 milliseconds.

When the capacitance is set, the two identical voltage dummy pixels of each set are set to $V_W$. Therefore in the first set, the two pixels with $V_{HB}$ are set to $V_W$ and in the other set, the two pixels with $V_{LB}$ are set to $V_W$. The pixels are held at this voltage for a specific time, the response period time to be checked. In a preferred embodiment, the time period can be in a range between 1 to 3 milliseconds.

After the time period, those pixels that were just set to $V_W$ are set back to the previous setting. Therefore, in the first set, the two pixel voltages are set to $V_{HB}$ and in the second set, the two pixels voltages are set to $V_{LB}$. The remaining pixel which had a voltage of $V_W$ is set to other black voltage setting (i.e., $V_{LB}$, $V_{HB}$). Therefore each set has two pixels set to $V_{HB}$ and two pixels set to $V_{LB}$.

This state is held for enough time for the pixels to charge electrically, but not so long that the liquid crystal begins to turn and the capacitance changes. In a preferred embodiment, this time period is approximately 1 microsecond.

In the final sensing phase, the driving voltages are removed from the dummy pixels and the four dummy pixels in each set are shorted together to allow charge sharing. A sense amplifier measures a voltage $\Delta V$, given by the equation below:

$$\Delta V = (V_+ - V_-) = (V_{HB} - V_{LB}) \frac{(C_M - C_G)}{(C_M + C_G)}$$

wherein
$C_B$=Black capacitance; $C_W$=White capacitance;
$C_M$=Capacitance to measure; and $2C_G = (C_B + C_W)$.

The sign of $\Delta V$ indicates whether $C_M$ is greater or less than $C_G$. If $\Delta V$ is positive, then $C_M$ is greater than $C_G$, and the dummy pixels have completed less than half the transition from black to white. That is, the response time is greater than the period being checked. A negative $\Delta V$ indicates a response time faster than the checked period.

The preferred embodiment described above measures the off-time (black-to-white) transition time, because this is usually slower than the on-time. It is recognized that the method described above can be readily adapted to on-time measurement.

In addition to having a response time sensor, the microdisplay of a preferred embodiment has a sensor to determine if the liquid crystal is approaching the characteristic clearing temperature of the liquid crystal. The clearing temperature is likewise located just off the active display area. The capacitance of a white pixel and a black pixel converge as the liquid crystal approaches its characteristic clearing temperature.

In contrast to the response time sensor, the characteristic clearing temperature sensor does not have identical sized pixels. The sensor has two sets of dummy pixels, wherein each set has a pair of pixels. The areas of the two pixels in each pair differ by a ratio $\alpha$, where $\alpha$ is chosen to match the known ratio of the liquid crystal white-state and black-state capacitances for the temperature of interest. In each set the voltage of the larger pixel is set $V_W$ and the $\alpha$ pixel has a voltage of $V_{HB}$ in one set and $V_{LB}$ in the other set. Similar to the response time, the liquid crystal is given a time period much longer than the anticipated response time, to allow the capacitance of the liquid crystal to settle. In a preferred embodiment, the time period can be in excess of 5 milliseconds.

The next step is to precharge those pixels which have a voltage of $V_W$ to a voltage such that each set has one pixel at $V_{HB}$ and the other at $V_{LB}$. This state is held for enough time for the pixels to charge electrically, but not so long that the liquid crystal begins to turn and the capacitance changes. In a preferred embodiment, this time period is approximately 1 microsecond.

In the final sensing phase, the driving voltages are removed from the dummy pixels and the two dummy pixels in each pair are shorted together to allow charge sharing. A sense amplifier measures a voltage $\Delta V$, given by the equation below.

$$\Delta V = \frac{V_{HB} - V_{LB}}{\alpha C_B + C_W}(\alpha C_B - C_W).$$

The sign of $\Delta V$ indicates whether the ratio of the $C_w$ to $C_B$ is greater or less $\alpha$. If $\Delta V$ is negative, then the ratio ($C_W/C_B$) is greater than $\alpha$, which means that the liquid crystal is nearing its clearing temperature.

One of the traits of liquid crystal that is desired is the long time constant which allows the image to be maintained without having to refresh in certain instances. Single crystal silicon using CMOS technology provides circuitry with extremely low leakage currents. In combination with high quality Liquid Crystal (LC) material the low leakage of the circuitry and extremely high resistance of the LC can produce long time constants. These time constants can be in the order of several minutes. Therefore, a residual image can be retained depending on the point where the scanning circuitry stops functioning during power offs.

Figure 16:
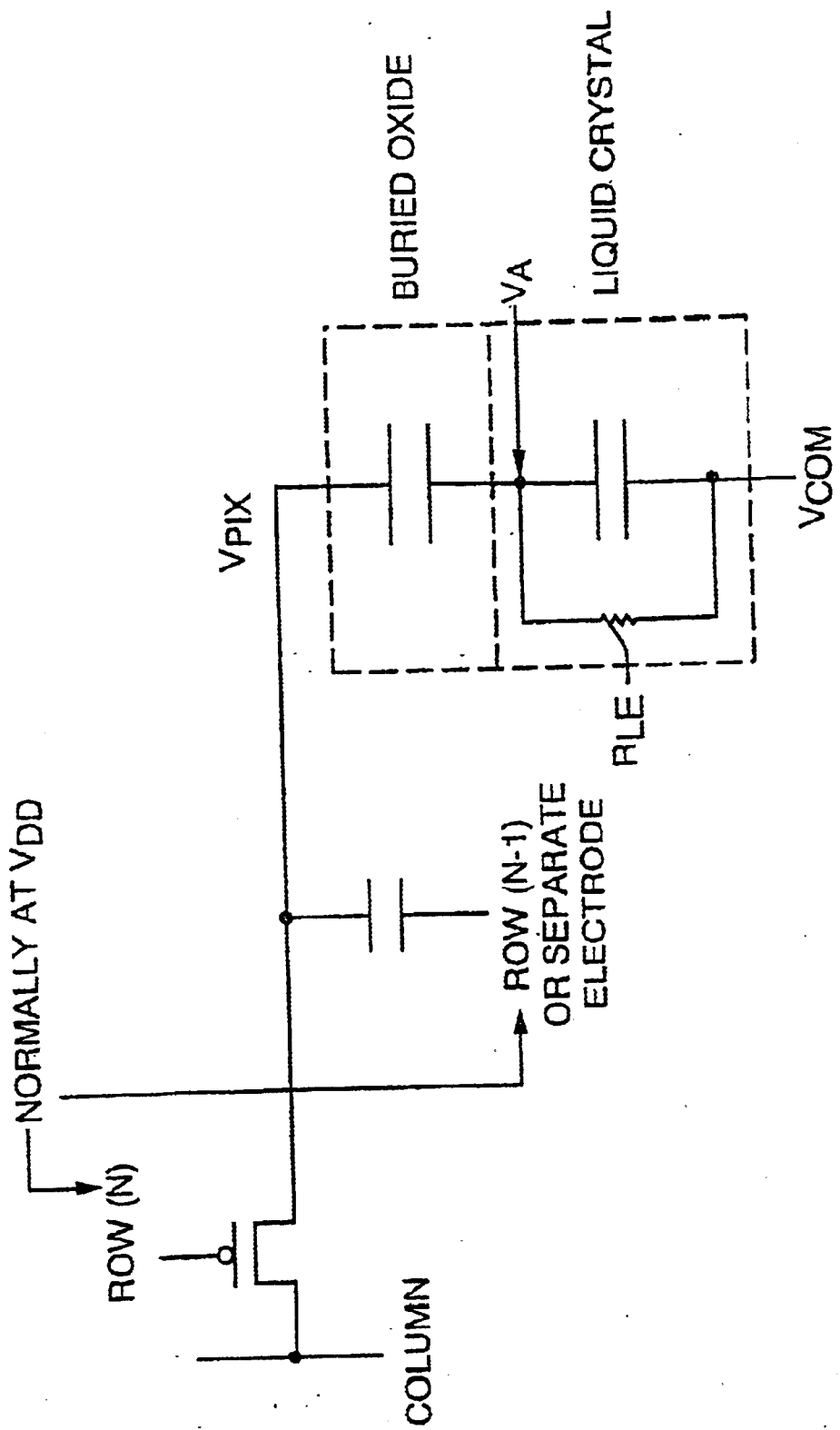
FIG. 16 illustrates a pixel element in a display.

A pixel element is illustrated in FIG. 16. The pixel element has a transistor (TFT) which is connected to the row line, which goes from normal $V_{DD}$ to 0 to allow the row to write. The video signal is received through the transistor from the column. The voltage of the pixel to the counter-electrode has a drop over the buried oxide, see FIGS. 7 and 11, which acts as a capacitor and over the liquid crystal, which acts as a resister and capacitor in parallel. In addition, the pixel electrode has a storage capacitor formed between the TFT and the previous row line.

Figure 17:
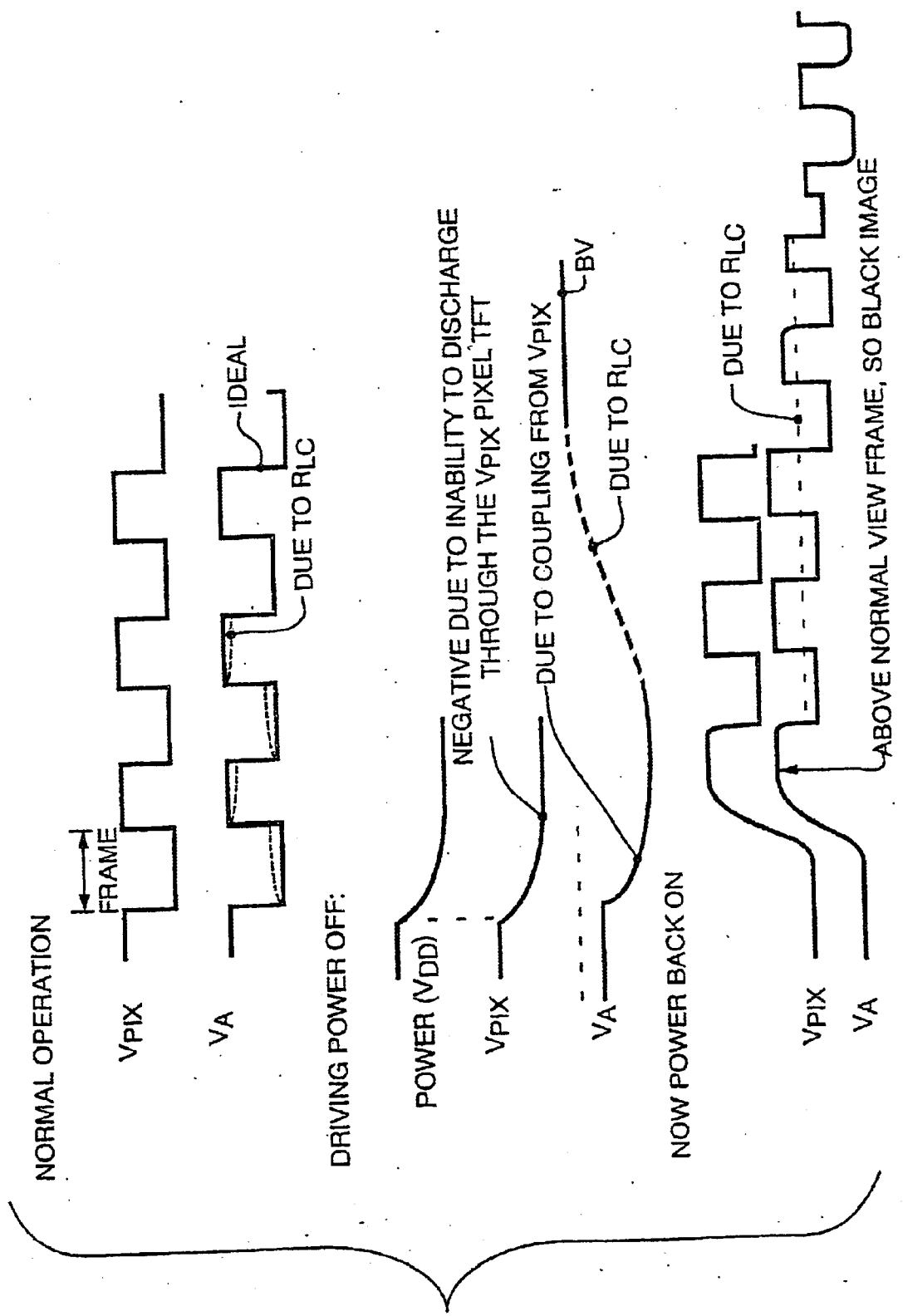
FIG. 17 is a graphical representation of voltage of the pixel electrode as power is turned off and back on in the prior art.

Referring to FIG. 17, in normal operation the voltage of the pixel is fluctuating. The voltage at the point ($V_A$) between the buried oxide and the liquid crystal generally follows the pixel voltage, but is lower because of the drop across the buried oxide and drops because of the resistance of the liquid crystal ($R_{LC}$) When powering off, $V_{DD}$ drops to zero. The pixel voltage ($V_{PIX}$) is unable to discharge through the p-channel pixel TFT and drops. VA which is coupled to $V_{PIX}$ drops likewise. If a sufficient time transpires, VA will return to zero due to the $R_{LC}$.

However, if the power is turned back on to the display prior to the natural discharge time, a portion of the image may be seen for several seconds. $V_{PIX}$ goes positive when the power comes on and since VA is coupled it goes positive above and creates a black image. VA returns to normal in several minutes due to $R_{LC}$.

Figure 18:
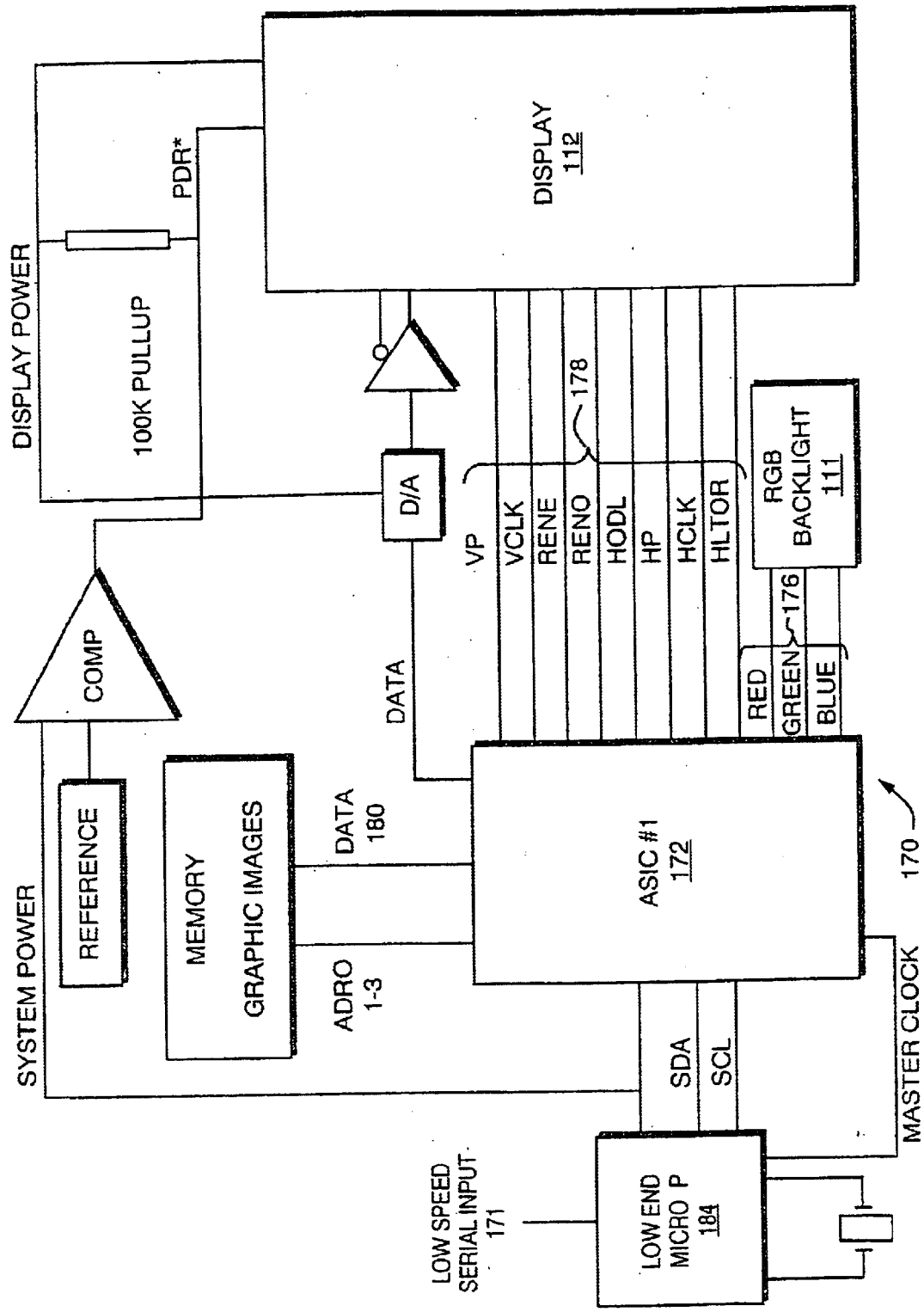
FIG. 18 illustrates a preferred embodiment of display control circuits in accordance with the invention.

A display circuit is illustrated in FIG. 18. In this embodiment, a digital circuit 170 is used to control color sequential display operation. The processor 184 receives serial digital image data at 171 and sends display data to memory 174. The timing control circuit 172 receives clock and digital control signals from processor 184 and transmits control signals to the backlight 111 and display 112 along lines 176 and 178, respectively. Lines 178 direct ready, reset, write enable, output enable, color enable, address and data signals to memory to control delivery of image frames to the display 112.

An analog comparator samples the voltage of the main power in real time. When the voltage drops below the level to run the circuit plus some margin, a reset signal (PDR*) is asserted low. On receipt of the PDR* signal the display circuitry will place VDD on all the column lines, see FIG. 2A, and activates all the row lines. The normal timing continues for two or more cycles, therein sequentially activating all the even and odd rows. This clocks the VDD signal on the column lines into every pixel.

Referring back to FIG. 16, VDD will also charge the pixel storage capacitor. In normal operation, the opposite side of the storage capacitor is connected to the previous row line. By activating all the even row lines, (i.e., driving them low) and not the odd row lines (i.e., maintaining high), the storage capacitors on the even rows will be discharged to 0 volts. (VDD is high logic level). On the next cycle the odd rows storage capacitors will be discharged. Because the storage capacitor is several times larger than the pixel capacitor, the voltage on the storage capacitor will then discharge the pixel capacitor to 0 volts. At this point the display can be de-energized without any residual charge left on either the storage or pixel capacitor.

Figure 19A:
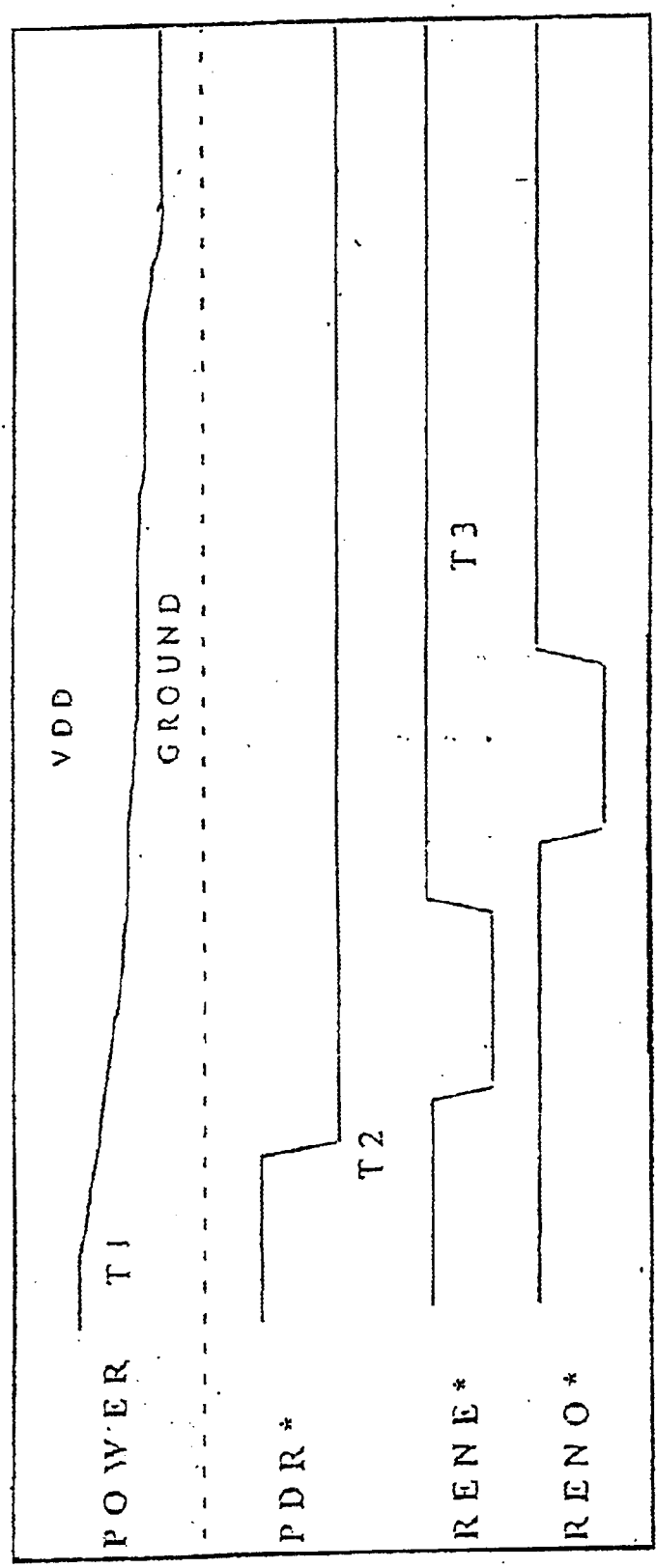
FIG. 19A is a graphical representation of the control signal as power is turned off in accordance with the invention.

FIG. 19A illustrates a timing diagram. The system power is turned off at time T1 and shown as a classical discharge as the logic continues to run powered by the bypass capacitors. The comparator senses the threshold voltage level and asserts the PDR* low, at time T2. The additional row enable signals are then asserted and completed at time T3. Non additional logic or signals are required after T3 and the power is allowed to randomly discharge. The power down reset will work with column inversion and $V_{COM}$ modulation displays.

The embodiment described with respect to FIG. 13 reset a white (clear) pixel to black and a black pixel to white (clear).

Figure 19B:
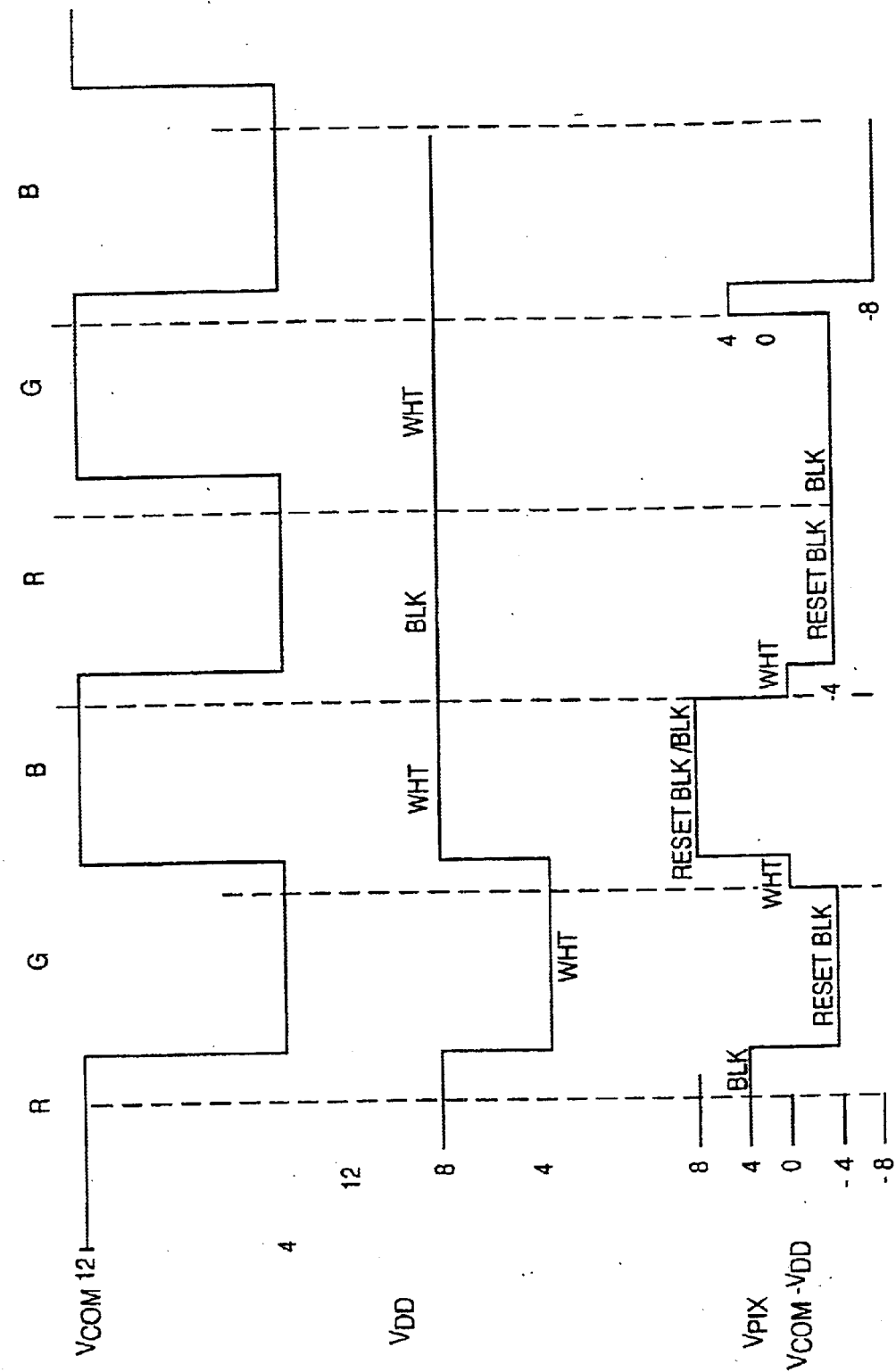
FIG. 19B is a graphical representation of a higher voltage $V_{COM}$ reset.

FIG. 19B illustrates a pixel reset having a greater fluctuation of $V_{COM}$ therein resetting the pixel to black in every instance. The $V_{COM}$ has twice the swing of the source voltage. By switching $V_{COM}$ and the video signal after each frame or subframe, a white pixel is reset to black, but a black pixel is also reset to black. The resetting of the $V_{COM}$ changes the base or common ground voltage for the pixel. Therefore if $V_{COM}$ is 12 volts and the pixel is driven to 4 volts, a 8 volt differential results and the liquid crystal is black, and then $V_{COM}$ is set to 4 volts, there is −4 volt differential and pixel is reset to black. Likewise if $V_{COM}$ is 4 volts and the pixel is allowed to go to $V_{COM}$, a 0 volt differential results and the liquid crystal twists to white, and then $V_{COM}$ is set to 12 volts, there is now an 8 volt differential and the pixel is reset to black/black, an overdriven black.

While the above shows a preferred method, there are several alternative embodiments of the structure.

Figure 20A:
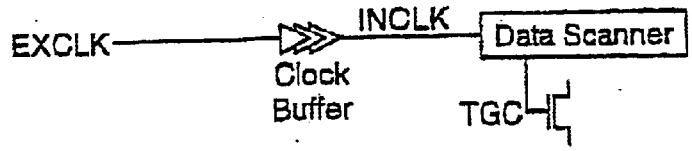
FIG. 20A illustrates a prior art signal path in a display.
Figure 20B:
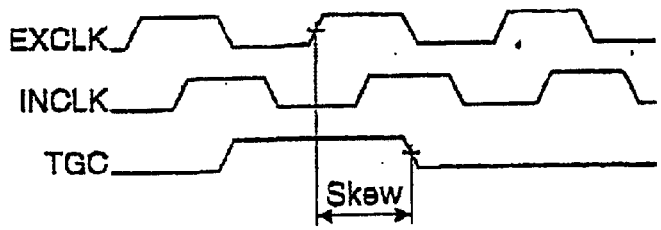
FIG. 20B is a timing diagram showing skew between EXCLK and TCG.

Referring to FIG. 20A, integrated displays, such as an active matrix liquid crystal display typically have a critical signal path. The external clock input (EXCLK) is buffered to produce an internal clock (INCLK) which controls the data scanner timing. The data scanner produces TGC pulses to enable the transmission gates (one shown). As shown in the timing diagram of FIG. 20B, the propagation delays of the clock buffer and the data scanner result in a timing skew between the active edge of EXCLK and the sampling edge of TGC.

The skew is typically temperature-dependent and may vary from one display to the next of apparently identical displays.

Figure 20C:
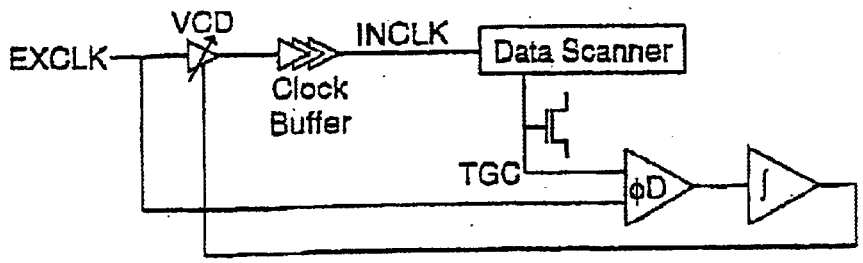
FIG. 20C illustrates a delay-locked loop circuit.

FIG. 20C shows a delay-locked loop (DLL) for eliminating the skew. A voltage-controlled delay (VCD) element is inserted in the signal path. The feedback path comprising phase detector (øD) and integrator controls the VCD, increasing the delay until the sampling edge of TGC becomes coincident with the next active edge of EXCLK. That is, the phase detector and integrator adjust the VCD to maintain zero skew between EXCLK and TGC.

Figure 20D:
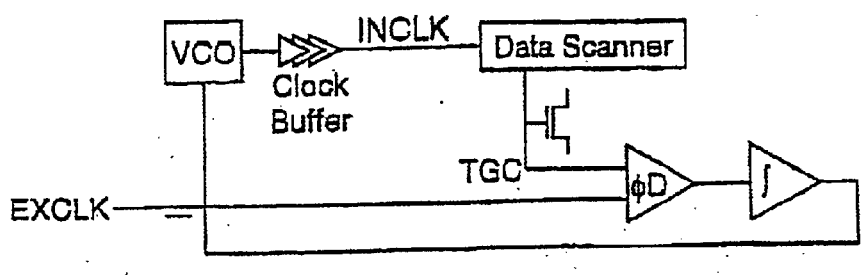
FIG. 20D illustrates a phase-locked circuit.

FIG. 20D shows an alternative of the invention, using a phase-locked loop (PLL) instead of a delay-locked loop. The VCD is replaced with a voltage-controlled oscillator (VCO), which generates the internal clock. As with the DLL (delay-locked loop), a feedback loop is used to eliminate the skew between TGC and EXCLK, as sensed by the phase detector.

The PLL involves a second-order control loop. The second integration is implicit in that the VCO generates a frequency but the øD senses phase.

In another preferred embodiment, the circuit to convert a digital video signal to an analog signal is located on the integrated circuit board which contains the microdisplay.

The display is analog, but analog circuitry is subject to both large power consumption and the increased likelihood of interference from other circuitry. It is therefore desired in some embodiments to have the display signal as a digital signal until the signal is in close proximity to the display.

Figure 20E:
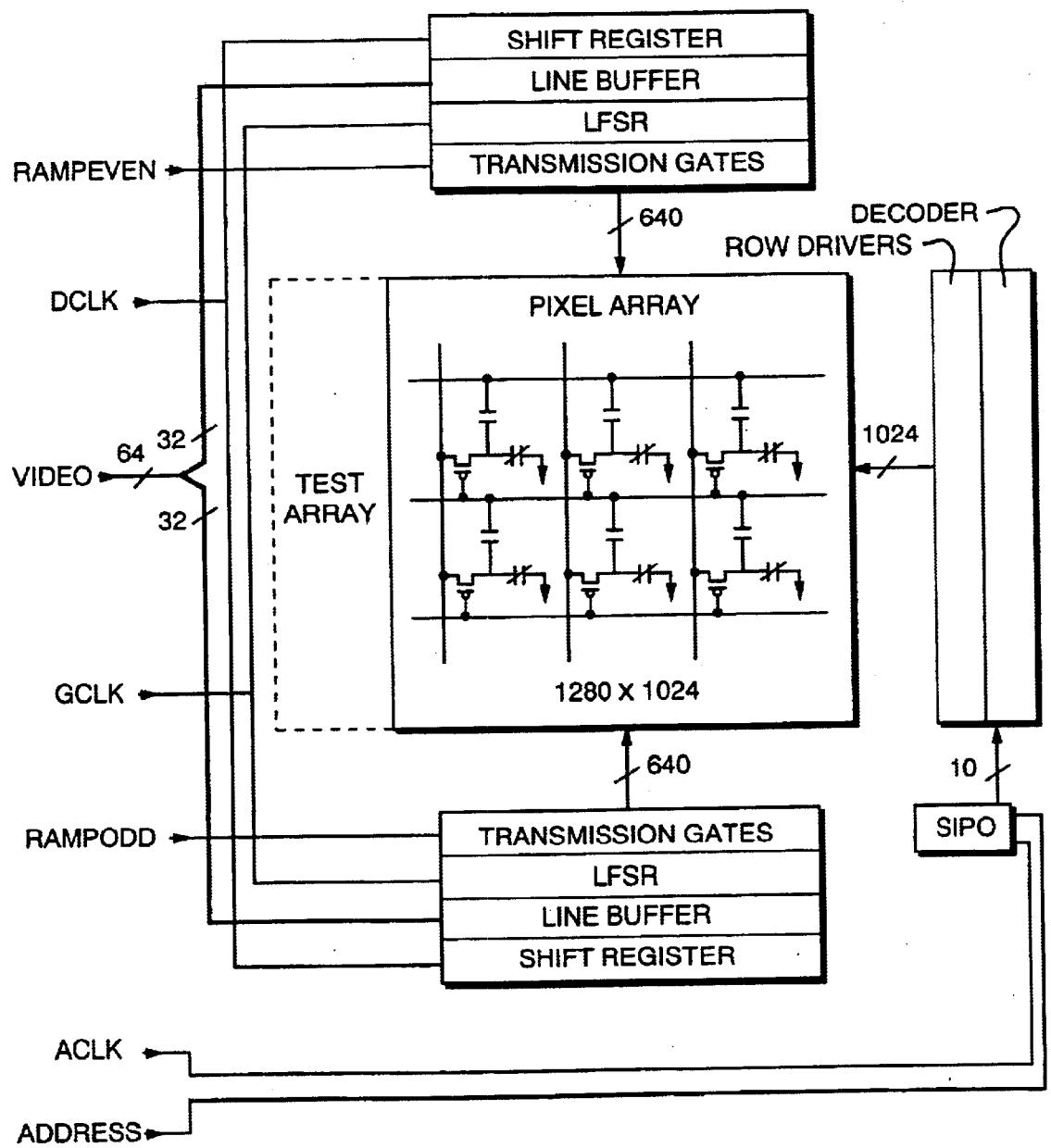
FIG. 20E is a schematic illustration of an integrated circuit of the microdisplay which receives a digital video signal.

In one preferred embodiment, the display signal is digital until it reaches the integrated circuit of the microdisplay as illustrated in FIG. 20E.

This is in contrast to FIGS. 2A, 15 and 18 wherein the signal that enters the integrated circuit of the microdisplay over the ribbon cable, as seen in FIG. 9 and represented in FIG. 18 by 178, is an analog signal.

Referring to FIG. 20E, an integrated circuit active matrix display 710 having a 1280×1024 pixel microdisplay 712 is illustrated. High definition television (HDTV) formats use a 1280×1024 pixel array. Incorporated into the circuit are a pair of horizontal scanners 714 and 718, a vertical driver 720, a SIPO 722, and an active matrix display 712. The active matrix display 712 has a plurality of pixel elements 724. Each pixel element has a transistor 728 and a pixel electrode 736. Each pixel electrode works in conjunction with a counterelectrode and the liquid crystal layer to create the displayed image. The pixel element is connected to the adjacent row to form a storage capacitor.

Adjacent to the active matrix display in a preferred embodiment is a test array 738. The test array can include a temperature sensor, a capacitance measurement of the liquid crystal sensor, and/or a characteristic clearing temperature sensor as described above.

The integrated circuit 710 of the microdisplay receives the digital video signal over a 64-channel bus 740 which in part is formed by a ribbon cable. In addition, the integrated circuit receives two analog ramp signals 742 and 744, (Rampodd and Rampeven), three clocking signals 746, 747, and 748 (digital clock, address clock and gate clock) and address signal 749.

The address signal and the address clocking signal in conjunction with the SIPO and the vertical driver select the row on which data is to be written. The vertical driver has a decoder which selects the proper row driver and a plurality of row drivers, 1024 in this preferred embodiment, which turns on the transistors in that row.

Figure 20F:
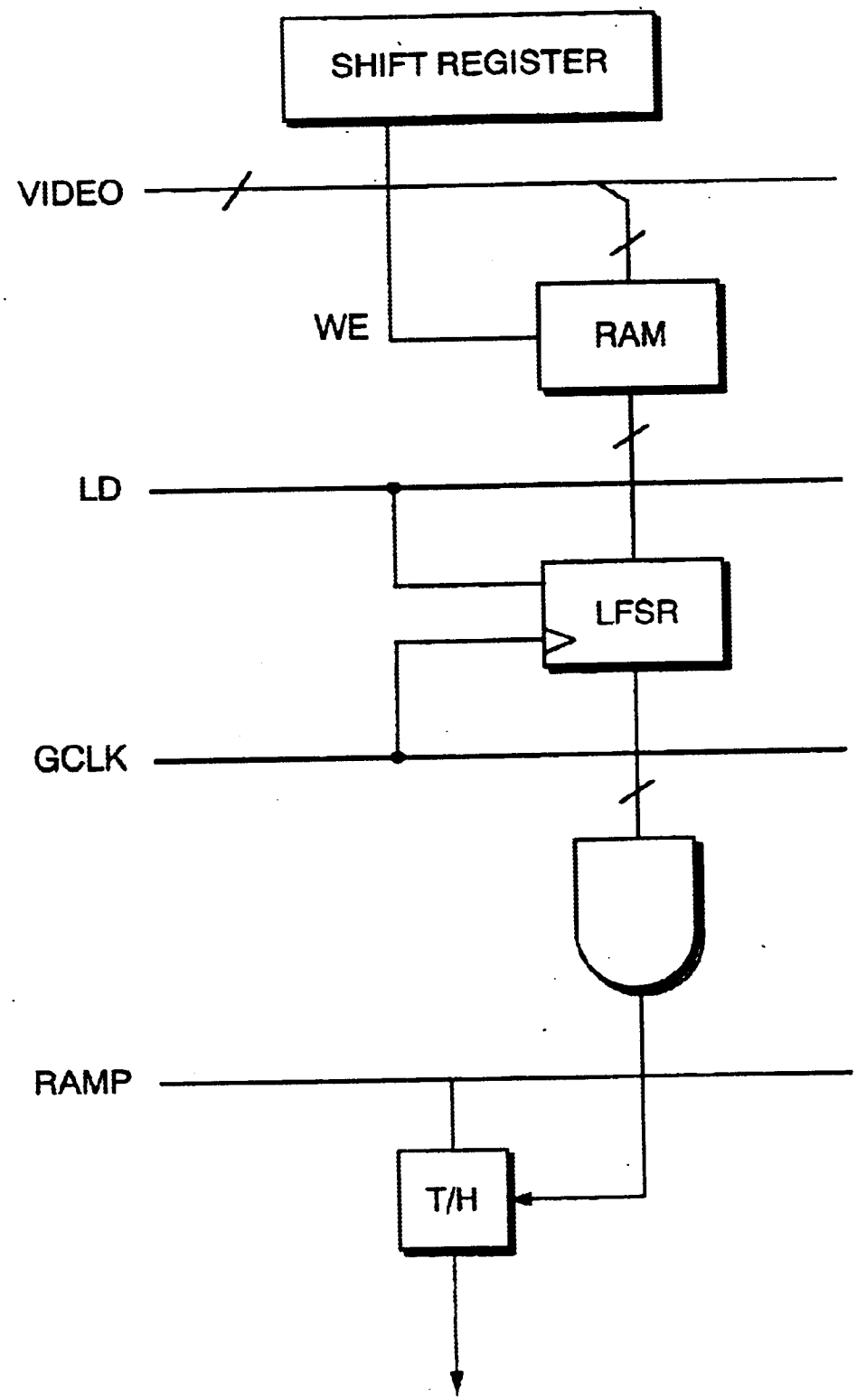
FIG. 20F is a schematic illustration of a linear feedback shift register (LFSR) state machine for the digital signal according to the invention.

The two column scanners are identical except that they differ in that the upper column scanner receives and handles the signal for even columns while the lower column scanner receives and handles the signal for odd columns. Each column scanner has a shift register, a line buffer, a LFSR and transmission gates as explained below. An analog ramp signal, gate and data clocking signals and digital data is received by each scanner. Referring to FIG. 20F, the video signal in a timed pulse enters the Random Access Memory (RAM) along 32-channel data line. The RAM for the desired column is selected using a write enable (WE) generated by a shift register.

The shift register 752 knows which RAM 754 to select. The data in the selected RAM is sent to a linear feedback shift register (LFSR). The LFSR 756 in a preferred embodiment is a 8-bit LFSR. The LFSR produces a sequence of $2^n-1$ states where n is the number of bits. The LFSR is controlled by a gate clock and LD. The bits of the LFSR are all connected to an AND gate. Both the output of the AND gate and ramp signal, which are analog signals, are sent to a T/H.

The T/H 758 converts the digital signal to the analog signal required for the pixel element which an 8-bit shift register, the display can have 256 of gray or distinction within a color.

| Timing | | | | |
|---|---|---|---|---|
| Array size | 1280 × 1024 | 1280 × 1024 | 1280 × 720 | 1280 × 720 |
| Gray levels | $2^8 = 256$ | $2^7 = 128$ | $2^8 = 256$ | $2^7 = 128$ |
| Field rate | 180 Hz | 180 Hz | 180 Hz | 180 Hz |
| Row rate | 184 kHz | 184 kHz | 130 kHz | 130 kHz |
| Row period | 5.43 μs | 5.43 μs | 7.72 μs | 7.72 μs |
| GCLK rate | 51.6 MHZ | 25.8 MHZ | 36.3 MHZ | 18.1 MHZ |
| GCLK period | 19.4 ns | 38.8 ns | 27.6 ns | 55.1 ns |
| DCLK rate | 31.0 MHZ | 31.0 MHZ | 21.8 MHZ | 21.8 MHZ |
| DCLK period | 32.3 ns | 32.3 ns | 45.9 ns | 45.9 ns |

It is recognized that an alternative method for resetting is to address each pixel individually to reset the liquid crystal. This is be done in a method similar to the heat cycle.

The embodiments of the color active matrix display described above can be used in various products including wireless communication devices such as pagers, described below, docking stations and cellular telephones, and other devices such as card readers, described below, and digital cameras.

Figure 21J:
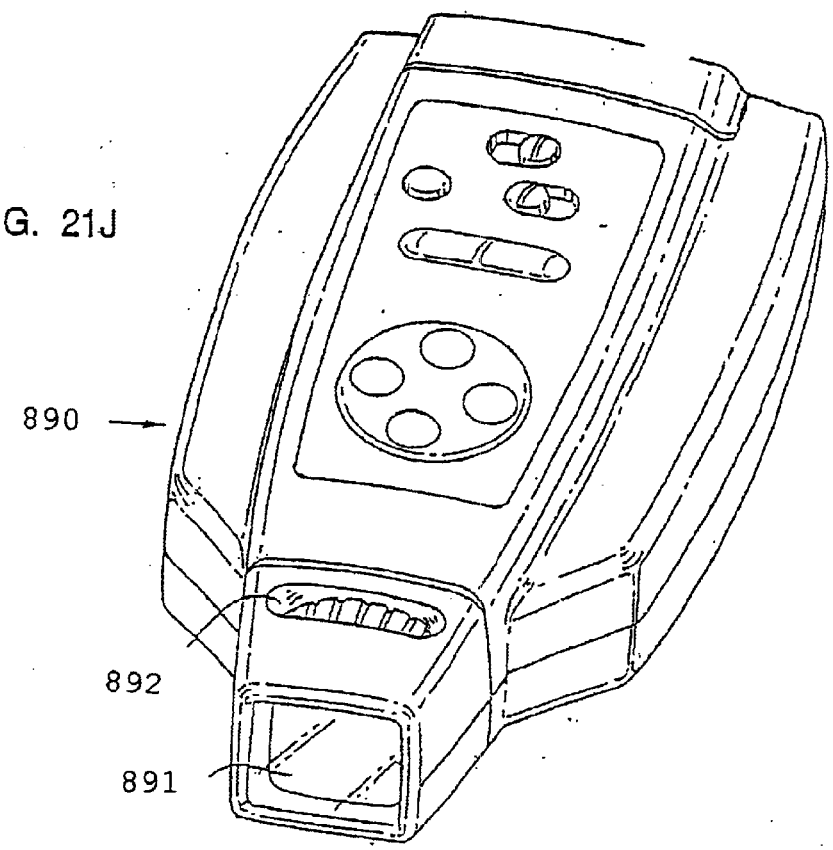
Figure 21K:
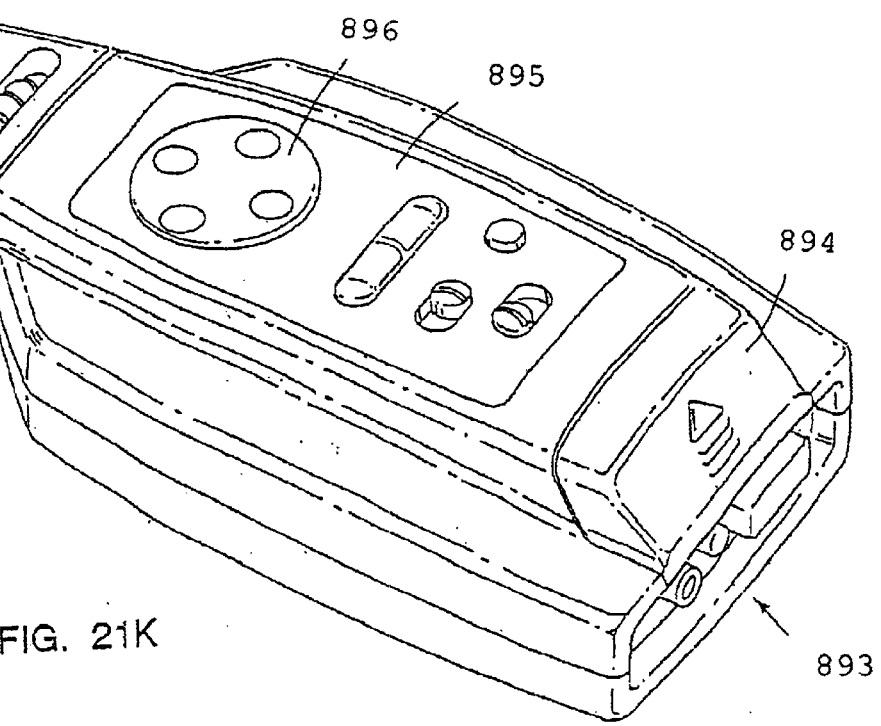

Preferred embodiment of hand held display devices are illustrated in connection with FIGS. 21A–21K. FIG. 21A is a perspective view of a preferred embodiment of a pager system 850 having two display viewing areas 852 and 854 within a housing 855. Viewing area 852 has a lens through which the user views a microdisplay as described previously. A second flat panel display without magnification is viewed by the user at the viewing area 854. The second display is a simple low resolution numeric and/or alphabetic display to read telephone numbers or scrolled numbers or messages. The microdisplay magnification can be adjusted at switch 858. The displays are operated by switches 856, 857. As seen in the rear view of FIG. 21B, the rear surface 862 of the housing 855 is thicker in that portion containing the microdisplay and the battery. In the alternative embodiment illustrated in FIG. 22, the rear panel 862 is removed to expose a cavity 859 for the battery and the rear of the display assembly 861. Also shown in this embodiment is a cover 863 which slides to cover or expose a camera including an image sensor 866 and lens 867. The digital imaging sensor 866 can take images electronically stored within a memory within the pager that can be sent by wireless transmitter to a personal computer, a telephone as described herein, or web browser. The images can also be loaded by wire through the port 869 onto a personal computer, or alternatively, can be loaded onto a smart card or flash memory card that can be inserted into one or more card slots 868. The port 869 can also be connected directly to a keyboard or touchpad as described herein. The side view of the housing 855 shown in FIG. 21C illustrates a clip 860 that is used to fasten the device to the clothing of the user. The clip 860 is attached to the bottom surface 864 of the housing 855 as shown in FIG. 21D.

Figure 21E:
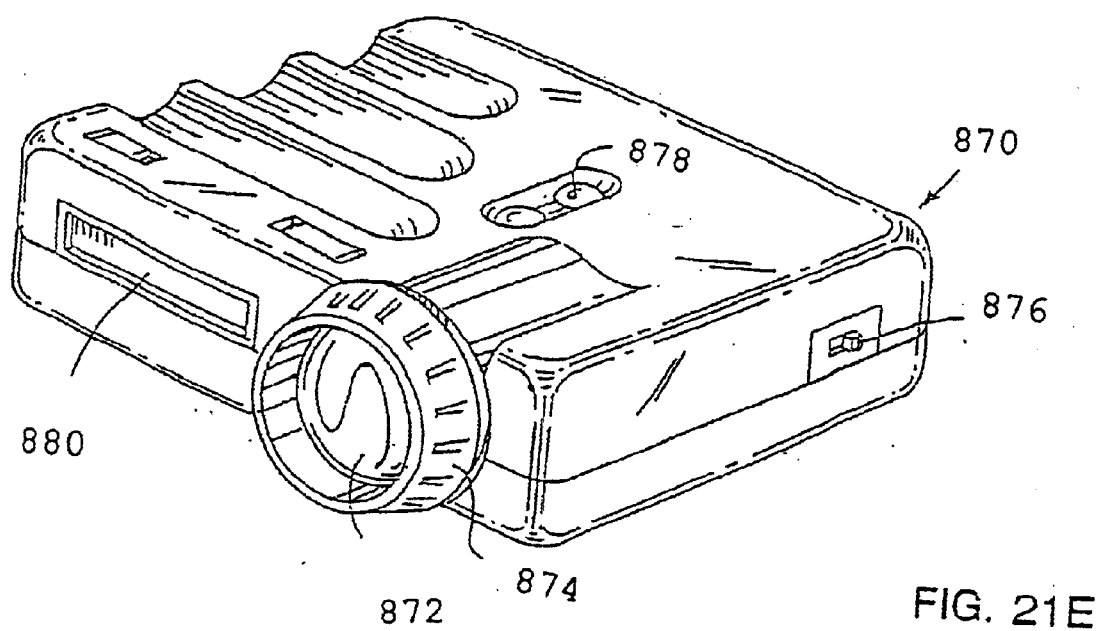
Figure 22:
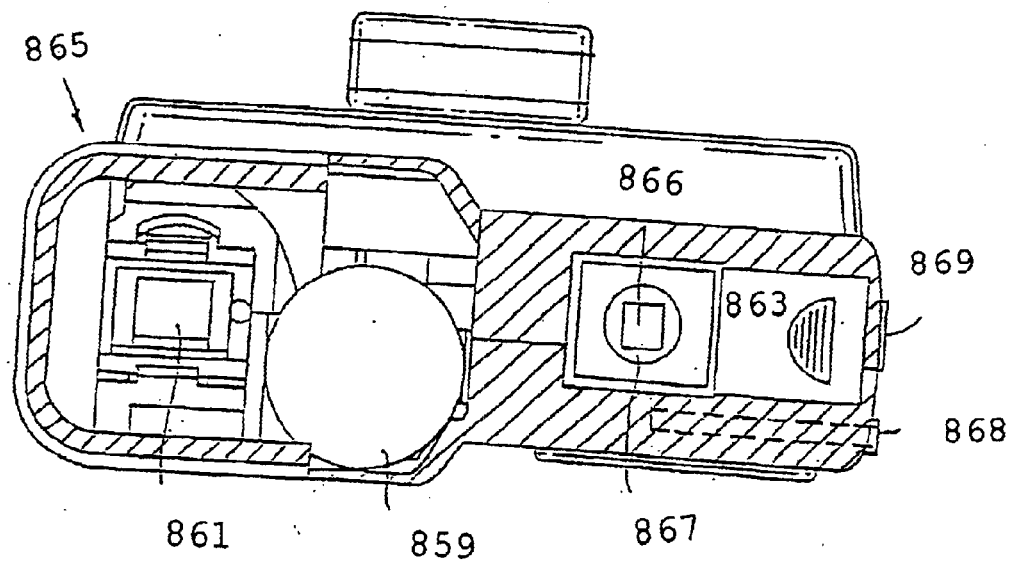
FIG. 22 is a partial cross section rear view of a pager with integrated camera.

Another preferred embodiment of a hand-held viewing device 870 is illustrated in the perspective view of FIG. 21E. A first display is seen through the lens 872 with magnification being adjusted by the knob 874. A second display 880 as described above is positioned on the same side of the device 870 as the lens 872 for ease of viewing. The displays are operated by the switch 876 and buttons or control elements 878. A top view is illustrated in FIG. 21F showing ridges 884 that accommodate the fingers of the user and the second display switch 882, which is shown more clearly in the side view of FIG. 21G.

Rear and bottom views of the device 870 show the rear 888 and bottom 886 sides in FIGS. 21H and 21I, respectively.

Another preferred embodiment is illustrated in the perspective views of FIGS. 21J and 21K. In the embodiment, a hand held unit 890 has a viewing window 891, a focus control 892, a rear panel 893 with an external port, a battery access panel 894, and a control panel 895 with control elements including a scan control element 896 to move text or the image on display up or down and left or right.

Figure 23A:
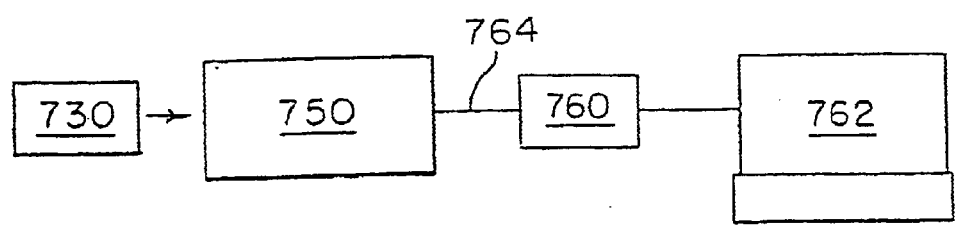
FIG. 23A illustrates a preferred embodiment of a card reader system.

As illustrated in FIG. 23A, the card reader 750 can be connected by wireless modem, telephone or other cable link 764 to an interface 760 such as a personal computer (PC) card to a general purpose computer 762.

Figure 23B:
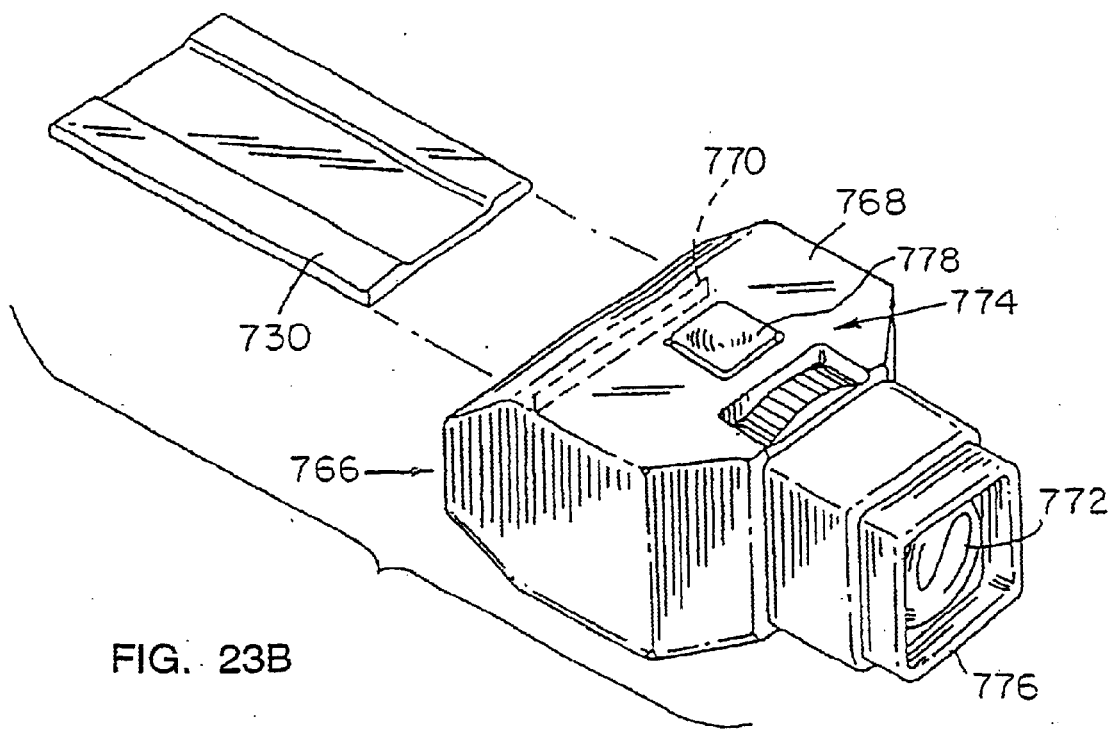
FIG. 23B shows a card reader system.

Another embodiment of the card reader system 766 is illustrated in FIG. 23B. The system includes a housing 768 with a port or aperture 770, shown in hidden line, for insertion of the card 730, or at least that portion of the card that contains the interface, a display system 772 for presenting information to the user, and a control panel 774 that controls reader operation. The system 766 has a card reader, a control circuit, and an internal battery as described previously. The display system 772 can include the color sequential display module as described previously herein and is shown in actual size.

As shown in FIG. 23B, the reader housing 768 has a viewing window 776. The user manipulates the control elements or buttons on a control panel 774 of the reader housing 768 to operate the system. The elements can include an on/off switch 778 and a four way element to scroll the display up, down, left or right.

Figure 28A:
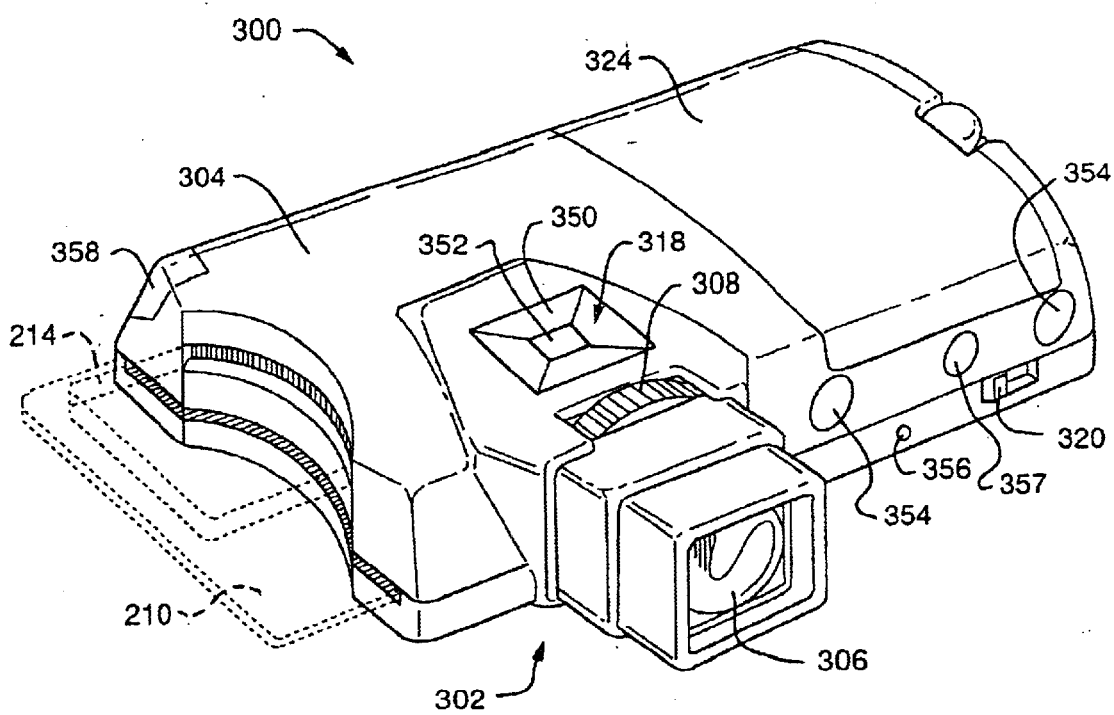
FIG. 28A is a perspective view of a portable display system.
Figure 28B:
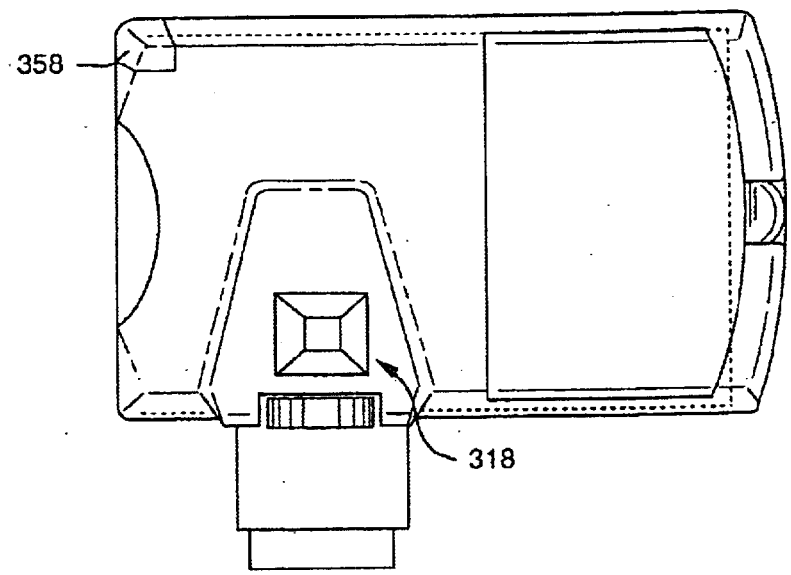
FIG. 28B is a top view of the portable display system.
Figure 28C:
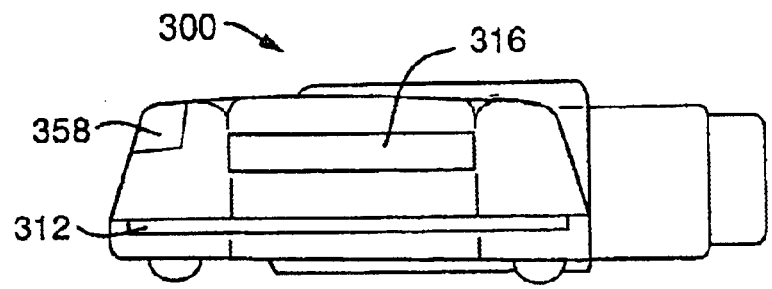
FIG. 28C is a side view of the portable display system.

The card reader system can be used to access or change the data stored on the card or select an option from choices provided through a PCMCIA modem. The user can change the data or make the selection using a four way element and a select button such a five way selection switch 318 in FIG. 28A.

Figure 24A:
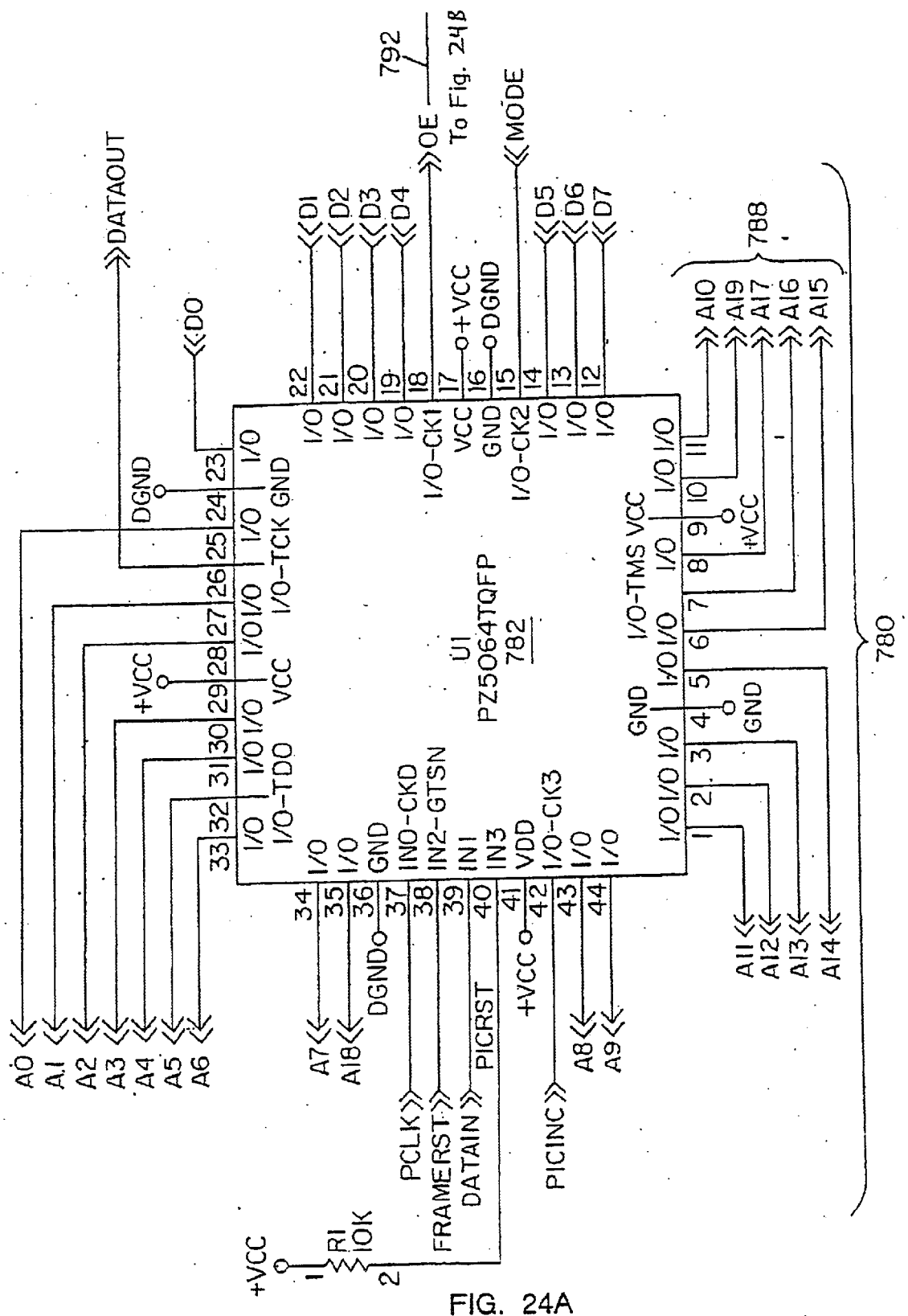
FIGS. 24A–24B is a schematic circuit diagram of a memory card for a card reader or imager.
Figure 24B:
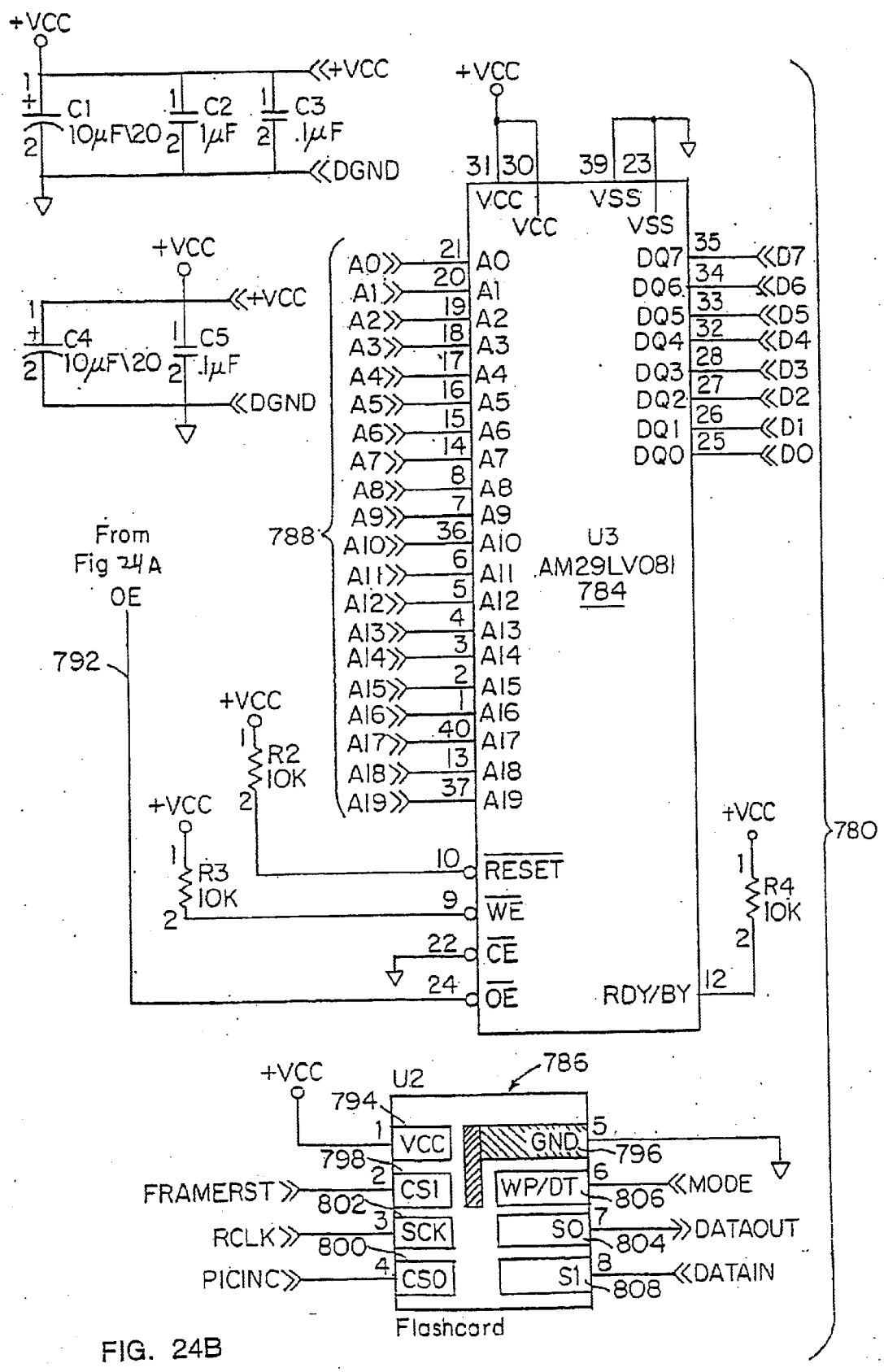

FIGS. 24A–24B disclose a schematic of an embodiment of a circuit 780 for the card 730. The circuit 780 has a control chip 782, a memory chip 784, and an interface chip (flashcard) 786. The control chip 782 takes the images stored on the memory chip 784 and sends the signal to the interface chip 786. The control chip 782 and the memory chip 784 are connected by both address lines 788 and data lines 790. In addition, an output enable (OE) line 792 extends between the control chip and the memory chip to allow the card 730 both to be read and to store data. The control chip 782 takes the image and sends the image in a series of bits to the interface chip 786.

The interface chip 786 has eight connection points 794, 796, 798, 800, 802, 804, 806, and 808 for interacting with an interface connection 816, as illustrated in FIG. 19D, on the card reader 750. The card 730 receives power (voltage) and is grounded through the connections 794 and 796 made on the interface chip 786. The card receives a frame reset signal through a frame reset connection 798 to allow the control chip 782 to know when to send the next frame. A picture increment signal sent through a picture increment connection 800 allows the control chip 782 to shift addresses to another stored picture. A clock signal to the control chip from the clock connection 802 regulates the flow of data. The control chip 782 sends a bit of data for each clock pulse and waits for a signal before starting the next row. The image signal is sent from the memory 784 through the control chip 782 to a data out connection 804 to the card reader 750.

The mode input 806 is used to switch between a read and a write mode. The data in connection 808 is for writing data to the memory.

Figure 25A:
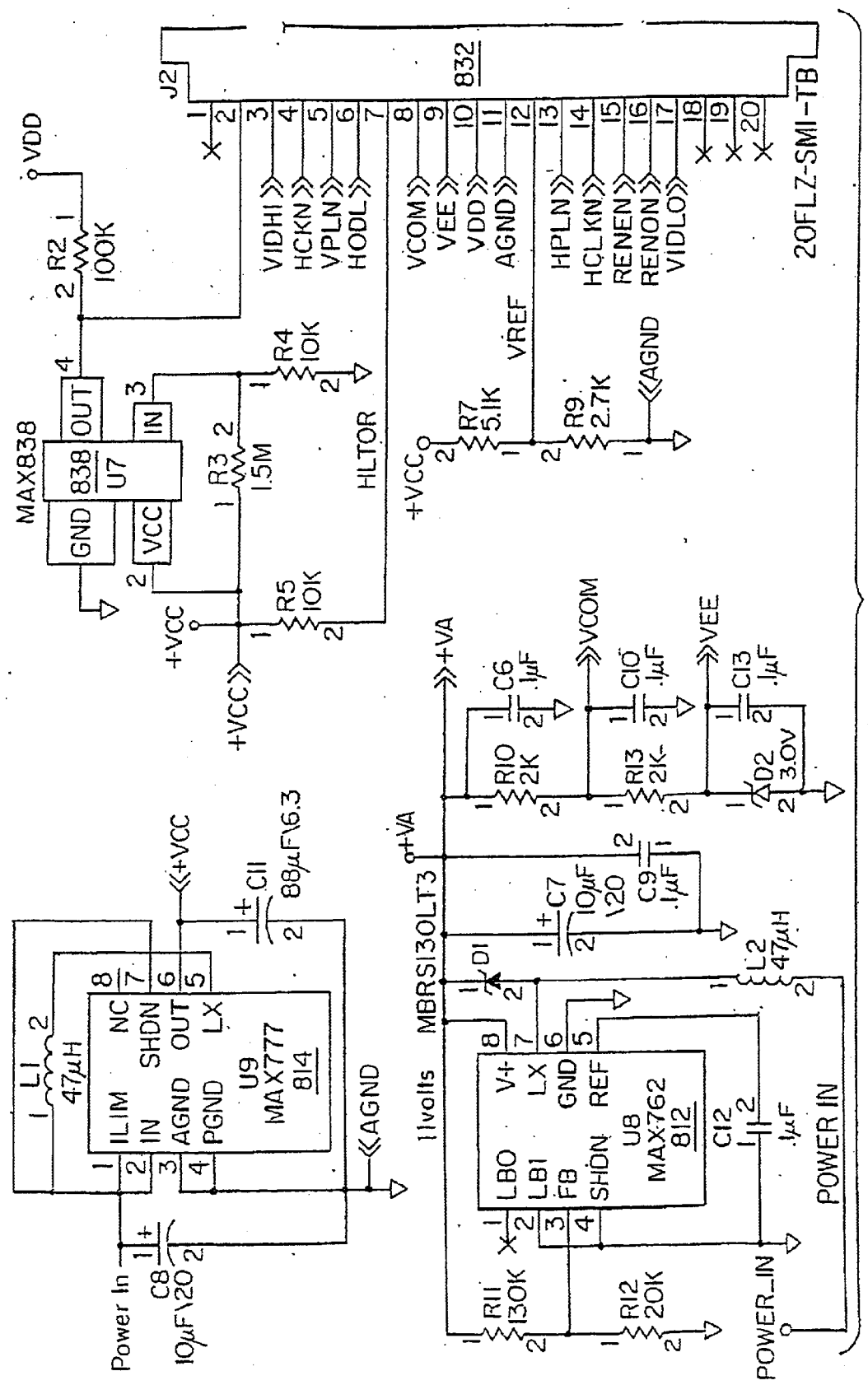
FIGS. 25A–25C is a schematic circuit diagram of the controller within the reader or imager.
Figure 25B:
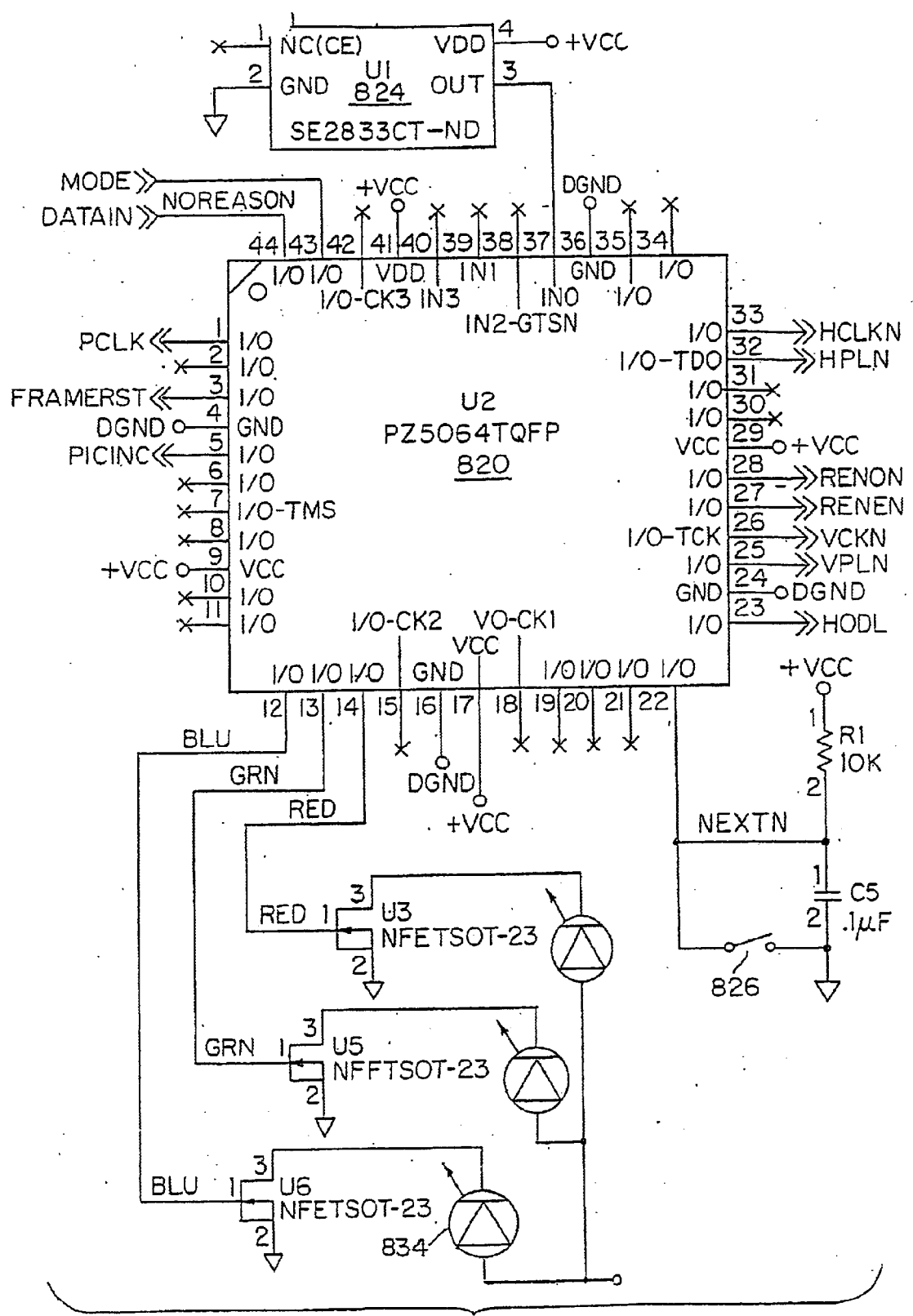
Figure 25C:
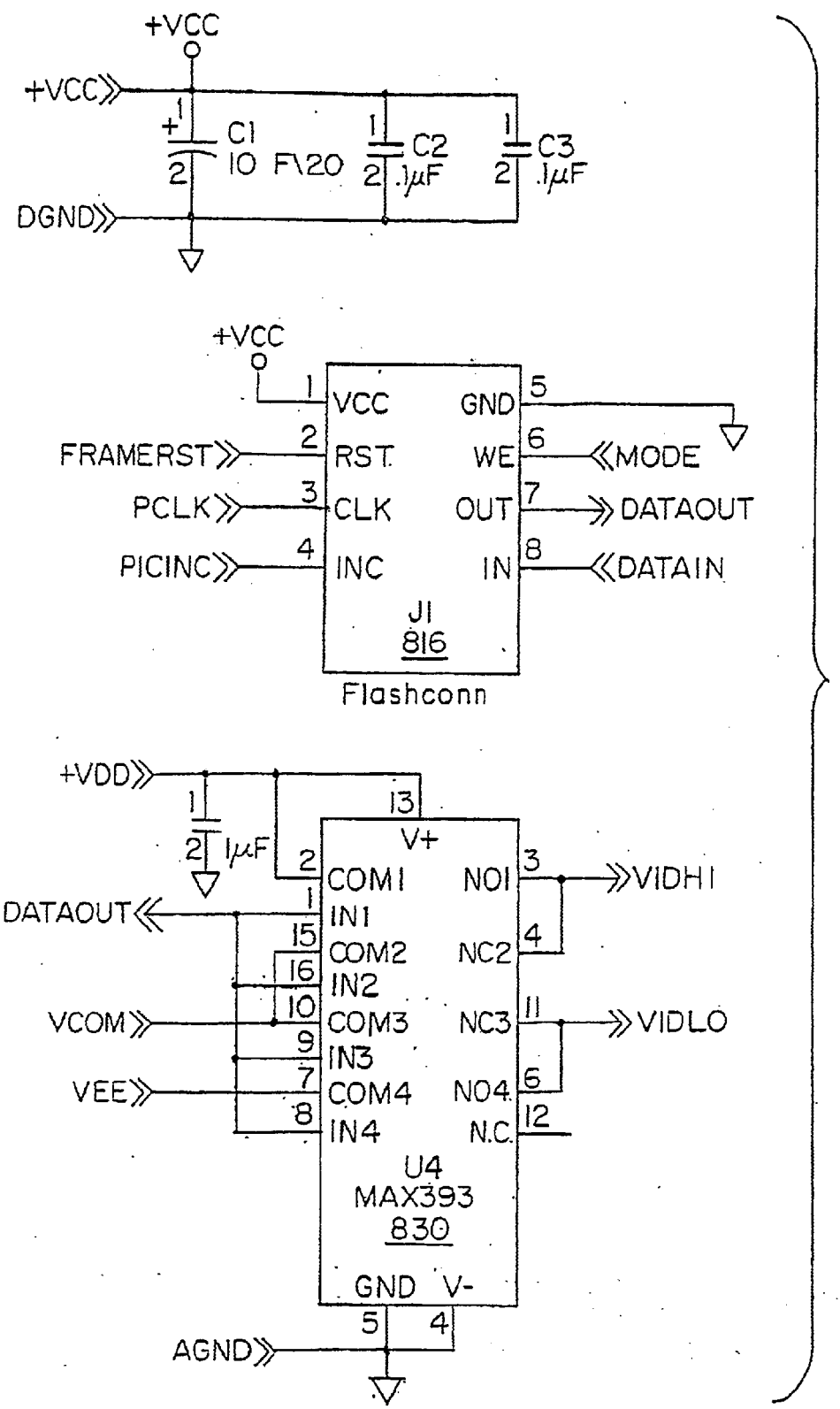

FIGS. 25A–25C illustrate a schematic of a display control circuit 810 in the card reader 750. The display control circuit 810 has a battery, which through a digital power supply 812 and an analog power supply 814, powers the circuit 810 as represented in FIG. 25A. The flash connection 816 of the card reader 750 is the interface with the flashcard 786 of the card 730. The flash connection 816 sends the signals and power described above including the clock, the frame reset and picture increment from a control chip 820. The control chip 820 receives its clock signal from a 20 MHZ clock chip 824. The picture increment is set high by a switch 826, which is physically connected to a button on the control panel 774 of the reader housing 768.

The data signal from the card 730 through the flash connection 816 is sent to a switch circuit 830 which sets the signal high ($V_{DD}$) or low ($V_{COM}$) depending if the signal is a high bit (1) or a low bit (0). The video signal is sent from the switch to a connector, which connects to the microdisplay. The connector in addition sends the control signals from the control circuit and power to the microdisplay. The LEDs for the backlight are controlled each by a transistor and a signal from the control chip.

The circuit in addition has a power down reset circuit. The power down reset circuit sends a signal to the microdisplay to clear the image before the power is off.

Figure 26:
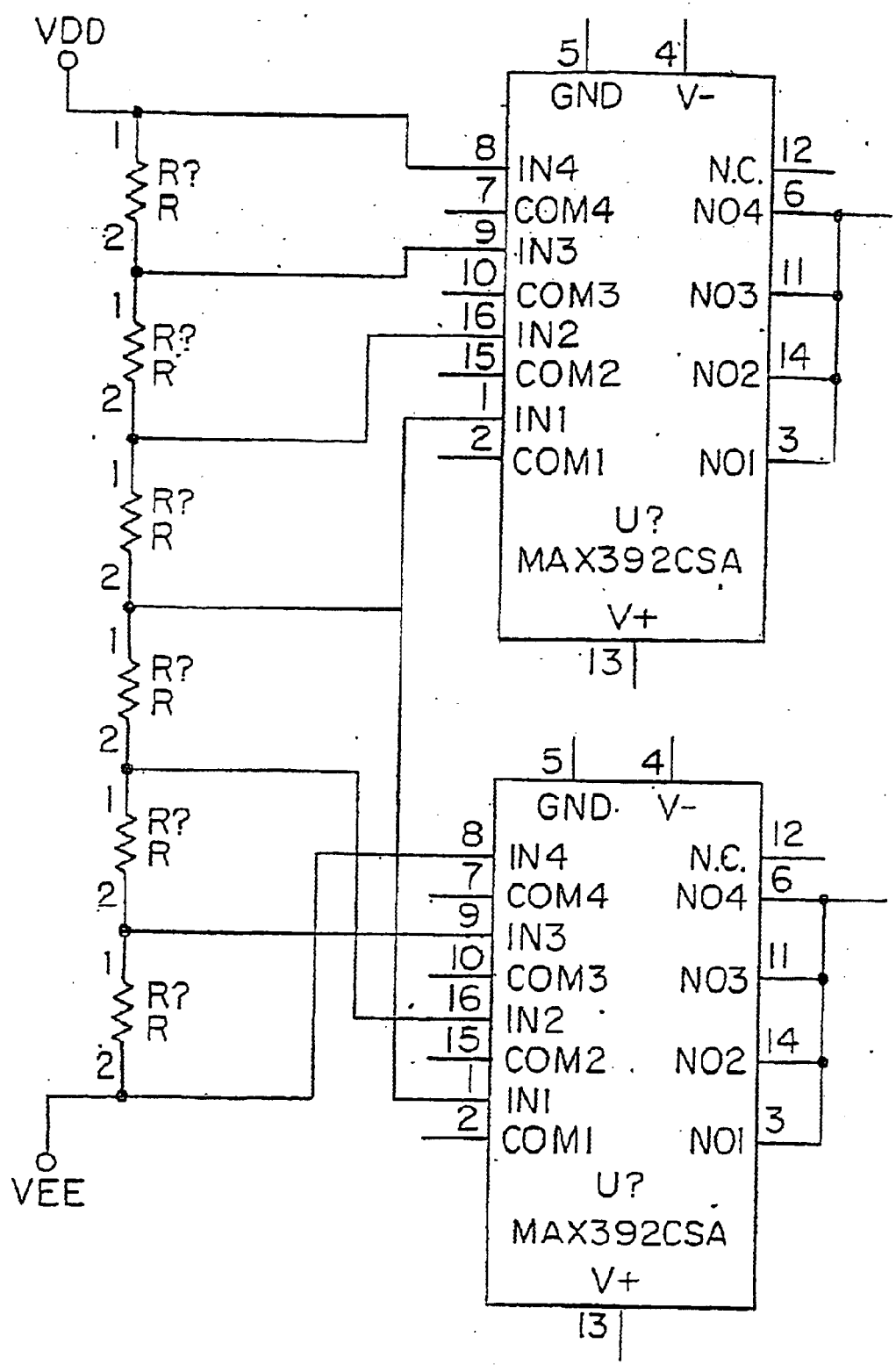
FIG. 26 is a schematic circuit diagram of an alternative embodiment of a switcher in the controller.

FIGS. 25A–25C represent a 1 bit color display control circuit which displays eight colors (red, blue, green, black, white, magenta, cyan, and yellow). By selecting varying voltages between $V_{EE}$ and $V_{DD}$ and having two switches as illustrated in FIG. 26, a 2 bit color display control circuit having 64 colors is possible. It is recognized that a greater number of colors is desired, but for items such as pagers and cellular telephones, the wireless transmission rate may limit the bits available for transmitting image data. With these limited transmission rates the available number of colors for display is reduced until better compression systems and transmission rates are available. With limited colors because of transmission rates, a switch chip is preferred to a video processor because of power requirements. For items such as cameras and other products not including wireless transmission 8 bit color displays having 16 million colors are preferred.

The display module shown in FIG. 23B can be equipped with an antenna and television receiver to provide a pocket size color television.

Figure 27A:
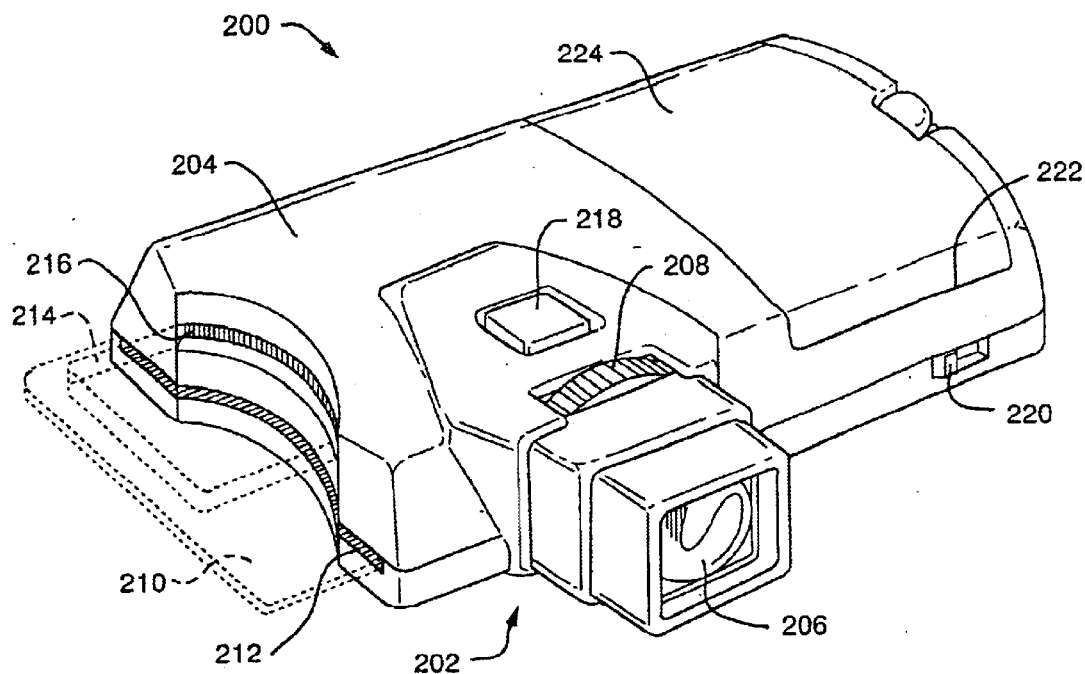
FIG. 27A is a perspective view of a portable display system.

A portable display system 200 is shown in FIGS. 27A–27E. FIG. 27A is a perspective view of a preferred embodiment of the portable display system 200 having a display viewing area 202 within a housing 204. The viewing area 202 has a lens 206 through which the user views a microdisplay as described previously. The microdisplay magnification can be adjusted using a knob 208 located on top of the housing 204.

The portable display system receives the information for the image it is going to display from either a smart card 210, shown in phantom, which can be inserted in to a slot 212 in the housing 204 of the portable display system 200 or a memory card 214, shown in phantom, which is inserted in to a second slot 216 in the housing 204.

The image is selected using a switch 218 located on top of the housing 204 in proximity to the magnification knob 208. The display system 200 is turned on and off with a switch 220 accessible through an opening on the housing on the front of the display system. The display system has an opening 222 to receive an rechargeable battery 224.

Figure 27B:
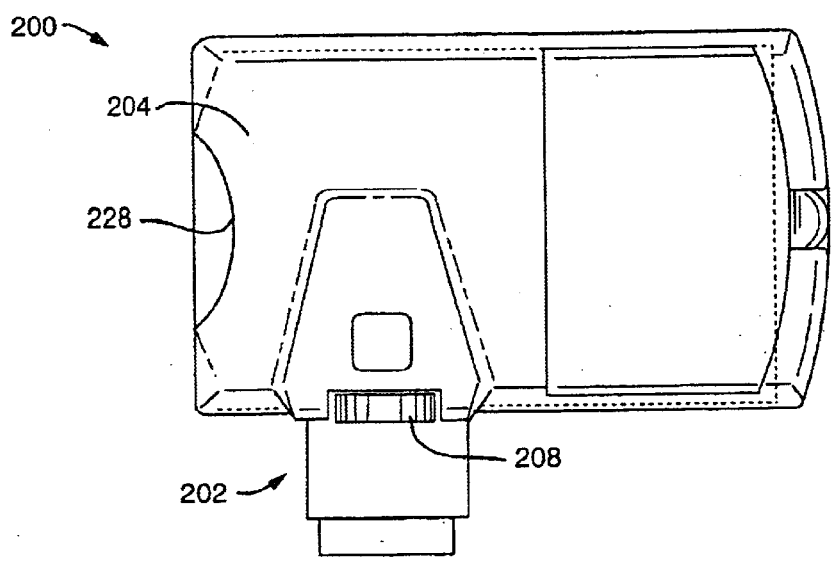
FIG. 27B is a top view of the portable display system.

As illustrated by FIG. 27B, the size of the portable display system 200 is defined predominately by the size of the smart card 210, which is shown in hidden line inserted in the portable display system 200. A small portion of the smart card extends out of the housing 204 to allow removal of the card. The smart cards, having credit card dimensions (i.e. about 3⅜ inches by 2⅛ inches, or about 85.6×53.98×0.76 mm). The housing material 204 in a preferred embodiment is approximately 4 inches by 2½ inches by 1 inch. The battery has a clasp to secure it to the housing.

Figure 27C:
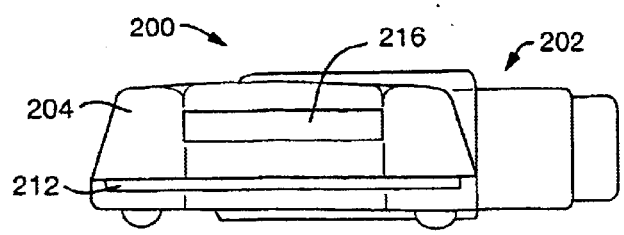
FIG. 27C is a side view of the portable display system.

Referring to FIGS. 27B and FIG. 27C, the housing 204 has a curved face 228 around the openings, slot 212 and 216, for receiving the smart card 210 and the memory card 214 so that a small portion of each extends out of the housing 204. The memory card 214 is narrow and thicker than smart card 210.

Figure 27D:
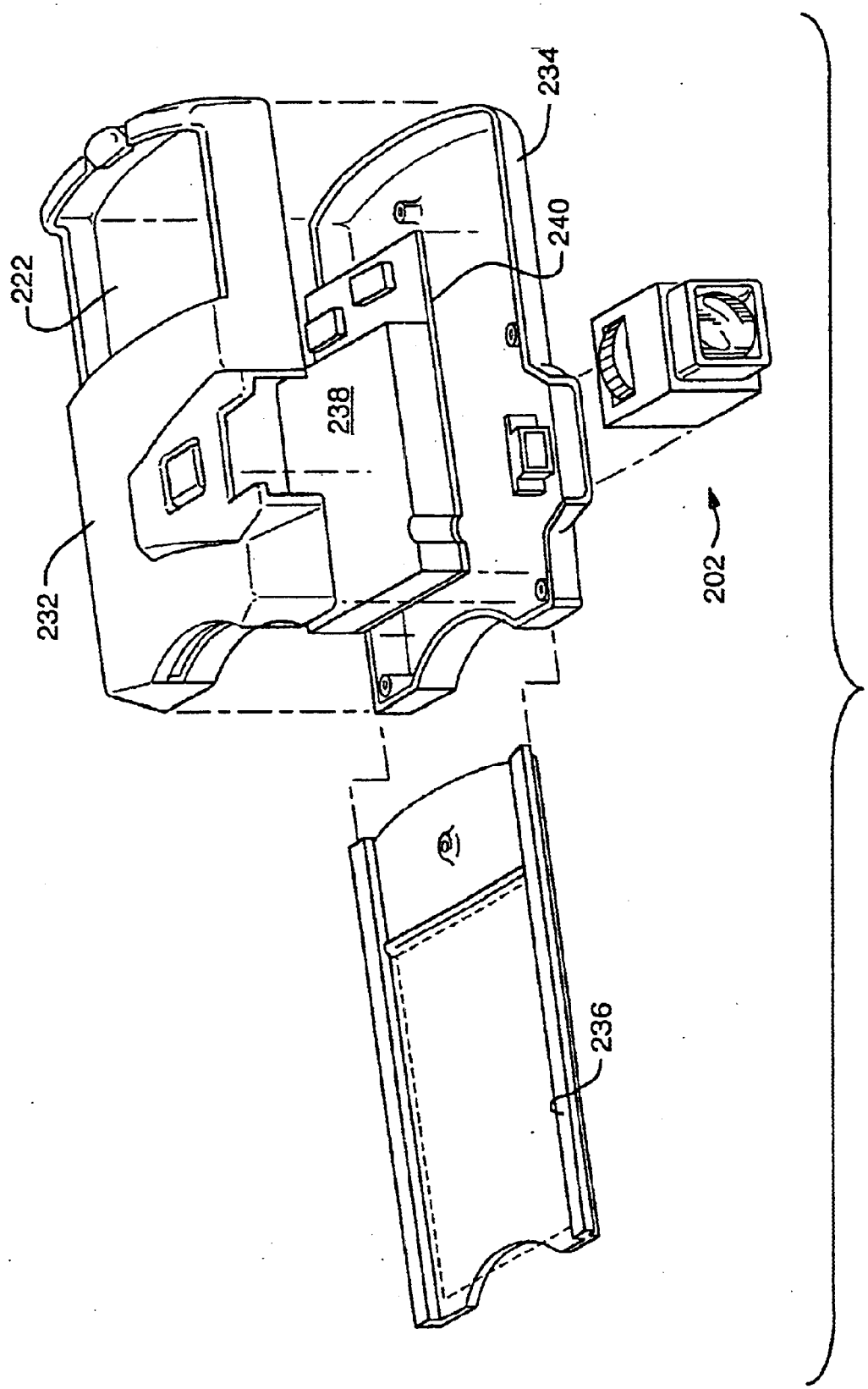
FIG. 27D is an exploded view of the portable display.

An exploded view of the portable display system 200 is shown in FIG. 27D. The housing 204 has a top housing 232, a bottom housing 234, and a lower smart card housing 236, which attaches to the bottom housing 234 in a sliding dovetail arrangement. The lower smart card housing 236 covers the assembly screws.

The memory card is received in a mating connector carried by a memory card housing 238 on a circuit board 240. The circuitry can be identical or similar to that shown in and described in relation FIGS. 25A–25C, FIG. 26, or FIGS. 29Aa and 29Ab. The memory card can be similar to that disclosed in FIGS. 24A and 24B, or FIGS. 29Ba and 29Bb.

Wherein the display system in FIGS. 27A–27D has no wireless receiver to receive information, FIGS. 28A–28D is a portable pager/display system 300. Similar to the previous embodiment, the portable pager/display system 300 has a display viewing area 302 within a housing 304. The viewing area 302 has a lens 306 through which the user views a microdisplay as described previously. The microdisplay magnification can be adjusted using a knob 308 located on top of the housing 304.

The portable pager display system 300 receives the information for the image to display on the microdisplay from either a smart card 210 shown in phantom, which can be inserted in to a slot 312 in the housing 304 of the portable pager/display system 300 or a memory card 214, shown in phantom which is inserted in to a second slot 316 in the housing.

The portable pager/display system 300 has a five way selection switch 318 located on top of the housing 304 in proximity to the magnification knob 308. The four outer buttons 350 allow movement of a cursor on the microdisplay and the center button 352 for selecting an item. The user can select information from menu on the microdisplay. The information that is selected can be transmitted wirelessly. The system 300 is turned on and off with a switch 320 accessible through an opening on the housing.

The portable pager/display system 300 has a set of speakers 354 on the front face. The sound, similar to the image, can come from three sources, the smart card 210, the memory card 214 or by wireless transmission. The user could view and listen to a video clip stored on a memory card or smart card. Depending on the transmission rate, the sound received by the wireless transceiver located in the housing could be heard real time or if the transceiver transmits at a slower rate, the sound can be store in memory in the portable pager/display system 300 and played back to the user at a faster rate.

While a smart cart and a memory card are shown, an alternative embodiment can include miniature CD ROMs, or other insertable storage medium.

In addition to inputting data and commanding the portable pager/display system using the five way selection switch 318 and the microdisplay as a virtual keyboard, the portable pager display system has a microphone, accessible through opening 356 in the housing 304, for use with voice commands, recording on the memory card or other insertable storage medium or for transmission wirelessly.

The portable pager/display system 300 has an infrared transceiver 358. The infrared transceiver 358 can be used to transmit information between the portable pager/display system 300 and a computer with a similar infrared transceiver. The infrared transceiver 358 can also be used with a wireless keyboard having a mouse track point joy stick and a pair of mouse buttons. The keyboard is capable of folding such that its thickness is less than 15 millimeters. The keyboard can have a touch pad on one side for taking notes or drawing inputs. It is recognized that the infrared transceiver can be used for a wireless headset in place of the speakers.

Figure 28D:
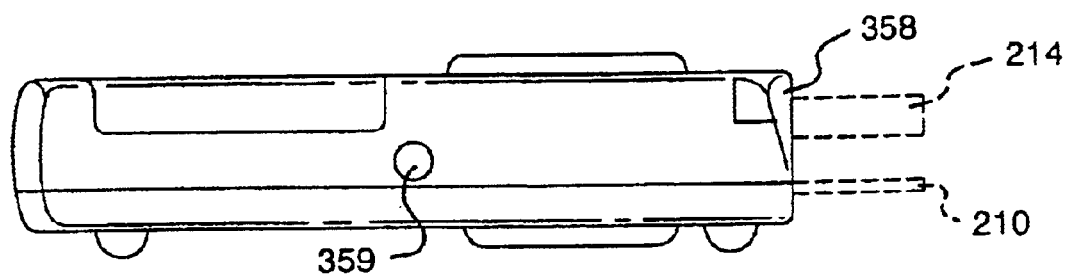
FIG. 28D is a back view of the portable display system.

The portable pager/display system 300 has a camera system with a pair of CCD cameras 357 and 359. One of the cameras 357 is on the front face such that it is aimed at the user when the user holds the system 300 to view the microdisplay. The other camera 359 is located on the back face as illustrated in FIG. 28D. The user can use this camera to take a picture of notes, an object, a building or other item that the user wants to store in memory or transmit.

The portable pager/display system 300 can be used to play games in addition to being used to play video clips and music. A television and/or radio receiver can also be added to the portable pager/display system. The portable pager/display system is slightly larger than the portable display system and has a volume of less than 330 cm$^3$ and in a preferred embodiment a volume of approximately 250 cm$^3$.

Figure 29A:
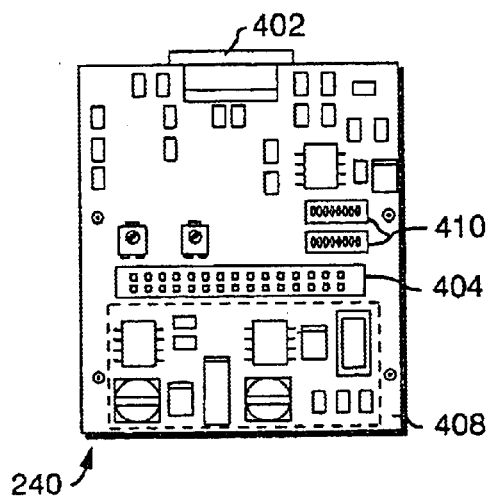
FIG. 29Aa illustrates a top view of a circuit board for the portable display system of FIGS. 27A–27D.
Figure 29A:
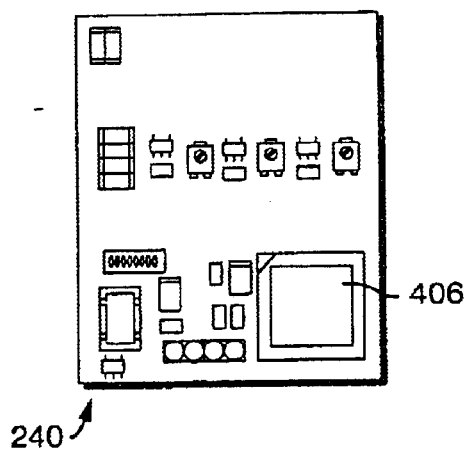

The circuit board 240 for the portable display system 300 of FIGS. 27A–27D is shown in FIGS. 29Aa and 29Ab. The circuit board has a display connector 402 to connect the microdisplay, a mating connector 404 for receiving the memory card, a programable logic device (PLD) 406, a power supply 408, and a digital to analog converter 410.

Figure 29B:
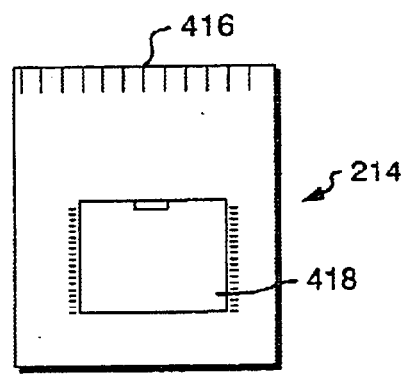
FIG. 29Ba illustrates a top view of a memory card.
Figure 29B:
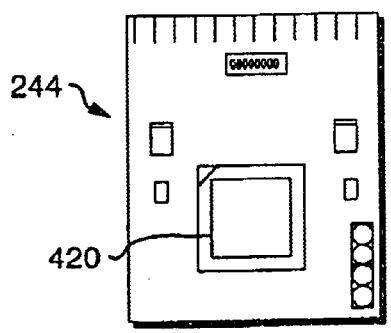

FIGS. 29Ba and 29Bb shows the memory card 214. The card has a thirty pin connector 416 for connecting to the mating connector 404 of the circuit board 240 of FIGS. 28Aa. The card has a complex programable logic device (CPLD) 418, and a memory chip 420. The memory card can operate at above 15 MHZ for video.

Figure 29C:
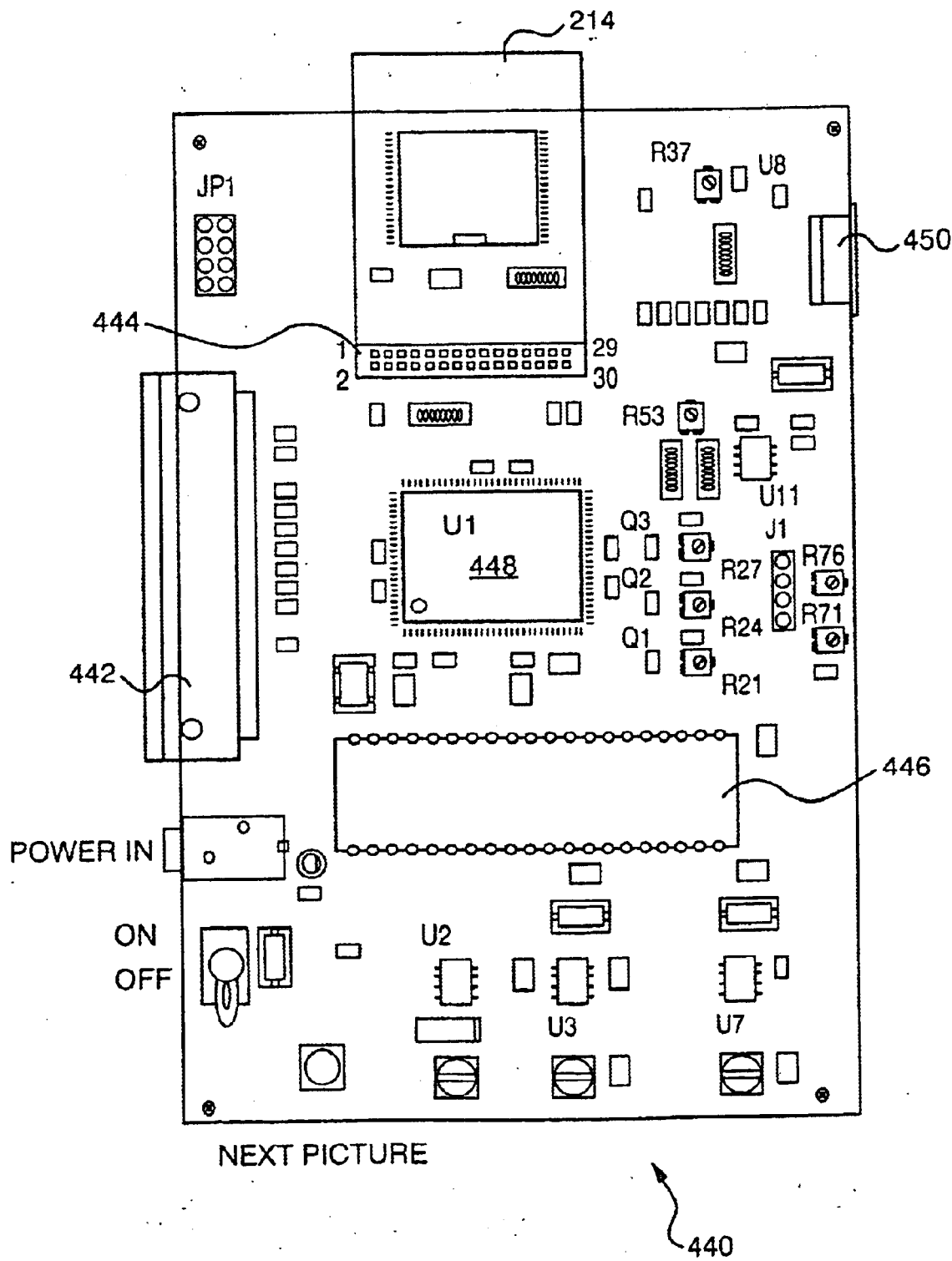
FIG. 29C illustrates the layout of a memory card programer.

While the memory chip can be written to in the portable pager/display system 300 as shown in FIGS. 28A–28D, the memory card 214 can also be written to directly from a personnel computer. FIG. 29C illustrates the interface board 440 between the memory card 214 and the personnel computer. The personnel computer is connected using a parallel interface port 442. The memory card 214 is connected at a mating connector 444 similar to that shown in FIG. 29Ab. The interface board 440 in addition has a microprocessor 446 for reading the data from the computer into the memory card 214. A complex programmable logic device (CPLD) 448 is used to address memory out of the memory card.

In addition to programming the memory card 214, the interface board 440 can be used to view the images on the memory card 214 with an optional microdisplay connected at connector 450.

Figures 30C, 30D:
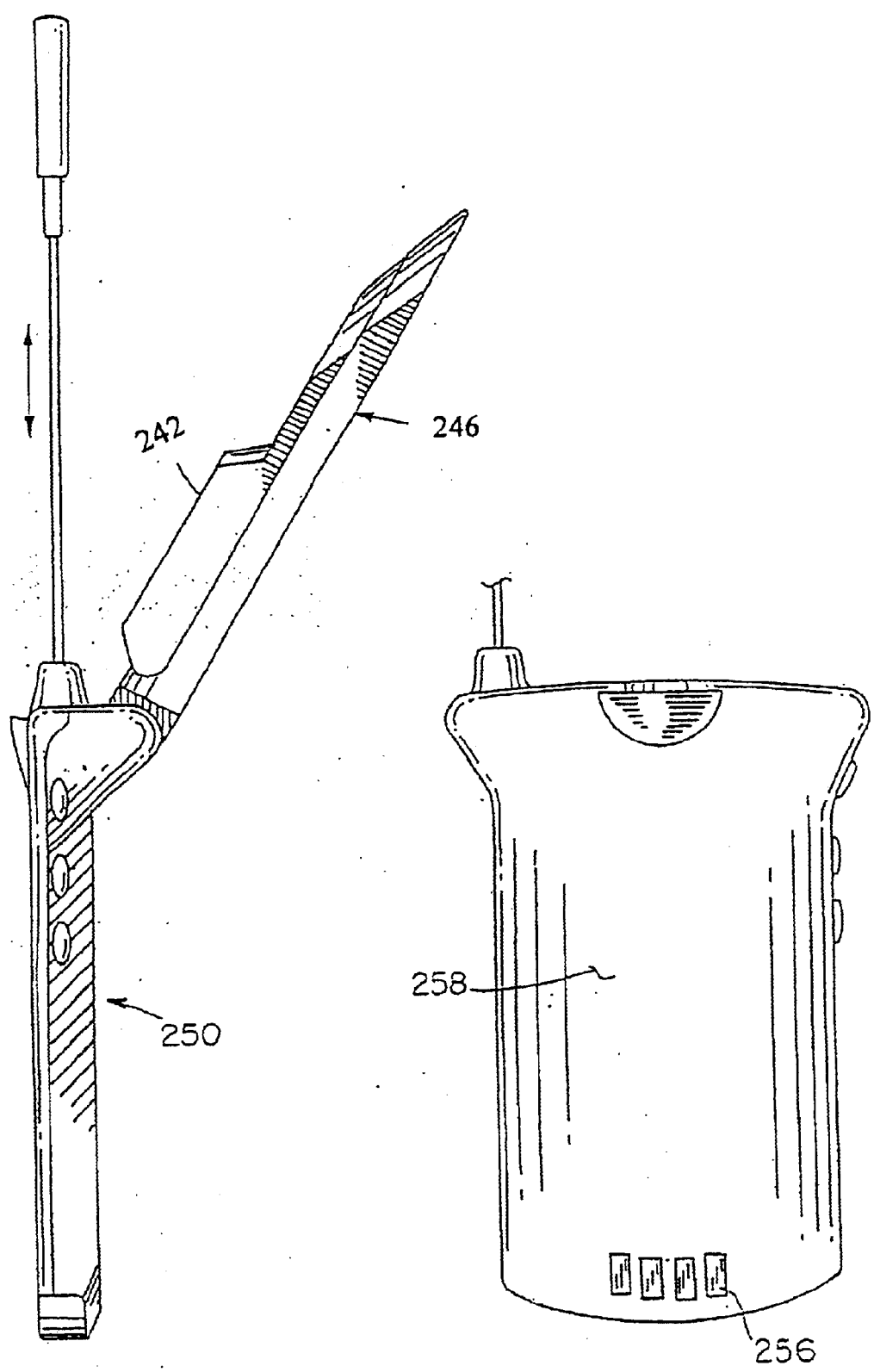

The display can be formed in a modular component that snaps onto the base portion of a standard telephone and couples to a display circuit port in the base section of the telephone. This is illustrated in the preferred embodiments of FIGS. 30A–30J. The standard telephone shown in FIGS. 30A, 30C and 30D is representative of a Motorola Star Tec® Cellular Telephone.

FIG. 30A shows a telephone 250 having standard features such as a display 252 and a port 254 for external communications. The modular display unit 260 shown in FIG. 30B is configured to dock with the telephone 250 wherein the connector 268 is inserted into port 254 and latch 264 connects to the top of the base section of telephone 250 thereby connecting the microdisplay within display subhousing 262 to the receiver within the telephone 250. The subhousing 262 pivots relative to main housing 270 to allow viewing of the display through lens 267 during use of the telephone 250. In this embodiment, telescoping camera 215 can extend from subhousing 262. Base 270 includes a second battery, drive electronics for the LED backlight LCD display on activation switch 266. FIG. 30C is a side view of telephone 250 showing the battery housing 242 on the opposite side from the speaker 246. Back panel 258 is shown in the rear view of FIG. 30D along with second battery contacts 256 exposed thereon. When the telephone 250 is docked in unit 260, the surface 258 abuts surface 265 and connectors 264 are positioned against contacts 256 such that the telephone can be powered by the second battery in housing 270.

Figure 30E:
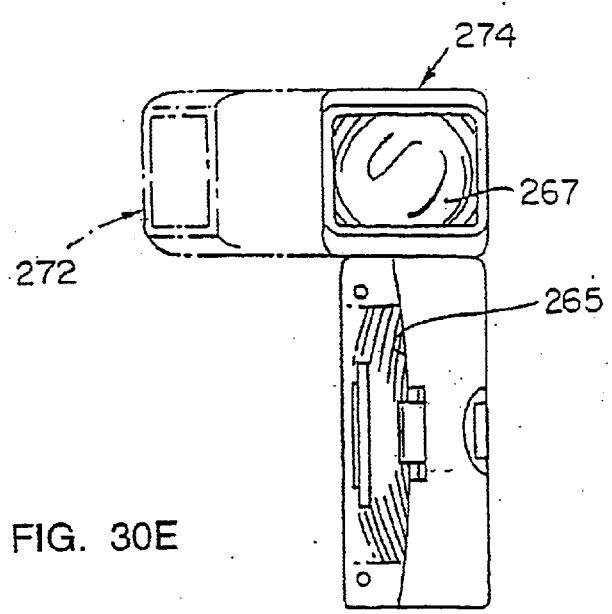
Figure 30F:
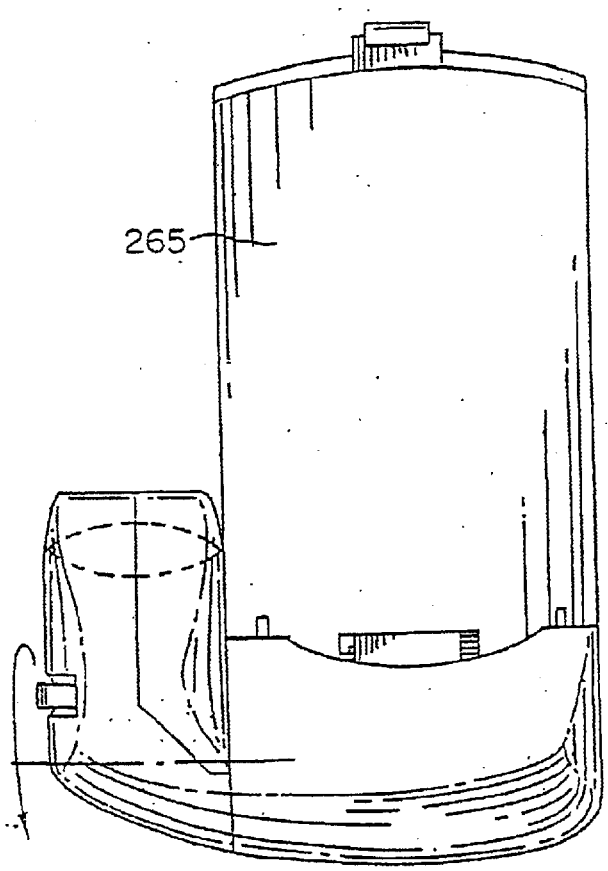
Figure 30G:
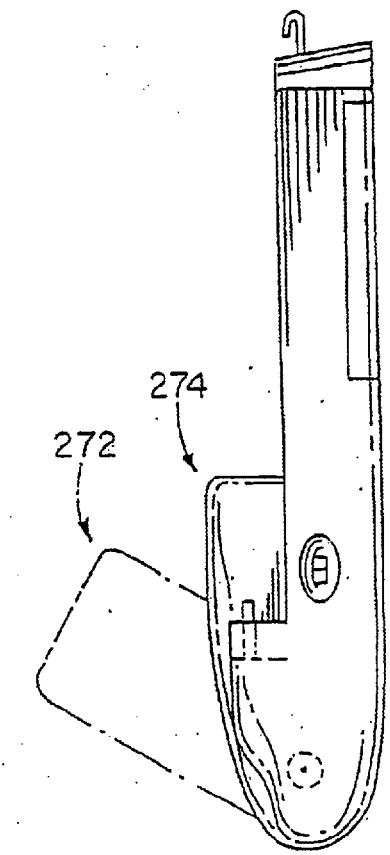
Figure 30H:
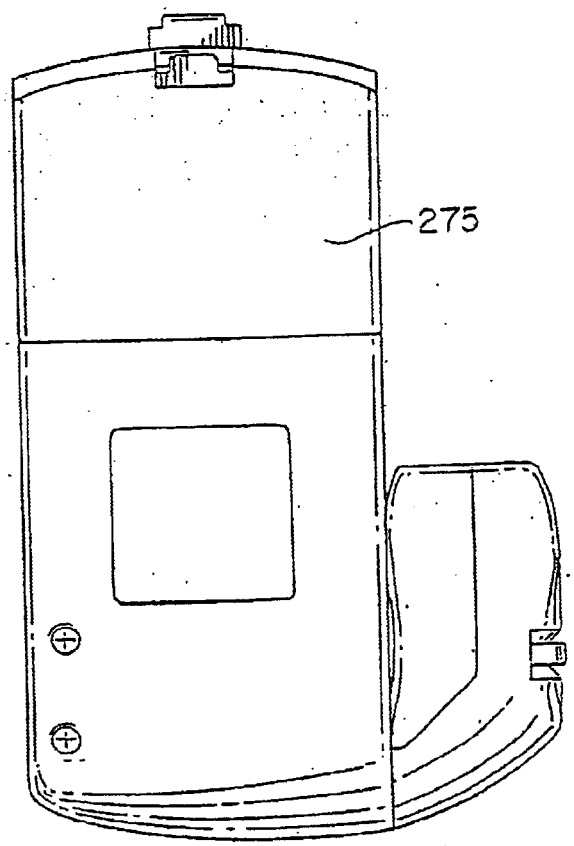
Figure 30I:
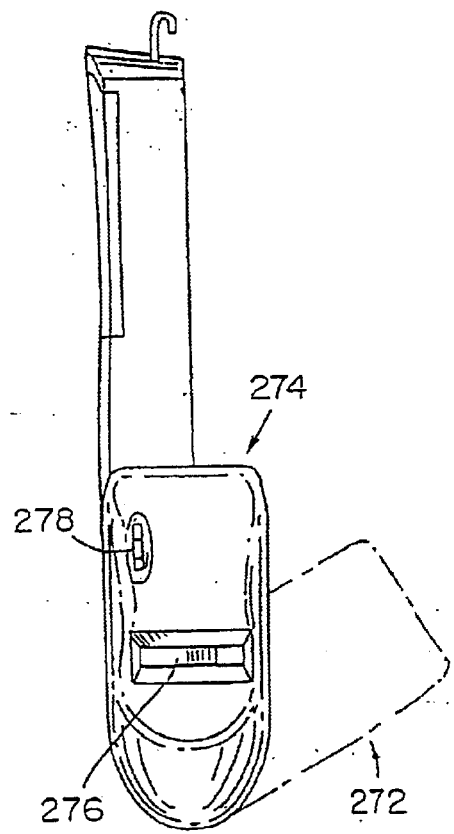

FIGS. 30E, 30F and 30G illustrate top front and side views of unit 260 where the subhousing is shown in both its storage position 274 and its viewing position 272. FIGS. 30H and 30I show back and second side views of unit 260 and illustrate battery access panel 275, focus knob 276 and control buttons 278 that are exposed on the side of housing 270 when the sub-housing 262 is rotated to the viewing position 272.

Figure 30J:
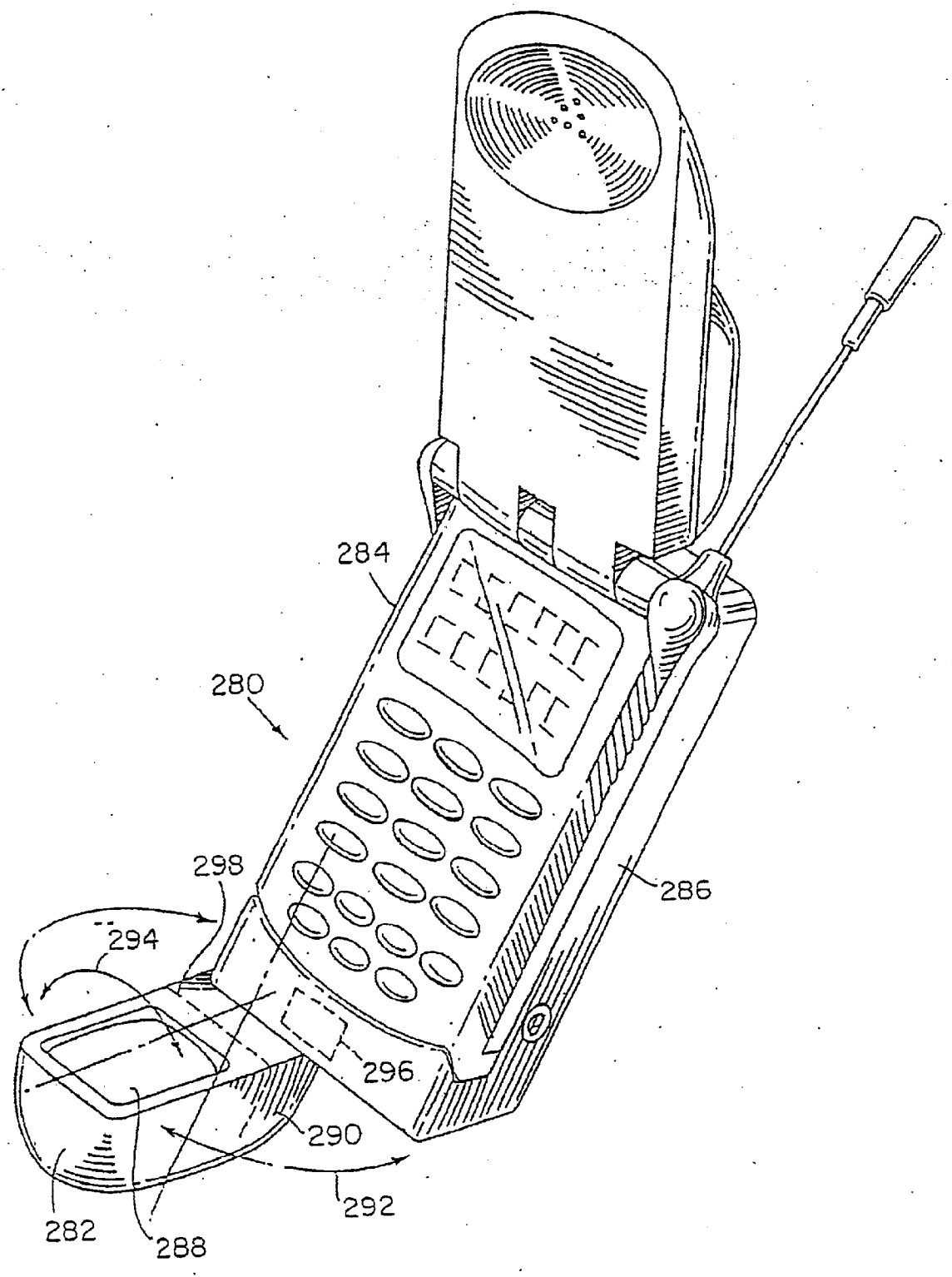

FIG. 30J shows an alternative embodiment of a docking station 280. A telephone 284 is shown docked in a housing 286. However in this embodiment, the display is mounted within a pivoting unit 282. The user can swing unit 282 along arc 292 to expose viewing lens 288. The user can also swing the display around a second orthogonal axis 294 at joint 298 so that the display rotates into a variety of viewing positions relative to hinge section 290. A release button 296 allows the pivoting unit 282 to move.

Figure 31A:
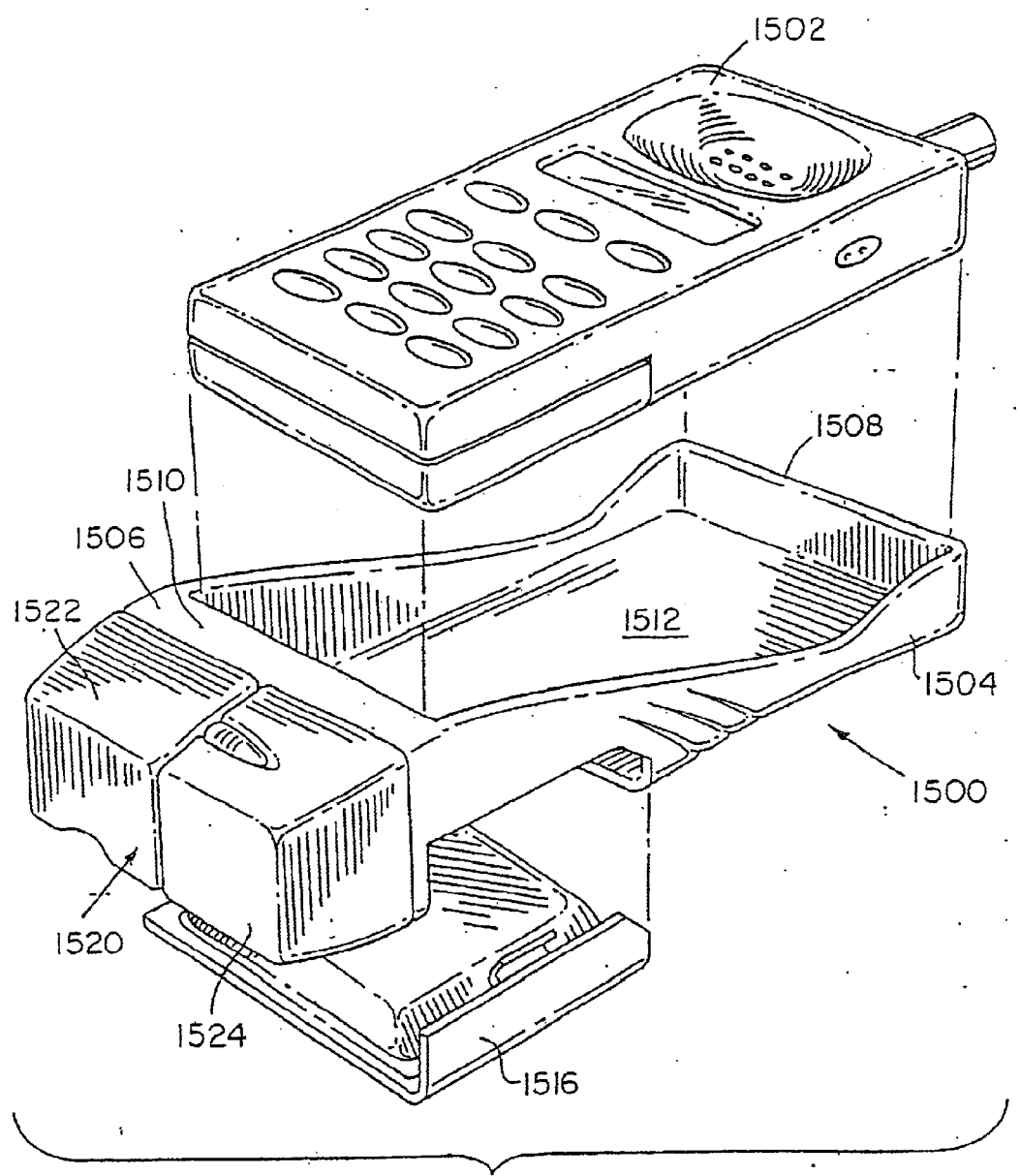
Figure 31B:
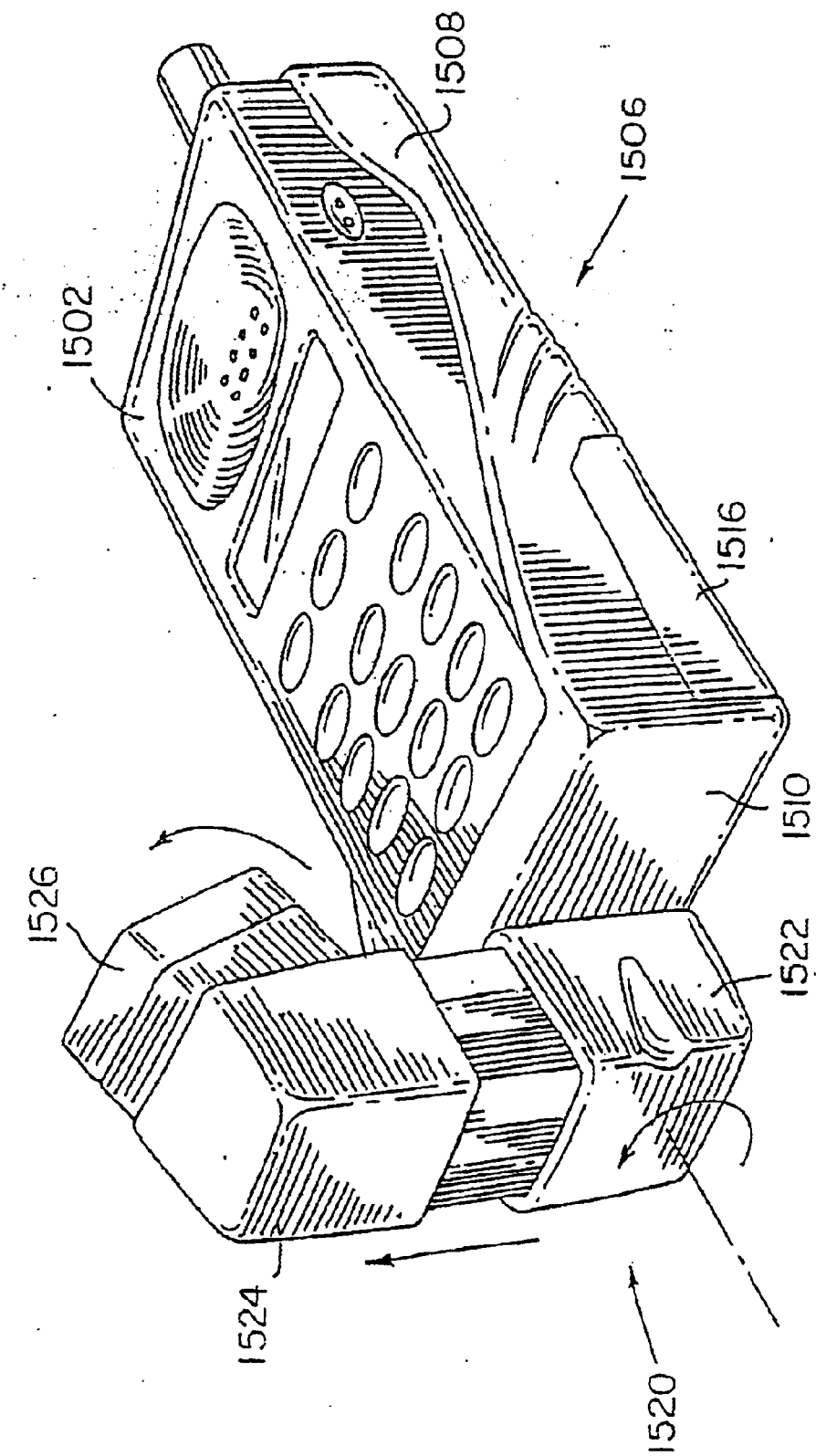
Figure 31C:
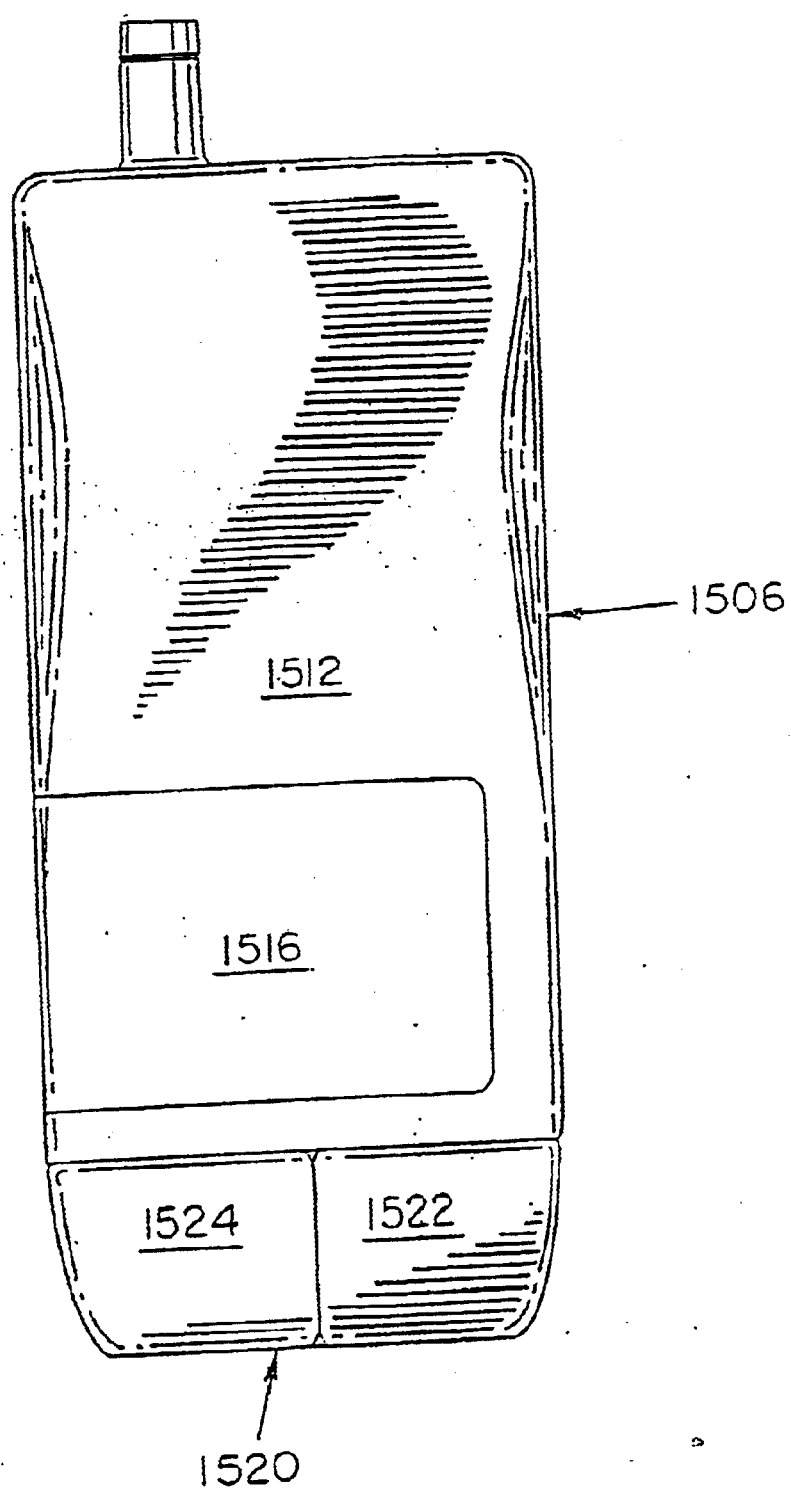

A display docking system 1500 is shown in FIGS. 31A–31C. A cradle 1504 in a docking element or station 1506 receives the cellular phone 1502. The cradle 1504 is formed by a pair of side rails and a top rail 1508, in addition to the base 1510 and the bottom 1512. The docking station 1506 is adapted to receive a battery 1516 as best seen in FIGS. 31A and 31C. The battery 1516, which is received on the bottom of the docking station 1506, is capable of powering both the docking station 1506 and the cellular phone 1502.

Still referring to FIGS. 31A–31C, the docking system 1500 has a display subhousing 1520 which pivots relative to the base 1510 of the docking station 1506. The display subhousing 1520 has a foot pivot portion 1522 that rotates relative to the base 1510 of the docking station 1506 and an arm 1524. The arm 1524 extends laterally from the foot pivot portion 1522 in the operating position, as seen in FIG. 31B. The arm 1524 has a viewing housing 1526 with a lens, which moves outward, therein spacing the lens from the microdisplay located in the arm 1524.

FIGS. 31D and 31E show another alternative display docking system 1530. The display docking system 1530 has a cradle 1534 on the docking station 1536 similar to the embodiment shown in FIGS. 31A–31C. The docking station 1536 likewise is adapted to receive a battery 1538 capable of powering both the docking station 1536 and the cellular phone 1502.

Still referring to FIGS. 31D and 31E, the docking system 1530 forms a handset and has a display subhousing 1540 which has a display pod 1542 and a pair of sliding arms 1544. The display subhousing 1540 moves relative to the docking station 1536 by the arms 1544 moving translation relative to the side rails of the station 1536 as represented in FIG. 31E. The arms 1544 then are capable of rotating relative to the docking station 1536 as illustrated in phantom in FIG. 31E. The display pod 1542, which houses the microdisplay and a lens, can rotate relative to the arms 1544 to position the microdisplay for viewing.

Figure 32A:
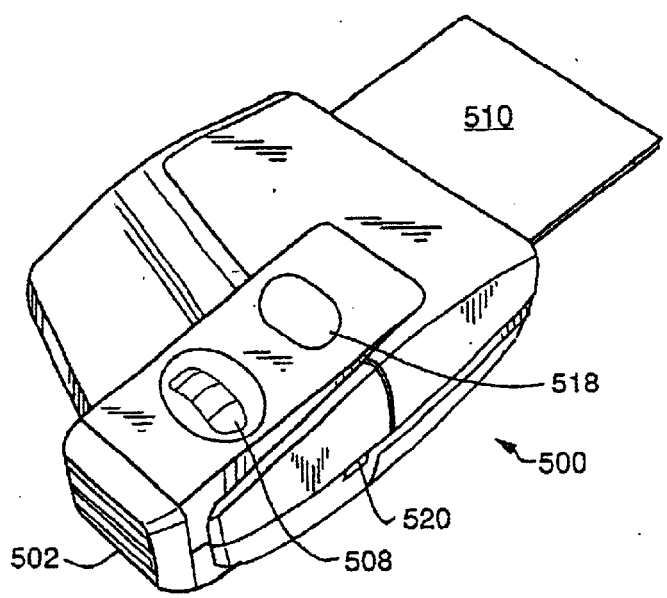
FIGS. 32A–32E illustrate an alternative portable display system.
Figure 32B:
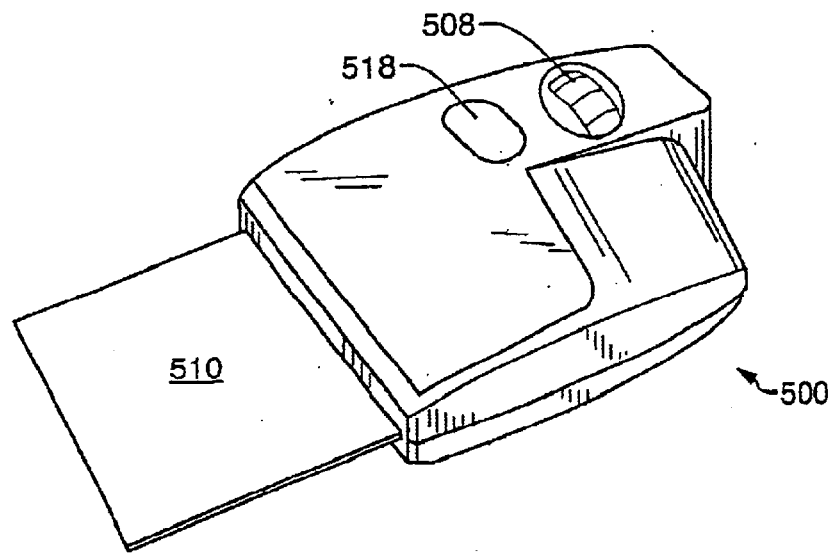
Figure 32C:
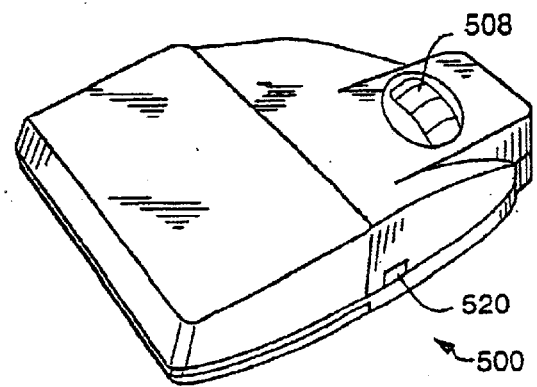

A portable display system 500 is shown in FIGS. 32A–32E. FIGS. 32A and 32B are a perspective views of a preferred embodiment of the portable display system 500 having a display viewing area 502 within a housing 504. The viewing area 502 has a lens 506 through which the user views a microdisplay as described previously. The microdisplay magnification can be adjusted using a knob 508 located on top and bottom of the housing 504. The bottom of the housing 504 is shown in FIG. 32C.

Figure 32D:
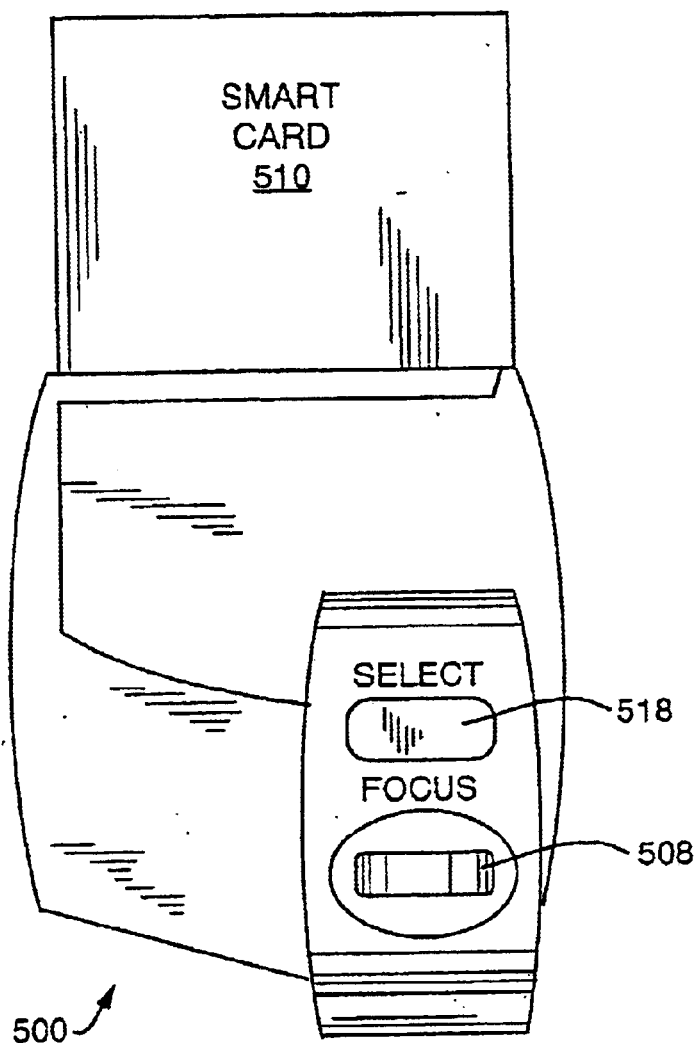
Figure 32E:
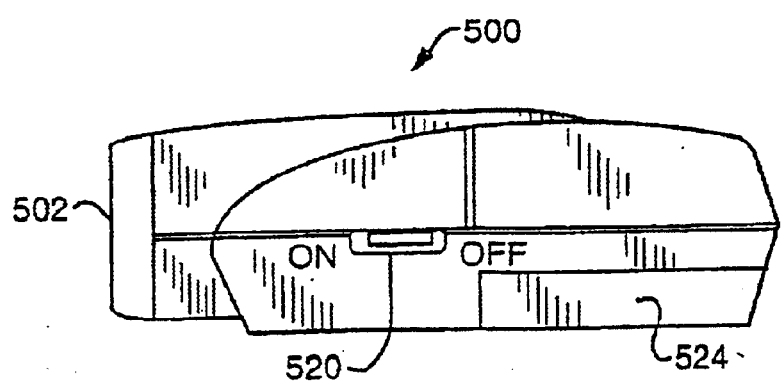

The portable display system 500 receives the information for the image it is going to display from a card, such as a smart card 510, shown in FIGS. 32A, 32B and 32D. The smart card 510 can be inserted in to a slot 512 in the housing 504 of the portable display system 500.

The image is selected using a switch 518 located on top of the housing 504 in proximity to the magnification knob 508. The display system 500 is turned on and off with a switch 520 accessible through an opening on the right side of the housing 504 as best seen in FIG. 32B on the front of the display system. The display system has an opening 522 to receive a rechargeable battery or a plurality of conventional batteries behind a cover 524.

As illustrated by FIGS. 32A, 32B, and 32C, the size of the portable display system 500 is defined predominately by the size of the smart card 510, which is shown inserted in the portable display system 500. A major portion of the smart card extends out of the housing 504 in this embodiment and allows easy removal of the card 510. The smart cards, having credit card dimensions (i.e. about 3⅜ inches by 2⅛ inches, or about 85.6×53.98×0.76 mm). The housing material 504 in a preferred embodiment is approximately 3⅜ inches by 2⅝ inches by 1 inch.

Figure 33A:
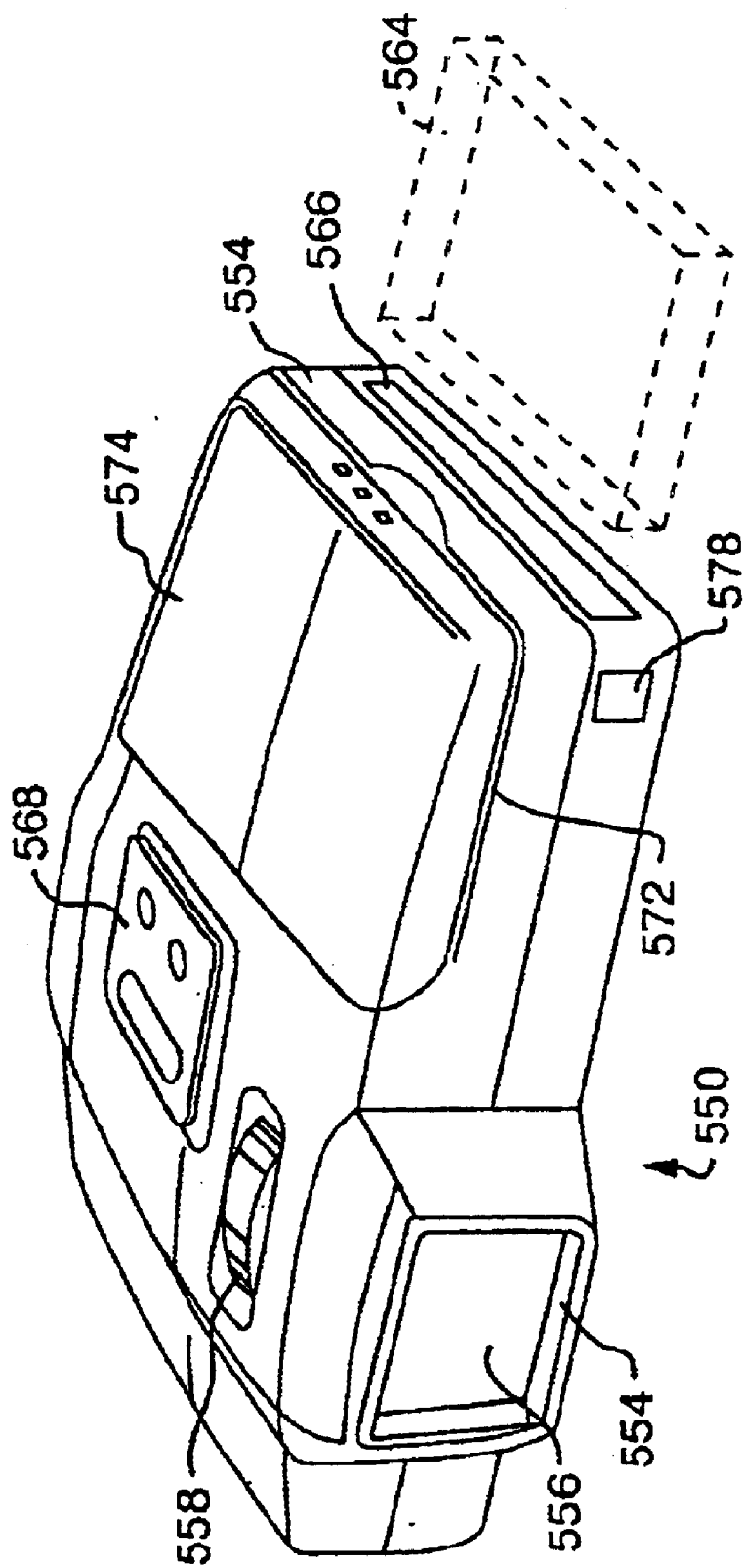
FIGS. 33A is a perspective view of an alternative portable display system.
Figure 33B:
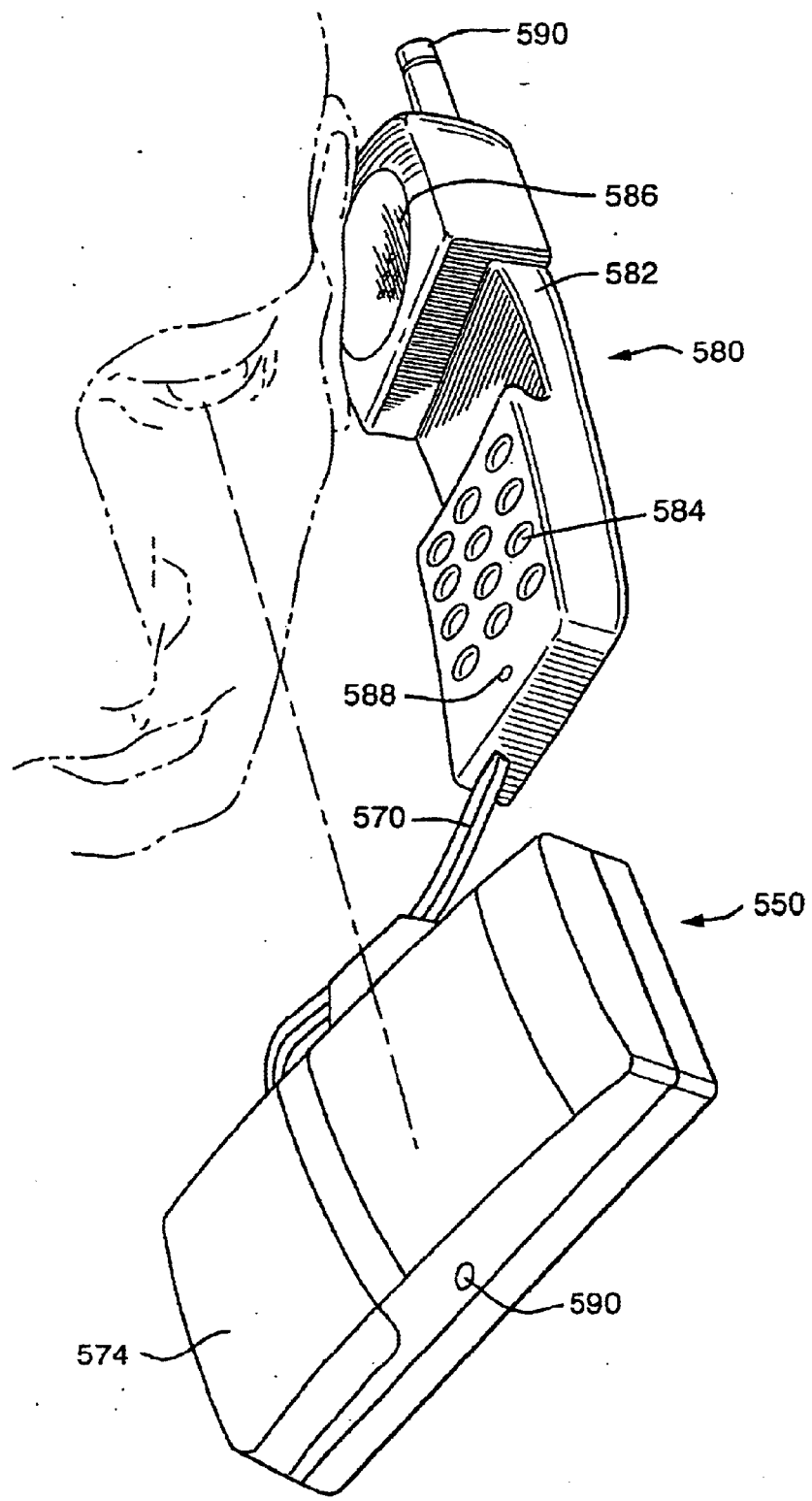
FIG. 33B is a perspective view of the display system of FIG. 33A coupled to a conventional cellular phone.

A portable display system 550 is shown in FIGS. 33A and 33B. FIG. 33A is a perspective view of a preferred embodiment of the portable display system 550 having a display viewing area 552 within a housing 554. The viewing area 552 has a lens 556 through which the user views a microdisplay as described previously. The microdisplay magnification can be adjusted using a knob 558 located on top of the housing 554.

The portable display system 550 receives the information for the image it is going to display from either a memory card 564, shown in phantom, which is inserted into a slot 566 in the housing 554 or a datalink, such as wire link, using a phone jack. A port 578 for the datalink is located on the front of housing 554.

The image is selected using a plurality of switches 568 located on top of the housing 554 in proximity to the magnification knob 558. A five-way selection switch can be used. The display system 550 is turned on and off with a switch 570 located on the left side of the housing 554, on the right side as seen in FIG. 33B. The display system has an opening 572 to receive a rechargeable battery 574.

Referring to FIG. 33B, a cellular telephone 580 has a base 582 having a keypad 584, a speaker 586, a microphone 588, and an antenna 590. The base portion 582 may include an alphanumeric display for seeing the telephone number as it is being entered.

The portable display system 550 is shown connected to the cellular telephone 580 using a wired datalink 570. The user spaces the lens 556 of the display system 550 the proper distance for viewing. While a wired datalink 570 is shown, an infrared transceiver such as seen in FIGS. 28A–28D could be used for transmitting data between the display system 550 and the cellular telephone.

The display system 550 has an opening 590 for a CCD camera located on the back face, as seen in FIG. 33B. The user can use this camera to take a picture of notes, an object or other item.

Figure 34A:
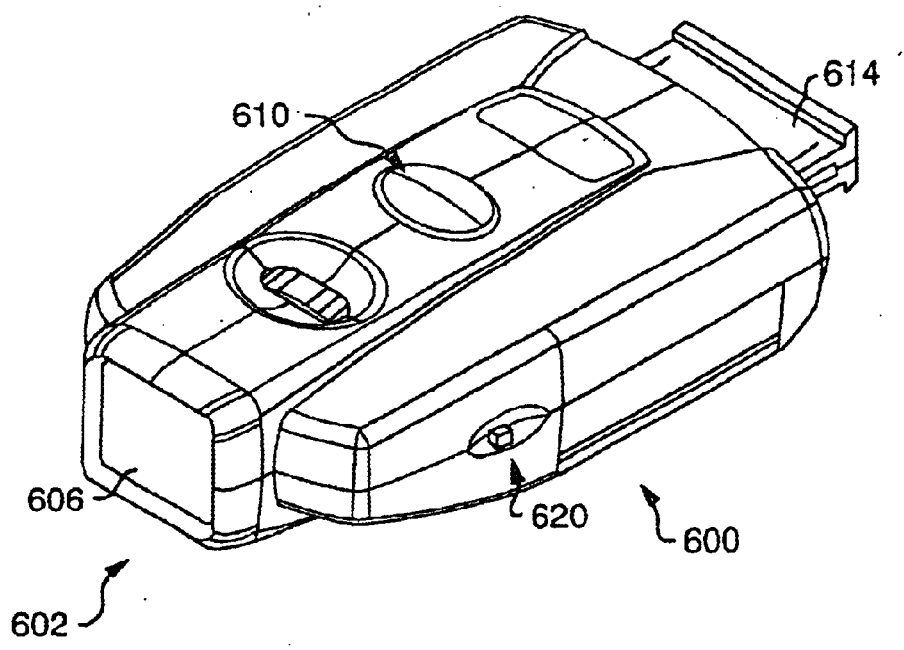
FIGS. 34A–34C illustrate prospective views of an alternative portable display system.
Figure 34B:
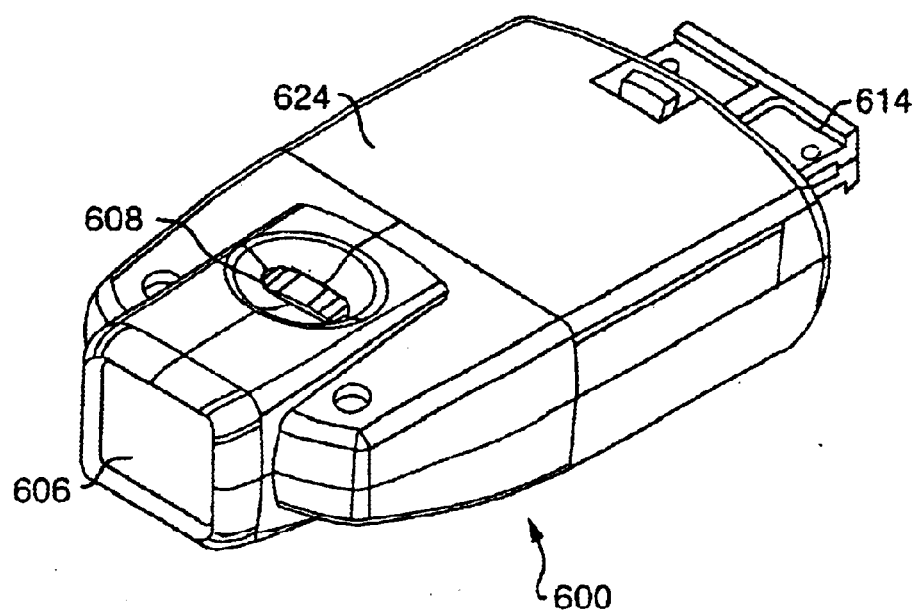
Figure 34C:
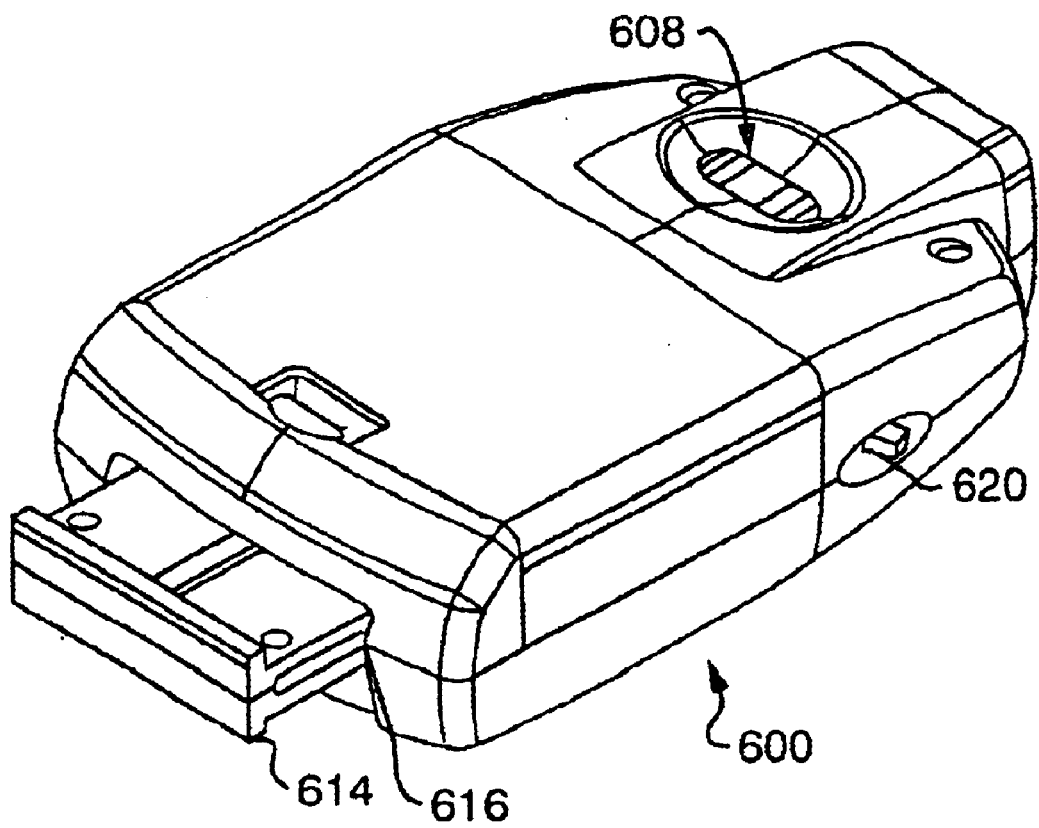

A preferred embodiment of another hand-held display device is shown in perspective FIGS. 34A–34C. In the embodiment, a hand held unit 600 has a viewing window 602 with a lens 606 through which the user views a microdisplay as described previously. The microdisplay magnification can be adjusted using a knob 608 located on top and bottom of the housing 604. The bottom of the housing 604 is shown in FIG. 34C.

The image is selected using a pair of selection buttons, 610 located on top of the housing 604 in proximity to the magnification knob 608. The hand held unit 600 is turned on and off with a switch 620 accessible through an opening on the side of the housing 604. The display system has an opening 622 to receive a rechargeable battery 624, as best seen in FIGS. 34C and 34D.

The hand held unit or portable display system 600 receives the information for the image it is going to display from either a smart card, which can be inserted in to a slot in the housing 604 of the hand held unit 600 or a memory card 614, which is inserted in to a slot 616, as seen in FIG. 34C, in the housing 604.

Figure 34D:
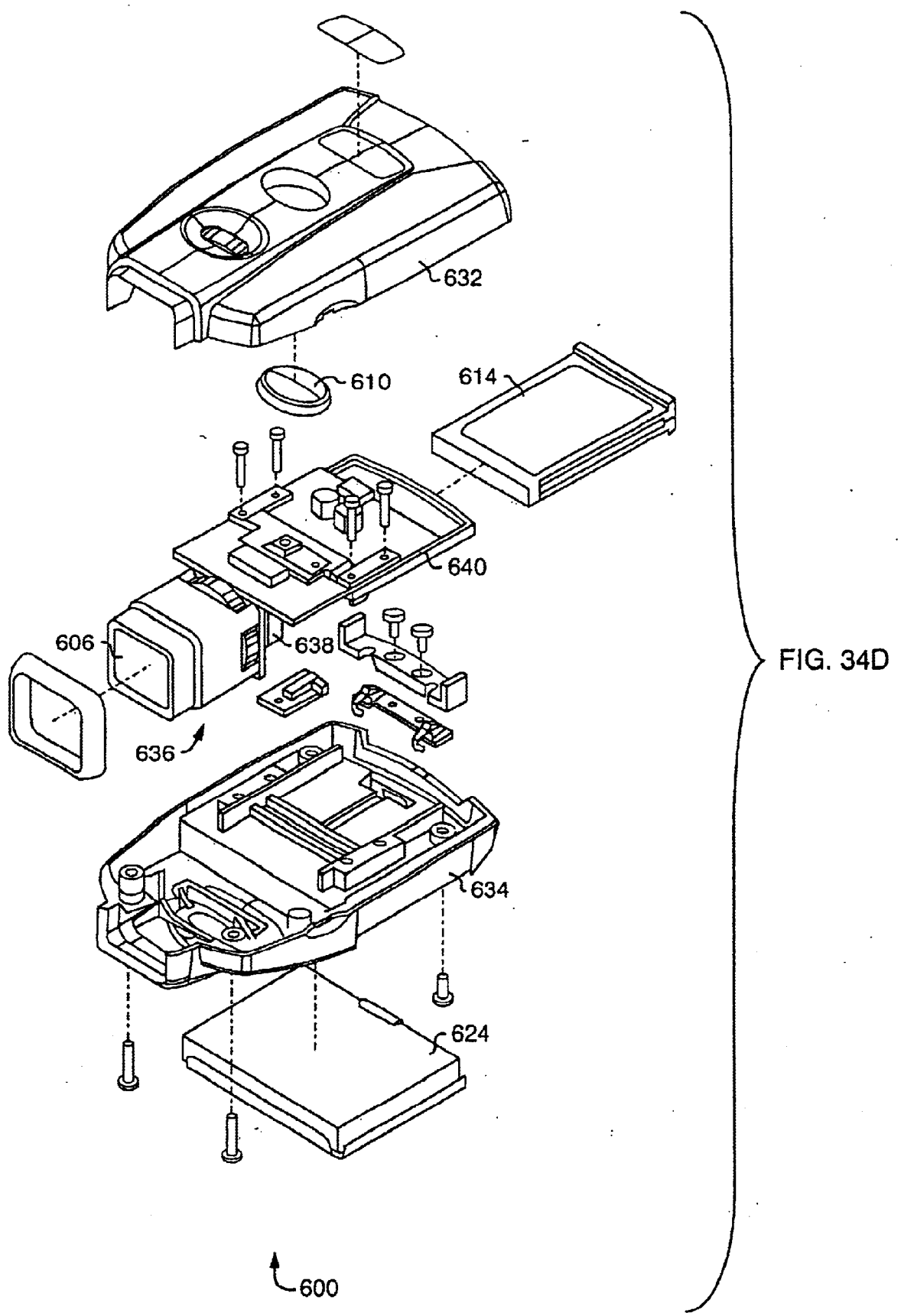
FIG. 34D is an exploded view of the display system of FIG. 34A–34C.

An exploded view of the hand held unit 600 is shown in FIG. 34D. The housing 604 has a top housing 632 and a bottom housing 634. The battery 624 is received in the opening 622 of the bottom housing 634. The optical engine 636 including the lens 606 and the microdisplay 638 is located in the forward portion and a circuit board 640 and the memory card 614 are located in the rear portion of the unit 600.

Figure 35A:
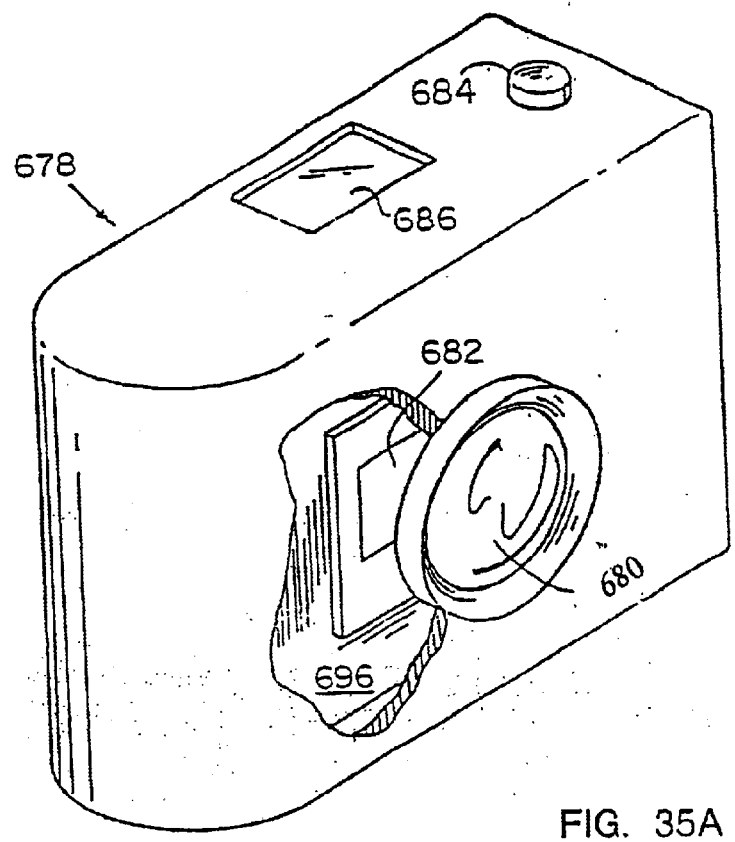
FIGS. 35A–35B illustrate the use of a microdisplay as a viewfinder for a digital still camera in another preferred embodiment of the invention.
Figure 35B:
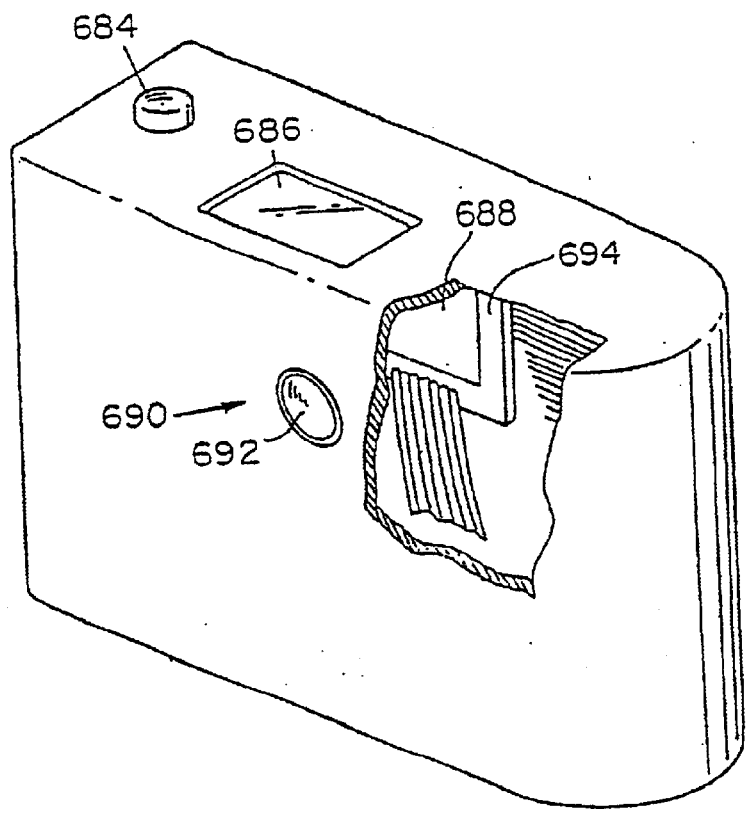

A digital camera 678 for still photographs is illustrated in FIGS. 35A and 35B. The digital camera 678 has a lens 680 located in front of an image sensor 682 and a photosensitive semiconductor such as a charge-coupled device (CCD) or CMOS image sensor. Interposed between the lens 680 and the image sensor 682 is a shutter which is controlled on the digital camera 678 by a shutter release button 684. An alphanumeric display panel 686 is located on the top or backside of the digital camera 678.

The digital camera 678 has a microdisplay 688 which is seen through a viewfinder 690 as illustrated in FIG. 35B. The viewfinder 690 has a lens 692 for viewing the microdisplay 688. The microdisplay 688 is located on its own chip 694 which is connected to a logic controller on a main or mother board 696 of the digital camera 678. It is recognized that the information typically displayed on the second display panel 686 can also be displayed on the microdisplay.

Figure 35C:
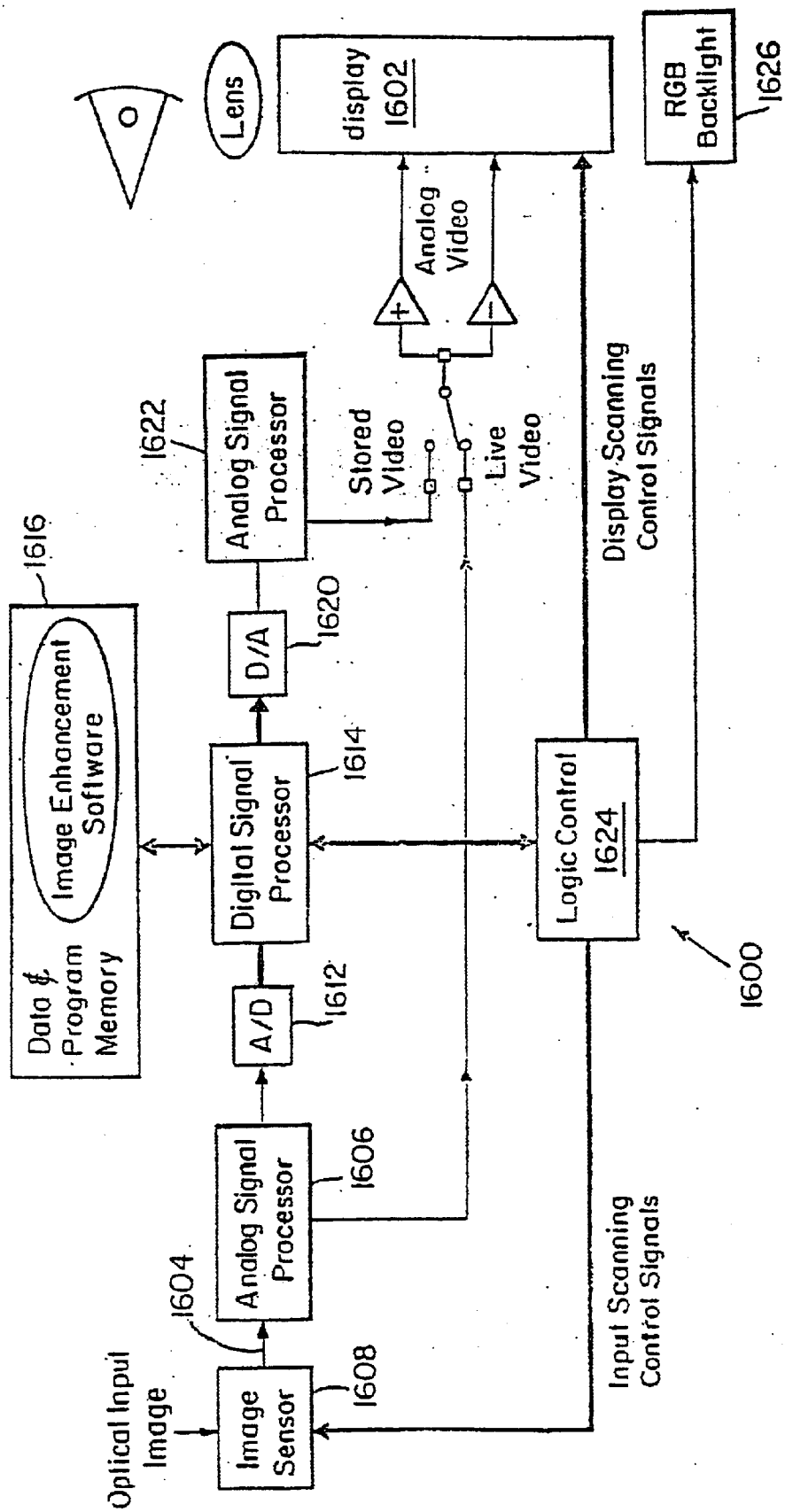
FIG. 35C illustrates a display control circuit for a camera.

A preferred embodiment of a display control circuit 1600 for a color sequential microdisplay 1602 for a camera is illustrated in FIG. 35C. The display control circuit 1600 receives an analog composite signal 1604 at an analog signal processor 1606 from an image sensor 1608. The analog signal processor 1606 can be a commercially available chip, such as the Sony CXA1585, which separates the signal 1604 into red, green and blue components.

The image is sent from the analog signal processor 1606 directly to the microdisplay 1602. At the same time, the three analog color components are converted into digital signals by analog to digital (A/D) converters 1612. The digital signals are further processed by a digital signal processor 1614 and stored in a memory circuit 1616. The signal stored in the memory circuit 1616 can be enhanced or altered such as compression, gamma correction, smoothing and/or dithering. The enchanting or altering uses commercially available software, such as that marketed by Photoshop, Inc.

In addition to viewing directly from the analog signal processor 1606 associated with the image sensor 1608, the microdisplay 1602 can display what is stored in the memory 1616 by the digital signals going through the digital signal processor 1614 to a digital-to-analog converter 1620 to convert the digital signal back into an analog signal. The display control circuit 1600 has an analog signal processor 1622 for separating the signal into red, green and blue components.

The display control circuit 1600 has a logic circuit 1624 including a timing circuit. The logic circuit 1624 is connected to the image sensor, the microdisplay, the digital signal processor and the memory for controlling the flow of the video signal.

When taking the images directly from the image sensor to the microdisplay 1602 through the analog signal processor 1606, the logic circuit 1624 synchronizes the signal into red, green and blue signals which the microdisplay 1602 uses. This synchronization can include the use of various filters to gather image data in a synchronized color order to be fed to the microdisplay 1602 and coordinating actuation of the backlight 1626.

The logic circuit 1624 controls the sequential flow of each color frame onto the display by sending video data from the memory 1616 onto the display 1602 and coordinating actuation of the backlight 1626 along lines for each primary color.

Figure 35D:
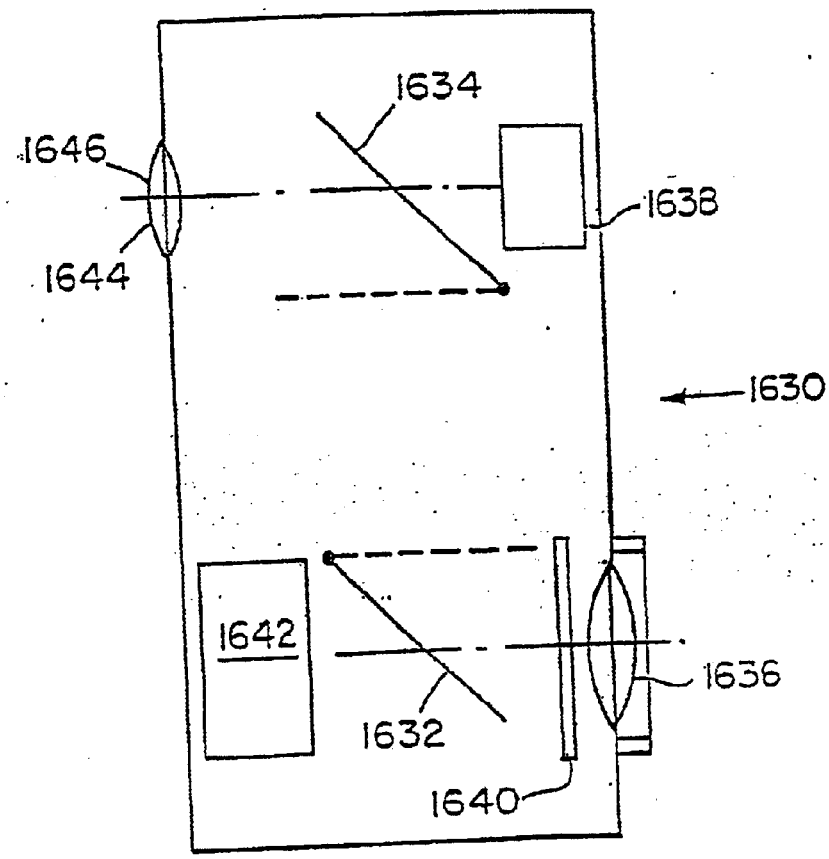
FIGS. 35D and 35E illustrate cameras with moving mirrors for through the lens viewing.

The digital camera 678 shown in FIGS. 35A and 35B uses the microdisplay 688 to view the image prior to shooting the picture. FIG. 35D illustrates a digital camera 1630 having a pair of mirrors 1632 and 1634 so that the user can view the image through the camera lens 1636 rather than from a microdisplay 1638 if preferred. The first mirror 1632 is located between a shutter 1640 and the image sensor 1642. The first mirror 1632 directs the image that is seen through the lens 1636 up to the second mirror 1634, which is located between the microdisplay 1638 and a lens 1644 of the viewfinder 1646.

When the shutter release button is pushed, both mirrors 1632 and 1634 flip to a substantially horizontal position as seen in phantom in FIG. 35D. The image that passes through the camera lens 1636 is seen by the image sensor 1642. In addition, if the user wants to see the image on the microdisplay 1638 or view a previously taken picture stored in memory, the second mirror 1634 is flipped horizontally, as viewed in FIG. 16H in phantom, so the microdisplay 1638 can be seen through the lens 1644 of the viewfinder 1646.

Figure 35E:
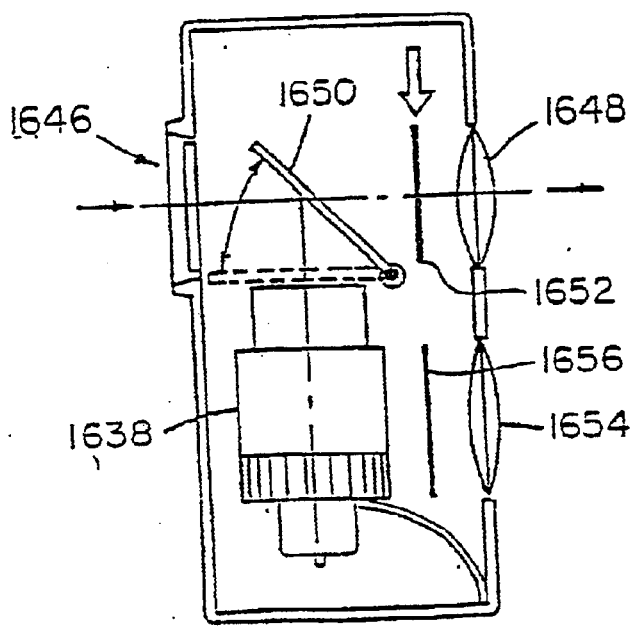

An alternative embodiment is shown in FIG. 35E. In this embodiment the viewfinder 1646 uses a separate second lens 1648 from that of the lens 1654 of the image sensor 1656 and a single mirror 1650. With the mirror 1650 in the position shown, the mirror 1650 allows the user to see the image of the microdisplay 1638 through the lens 1644 of the viewfinder 1646. With the mirror 1650 flipped down as seen in phantom, the user sees the view to be photograph through the second lens 1648. If the mirror 1650 is a half mirror, the user can see both the microdisplay 1638 and the view through the second lens 1648. A shutter 1652 interposed between the second lens 1648 and the mirror 1650 allows selection of viewing through either the second lens 1648 or microdisplay 1638 when a half mirror 1650 is used.

Figure 35F:
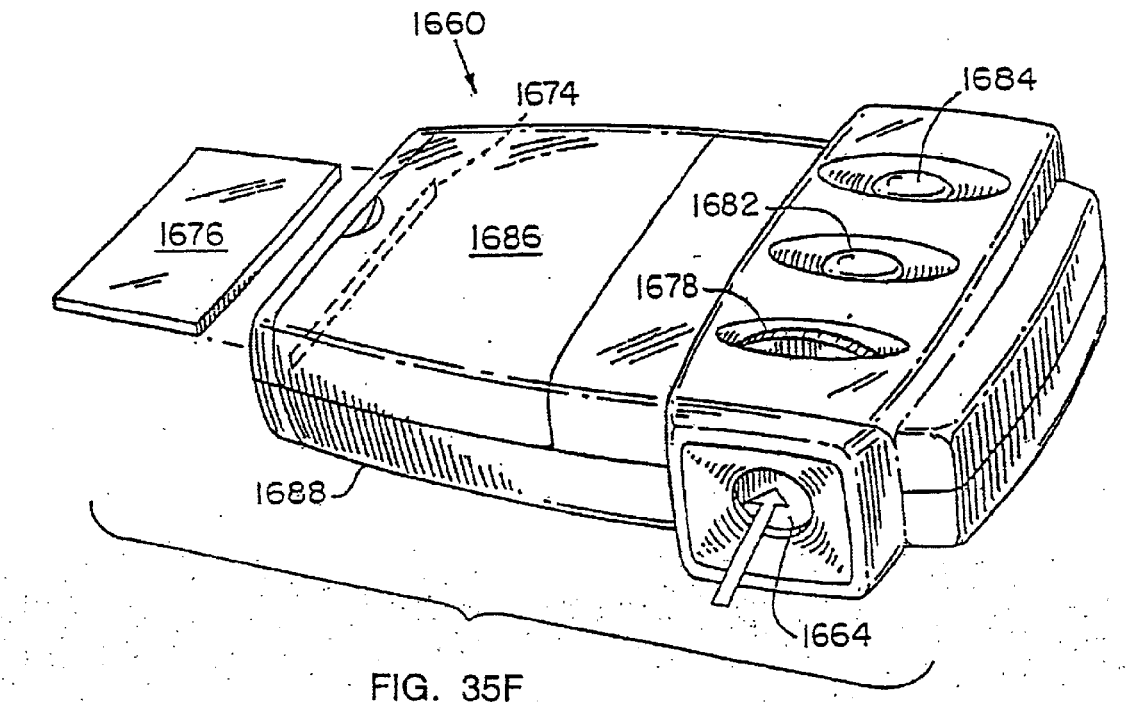
FIGS. 35F and 35G illustrate a camera/imager with a microdisplay as a viewfinder.
Figure 35G:
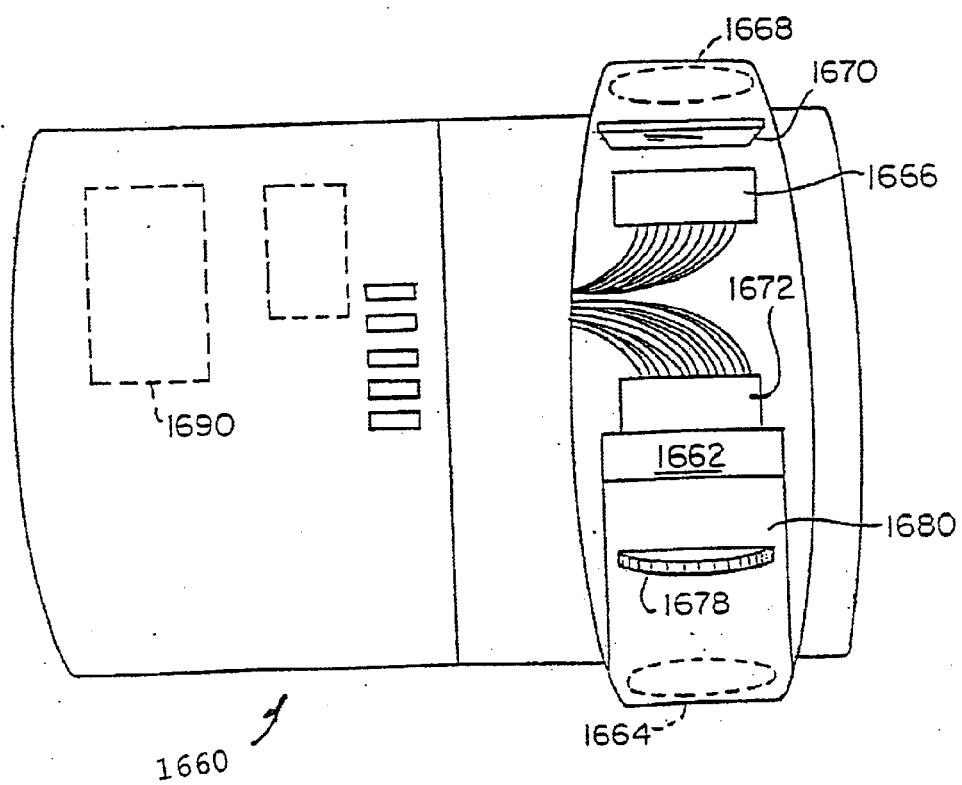

A digital camera/card reader 1660 is illustrated in FIGS. 35F and 35G. The digital camera/card reader 1660 has a microdisplay 1662 with a viewing lens 1664 and a image sensor 1666, such as the INTEL VL5426S002, with a lens 1668 and an interposed shutter 1670. Note that an electronic shutter can also be used. A backlight 1672 for the microdisplay 1662 is interposed between the microdisplay 1662 and the image sensor 1666.

The digital camera/card reader 1660 has a slot 1674 for receiving a memory card which can store or already contain images viewable on the microdisplay 1662. A focus knob 1678 for the display is located on the optical engine 1680 of the microdisplay 1662. A shutter release button 1682 and an image select button 1684 are also shown.

A detachable battery pack 1686 and the housing 1688 for the circuit 1690, illustrated in broken line in FIG. 35G, which underlie the battery 1686, create a handle for holding the digital camera/card reader 1660.

Figure 35H:
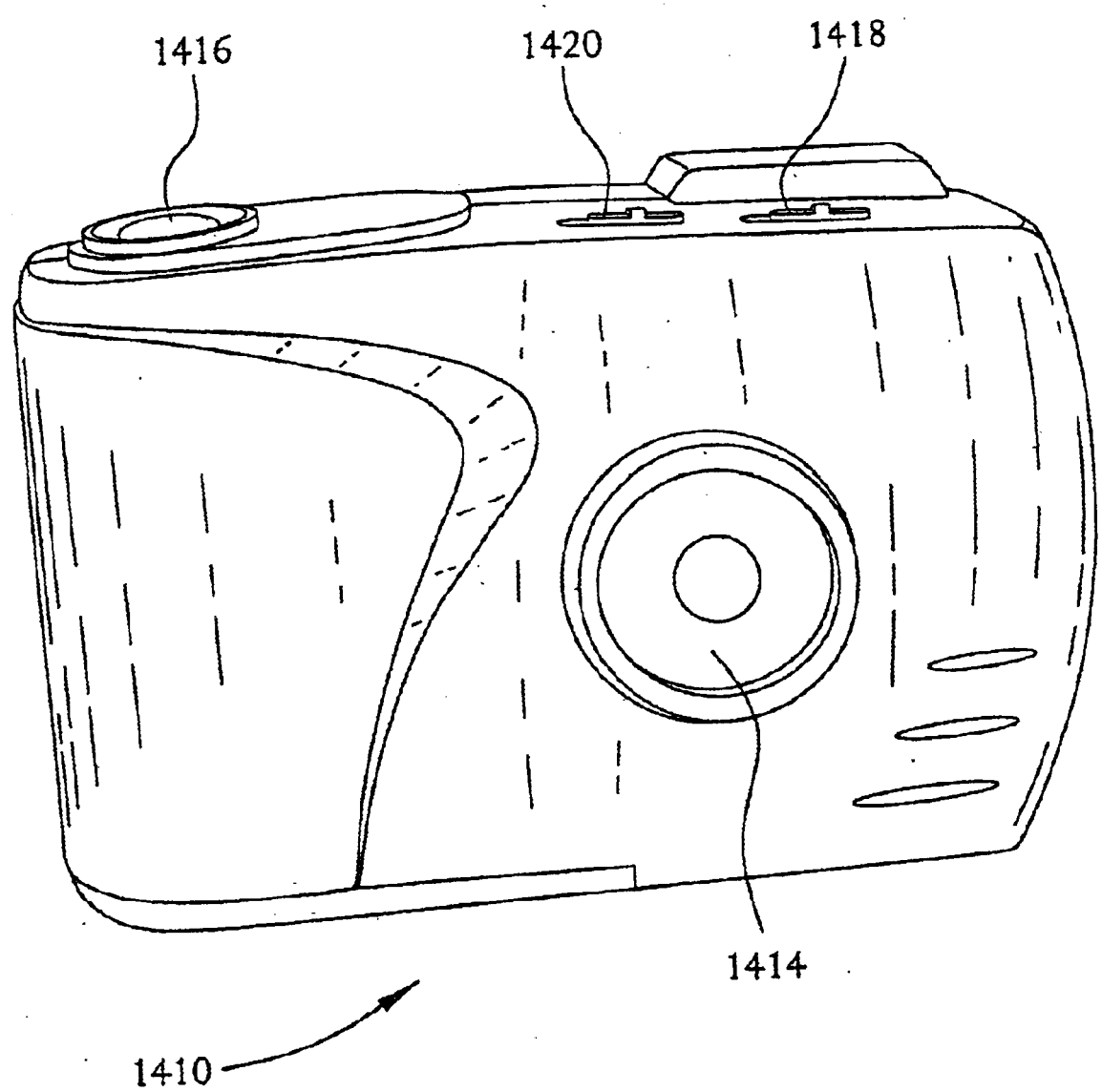
FIG. 35H–35J are views of an alternative digital camera.

A front perspective view of a digital camera 1410 is shown in FIG. 35H. The digital camera 1410 has a CCD 1412, as seen in FIG. 35K, behind the front lens 1414.

The camera 1410 has a shutter release button 1416 on the top. In addition, the button for capturing the image is located on the top of the digital camera.

Figure 35I:
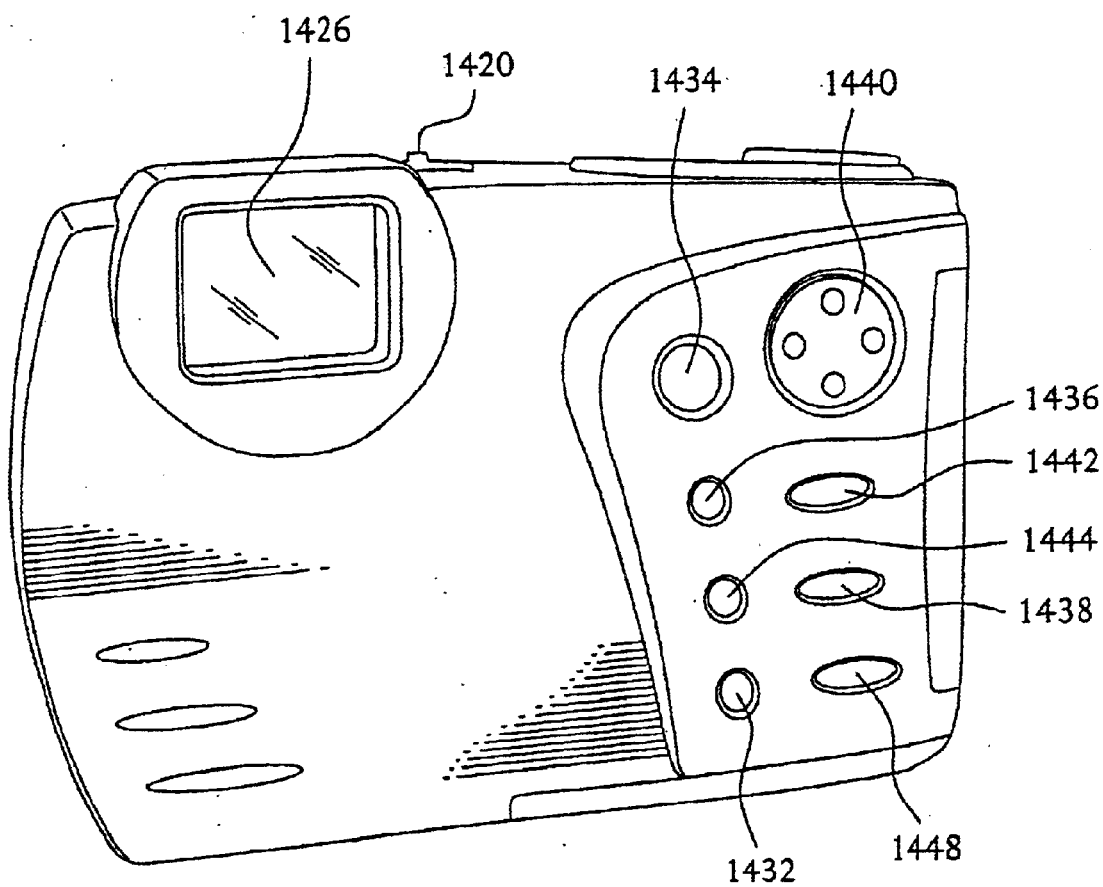
Figure 35J:
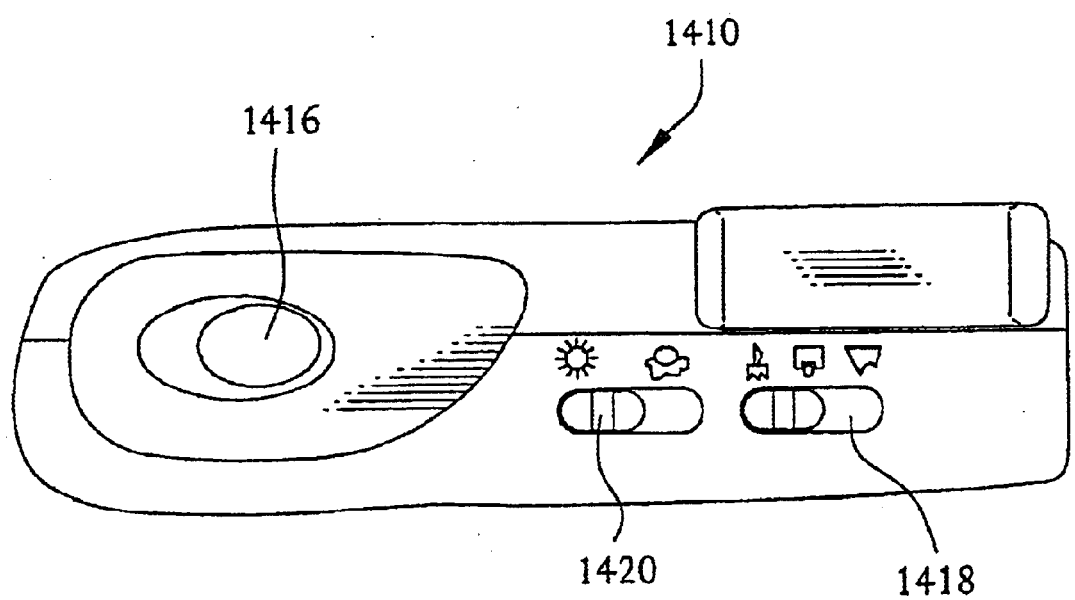

As seen in FIGS. 35H and 35J, the digital camera 1410 has a pair of control switches 1418 and 1420, for adjusting the camera 1410, as explained below, for the desired focus range and ambient light levels.

Figure 35K:
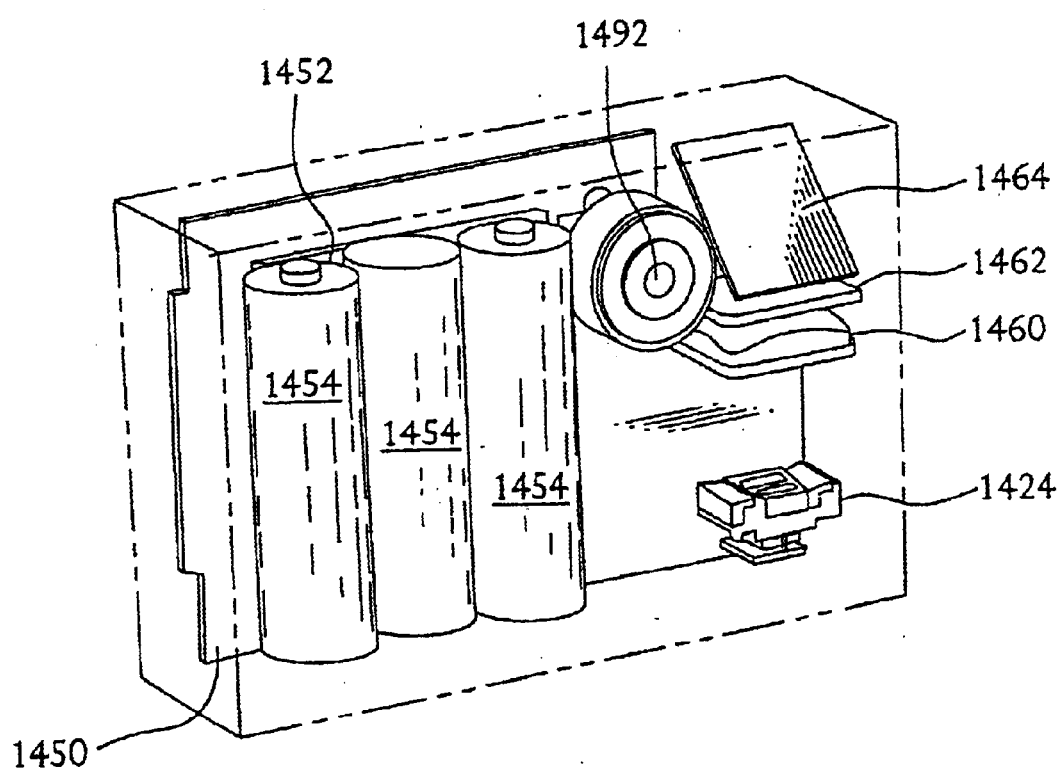
FIG. 35K is a front perspective view of an internal board in the digital camera.

Referring to FIG. 35I, the digital camera 1410 has a microdisplay 1424, as seen in FIG. 35K, seen through a lens 1426 to both aim the camera and to view the captured image. The digital camera 1410 in addition has a plurality of control knobs for viewing images within the digital camera and deleting images. The control knobs include an on/off switch 1432, a delete button 1434 for deleting a recorded image, a record button 1436 for saving images, and a play button 1438 for viewing images. In addition, there is a scroll/select control knob 1440 which allows movement up/down and side-to-side. There is also a WB (White Balance) button 1442, a resolution/zoom button 1444, and a N-F-S Button. The N-F-S (Normal-Fine-Superfine) buttons are used to select image quality.

The digital camera is capable of interfacing with items such as a portable computer, a cardreader to transfer images from the digital camera to a computer or printer. In a preferred embodiment a card is removed from the camera and inserted in the computer. In an alternative embodiment, the transfer can be both to and from the digital camera. The camera has a cable interference for connecting to the computer.

FIG. 35K is a front prospective view of an internal board 1450 in the digital camera 1410. The internal board 1450 has a holder 1452 for containing three batteries 1454 in a preferred embodiment. The CCD camera 1412 is seen located between the batteries 1454 and an optical viewing portion 1456. The microdisplay 1424 is seen in the lower right hand corner of the internal board 1450 with a lens 1460 and a diffuser 1462 positioned above the microdisplay 1424.

A mirror 1464 transposes the image from the vertical plane to the horizontal plane.

Figure 36A:
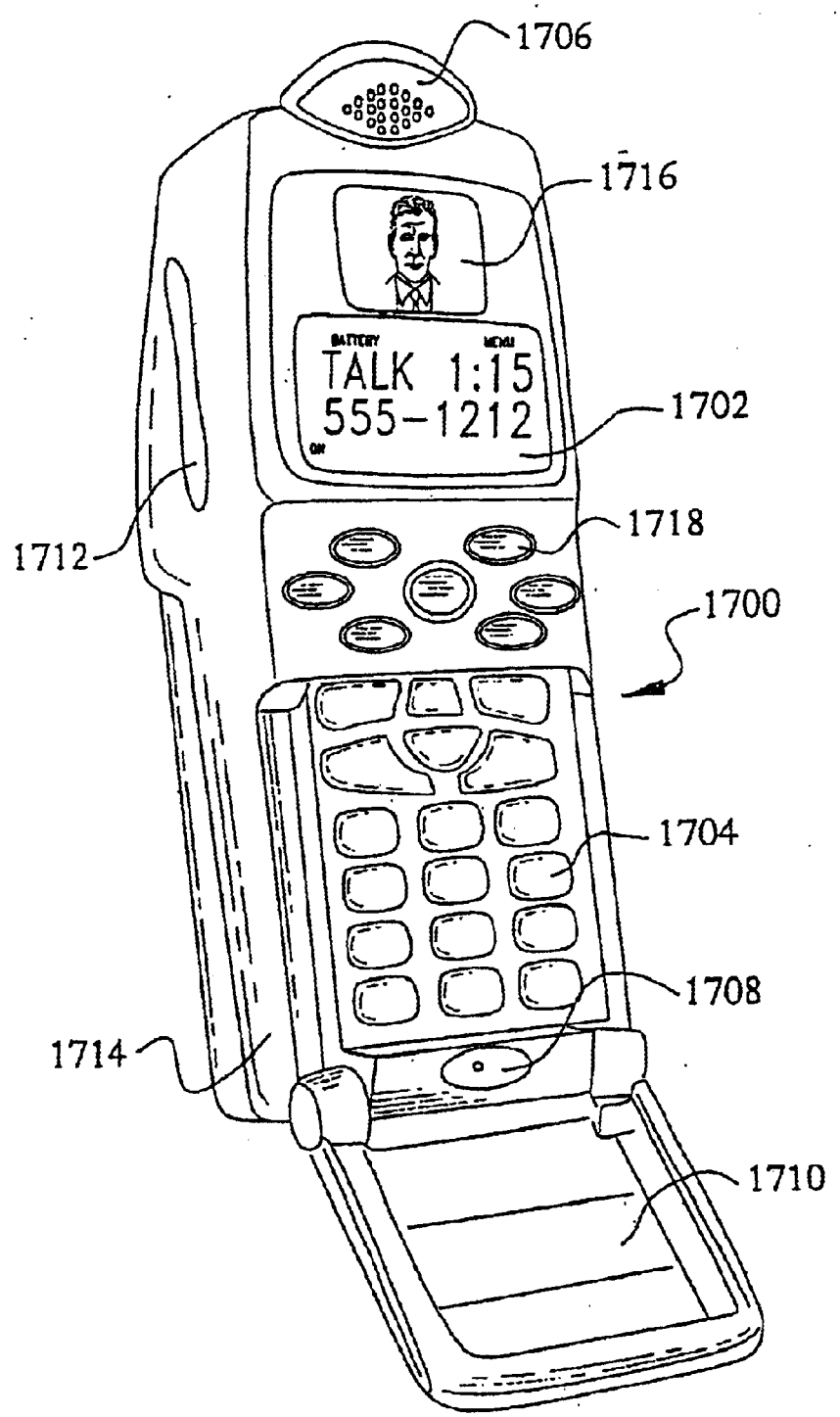
FIGS. 36A–36C illustrate an alternative display telephone.

FIG. 36A is a prospective view of a cellular telephone 1700 having an alphanumeric display 1702, a keypad 1704, a speaker 1706, and a microphone 1708. In addition, the cellular telephone 1700 has a flip-lid 1710 for covering the keypad 1704 as found on a lot of conventional cellular telephones 1700. In addition, the cellular telephone 1700, in a preferred embodiment, has a scroll switch 1712 on the left side of the housing 1714. The scroll switch 1712 can be used to select information on the alphanumeric screen 1702 or on a microdisplay 1716 located above the alphanumeric screen 1702 in a preferred embodiment. Information on the microdisplay 1716 can likewise be accessed using an additional keypad 1718 or the conventional keypad 1704 dependent on the workings of the particular cellular telephone 1700.

Figure 36B:
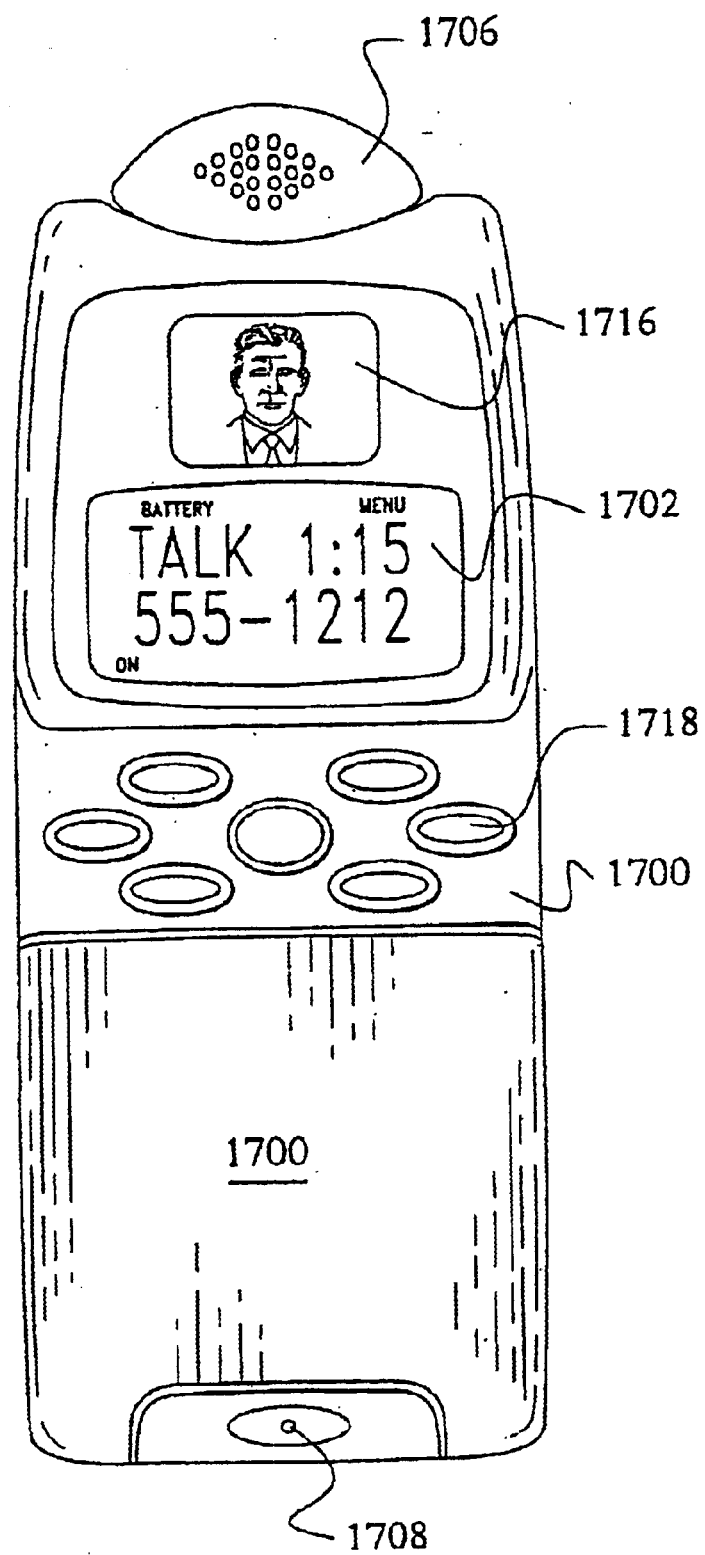

FIG. 36B shows the front of the cellular telephone 1700 with the flip lid 1710 covering the keypad. In a preferred embodiment with the flip cover 1710 in the closed position, the user can hold the cellular telephone 1700 away from the user's face so that they can view the microdisplay 1716. The phone is placed in a half-duplex mode such that the speaker 1706 and the microphone 1708 are not on at the same time, therein preventing feedback. The user is able to hear the speaker 1706 from the distance that they are located in this mode and converse with the party on the other end of the cellular telephone call. The scroll switch 1712 as seen in FIG. 36A and or the keypad 1718 can be programmed to control and select images on either the alphanumeric display 1702 or the microdisplay 1716.

In an alternative embodiment, the earpiece 1706 is detachable from the housing 1714 of the cellular telephone 1700 such that the user places the speaker 1706 in or in proximity to the user's ear. The microphone 1708 is capable of picking up conversation from the distance, approximately one foot, in that the cellular telephone 1700 is spaced from the user.

Figure 36C:
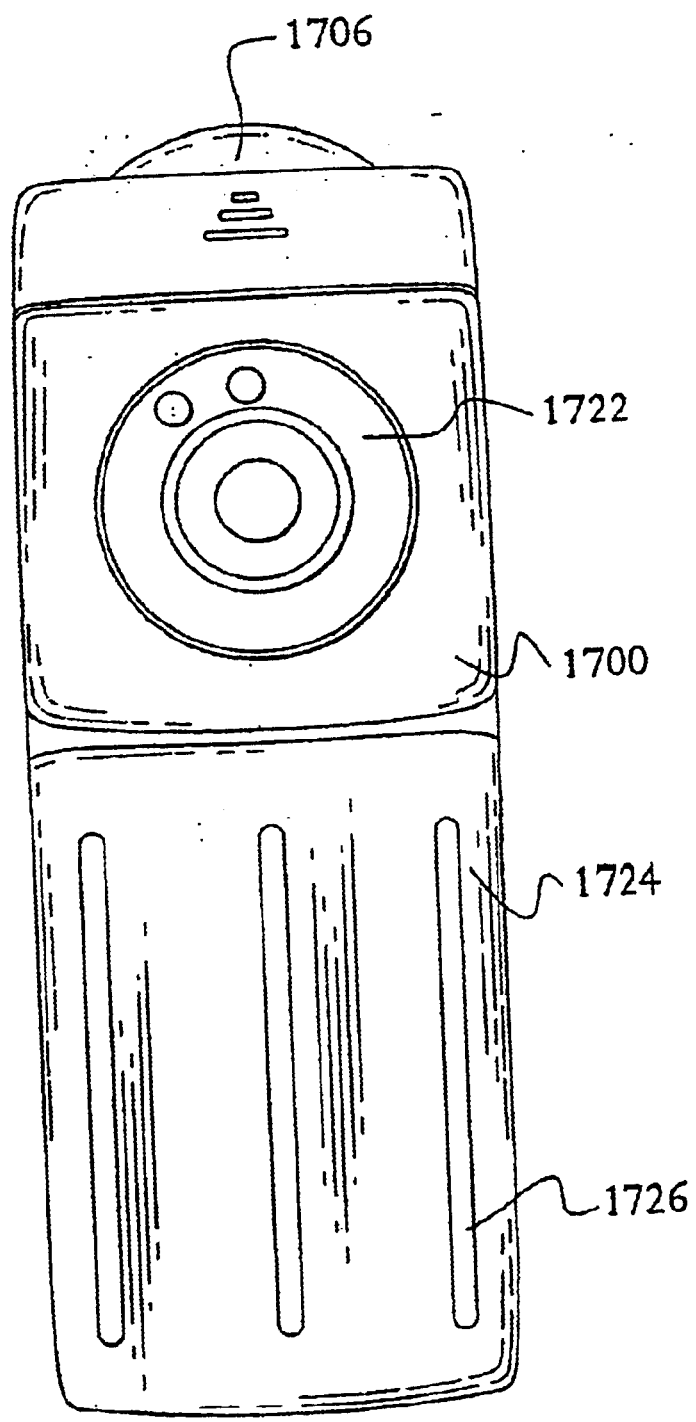

FIG. 36C shows the back of the cellular telephone 1700. The speaker housing 1706 is seen in the rear view. The cellular telephone 1700 has a camera 1722. The electronic images taken by the camera 1722 can be transmitted by the cellular telephone 1700. The microdisplay 1716 as seen in FIGS. 36A and 36B is used for the camera element 1722. The image to be recorded is selected using. In addition, the cellular telephone 1700 has a battery pack 1724. In the preferred embodiment the battery pack 1724 has a series of ribs 1726 for easy handling.

Figure 37A:
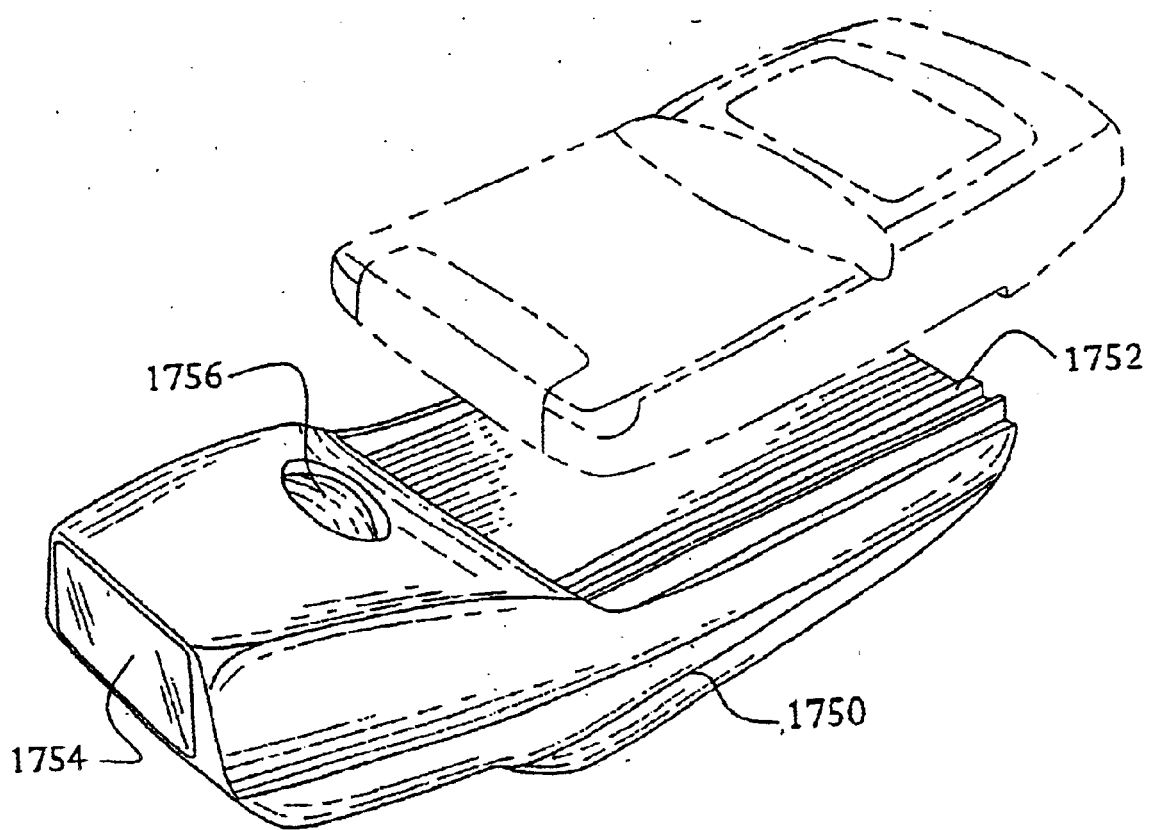
FIGS. 37A–37E illustrate an alternative display docking system.

FIG. 37A discloses a docking station 1750 having a docking element 1752 for receiving a cellular telephone. The docking station 1750 has a microdisplay with a lens 1754 wherein the optics engine is adjusted using a focus knob 1756.

Figure 37B:
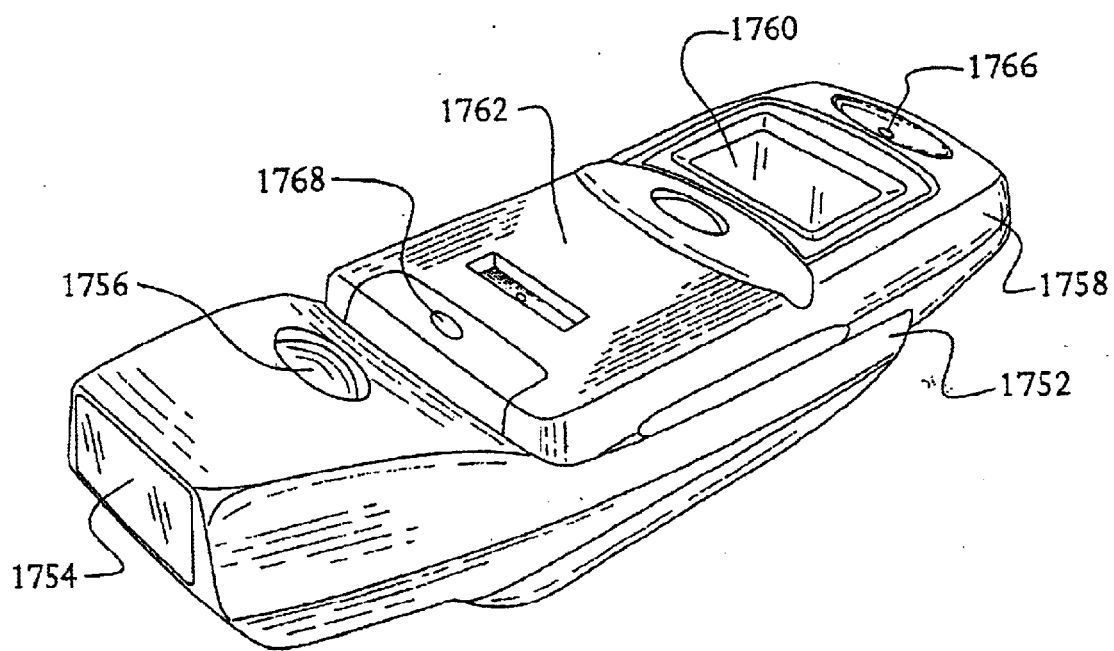

The cellular telephone 1758 is shown attached to the docking station 1750 using the docking element 1752 in FIG. 37B. The cellular telephone 1758 is a conventional cellular telephone having an alphanumeric display 1760 and a keypad. The cellular telephone 1758 has a speaker 1766 and a microphone 1768.

Figure 37C:
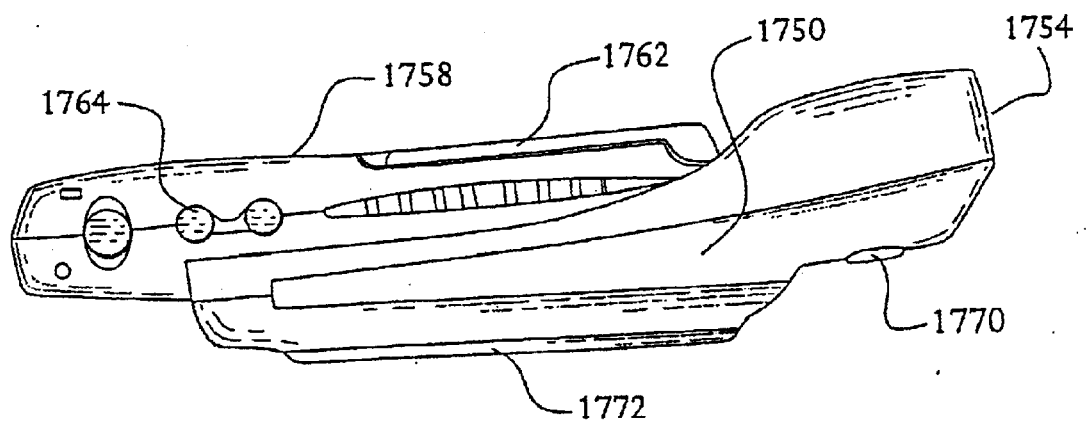

FIG. 37C shows a side view of the cellular telephone 1758 in the docking station 1750. The docking station 1750 is received by the cellular telephone 1758 in the location that the cellular telephone 1758 would typically receive its battery pack. The flip lid 1762 is shown in the closed position in FIG. 37C. The cellular telephone 1758 has a plurality of control buttons 1764 on the side. The docking station 1750 has the microdisplay located along the same plane as the cellular telephone 1758. The lens 1754 for the microdisplay is projected slightly to the right in FIG. 37C.

Figure 37D:
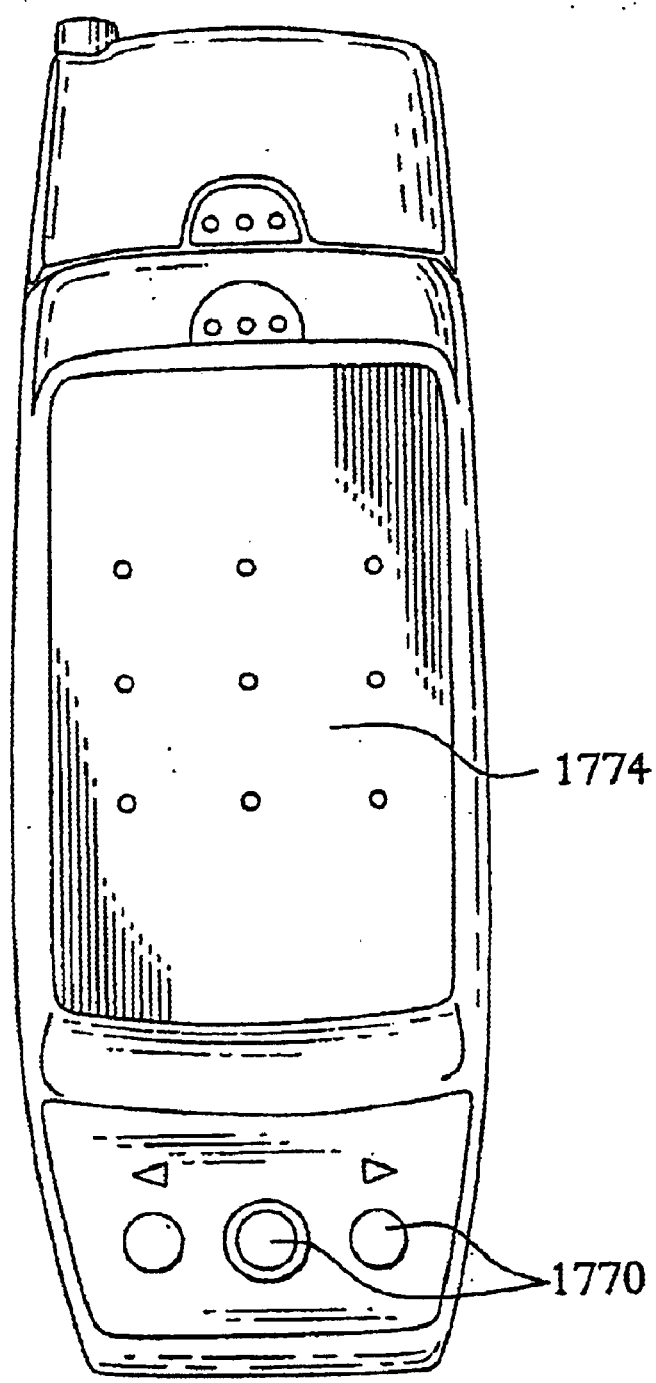

A plurality of control knobs 1770 on the housing 1772 of the docking station 1750 are seen projecting below the microdisplay. Referring to FIG. 37D, the plurality of control buttons 1770 are seen. The docking station 1750 receives a rechargeable battery 1774 on its bottom surface. The coupling of the cellular telephone 1758 to the docking station 1750 uses a knob to connect them.

Figure 37E:
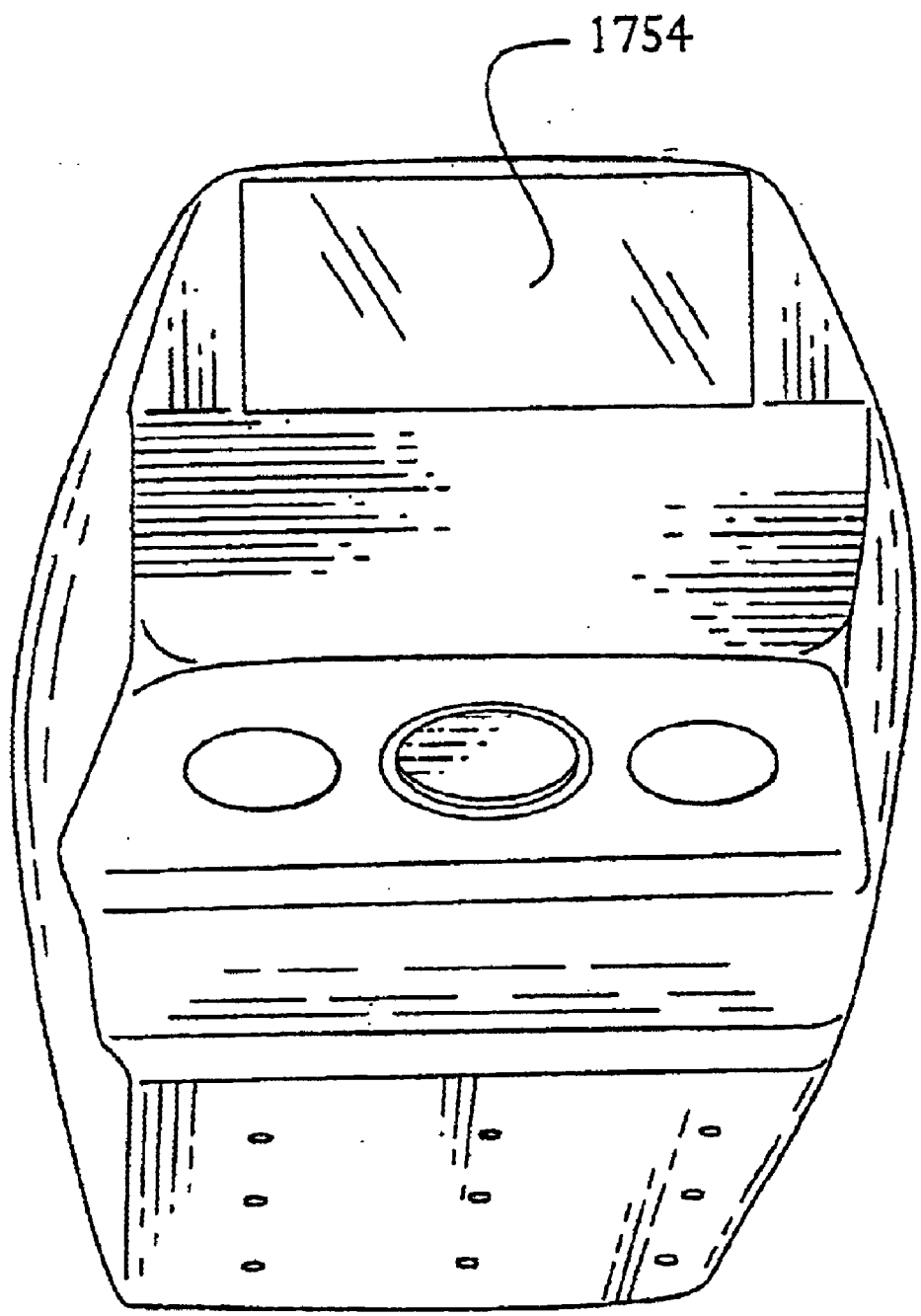

FIG. 37E is a bottom rear prospective of the docking station 1750. The image seen through the lens 1754 is selected using the control buttons 1770 located on the bottom of the housing 1772. The battery 1774 is likewise seen in this figure.

In a preferred embodiment of this embodiment, the user is not using the cellular telephone in a conventional manner, speaking and listening while viewing data on the microdisplay. In this preferred embodiment, the user is using the docking station 1750 with the cellular telephone 1758 to view data. The volume of the speaker 1766, as seen in FIG. 37B, can be adjusted so the user can listen while viewing. Either or both the control knobs 1770 or the keypad of the cellular telephone can be used to select and display data on the microdisplay through the lens 1750. It is recognized that how button is used will depend on the particular conventional cellular telephone.

In a vehicle such as a helicopter or plane, the operator is required to process a large amount of information quickly to operate the vehicle. In one preferred embodiment, the display is a head-mounted display. Therefore, the display and those components mounted on the head via a helmet need to be both lightweight and rugged. In addition, due to the varying light conditions experienced by the pilot from bright sunlight to darkness, the display needs to be able to vary the intensity.

Figure 38A:
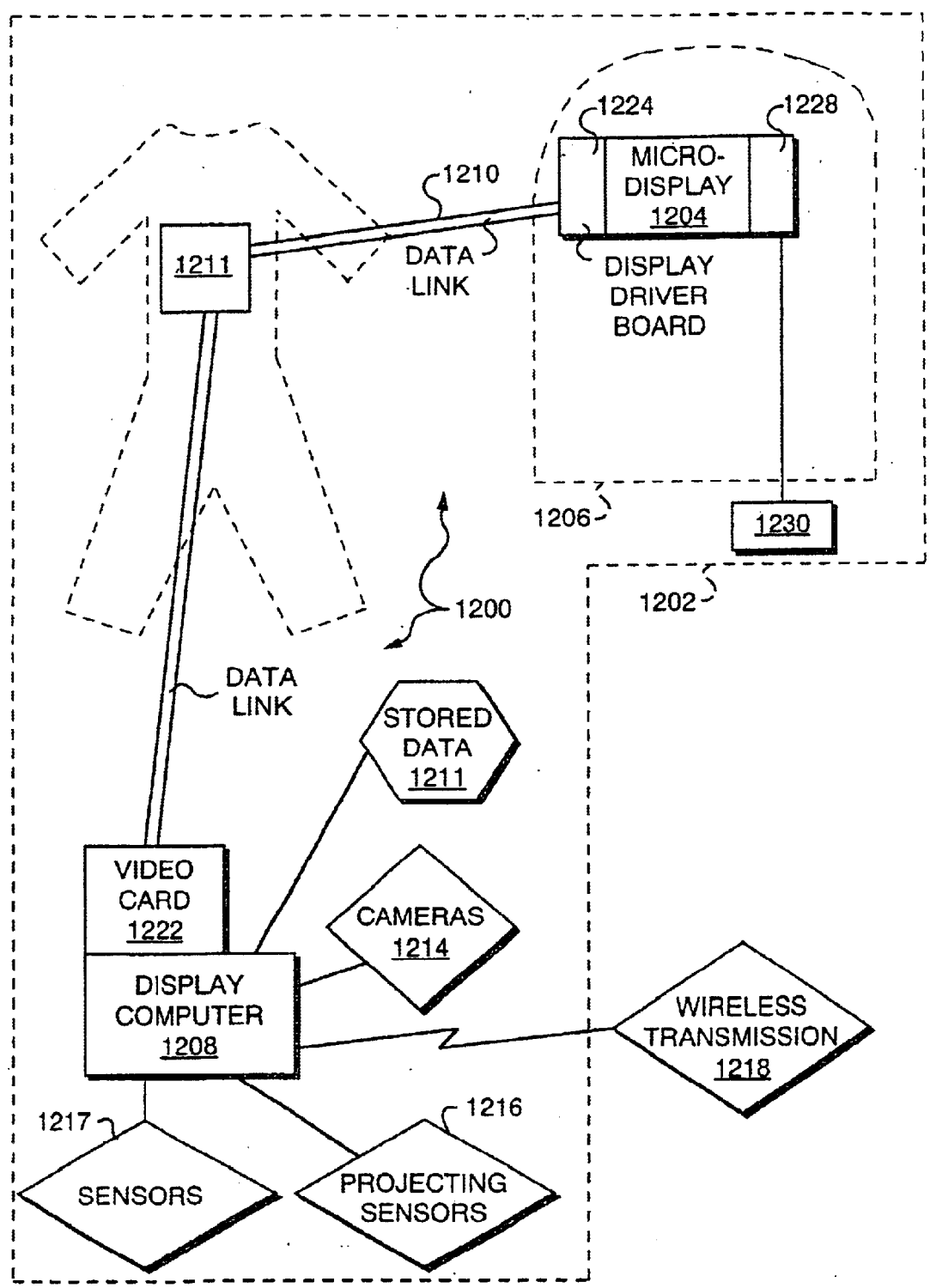
FIG. 38A is a schematic for a head mounted display system for use in a vehicle.

Referring to FIG. 38A, a schematic of a display system 1200 for a vehicle 1202 is shown. In this embodiment, the display 1204, a microdisplay, is mounted on a helmet 1206 worn by the user. The information that the display projects is transmitted from a display computer 1208 to the microdisplay 1204 through a data link 1210.

The computer 1208 receives its information from numerous sources which can include store data 1211 sensors 1212 on the vehicle for items speed, direction, altitude; cameras 1214 for enhanced vision, such as night or infrared; projecting sensor 1216, such as a radar system, and information received from other sources by wireless transmission 1218. The computer 1208 can select and combine the data based on inputs from the operator.

The information is transferred to the microdisplay 1204 from the display computer 1208 using the data link 1210. The data link 1210 takes the data which is converted on a video card 1222, which is connected and adjacent to the display computer 1208, and transfers it to a display driver board 1224, located in proximity to the microdisplay 1204 by a link 1226, either a twisted flat wired cable or/and optical cables, as seen in FIG. 38C. In FIG. 38A, the data link 1210 has a quick-disconnect 1211 on a user's flight suit.

The data link 1210 converts the information so that it can be transmitted quickly at high band width with a minimum number of connections. For example, in a preferred embodiment, the microdisplay 1204 is 1280×1024 pixel array having a light bit gray scale.

Figure 38B:
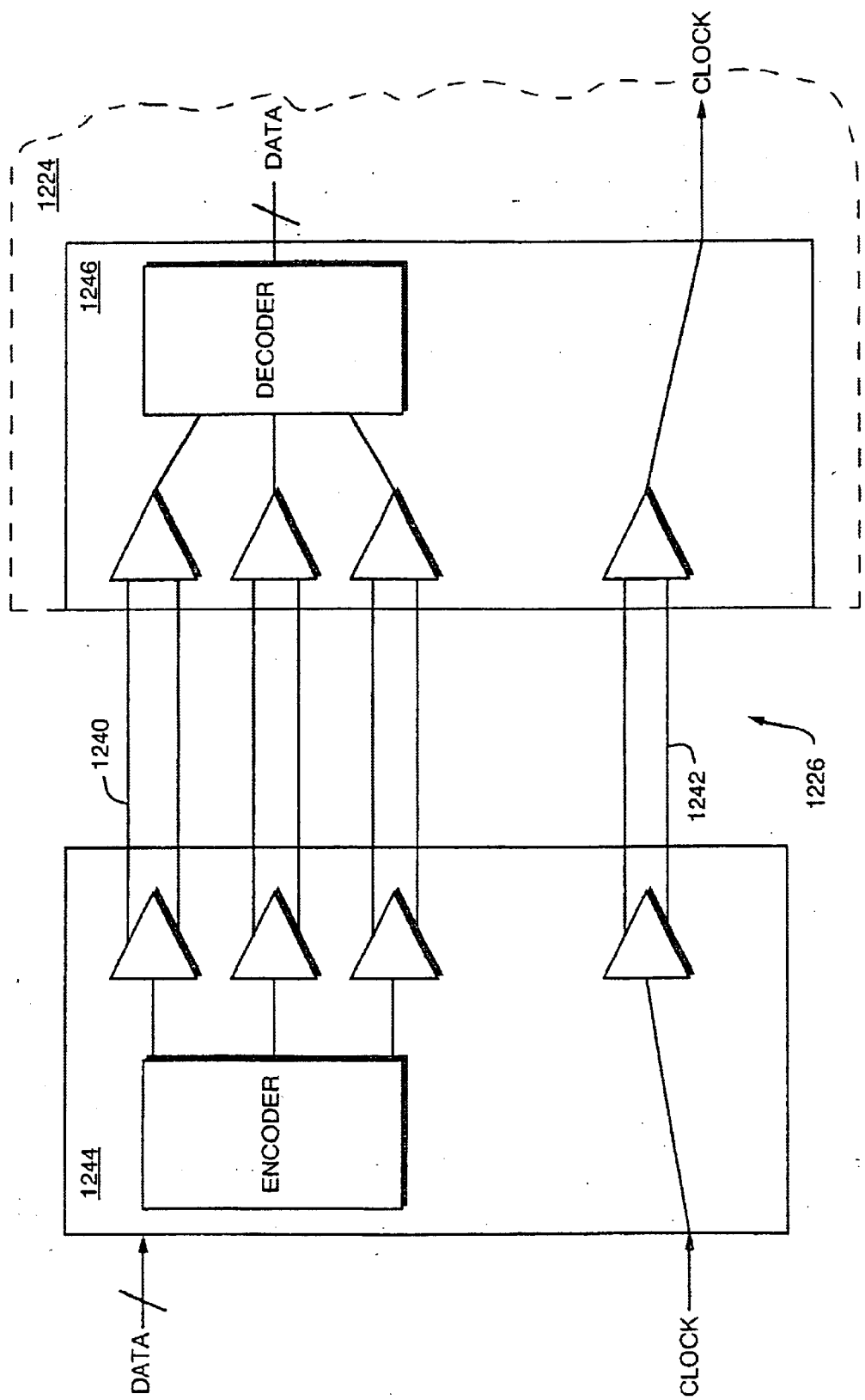
FIG. 38B is a schematic of a data link.
Figure 38C:
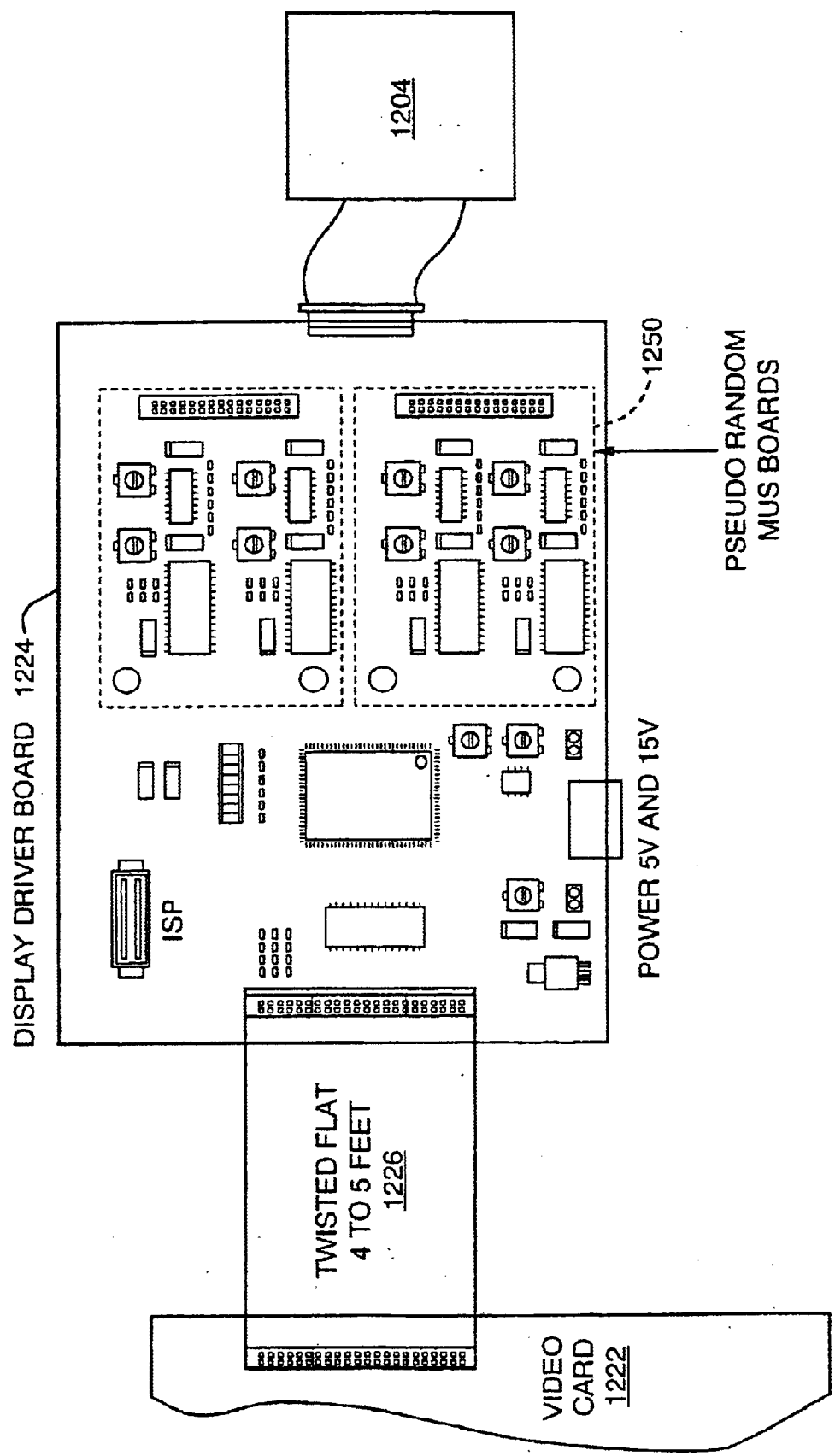
FIG. 38C illustrates the data link between video card and a display driver board.

The link 1226 of the data link 1210 as shown in FIG. 38B, has a plurality of paired data signal wires 1240 or fiber optics and a clock-pair wires 1242 or optics. The data is encoded and serialized by a transmitter unit 1244 located on the video card 1222. The data is sent across the link at a higher clock rate, such as greater than 100 Mbytes/sec. greater than 200

Mbytes/sec. or greater than 300 Mbytes/sec. A receiver 1246 located on the display driver board 1224 decodes the data and places it back into a "parallel" data form. In a preferred embodiment, the data link is such as the one marketed by Silicon Images, Inc. under the tradename PanelLink. The purpose of the link is to speed the data using the minimum number of data lines. The data link or transmission system uses a Fibre Channel such as available from numerous suppliers such as FlatLink™ Data Transmission System from Texas Instruments or PanelLink™ Technology from Silicon Images.

In addition to the data link 1210, the display system 1200 of FIG. 38C includes a pair of pseudo-random multiplexing boards 1254. The microdisplay 1204 in this preferred embodiment receives an analog signal which is converted from a digital signal on the display driver board 1224. The signal converted through the digital to analog converter (D/A converter) 1252 is sent through an amplifier (operational amplifier) 1254. Each amplifier is slightly different; therefore, if the same signal is input into each amplifier, a different signal would be output. While the amplifiers can be tuned/adjusted, the pseudo-random multiplexing is easier. When the amplifiers are used for the signal on a display, the user may note dark and light columns because of the varying output signal.

The pseudo-random multiplexing system is formed on a board that plugs into the display driver board in a preferred embodiment. It is recognized that the pseudo-random multiplexing system can be formed integral with the display driver board.

The pseudo-random multiplexing system captures the signal from the D/A converter pseudo-randomly sends the signal to one of the amplifiers and then takes the signal from the amplifier and sends it to the proper output, the inputs for the microdisplay.

Figure 38D:
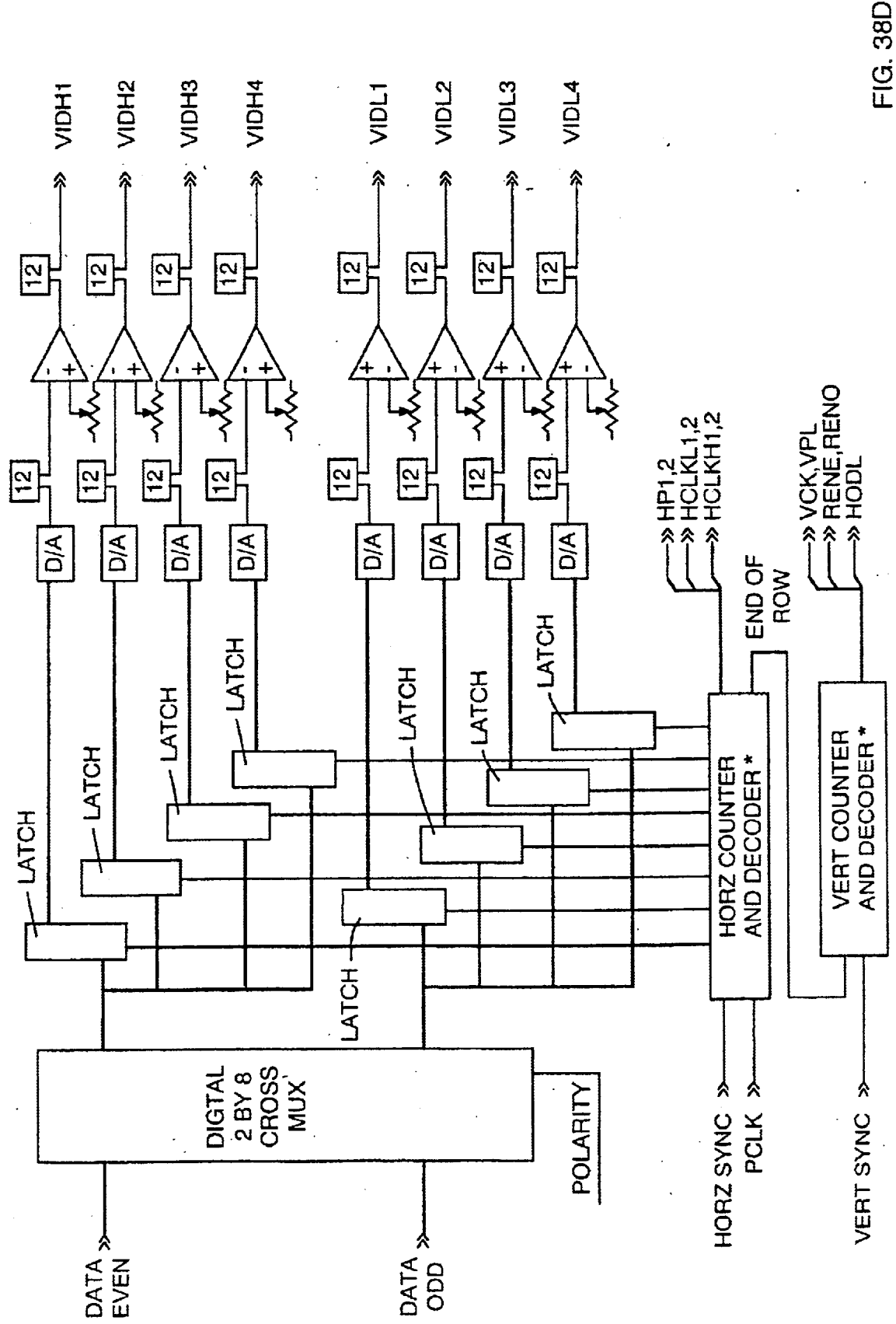
FIG. 38D is a schematic of a digital drive.

Referring to FIG. 38D, the driver for the display is schematically shown. The data enter in series digital 2-by-8 cross max (demultiplexer) in two channels, a data even channel and a data odd channel. The data exits in eight (8) channels, four (4) channels video high (even rows) and 4 channels video low (odd rows). The data is sent to the D/A converters with a plurality of latch controlled by the horizontal counter controlling the flow of data. The converted signal from the D/A converter is taken by the pseudo-random multiplex board and routed to one of the amplifiers and then to the proper output. The inputs to the pseudo-random multiplex board are represented by the "1" on the terminals and the outputs are represented by the "2" on the terminals shown in FIG. 38D.

In a preferred embodiment, the vehicle is a helicopter. The backlight light source is located remote from the microdisplay. The light source for the backlight is located either below or aft of the user, a pilot, and channeled by fiber optics to the pilot's helmet. The microdisplay works in conjunction with a lighting system, in a preferred embodiment, a backlight 1220.

The lighting system is connected to a controller 1230 as seen in FIG. 38A for varying the intensity of the light for both day-to-night vision. In addition, in another preferred embodiment the controller is capable of varying the intensity of the light of individual LEDS to improve the color quality for a color sequential display as discussed above.

The lighting system shown in FIG. 38A is a monochrome LED mounted in proximity to the microdisplay 1204 on the helmet 1206.

While the above has been described related to a vehicle such as an aircraft, it is recognized that the configuration may be used in other embodiments such as connecting to an ordinary personal computer.

The pseudo-random multiplexer has two identical units. One unit pseudo-randomizes the inputs to the video high and the second unit pseudo-randomizes the inputs to the video low. The pseudo-random multiplex does not mix amplifiers between the high signal and the low signal in a preferred embodiment. The amplifiers have different offsets. It is recognized however that such mixing could occur.

Figure 38E:
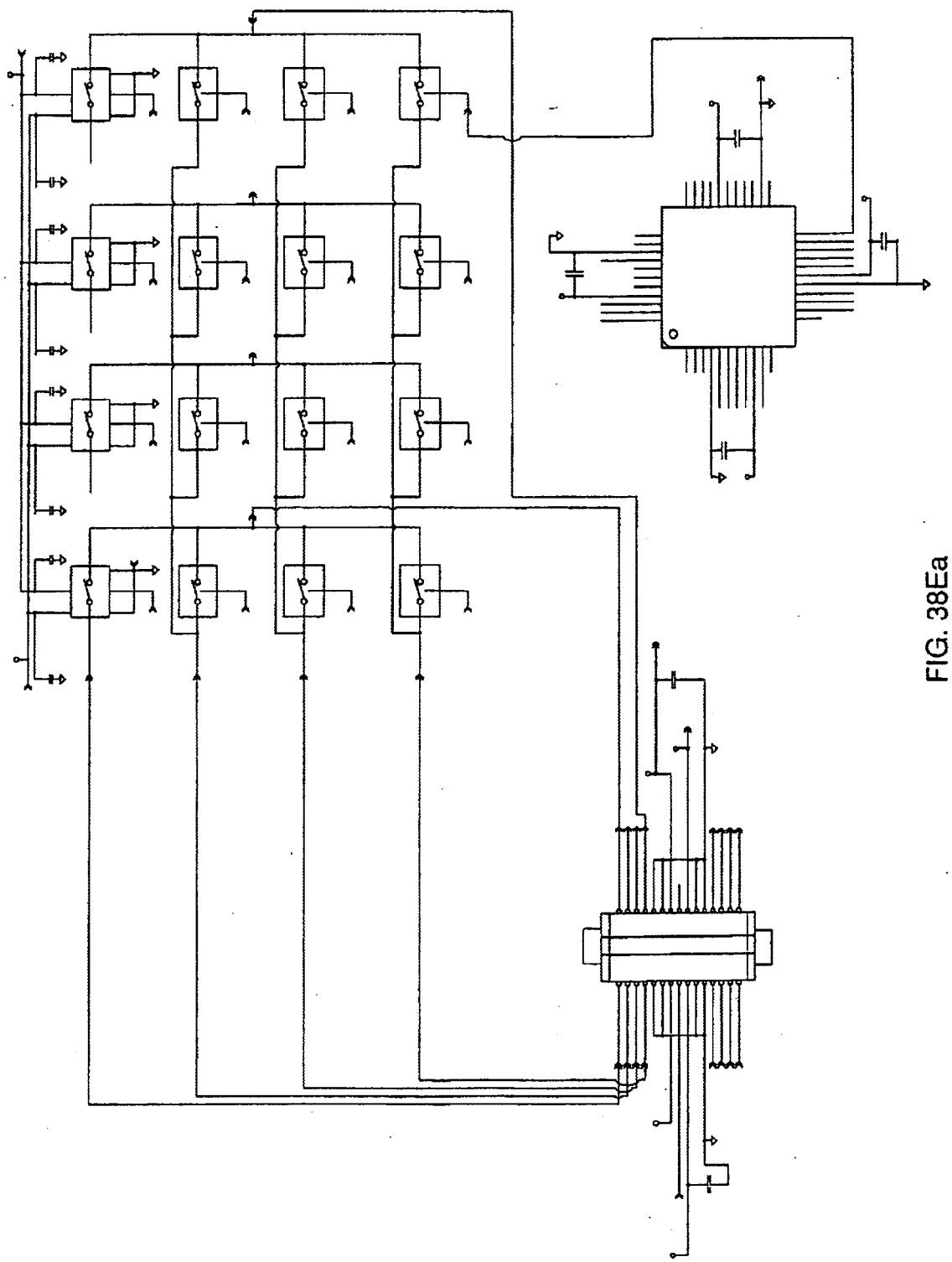
FIGS. 38Ea and 38Eb are a schematic of a pseudo-random multiplexer.
Figure 38E:
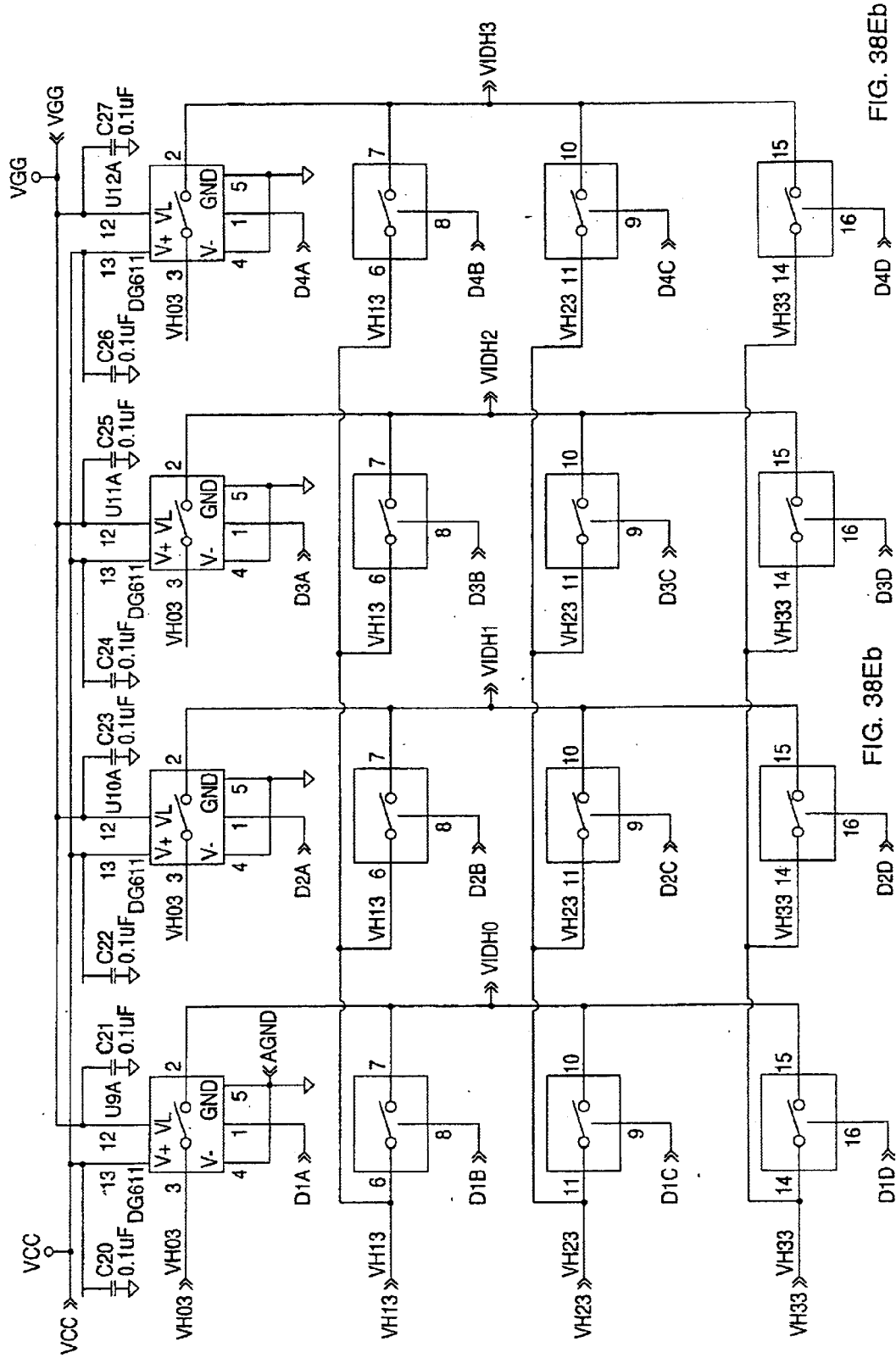

FIG. 38E is an illustration of a schematic of one pseudo-random multiple. The board has a header with eight (8) inputs, for receiving the outputs from four respective D/A converters and the outputs from four amplifiers. The header has eight (8) outputs for sending the signal to the four amplifiers and four respective video signals. In addition, the header which connects to the display driver board transmits the clock signal (Muxclck), the circuit board voltage ($V_{CC}$) and the ground voltage ($V_{SS}$). The signals (the four signals) from the D/A converter are each fed from the header to four individual switch circuits. There are therefore sixteen (16) switching circuits for this portion. In a preferred embodiment, each set of four switches are located on a chip. Each of the individual switches receives a controlling input from a logic chip. Only one switch in each set, and a different one in each set, is closed to all the input flow to the output which is the input to the amplifier. The output from the amplifier follows a similar path through the header to a second set of switches. The second set of switches is controlled using the same inputs from the logic chip, and therefore the output from the switch is sent to the proper video signal. The signal going through the top D/A converter in FIG. 38D is sent down the top signal line.

The following are two examples of how the respected switching can be set. In the first example, the signal from the first two inputs is sent to the amplifier which it would be sent to without the pseudo-random multiplexer. The signals from the third and the fourth inputs are switched by the multiplexer before entering the amplifier and then switched back to the correct line before forwarding to the display.

| INPUT | OUTPUT | | | |
|---|---|---|---|---|
| | 0 | 1 | 2 | 3 |
| 0 | X | | | |
| 1 | | X | | |
| 2 | | | | X |
| 3 | | | X | |

| Switch FIG. 38Ea | Switch FIG. 38Eb |
|---|---|
| VH01→VH02 | VH03→VIDH0 |
| VH11→VH12 | VH13→VIDH1 |
| VH21→VH32 | VH33→VIDH2 |
| VH31→VH22 | VH23→VIDH3 |

In the second example, the signals from the inputs are sent to the amplifier following. The signal from the last input is sent to the first amplifier. The output from the amplifier and then switched back to the correct line before forwarding to the display.

|  | OUTPUT | | | |
| --- | --- | --- | --- | --- |
| INPUT | 0 | 1 | 2 | 3 |
| 0 |  | X |  |  |
| 1 |  |  | X |  |
| 2 |  |  |  | X |
| 3 | X |  |  |  |

| Switch FIG. 38Ea | Switch FIG. 38Eb |
| --- | --- |
| VH01→VH12 | VH13→VIDH0 |
| VH11→VH22 | VH23→VIDH1 |
| VH21→VH32 | VH33→VIDH2 |
| VH31→VH02 | VH03→VIDH3 |

With the four (4) input and four (4) outputs, the two above examples are just two of 16 combinations. The pseudo-random multiplexer constantly switches between the sixteen (16) conditions to allow the eye to integrate the amplifiers. The rate can be either frame rate (60 HZ) or run pate (60 KHZ). Row rate is preferred.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A portable microdisplay system comprising:
    an active matrix liquid crystal display including an array of at least 75,000 pixel electrodes, the active matrix liquid crystal having an active matrix circuit having an array of transistor circuits formed in a first plane, each transistor circuit being connected to a pixel electrode in an array of pixel electrodes having an area of 200 mm² or less, and a counter electrode panel extending in a second plane that is parallel to the first plane;
    a light source positioned to illuminate the array of pixel electrodes;
    a lens positioned to receive an image formed on the active matrix liquid crystal display and that magnifies the image by at least a factor of two;
    a display circuit that generates images to be displayed on the liquid crystal display and connected to the active matrix liquid crystal display, the counterelectrode panel receiving an applied voltage such that the display circuit actuates the pixel electrodes to write an image, flashes the light source to illuminate the image, and switches the applied voltage to the counterelectrode to erase the image; and
    a data link that transmits data at a rate of speed of greater than 100 Mbytes per second in series between the display circuit computer and the active matrix liquid crystal display.

2. A portable microdisplay system of claim 1 wherein the array of the pixel electrodes comprises an array of at least 640×480.

3. A portable microdisplay system of claim 2 wherein the light source is a backlight of at least one light emitting diode device.

4. A portable microdisplay system of claim 2 wherein the light source is remote from the display and the light is transmitted by a fiber optics cable.

5. A portable microdisplay system of 2 wherein the light source varies intensity and has a light source for ambient daylight and a light source for night vision.

6. A portable microdisplay system of claim 2 wherein the display is a color sequential and further comprising at least three light emitting diode devices for illuminating the array of pixel electrodes.

7. A portable microdisplay system of claim 2 wherein the array of pixel electrodes comprises an array of at least 1280×1024.

8. A portable microdisplay system of claim 7 where the data link has a transmission rate of speed greater than 200 Mbytes per second.

9. A portable microdisplay system of claim 7 where the data link has a transmission rate of speed greater than 300 Mbytes per second.

10. A portable microdisplay system of claim 7 wherein the microdisplay and lens are mounted on a helmet.

11. A portable microdisplay of claim 1 wherein the active matrix liquid display has a liquid crystal layer interposed in a cavity between the first and the second planes, the cavity having a depth of less than 3 microns.

12. A portable microdisplay of claim 11 further comprising an oxide layer over the pixel electrode arrays.

13. A portable microdisplay of claim 11 wherein the depth of the cavity is 2 μm or less.

14. A portable microdisplay system of claim 11 wherein the display circuit further times the initializing of the pixel electrodes to a selected state after switching the applied voltage to the counterelectrode and prior to the writing of a further image.

15. A portable microdisplay system of claim 14 wherein the selected state that the pixel electrodes are set to is such that the liquid crystal relaxes to a transmissive state.

16. A portable microdisplay system of claim 1 further comprising a randomizing device for alternating the amplifier through which an analog video signal passes.

17. A portable microdisplay system of claim 1 wherein the display circuit includes a switch that switches the setting of a common voltage that enters the display.

18. A portable microdisplay system of claim 17 wherein the display circuit includes a timing control circuit that controls the switch.

19. A portable microdisplay system of claim 17 wherein at one setting of the common voltage the image is presented on the display, and at a second setting the image is erased.

20. A digital camera comprising:
    a housing;
    an image sensor within the housing that senses an image;
    a signal processor within the housing that processes signals from the image sensor;
    an active matrix display positioned within the housing and having an active matrix circuit including an array of transistor circuits in a first plane, a counter electrode panel extending in a second plane that is parallel to the first plane, and a plurality of pixel electrodes that displays an image, the pixel electrodes being connected to the signal processor;
    a light source within the housing positioned to illuminate the active matrix display;
    a display control circuit within the housing that controls activation of the pixel electrodes, the display control circuit being connected to the active matrix display by a data link that transmits data at a rate of speed of greater than 100 Mbytes per second in series, the counter electrode panel of the active matrix display receiving an applied voltage such that the display circuit actuates the pixel electrodes to write an image, flashes the light source to illuminate the image, switches the applied voltage to the counter electrode to erase the image, and initializes the pixel electrodes to a selected specific state prior to the writing a further image; and a lens optically coupled to the matrix display to magnify an image on the display.

21. A digital camera of claim 20 further comprising an alphanumeric display.

22. A digital camera of claim 21 wherein the active imaging area of less than 158 mm$^2$.

23. A digital camera of claim 21 wherein the matrix display having at least 640×480 pixel electrodes.

24. A digital camera of claim 21 further comprising a mirror for projecting the image from the microdisplay.

25. A digital camera of claim 20 wherein the active matrix display is a color sequential display has at least 320×240 pixel electrodes and an active imaging area of less than 200 mm$^2$ and is a color sequential display system with an LED backlight system.

26. A digital camera of claim 25 wherein the selected state that the pixel electrodes are set to is such that the liquid crystal relaxes to a transmissive state.

27. A digital camera of claim 20 further comprising a randomizing device alternates the amplifier through which an analog video signal passes.

28. A digital camera of claim 20 wherein the display control circuit includes a switch that sets the level of a common voltage that enters the display.

29. A digital camera of claim 28 wherein the display circuit includes a timing control circuit that controls the switch.

30. A digital camera of claim 28 wherein at one setting of the common voltage the image is presented on the display, and at a second setting the image is erased.

31. A portable microdisplay system comprising an active matrix liquid crystal display including an array of at least 75,000 pixel electrodes, the active matrix liquid crystal display having an active matrix circuit having an array of transistor circuits formed in a first plane, each transistor circuit being connected to a pixel electrode in an array of pixel electrodes having an active area of less than 158 mm$^2$, and a counter electrode panel extending in a second plane that is parallel to the first plane;

a light source positioned to illuminate the active matrix display;

a display control circuit that controls activation of the pixel electrodes, the display control circuit being connected to the active matrix liquid crystal display by a data link that transmits data at a rate of speed of greater than 100 Mbytes per second in series, the counter electrode panel of the active matrix liquid crystal display receiving an applied voltage such that the display circuit actuates the pixel electrodes to write an image, flashes the light source to illuminate the image, switches the applied voltage to the counter electrode to erase the image, and initializes the pixel electrodes to a selected state prior to the writing of a further image; and a lens positioned to receive an image formed on the active matrix liquid crystal display and magnify the image by at least a factor of two.

32. A portable communication system of claim 31 further comprising a delay locked-loop for eliminating clock skew including a voltage-controlled delay element located in a signal path, and a feedback path having a phase detector and integrator for controlling the voltage control delay.

33. A portable display system of claim 31 further comprising phase-locked loop including a voltage-controlled oscillator located in a signal path for generating an internal clock and a feedback path having a phase detector and integrator for controlling the voltage-controlled oscillator.

34. A portable display system of claim 31 wherein the selected state that the pixel electrodes are set to is such that the liquid crystal relaxes to a clear position.

35. A portable microdisplay system of claim 31 wherein the display control circuit includes a switch that sets the level of a common voltage that enters the display.

36. A portable microdisplay system of claim 35 wherein the display circuit includes a timing control circuit that controls the switch.

37. A portable microdisplay system of claim 35 wherein at one setting of the common voltage the image is presented on the display, and at a second setting the image is erased.

38. A portable microdisplay system comprising:

an active matrix liquid crystal display including an active matrix circuit having an array of transistor circuits formed in a first plane, each transistor circuit being connected to a pixel electrode in an array of pixel electrodes, and a counter electrode panel extending in a second plane that is parallel to the first plane;

a light source positioned to illuminate the array of pixel electrodes;

a lens positioned to receive an image formed on the active matrix liquid crystal display and that magnifies the image by at least a factor of two;

a display control circuit that generates images to be displayed on the liquid crystal display and connected to the active matrix liquid crystal display by a data link that transmits data at a rate of speed of greater than 100 Mbytes per second in series and to the light source, the display control circuit including a first switching circuit connected to the counterelectrode panel, the first switching circuit selecting a high or a low common voltage applied to the counterelectrode panel, a second switching circuit that selects a video or an inverted video signal to be transmitted to the display, and a timing control circuit that determines when the display control circuit actuates the pixel electrodes to write an image and flashes the light source to illuminate the image, when the second switching circuit selects the video or the inverted video signal, and when the first switching circuit selects the high or low common voltage applied to the counterelectrode to erase the image.

* * * * *